US012572198B2

(12) United States Patent
Yerkes et al.

(10) Patent No.: US 12,572,198 B2
(45) Date of Patent: Mar. 10, 2026

(54) USER INTERFACES FOR GAZE TRACKING ENROLLMENT

(71) Applicant: Apple Inc., Cupertino, CA (US)

(72) Inventors: Giancarlo Yerkes, San Francisco, CA (US); Philipp Rockel, San Francisco, CA (US); Stephen O. Lemay, Palo Alto, CA (US); William A. Sorrentino, III, Kentfield, CA (US); Katherine W. Kolombatovich, New York, NY (US); Adam L. Amadio, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 140 days.

(21) Appl. No.: 18/371,403

(22) Filed: Sep. 21, 2023

(65) Prior Publication Data

US 2024/0118746 A1      Apr. 11, 2024

Related U.S. Application Data

(60) Provisional application No. 63/522,091, filed on Jun. 20, 2023, provisional application No. 63/470,943, filed on Jun. 4, 2023, provisional application No. 63/409,051, filed on Sep. 22, 2022.

(51) Int. Cl.
*G06F 9/451* (2018.01)
*G06F 3/01* (2006.01)
(52) U.S. Cl.
CPC .............. *G06F 3/013* (2013.01); *G06F 9/453* (2018.02)

(58) Field of Classification Search
CPC ................................. G06F 9/453; G06F 3/013
See application file for complete search history.

(56) References Cited

U.S. PATENT DOCUMENTS

| | | | |
|---|---|---|---|
| 7,057,625 | B2 | 6/2006 | Kamata et al. |
| 8,418,075 | B2 | 4/2013 | Gallo et al. |
| 8,594,374 | B1 | 11/2013 | Bozarth |
| 8,983,846 | B2 | 3/2015 | Di Profio et al. |
| 9,965,039 | B2 | 5/2018 | Kwon |
| 10,148,912 | B1 | 12/2018 | Oliver et al. |
| 10,199,051 | B2 | 2/2019 | Binder et al. |
| 10,762,716 | B1 | 9/2020 | Paul et al. |

(Continued)

FOREIGN PATENT DOCUMENTS

| | | |
|---|---|---|
| CN | 105874405 A | 8/2016 |
| CN | 108574773 A | 9/2018 |

(Continued)

OTHER PUBLICATIONS

Kxowls, "Face Unlock Not Working", Online available at: https://youtube.com/shorts/EF8WgD_9Oiw?si=i-4X8OAGPLHgMfvz, Nov. 2, 2020, 2 pages.

(Continued)

*Primary Examiner* — Tadesse Hailu
(74) *Attorney, Agent, or Firm* — YHE Law LLP

(57) ABSTRACT

Gaze enrollment, including displaying an enrollment progress user indicator, animating movement of user interface elements, changing the appearances of user interface elements, and/or moving a user interface element over time, enable a computer system to more accurately track the gaze of a user of the computer system.

66 Claims, 74 Drawing Sheets

1000

1002
Displaying, via the display generation component, a plurality of user interface elements 1004
While displaying the plurality of user interface elements with a first visual appearance, detecting, via at least one input device of the one or more input devices, a gaze of a user of the computer system that is directed to a plurality of different user interface objects including a gaze directed toward a first user interface element and gaze directed toward a second user interface element.

1006
In response to detecting the gaze of the user of the computer system:

1008
In accordance with a determination that the gaze of the user of the computer system is directed to a location corresponding to the first user interface element of the plurality of user interface elements for less than a threshold amount of time, updating display, via the display generation component, of the first user interface element to have a second visual appearance that is different from the first visual appearance.

1010
In accordance with a determination that the gaze of the user of the computer system is directed to a location corresponding to a second user interface element, different from the first user interface element, of the plurality of user interface elements for less than the threshold amount of time, updating display, via the display generation component, of the second user interface element to have the second visual appearance.

1012
In accordance with a determination that the gaze of the user is directed to the location corresponding to the first user interface element for more than the threshold amount of time, changing, via the display generation component, the first user interface element to a third visual appearance different from the first visual appearance and the second visual appearance.

1014
In accordance with a determination that the gaze of the user is directed to the location corresponding to the second user interface element for more than the threshold amount of time, changing, via the display generation component, the second user interface element to the third visual appearance.

(56) References Cited

U.S. PATENT DOCUMENTS

| | | | |
|---|---|---|---|
| 10,802,582 | B1 | 10/2020 | Clements |
| 11,106,280 | B1* | 8/2021 | Bigham .................. G06F 3/013 |
| 11,907,421 | B1 | 2/2024 | Clements |
| 2001/0030715 | A1 | 10/2001 | Tabata |
| 2006/0120707 | A1 | 6/2006 | Kusakari et al. |
| 2006/0156228 | A1 | 7/2006 | Gallo et al. |
| 2007/0024579 | A1 | 2/2007 | Rosenberg |
| 2008/0030496 | A1 | 2/2008 | Lee et al. |
| 2008/0218641 | A1 | 9/2008 | Kjeldsen et al. |
| 2011/0032274 | A1 | 2/2011 | Miyata |
| 2012/0036433 | A1 | 2/2012 | Zimmer et al. |
| 2012/0081356 | A1 | 4/2012 | Filippov et al. |
| 2012/0105444 | A1 | 5/2012 | Tokuda |
| 2012/0105486 | A1 | 5/2012 | Lankford et al. |
| 2012/0189273 | A1 | 7/2012 | Folgner et al. |
| 2012/0200600 | A1 | 8/2012 | Demaine |
| 2012/0254989 | A1 | 10/2012 | Levien et al. |
| 2012/0295708 | A1 | 11/2012 | Hernandez-Abrego et al. |
| 2012/0316876 | A1 | 12/2012 | Jang et al. |
| 2013/0010093 | A1 | 1/2013 | Redmann et al. |
| 2013/0014052 | A1 | 1/2013 | Frey et al. |
| 2013/0036380 | A1 | 2/2013 | Symons |
| 2013/0114043 | A1 | 5/2013 | Balan et al. |
| 2013/0201185 | A1 | 8/2013 | Kochi |
| 2013/0227596 | A1 | 8/2013 | Pettis et al. |
| 2013/0304479 | A1 | 11/2013 | Teller et al. |
| 2013/0307771 | A1 | 11/2013 | Parker et al. |
| 2014/0195918 | A1 | 7/2014 | Friedlander |
| 2014/0222436 | A1 | 8/2014 | Binder et al. |
| 2014/0226131 | A1 | 8/2014 | Lopez et al. |
| 2014/0237393 | A1 | 8/2014 | Van Wie et al. |
| 2014/0350924 | A1 | 11/2014 | Zurek et al. |
| 2014/0354539 | A1* | 12/2014 | Skogo ...................... G06F 3/013 |
| | | | 345/156 |
| 2015/0109191 | A1 | 4/2015 | Johnson et al. |
| 2015/0130740 | A1 | 5/2015 | Cederlund et al. |
| 2015/0135309 | A1 | 5/2015 | Karmarkar et al. |
| 2015/0154001 | A1 | 6/2015 | Knox et al. |
| 2015/0169053 | A1 | 6/2015 | Bozarth et al. |
| 2015/0228121 | A1 | 8/2015 | Tsukahara et al. |
| 2015/0370323 | A1 | 12/2015 | Cieplinski et al. |
| 2016/0182435 | A1 | 6/2016 | Landqvist et al. |
| 2016/0219262 | A1 | 7/2016 | Cole et al. |
| 2016/0253745 | A1 | 9/2016 | Lee |
| 2016/0306533 | A1* | 10/2016 | Agarwal ............. G06F 3/04845 |
| 2016/0320838 | A1 | 11/2016 | Teller et al. |
| 2017/0004828 | A1 | 1/2017 | Lee et al. |
| 2017/0108924 | A1 | 4/2017 | Hurter |
| 2017/0195307 | A1 | 7/2017 | Jones-McFadden et al. |
| 2017/0235361 | A1 | 8/2017 | Rigazio et al. |
| 2017/0318019 | A1 | 11/2017 | Gordon et al. |
| 2017/0332035 | A1 | 11/2017 | Shah et al. |
| 2017/0332045 | A1 | 11/2017 | Metter et al. |
| 2017/0336867 | A1 | 11/2017 | Wilairat et al. |
| 2017/0353423 | A1 | 12/2017 | Morrison et al. |
| 2018/0012070 | A1 | 1/2018 | Shin et al. |
| 2018/0018514 | A1 | 1/2018 | Azam et al. |
| 2018/0024846 | A1 | 1/2018 | Wu et al. |
| 2018/0063249 | A1 | 3/2018 | Nguyen |
| 2018/0095635 | A1 | 4/2018 | Valdivia et al. |
| 2018/0096690 | A1 | 4/2018 | Mixter et al. |
| 2018/0233139 | A1 | 8/2018 | Finkelstein et al. |
| 2018/0262834 | A1 | 9/2018 | Cho et al. |
| 2018/0268747 | A1 | 9/2018 | Braun |
| 2018/0365898 | A1 | 12/2018 | Costa |
| 2019/0080066 | A1 | 3/2019 | Van Os et al. |
| 2019/0138092 | A1* | 5/2019 | Song ...................... G06F 3/013 |
| 2019/0155382 | A1 | 5/2019 | Ikuta et al. |
| 2019/0235247 | A1* | 8/2019 | Norden .................. G06F 3/013 |
| 2019/0333508 | A1 | 10/2019 | Rao et al. |
| 2019/0371323 | A1 | 12/2019 | Kao et al. |
| 2020/0042083 | A1 | 2/2020 | Min |
| 2020/0075015 | A1 | 3/2020 | Taki et al. |
| 2020/0103963 | A1 | 4/2020 | Kelly et al. |
| 2020/0225746 | A1* | 7/2020 | Bar-Zeev ............. G02B 27/017 |
| 2020/0379560 | A1 | 12/2020 | Krasadakis |
| 2020/0401686 | A1 | 12/2020 | Duchastel |
| 2021/0027790 | A1 | 1/2021 | Choi et al. |
| 2021/0048883 | A1 | 2/2021 | Kelly et al. |
| 2021/0151008 | A1 | 5/2021 | Chrapek et al. |
| 2021/0255269 | A1 | 8/2021 | Lv et al. |
| 2021/0286502 | A1 | 9/2021 | Lemay et al. |
| 2021/0287416 | A1 | 9/2021 | O'Hagan et al. |
| 2022/0074754 | A1 | 3/2022 | Elder et al. |
| 2022/0100270 | A1* | 3/2022 | Pastrana Vicente .. G06F 3/0481 |
| 2022/0100812 | A1 | 3/2022 | Anvaripour et al. |
| 2022/0121277 | A1 | 4/2022 | Azam et al. |
| 2022/0207840 | A1 | 6/2022 | Cansizoglu et al. |
| 2022/0214743 | A1* | 7/2022 | Dascola .................. G06F 3/017 |
| 2022/0237660 | A1 | 7/2022 | Balondona |
| 2022/0245888 | A1 | 8/2022 | Singh et al. |
| 2022/0253136 | A1 | 8/2022 | Holder et al. |
| 2022/0342972 | A1 | 10/2022 | Van Os et al. |
| 2022/0413605 | A1 | 12/2022 | Liu et al. |
| 2023/0071037 | A1 | 3/2023 | Kim et al. |
| 2023/0185373 | A1 | 6/2023 | Kelly et al. |
| 2023/0254152 | A1 | 8/2023 | Ratnakaram et al. |
| 2023/0273985 | A1 | 8/2023 | Suchan et al. |
| 2024/0028110 | A1 | 1/2024 | Aurongzeb et al. |
| 2024/0028177 | A1 | 1/2024 | Pastrana Vicente et al. |
| 2024/0085707 | A1* | 3/2024 | Schowengerdt ..... G02B 6/0016 |
| 2024/0103616 | A1 | 3/2024 | Yerkes et al. |
| 2024/0103617 | A1 | 3/2024 | Yerkes et al. |
| 2024/0103678 | A1 | 3/2024 | Dryer et al. |
| 2024/0104859 | A1 | 3/2024 | Chand et al. |
| 2024/0152244 | A1 | 5/2024 | DeDonato et al. |
| 2024/0353922 | A1 | 10/2024 | Dedonato et al. |
| 2024/0427417 | A1 | 12/2024 | Kelly et al. |

FOREIGN PATENT DOCUMENTS

| | | |
|---|---|---|
| EP | 2801972 B1 | 1/2018 |
| EP | 3373132 A2 | 9/2018 |
| JP | 9-81309 A | 3/1997 |
| JP | 9-322199 A | 12/1997 |
| JP | 2006-293939 A | 10/2006 |
| JP | 2010-211742 A | 9/2010 |
| JP | 2011-159006 A | 8/2011 |
| JP | 2011-209787 A | 10/2011 |
| JP | 2013-537670 A | 10/2013 |
| JP | 2014-230061 A | 12/2014 |
| JP | 2015-514254 A | 5/2015 |
| JP | 2015-149634 A | 8/2015 |
| JP | 2016-508007 A | 3/2016 |
| JP | 2016-76799 A | 5/2016 |
| JP | 6112878 B2 | 4/2017 |
| JP | 6208151 B2 | 10/2017 |
| JP | 6238381 B1 | 11/2017 |
| JP | 2018-513515 A | 5/2018 |
| JP | 2019-155115 A | 9/2019 |
| JP | 2020-30853 A | 2/2020 |
| JP | 2020-504376 A | 2/2020 |
| JP | 2020-149336 A | 9/2020 |
| JP | 2021-533512 A | 12/2021 |
| JP | 2022-3545 A | 1/2022 |
| JP | 2022-23406 A | 2/2022 |
| JP | 2024-537657 A | 10/2024 |
| KR | 10-2015-0068013 A | 6/2015 |
| KR | 10-2017-0065563 A | 6/2017 |
| WO | 2009/125481 A1 | 10/2009 |
| WO | 2012/018513 A1 | 2/2012 |
| WO | 2014/124332 A2 | 8/2014 |
| WO | 2015/088141 A1 | 6/2015 |
| WO | 2016/189390 A2 | 12/2016 |
| WO | 2017/068422 A1 | 4/2017 |
| WO | 2018/109751 A1 | 6/2018 |
| WO | 2018/0525563 A1 | 7/2018 |
| WO | 2018/226265 A1 | 12/2018 |
| WO | 2020/028236 A1 | 2/2020 |
| WO | 2021/188439 A1 | 9/2021 |
| WO | 2021/216044 A1 | 10/2021 |
| WO | 2022/086580 A1 | 4/2022 |

(56)                 References Cited

FOREIGN PATENT DOCUMENTS

| WO | 2022/147146 A1 | 7/2022 |
| WO | 2023/049418 A2 | 3/2023 |

OTHER PUBLICATIONS

Non-Final Office Action received for U.S. Appl. No. 18/167,767, mailed on Jun. 4, 2025, 32 pages.

Office Action received for Korean Patent Application No. 10-2023-7039602, mailed on May 28, 2025, 9 pages (4 pages of English Translation and 5 pages of Official Copy).

International Search Report and Written Opinion received for PCT Patent Application No. PCT/US2024/025526, mailed on Aug. 5, 2024, 19 pages.

Invitation to Pay Additional Fees received for PCT Patent Application No. PCT/US2024/025526, mailed on Jun. 14, 2024, 12 pages.

Office Action received for Korean Patent Application No. 10-2023-7039602, mailed on Nov. 14, 2024, 12 pages (5 pages of English Translation and 7 pages of Official Copy).

International Preliminary Report on Patentability received for PCT Patent Application No. PCT/US2023/033372, mailed on Apr. 3, 2025, 15 pages.

International Preliminary Report on Patentability received for PCT Patent Application No. PCT/US2023/033376, mailed on Apr. 3, 2025, 15 pages.

International Preliminary Report on Patentability received for PCT Patent Application No. PCT/US2023/033540, mailed on Apr. 3, 2025, 18 pages.

Corrected Notice of Allowance received for U.S. Appl. No. 18/367,418, mailed on Jul. 8, 2025, 12 pages.

Non-Final Office Action received for U.S. Appl. No. 18/597,275, mailed on Jun. 27, 2025, 27 pages.

Non-Final Office Action received for U.S. Appl. No. 18/829,038, mailed on Jun. 23, 2025, 12 pages.

Notice of Allowance received for U.S. Appl. No. 18/367,418, mailed on Jun. 24, 2025, 18 pages.

Office Action received for Australian Patent Application No. 2024203238, mailed on Jun. 25, 2025, 5 pages.

Office Action received for Japanese Patent Application No. 2024-550636, mailed on Jun. 20, 2025, 10 pages (5 pages of English Translation and 5 pages of Official Copy).

Office Action received for Japanese Patent Application No. 2024-515963, mailed on Mar. 7, 2025, 15 pages (7 pages of English Translation and 8 pages of Official Copy).

Non-Final Office Action received for U.S. Appl. No. 18/374,562, mailed on May 19, 2025, 29 pages.

Office Action received for Australian Patent Application No. 2022352756, mailed on May 14, 2025, 4 pages.

Office Action received for European Patent Application No. 22198902.3, mailed on Dec. 12, 2024, 8 pages.

Applicant-Initiated Interview Summary received for U.S. Appl. No. 16/553,622, mailed on Aug. 3, 2020, 3 pages.

Applicant-Initiated Interview Summary received for U.S. Appl. No. 17/087,855, mailed on Feb. 28, 2022, 2 pages.

Applicant-Initiated Interview Summary received for U.S. Appl. No. 17/087,855, mailed on Jul. 5, 2022, 2 pages.

Applicant-Initiated Interview Summary received for U.S. Appl. No. 17/087,855, mailed on Nov. 5, 2021, 2 pages.

Applicant-Initiated Interview Summary received for U.S. Appl. No. 18/105,191, mailed on Apr. 30, 2024, 2 pages.

Applicant-Initiated Interview Summary received for U.S. Appl. No. 18/105,191, mailed on Jan. 17, 2024, 2 pages.

Corrected Notice of Allowance received for U.S. Appl. No. 16/553,622, mailed on Sep. 23, 2020, 5 pages.

Corrected Notice of Allowance received for U.S. Appl. No. 17/087,855, mailed on Jan. 12, 2023, 6 pages.

Corrected Notice of Allowance received for U.S. Appl. No. 17/087,855, mailed on Jan. 25, 2023, 4 pages.

Corrected Notice of Allowance received for U.S. Appl. No. 18/105,191, mailed on Aug. 6, 2024, 5 pages.

Decision to Grant received for European Patent Application No. 19769336.9, mailed on Oct. 7, 2022, 2 pages.

Extended European Search Report received for European Patent Application No. 22198902.3, mailed on Jan. 20, 2023, 9 pages.

Final Office Action received for U.S. Appl. No. 17/087,855, mailed on Mar. 31, 2022, 23 pages.

Final Office Action received for U.S. Appl. No. 18/105,191, mailed on Feb. 20, 2024, 20 pages.

Fono et al., "EyeWindows: Evaluation of Eye-Controlled Zooming Windows for Focus Selection", CHI 2005, Conference Proceedings, Conference On Human Factors In Computing Systems, Apr. 2-7, 2005, pp. 151-160.

Intention to Grant received for European Patent Application No. 19769336.9, mailed on May 31, 2022, 13 pages.

International Preliminary Report on Patentability received for PCT Patent Application No. PCT/US2019/049239, mailed on Apr. 8, 2021, 12 pages.

International Preliminary Report on Patentability received for PCT Patent Application No. PCT/US2022/044637, mailed on Apr. 4, 2024, 12 pages.

International Preliminary Report on Patentability received for PCT Patent Application No. PCT/US2023/014067, mailed on Sep. 12, 2024, 12 pages.

International Search Report and Written Opinion received for PCT Patent Application No. PCT/US2019/049239, mailed on Jan. 22, 2020, 18 pages.

International Search Report and Written Opinion received for PCT Patent Application No. PCT/US2022/044637, mailed on Mar. 15, 2023, 19 pages.

International Search Report and Written Opinion received for PCT Patent Application No. PCT/US2023/033372, mailed on Jan. 12, 2024, 21 pages.

International Search Report and Written Opinion received for PCT Patent Application No. PCT/US2023/033376, mailed on Mar. 18, 2024, 21 pages.

International Search Report and Written Opinion received for PCT Patent Application No. PCT/US2023/033540, mailed on Feb. 6, 2024, 25 pages.

International Search Report and Written Opinion received for PCT Patent Application No. PCT/US2023/14067, mailed on Aug. 4, 2023, 17 pages.

Invitation to Pay Additional Fees and Partial International Search Report received for PCT Patent Application No. PCT/US2022/044637, mailed on Jan. 20, 2023, 12 pages.

Invitation to Pay Additional Fees and Partial International Search Report received for PCT Patent Application No. PCT/US2023/033372, mailed on Nov. 22, 2023, 13 pages.

Invitation to Pay Additional Fees and Partial International Search Report received for PCT Patent Application No. PCT/US2023/033376, mailed on Jan. 24, 2024, 13 pages.

Invitation to Pay Additional Fees and Partial International Search Report received for PCT Patent Application No. PCT/US2023/033540, mailed on Dec. 12, 2023, 17 pages.

Invitation to Pay Additional Fees and Partial International Search Report received for PCT Patent Application No. PCT/US2023/14067, mailed on Jun. 14, 2023, 16 pages.

Invitation to Pay Additional Fees received for PCT Patent Application No. PCT/US2019/049239, mailed on Dec. 4, 2019, 10 pages.

Krumm et al., "Multi-camera multi-person tracking for easyliving", Third IEEE International Workshop on Visual Surveillance, Available online at: http://mesh.brown.edu/en193s05-2004/pdfs/KrummEtAl-iwvs00.pdf, Jul. 1, 2000, 8 pages.

Non-Final Office Action received for U.S. Appl. No. 16/553,622, mailed on May 29, 2020, 11 pages.

Non-Final Office Action received for U.S. Appl. No. 17/087,855, mailed on Dec. 24, 2021, 21 pages.

Non-Final Office Action received for U.S. Appl. No. 17/087,855, mailed on Jul. 12, 2021, 17 pages.

Non-Final Office Action received for U.S. Appl. No. 17/087,855, mailed on Jul. 21, 2022, 23 pages.

(56) References Cited

OTHER PUBLICATIONS

Non-Final Office Action received for U.S. Appl. No. 18/105,191, mailed on Oct. 13, 2023, 23 pages.

Notice of Acceptance received for Australian Patent Application No. 2019346842, mailed on Jan. 21, 2021, 3 pages.

Notice of Acceptance received for Australian Patent Application No. 2021202352, mailed on Jun. 6, 2022, 3 pages.

Notice of Acceptance received for Australian Patent Application No. 2022231779, mailed on Feb. 5, 2024, 3 pages.

Notice of Allowance received for Chinese Patent Application No. 201980041865.3, mailed on Aug. 16, 2022, 6 pages (3 pages of English Translation and 3 pages of Official Copy).

Notice of Allowance received for Japanese Patent Application No. 2020-569806, mailed on Jul. 12, 2021, 4 pages (1 page of English Translation and 3 pages of Official Copy).

Notice of Allowance received for Japanese Patent Application No. 2021-131310, mailed on Dec. 9, 2022, 4 pages (1 pages of English Translation and 3 pages of Official Copy).

Notice of Allowance received for Japanese Patent Application No. 2023-001790, mailed on Jul. 5, 2024, 4 pages (1 page of English Translation and 3 pages of Official Copy).

Notice of Allowance received for Korean Patent Application No. 10-2020-7036748, mailed on Jan. 25, 2021, 3 pages (1 page of English Translation and 2 pages of Official Copy).

Notice of Allowance received for Korean Patent Application No. 10-2021-7010306, mailed on Aug. 14, 2023, 7 pages (2 pages of English Translation and 5 pages of Official Copy).

Notice of Allowance received for U.S. Appl. No. 16/553,622, mailed on Sep. 11, 2020, 8 pages.

Notice of Allowance received for U.S. Appl. No. 17/087,855, mailed on Nov. 25, 2022, 8 pages.

Notice of Allowance received for U.S. Appl. No. 18/105,191, mailed on May 22, 2024, 8 pages.

Office Action received for Australian Patent Application No. 2021202352, mailed on Mar. 15, 2022, 3 pages.

Office Action received for Australian Patent Application No. 2022231779, mailed on Aug. 7, 2023, 5 pages.

Office Action received for Australian Patent Application No. 2022231779, mailed on Nov. 6, 2023, 3 pages.

Office Action received for Chinese Patent Application No. 201980041865.3, mailed on Apr. 13, 2022, 12 pages (6 pages of English Translation and 6 pages of Official Copy).

Office Action received for Chinese Patent Application No. 201980041865.3, mailed on May 24, 2021, 14 pages (8 pages of English Translation and 6 pages of Official Copy).

Office Action received for European Patent Application No. 19769336.9, mailed on Nov. 4, 2021, 6 pages.

Office Action received for Japanese Patent Application No. 2021-131310, mailed on Sep. 2, 2022, 9 pages (5 pages of English Translation and 4 pages of Official Copy).

Office Action received for Japanese Patent Application No. 2023-001790, mailed on Mar. 4, 2024, 10 pages (5 pages of English Translation and 5 pages of Official Copy).

Office Action received for Korean Patent Application No. 10-2021-7010306, mailed on Feb. 15, 2023, 10 pages (5 pages of English Translation and 5 pages of Official Copy).

Applicant-Initiated Interview Summary received for U.S. Appl. No. 18/167,767, mailed on Sep. 4, 2025, 7 pages.

Applicant-Initiated Interview Summary received for U.S. Appl. No. 18/371,406, mailed on Sep. 19, 2025, 2 pages.

Applicant-Initiated Interview Summary received for U.S. Appl. No. 18/374,562, mailed on Jul. 22, 2025, 2 pages.

Applicant-Initiated Interview Summary received for U.S. Appl. No. 18/597,275, mailed on Aug. 28, 2025, 5 pages.

Applicant-Initiated Interview Summary received for U.S. Appl. No. 18/829,038, mailed on Sep. 18, 2025, 2 pages.

Final Office Action received for U.S. Appl. No. 18/374,562, mailed on Sep. 11, 2025, 45 pages.

Non-Final Office Action received for U.S. Appl. No. 18/371,406, mailed on Jul. 15, 2025, 15 pages.

Notice of Allowance received for U.S. Appl. No. 18/367,418, mailed on Aug. 15, 2025, 14 pages.

Office Action received for Australian Patent Application No. 2022352756, mailed on Aug. 8, 2025, 4 pages.

Office Action received for European Patent Application No. 22198902.3, mailed on Jul. 9, 2025, 7 pages.

Office Action received for Japanese Patent Application No. 2024-127947, mailed on Aug. 1, 2025, 6 pages (3 pages of English Translation and 3 pages of Official Copy).

Office Action received for Japanese Patent Application No. 2024-515963, mailed on Sep. 1, 2025, 17 pages (8 pages of English Translation and 9 pages of Official Copy).

Final Office Action received for U.S. Appl. No. 18/829,038, mailed on Oct. 9, 2025, 12 pages.

Notice of Allowance received for U.S. Appl. No. 18/167,767, mailed on Oct. 15, 2025, 11 pages.

* cited by examiner

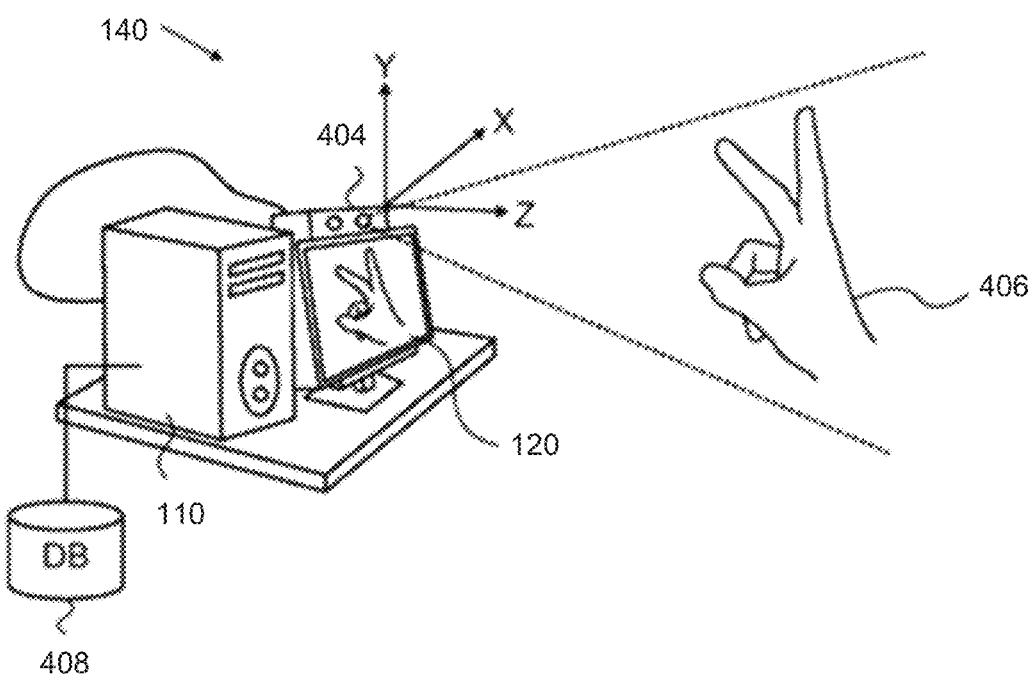
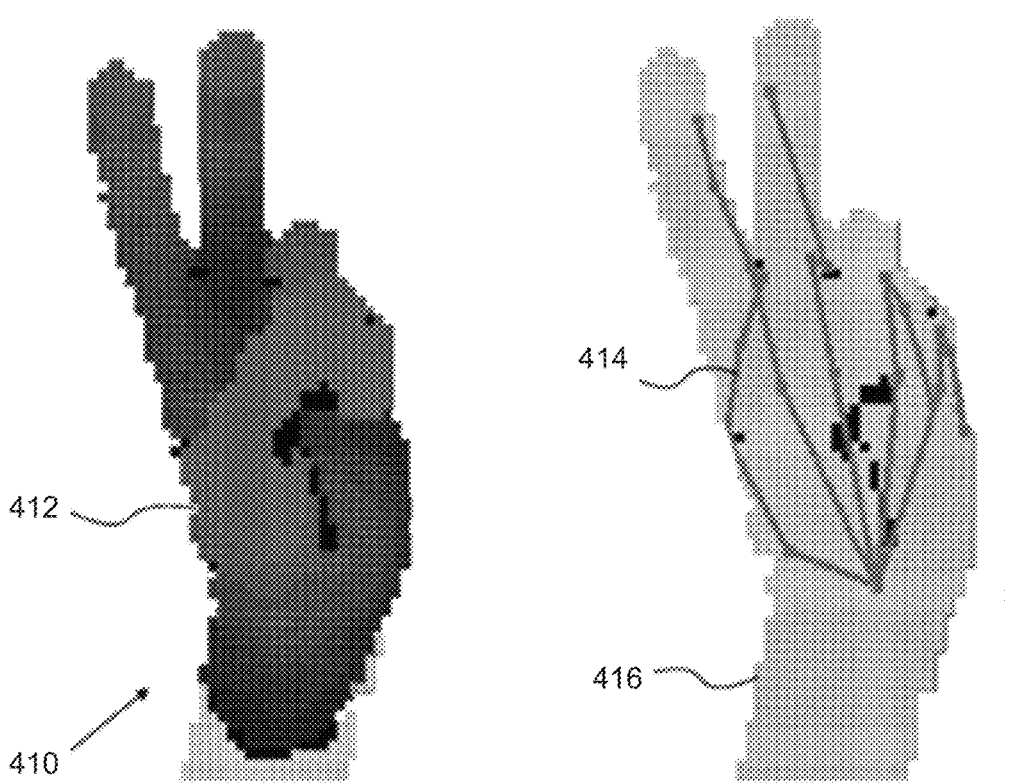
*FIG. 4*

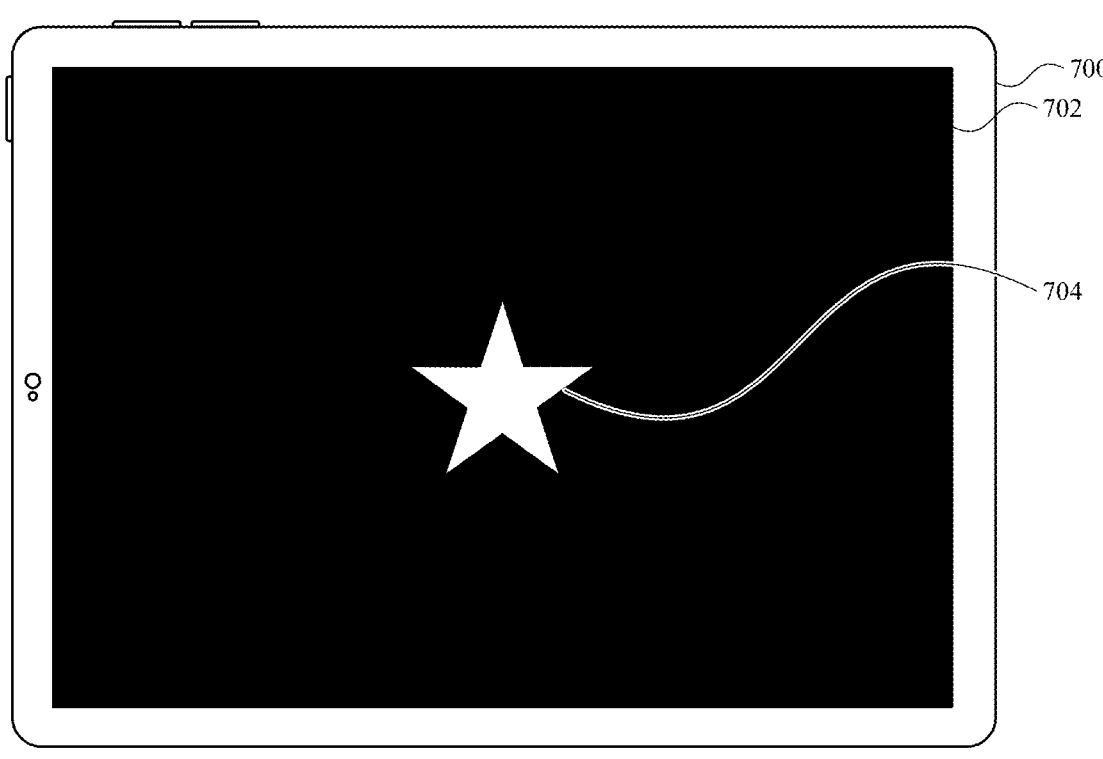
*FIG. 7A*
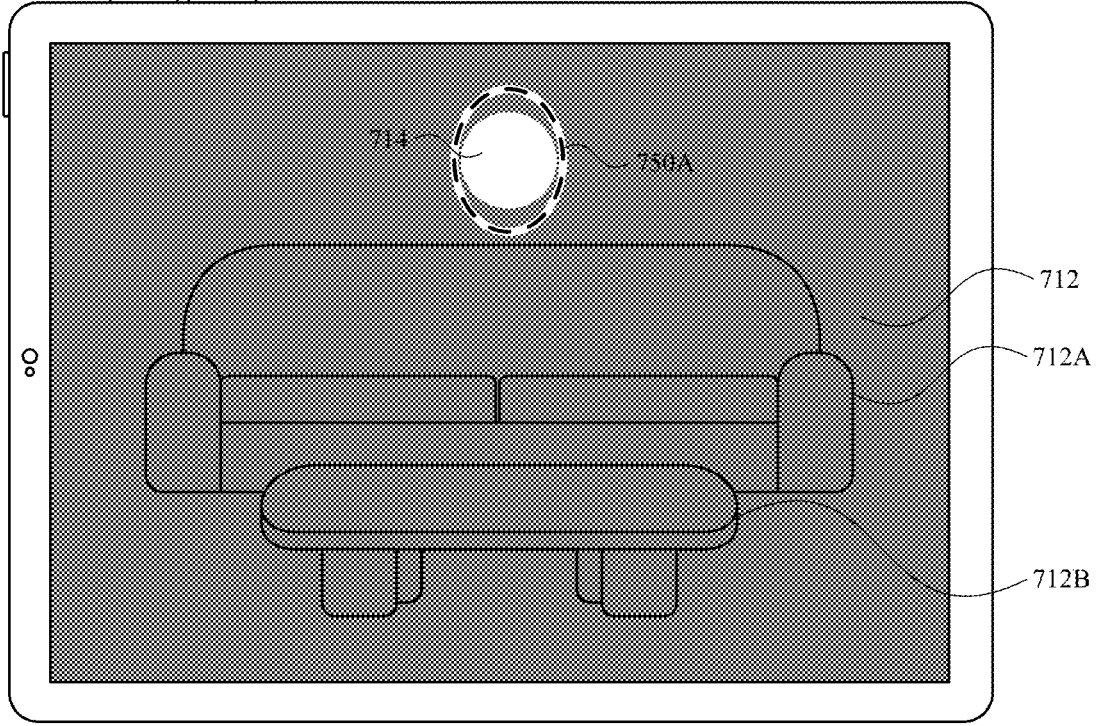
*FIG. 7B1*

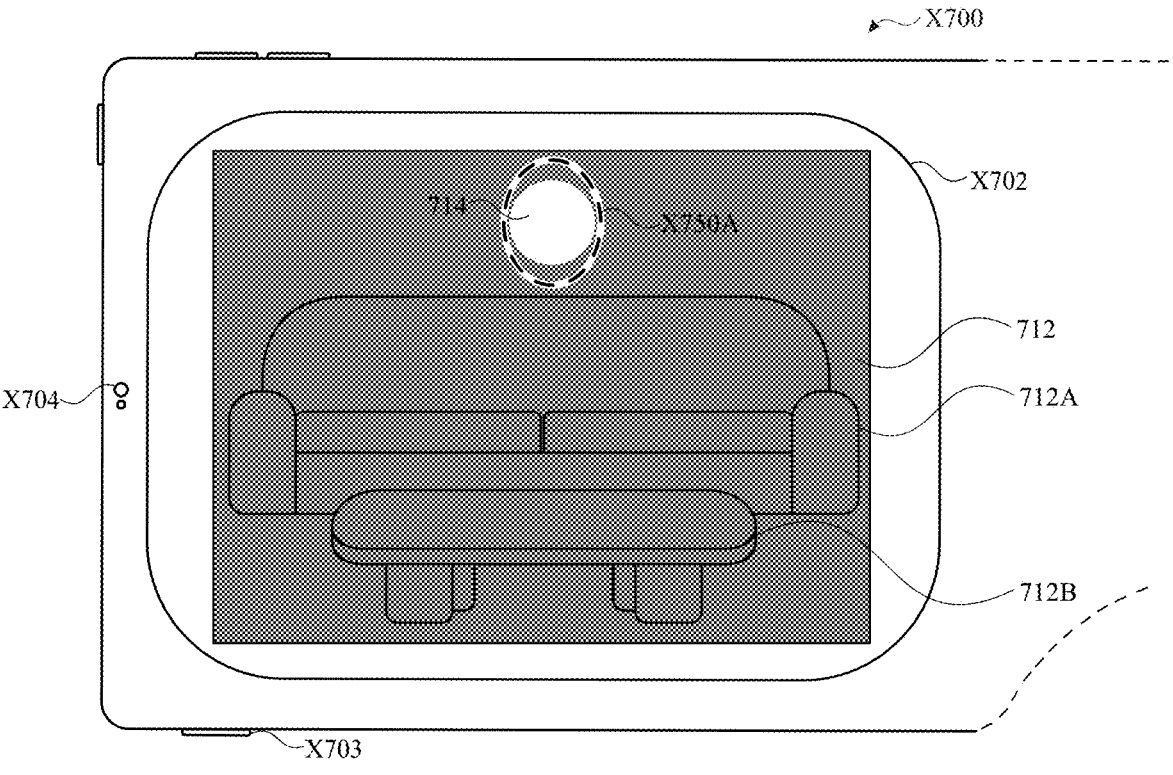
*FIG. 7B2*

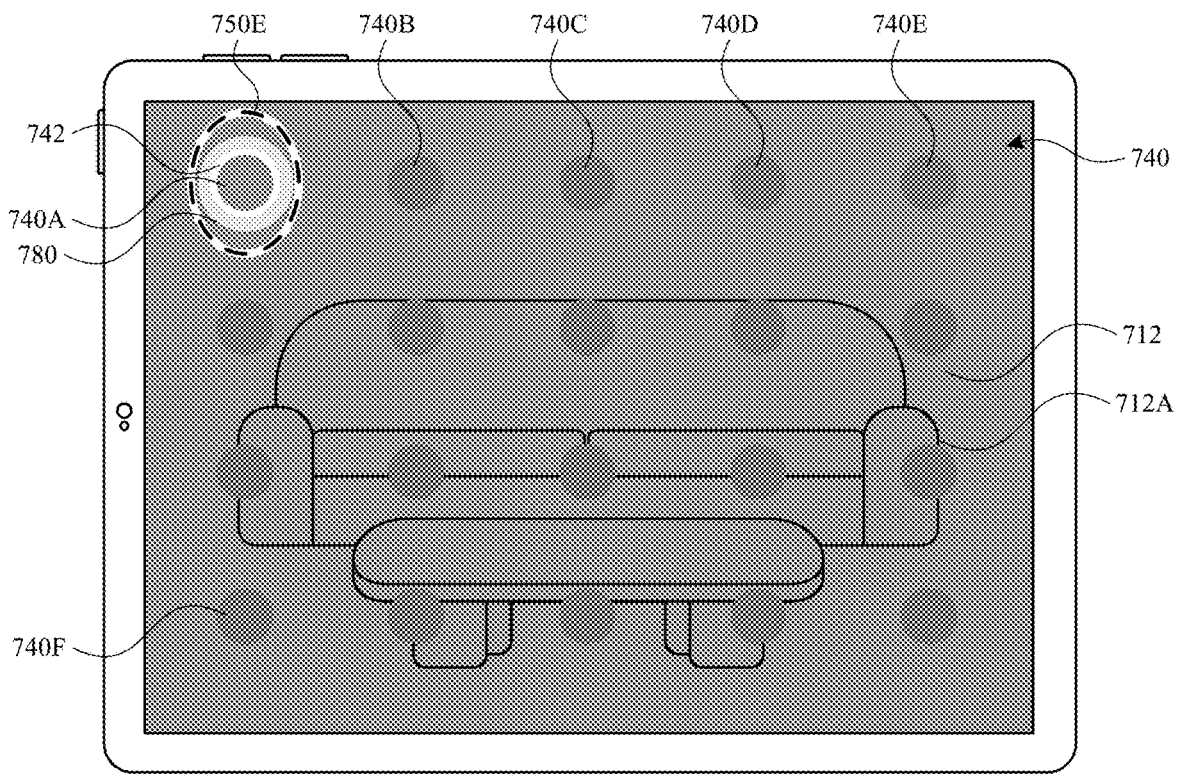
FIG. 7L
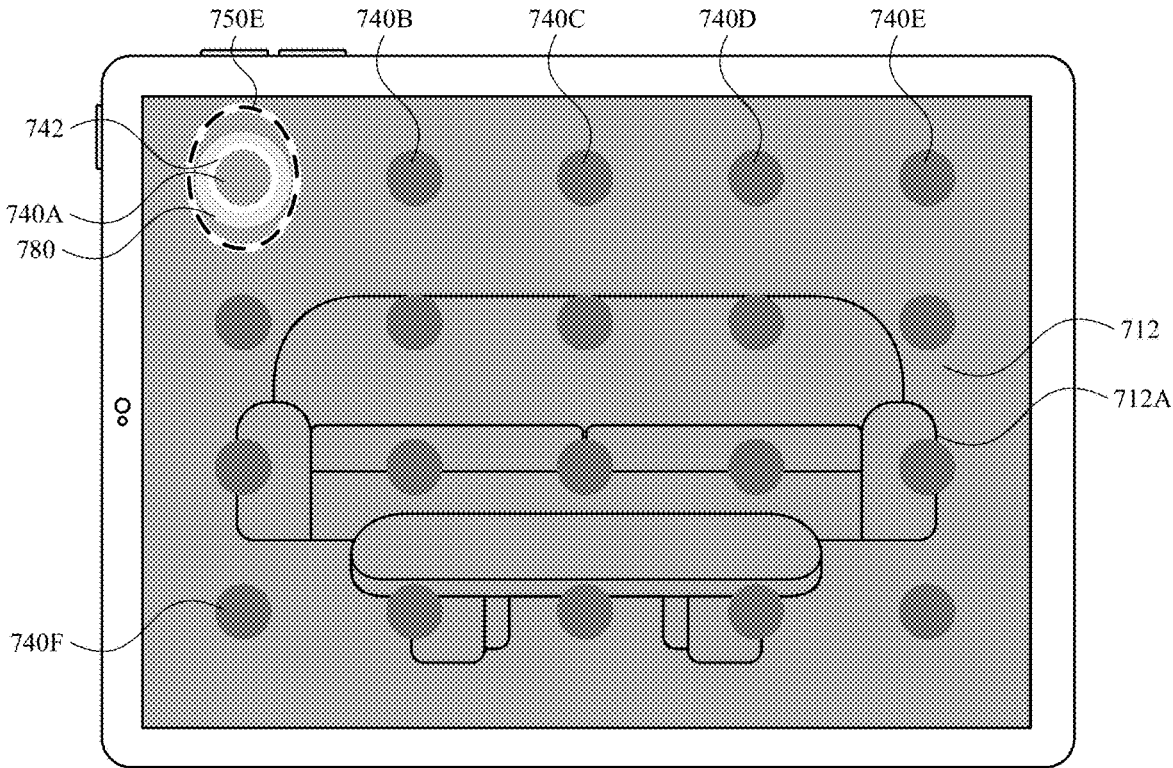
FIG. 7M1

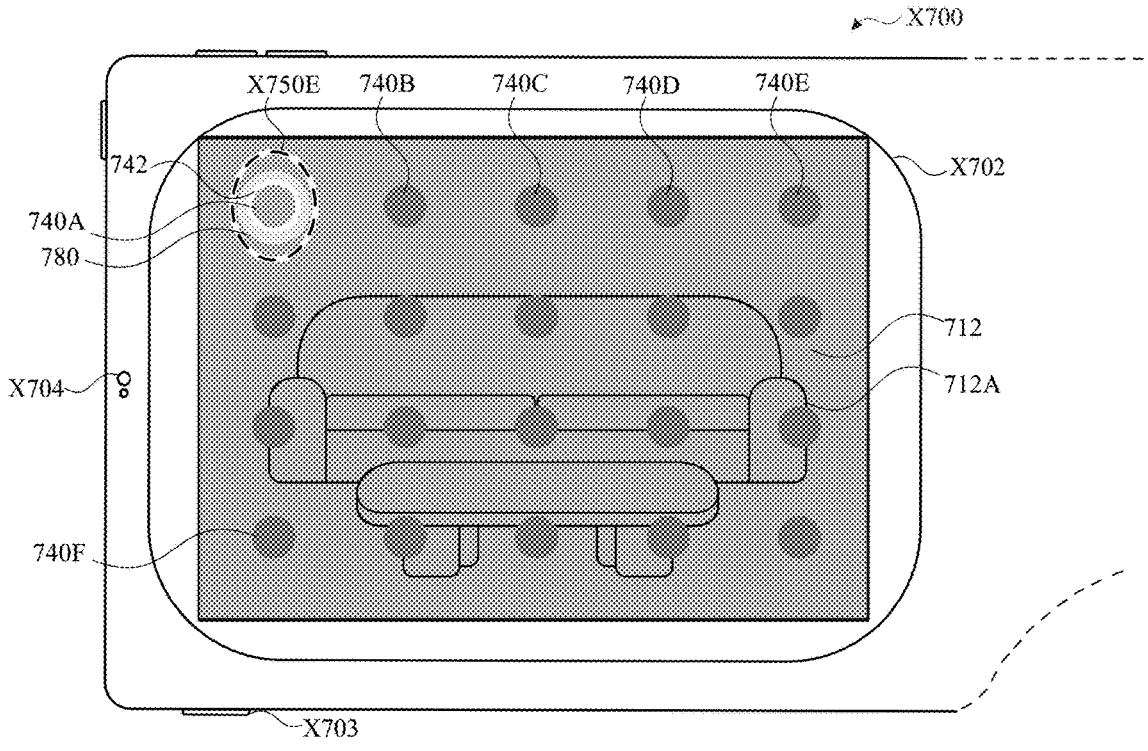
*FIG. 7M2*
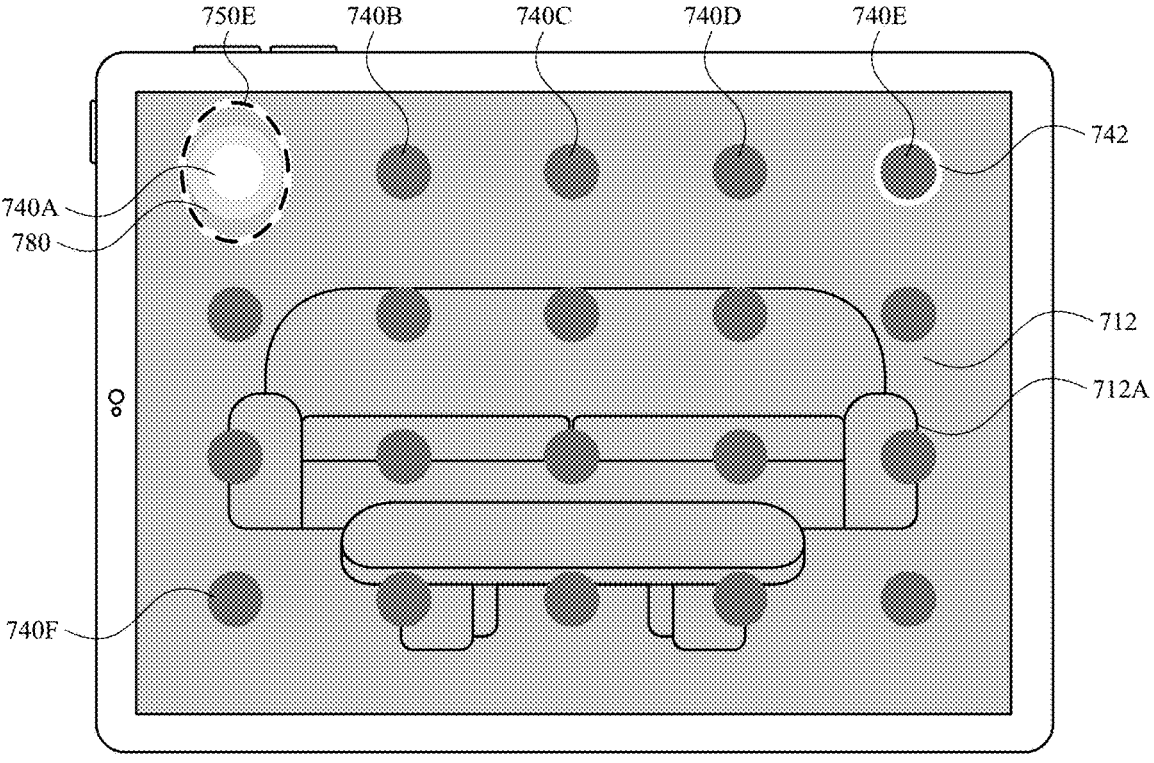
*FIG. 7N*

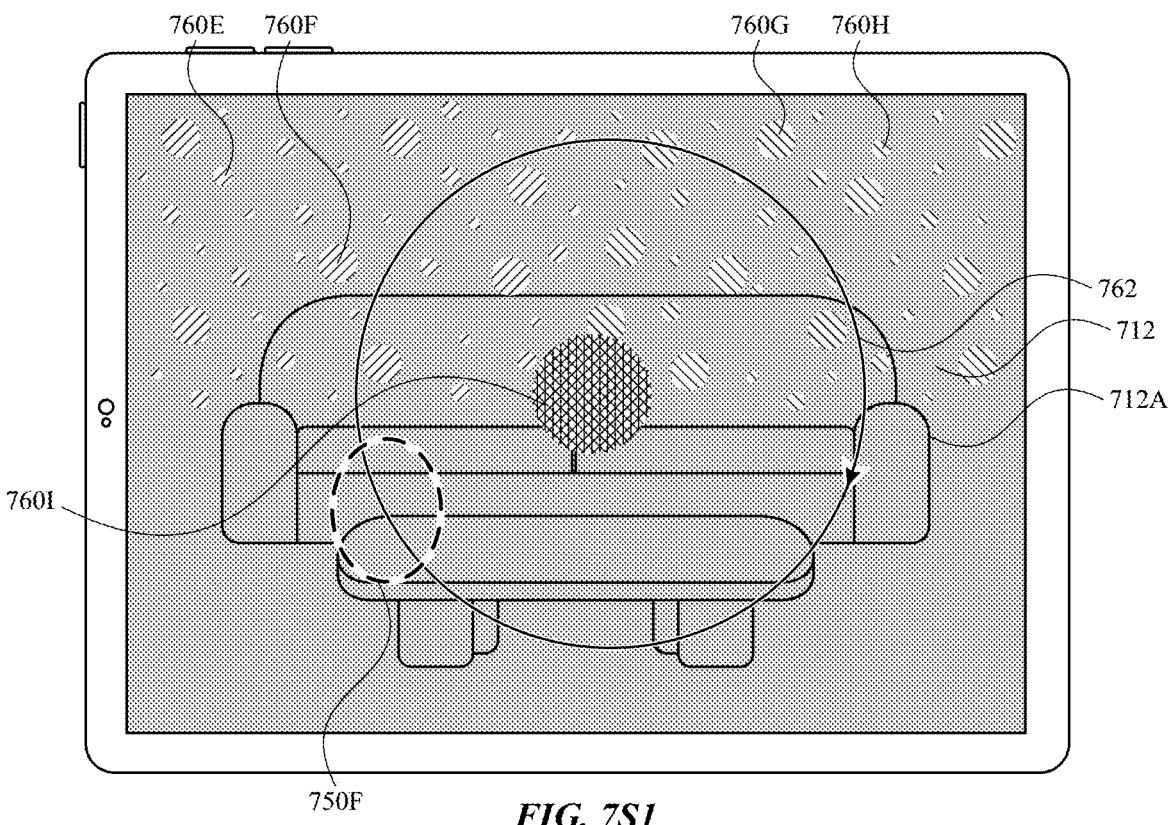
*FIG. 7S1*
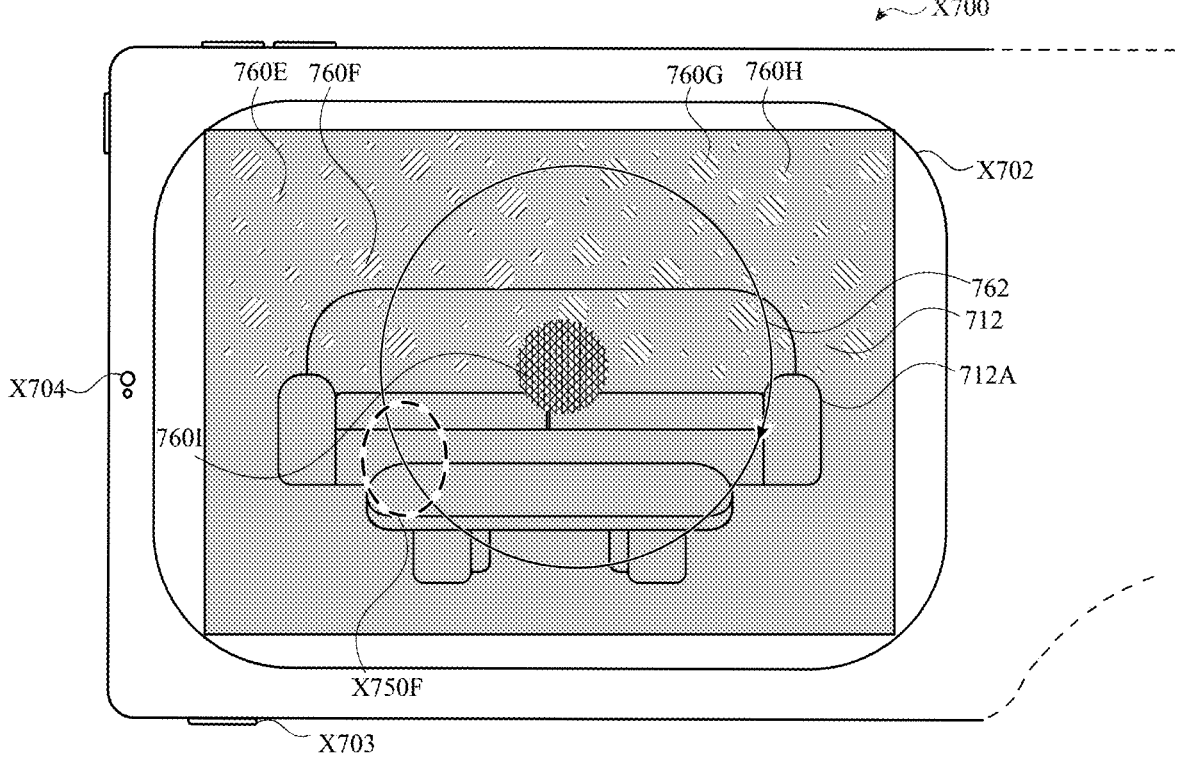
*FIG. 7S2*

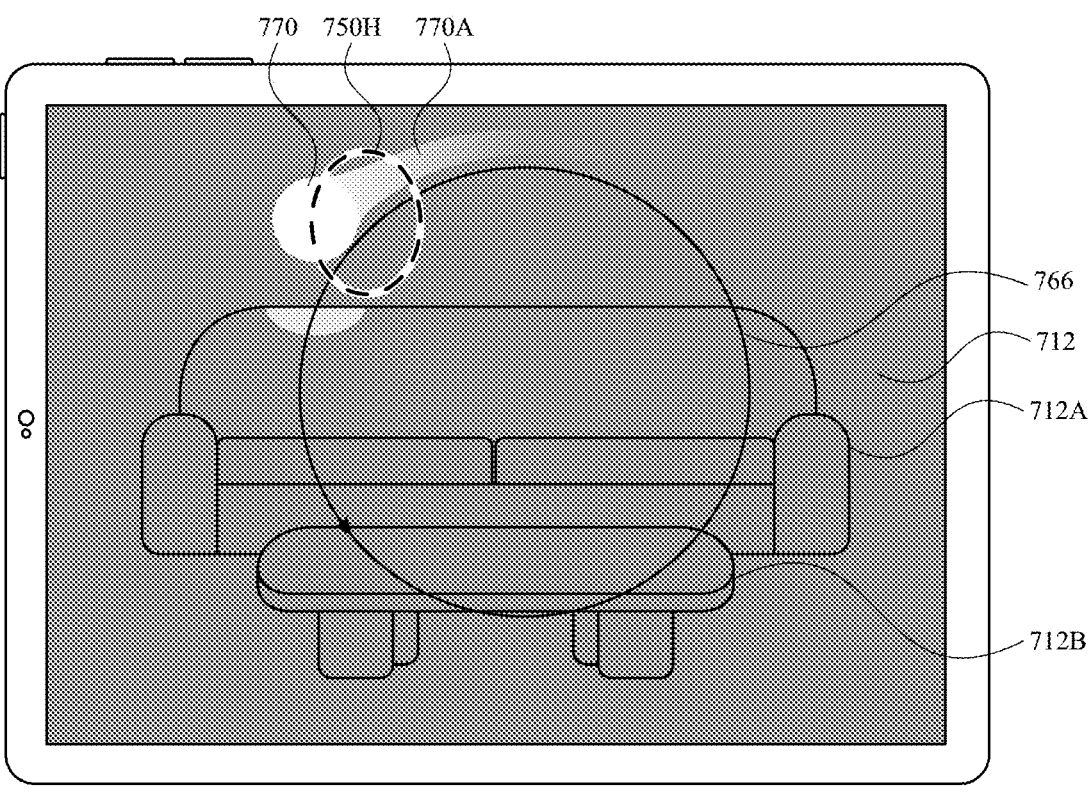
FIG. 7V
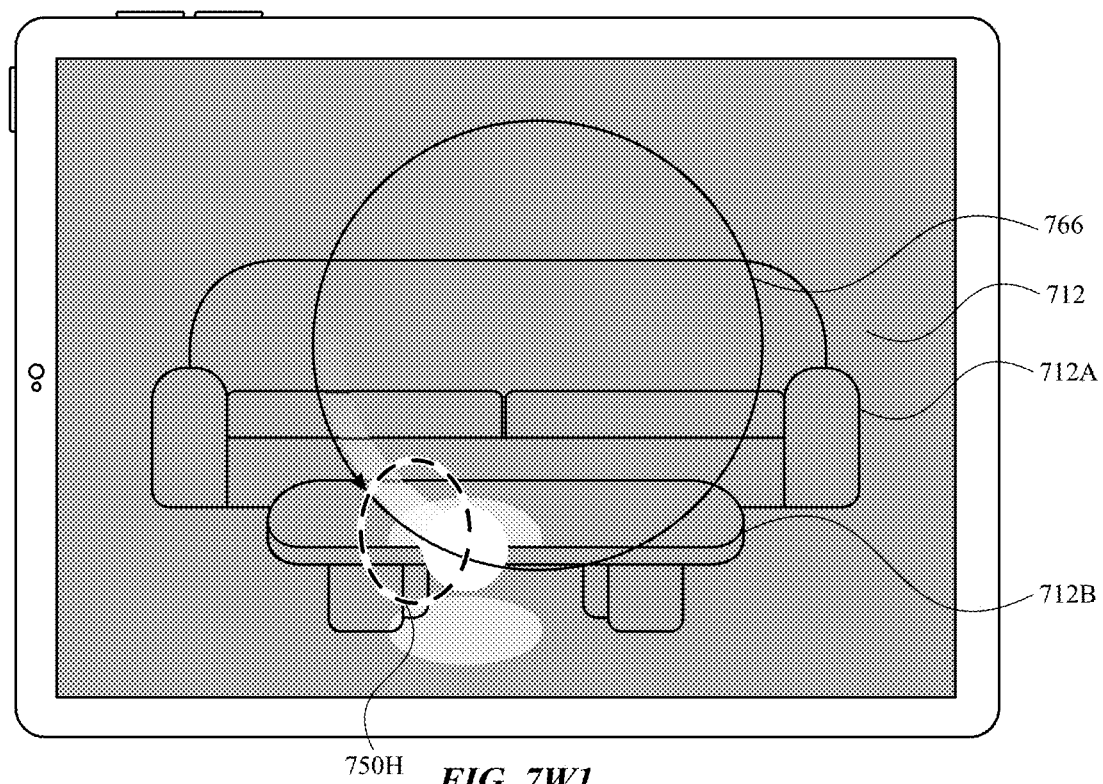
FIG. 7W1

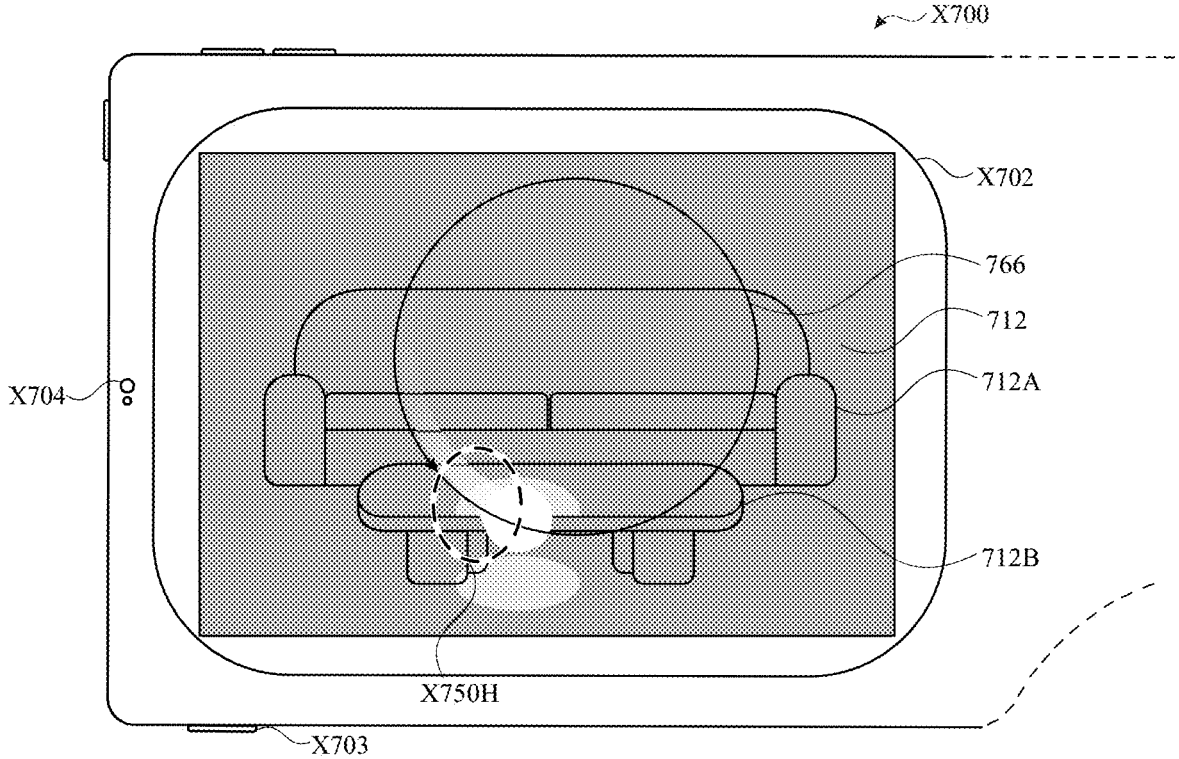
FIG. 7W2

800 —◥

802
Displaying, via the display generation component, a target.

↓

804
While displaying the target, detecting, via at least one input device of the one or more input devices, a gaze of a user of the computer system.

↓

806
In response to detecting the gaze of the user and in accordance with a determination that the gaze of the user is directed at the target for a threshold amount of time, replacing, via the display generation component, display of the target with an enrollment progress user interface element.

↓

808
While displaying the enrollment progress user interface element, detecting, via at least one input device of the one or more input devices, one or more changes in the gaze of the user.

↓

810
In response to detecting the one or more changes in the gaze of the user, changing, via the display generation component, a visual appearance of the enrollment progress user interface element based on the one or more changes detected in the gaze of the user.

*FIG. 8*

900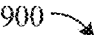

902
Displaying, via the display generation component, a plurality of user interface elements.

904
While displaying the plurality of user interface elements, detecting, via at least one input device of the one or more input devices, a gaze of a user of the computer system.

906
In response to detecting the gaze of the user of the computer system:

908
In accordance with a determination that the gaze of the user of the computer system is directed to a first location that corresponds to a first user interface element of the plurality of user interface elements, animating movement, via the display generation component, of the first user interface element from the first location toward a respective location that is different from the first location.

910
In accordance with a determination that the gaze of the user of the computer system is directed to a second location that corresponds to a second user interface element of the plurality of user interface elements, animating movement, via the display generation component, of the second user interface element from the second location toward the respective location that is different from the second location.

FIG. 9

1000

---

1002
Displaying, via the display generation component, a plurality of user interface elements.

---

1004
While displaying the plurality of user interface elements with a first visual appearance, detecting, via at least one input device of the one or more input devices, a gaze of a user of the computer system that is directed to a plurality of different user interface objects including a gaze directed toward a first user interface element and gaze directed toward a second user interface element.

---

1006
In response to detecting the gaze of the user of the computer system:

1008
In accordance with a determination that the gaze of the user of the computer system is directed to a location corresponding to the first user interface element of the plurality of user interface elements for less than a threshold amount of time, updating display, via the display generation component, of the first user interface element to have a second visual appearance that is different from the first visual appearance.

1010
In accordance with a determination that the gaze of the user of the computer system is directed to a location corresponding to a second user interface element, different from the first user interface element, of the plurality of user interface elements for less than the threshold amount of time, updating display, via the display generation component, of the second user interface element to have the second visual appearance.

1012
In accordance with a determination that the gaze of the user is directed to the location corresponding to the first user interface element for more than the threshold amount of time, changing, via the display generation component, the first user interface element to a third visual appearance different from the first visual appearance and the second visual appearance.

1014
In accordance with a determination that the gaze of the user is directed to the location corresponding to the second user interface element for more than the threshold amount of time, changing, via the display generation component, the second user interface element to the third visual appearance.

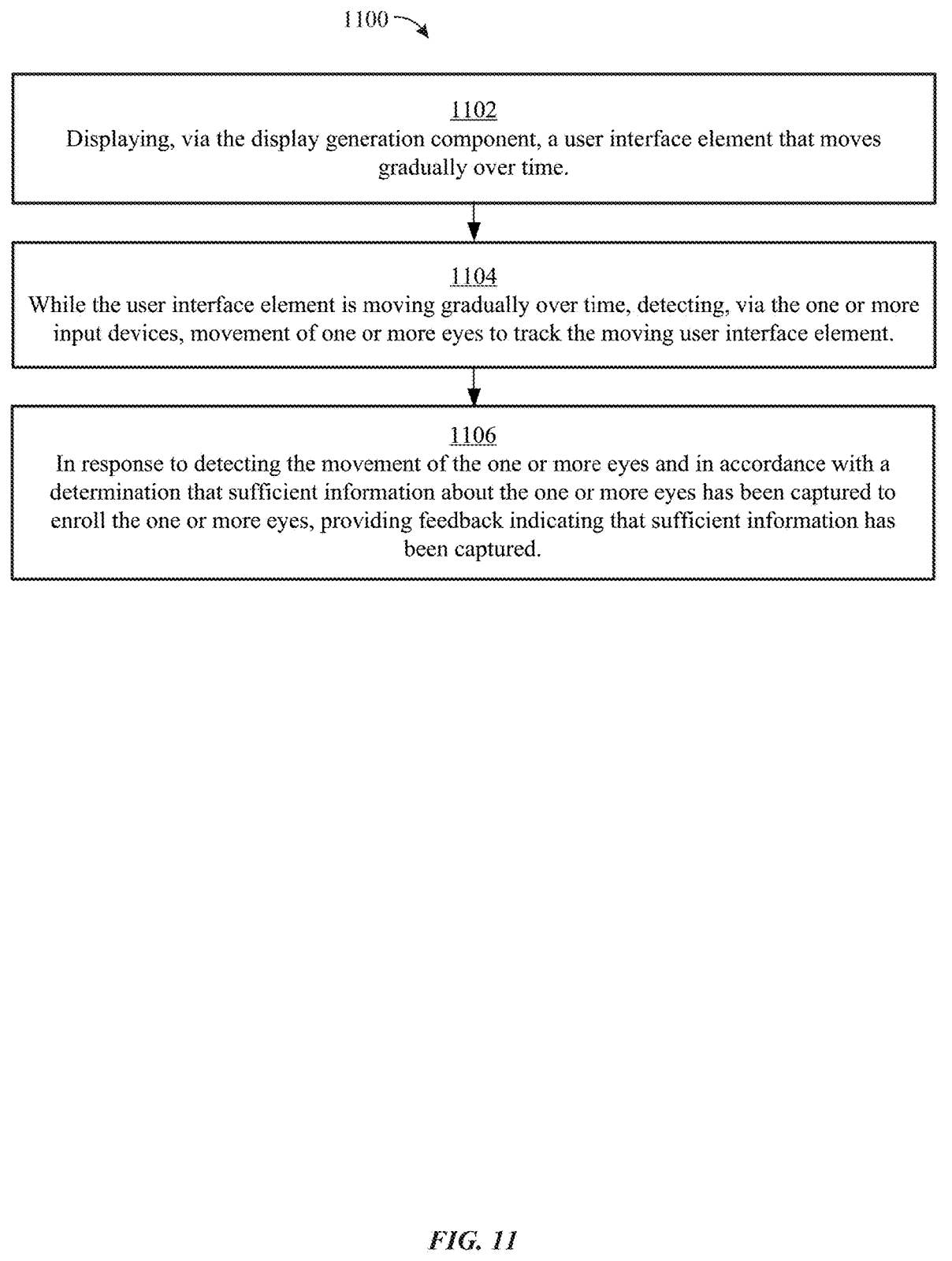

┌─────────────────────────────────────────────────────────────────────────┐
│ 1102                                                                  │
│ Displaying, via the display generation component, a user interface element that moves │
│ gradually over time.                                                      │
└─────────────────────────────────────────────────────────────────────────┘

↓

┌─────────────────────────────────────────────────────────────────────────┐
│ 1104                                                                  │
│ While the user interface element is moving gradually over time, detecting, via the one or more │
│ input devices, movement of one or more eyes to track the moving user interface element. │
└─────────────────────────────────────────────────────────────────────────┘

↓

┌─────────────────────────────────────────────────────────────────────────┐
│ 1106                                                                  │
│ In response to detecting the movement of the one or more eyes and in accordance with a │
│ determination that sufficient information about the one or more eyes has been captured to │
│ enroll the one or more eyes, providing feedback indicating that sufficient information has │
│ been captured.                                                            │
└─────────────────────────────────────────────────────────────────────────┘

*FIG. 11*

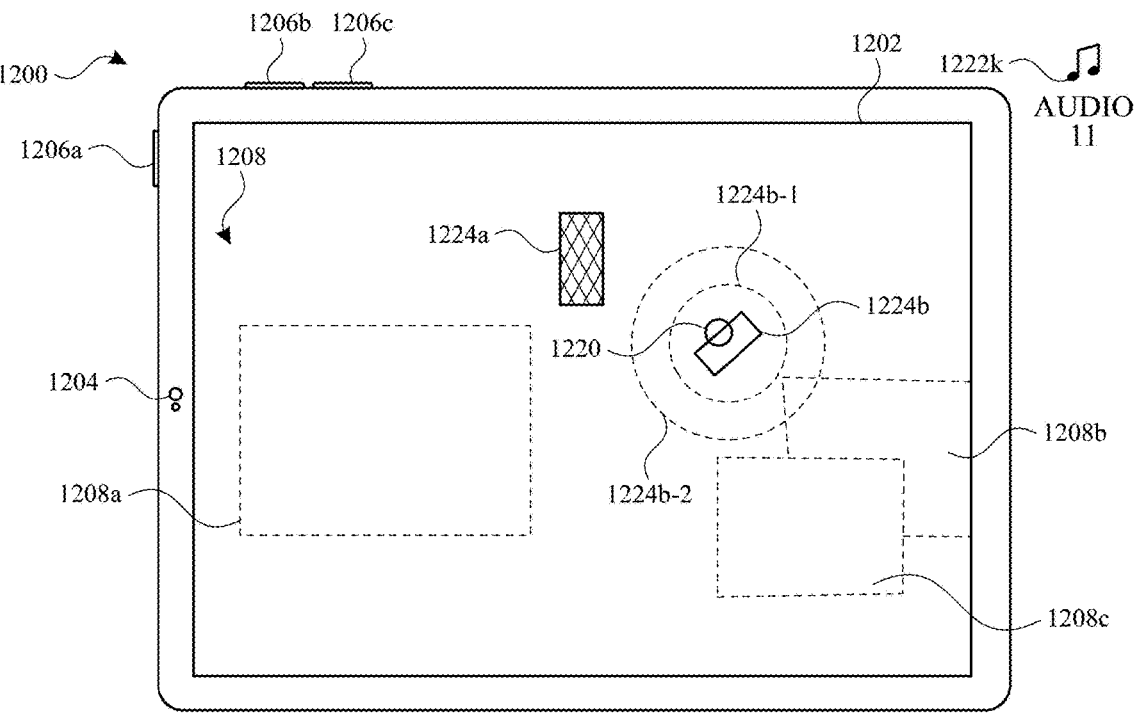
*FIG. 12M1*
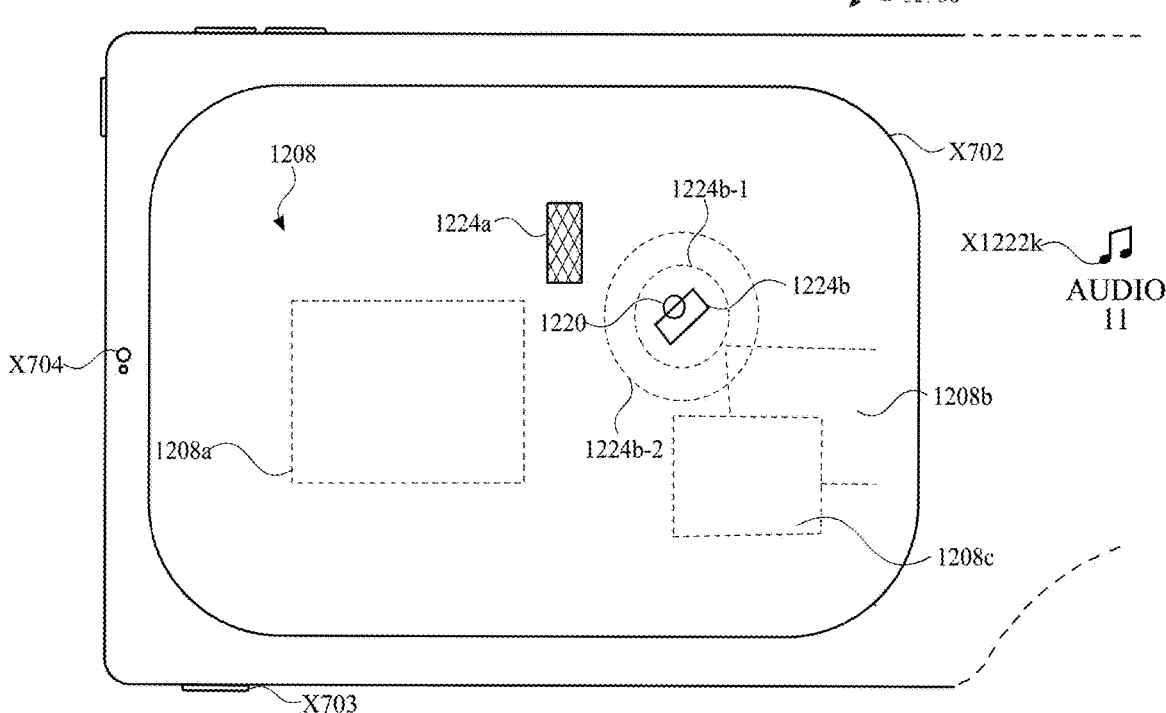
*FIG. 12M2*

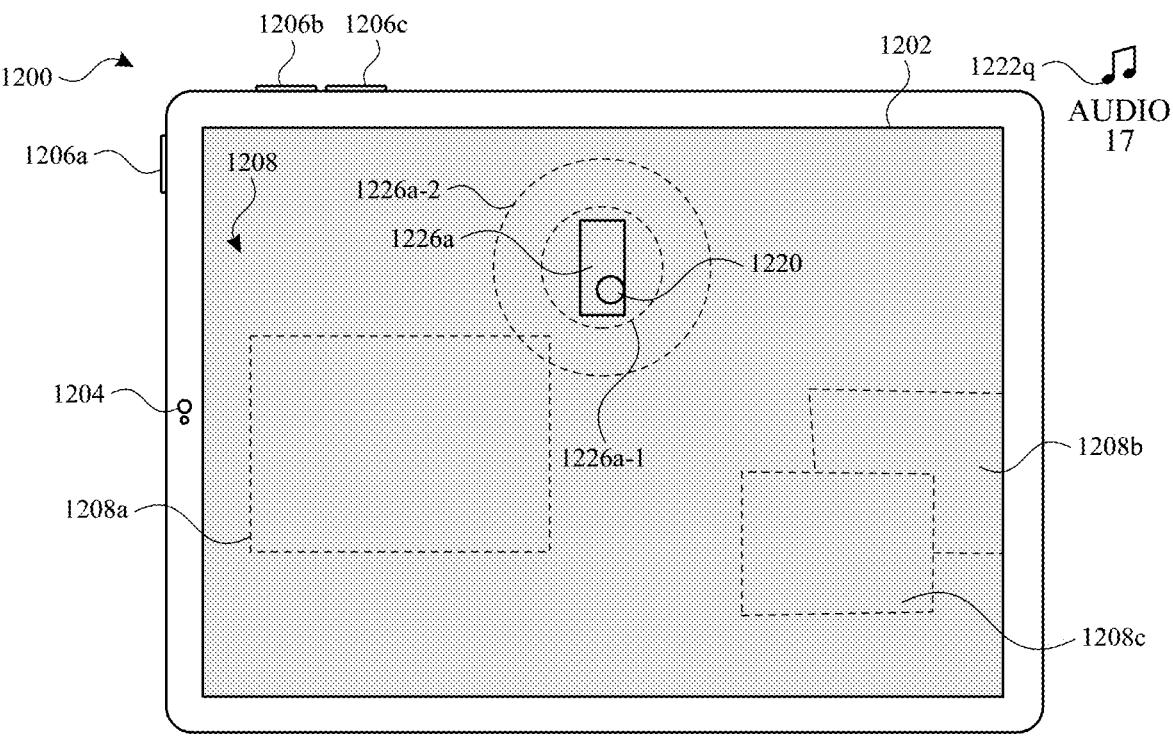
FIG. 12S
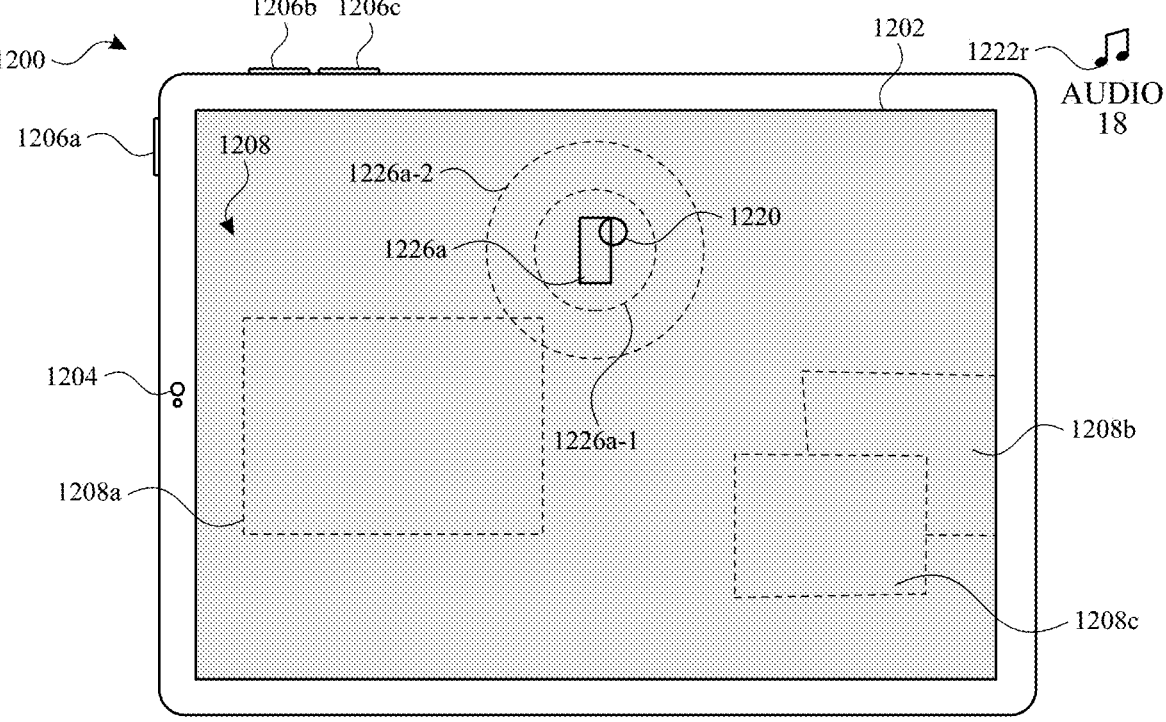
FIG. 12T1

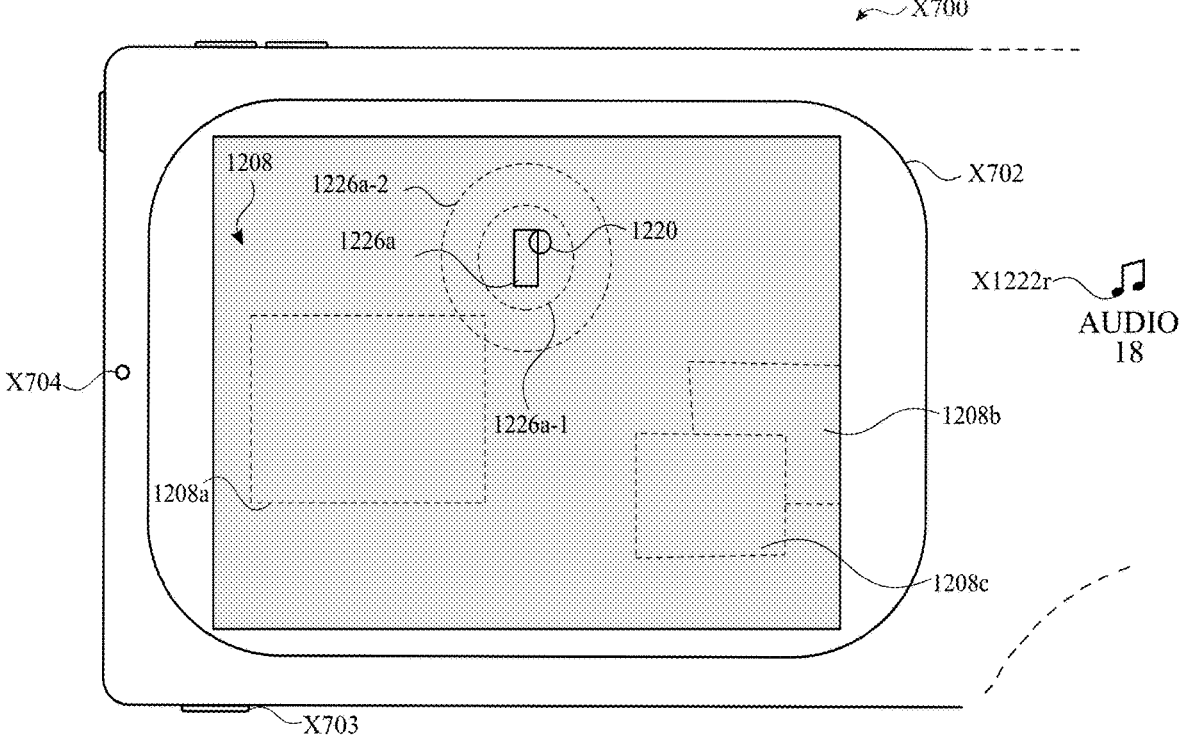
*FIG. 12T2*

1300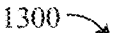

<u>1302</u>
Display, via the one or more display generation components, a first gaze enrollment user interface, wherein:

<u>1304</u>
The first gaze enrollment user interface includes a first set of user interface elements that prompt movement of one or more eyes of a user.

<u>1306</u>
The first gaze enrollment user interface is displayed with a respective type of element having a first average brightness.

<u>1308</u>
Subsequent to displaying the first gaze enrollment user interface, display, via the one or more display generation components, a second gaze enrollment user interface, wherein:

<u>1310</u>
The second gaze enrollment user interface includes a second set of user interface elements that prompt movement of one or more eyes of a user.

<u>1312</u>
The second gaze enrollment user interface is displayed with the respective type of element having a second average brightness different from the first average brightness.

*FIG. 13*

1400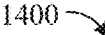

---

1402
Display, via the one or more display generation components, a plurality of user interface elements.

---

1404
While displaying the plurality of user interface elements, detect, via the one or more input devices, a change in a direction of a gaze of the user.

---

1406
In response to detecting the change in direction of the gaze of the user:

1408
In accordance with a determination that the gaze of the user is directed toward a first user interface element, output a first audio output indicative of the gaze of the user being directed toward the first user interface element.

1410
In accordance with a determination that the gaze of the user is not directed toward the first user interface element, forgo outputting the first audio output indicative of the gaze of the user being directed toward the first user interface element.

*FIG. 14*

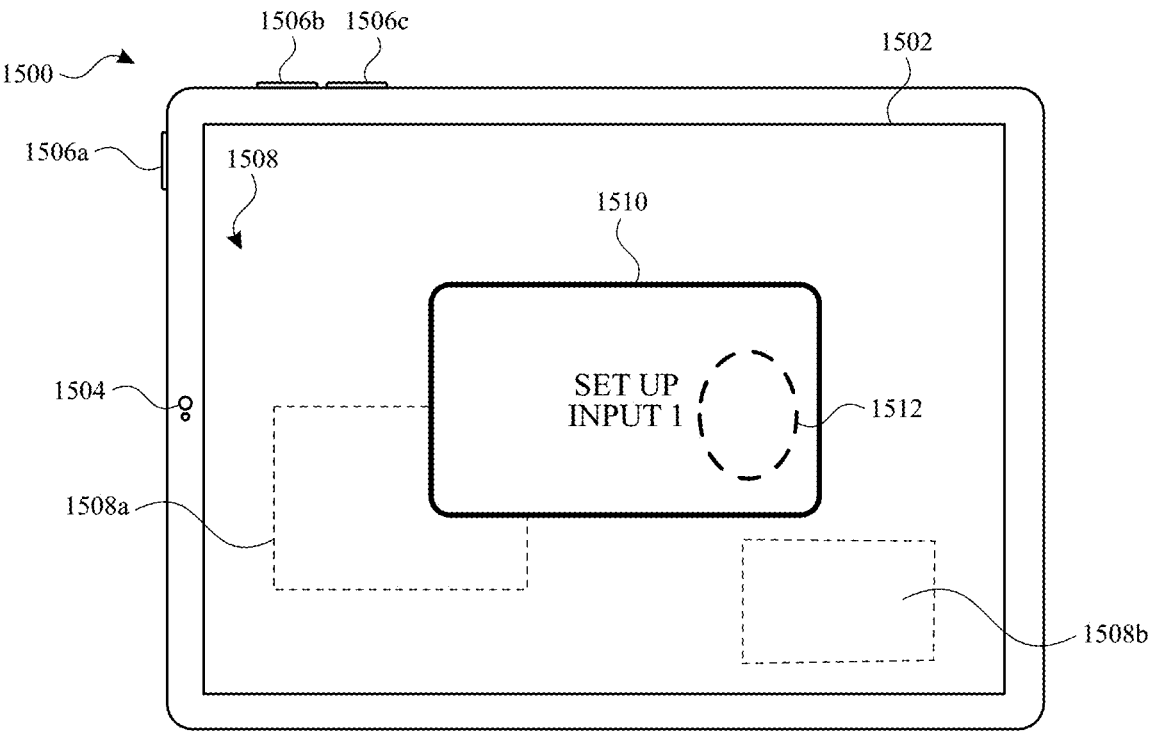
FIG. 15A
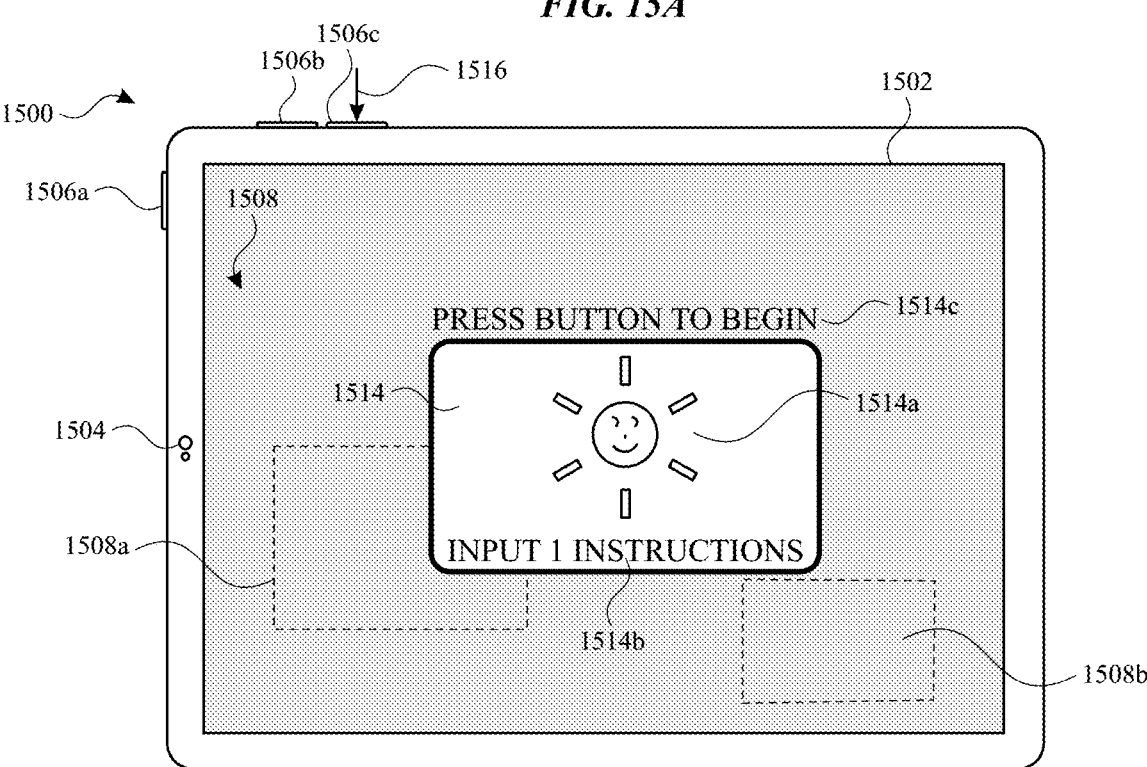
FIG. 15B1

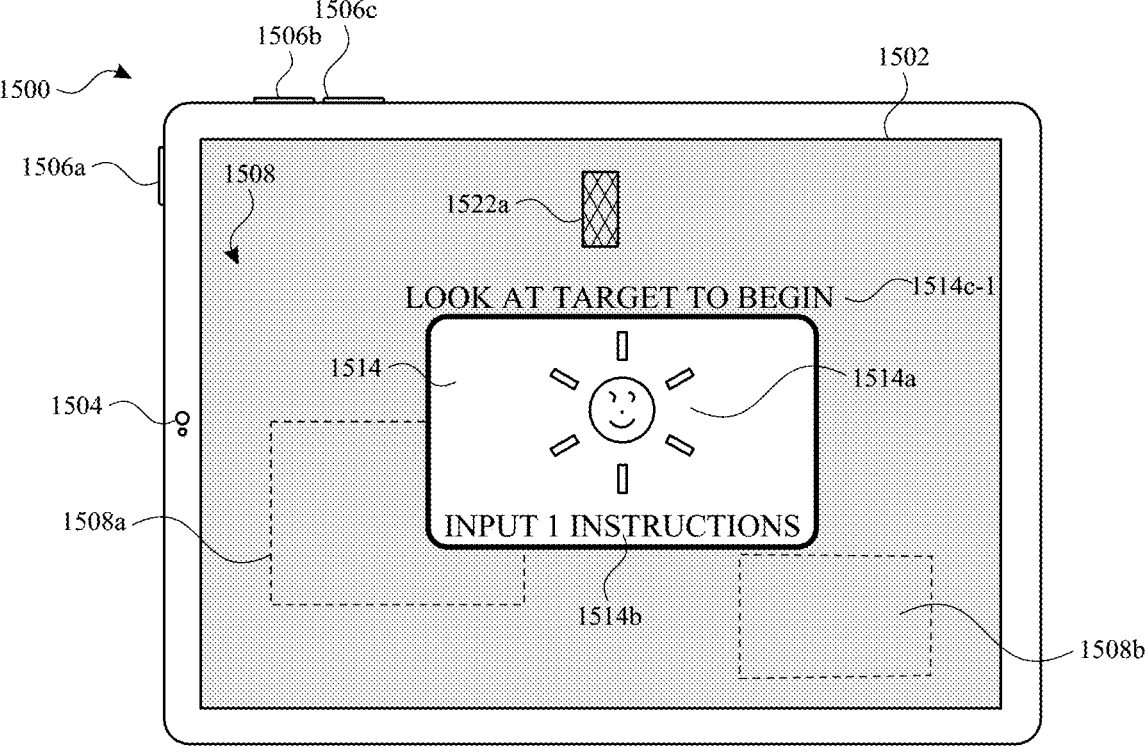
FIG. 15B2

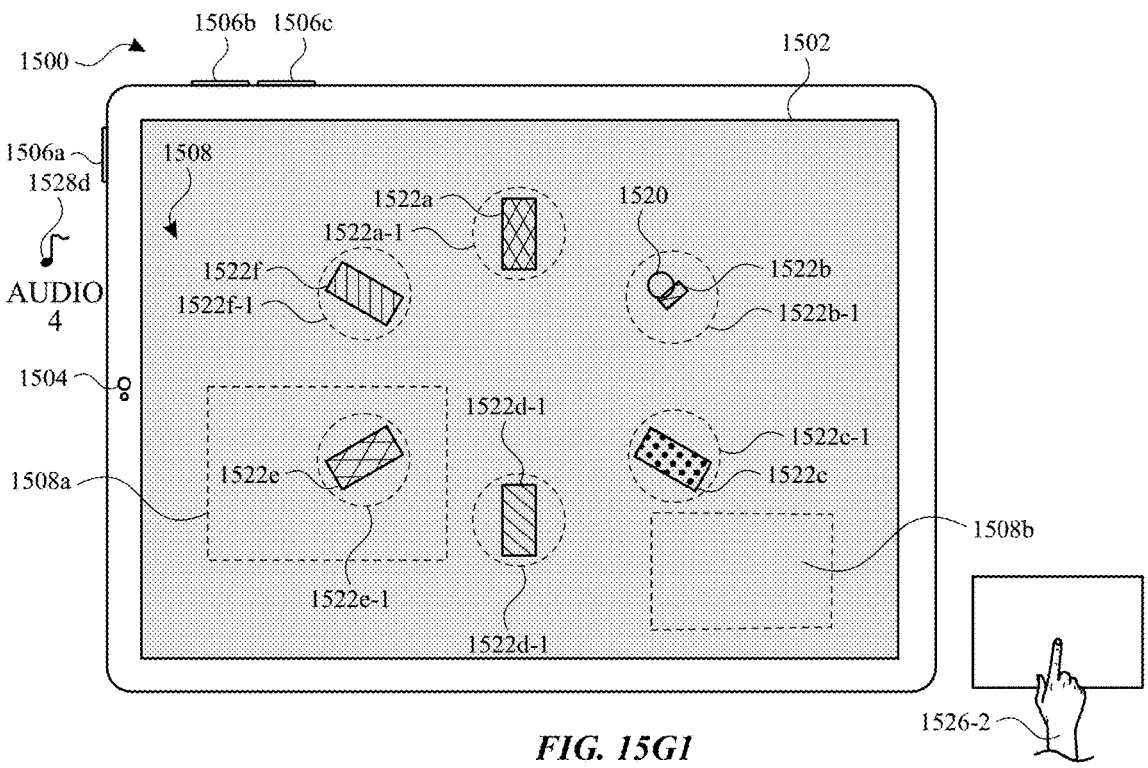
*FIG. 15G1*
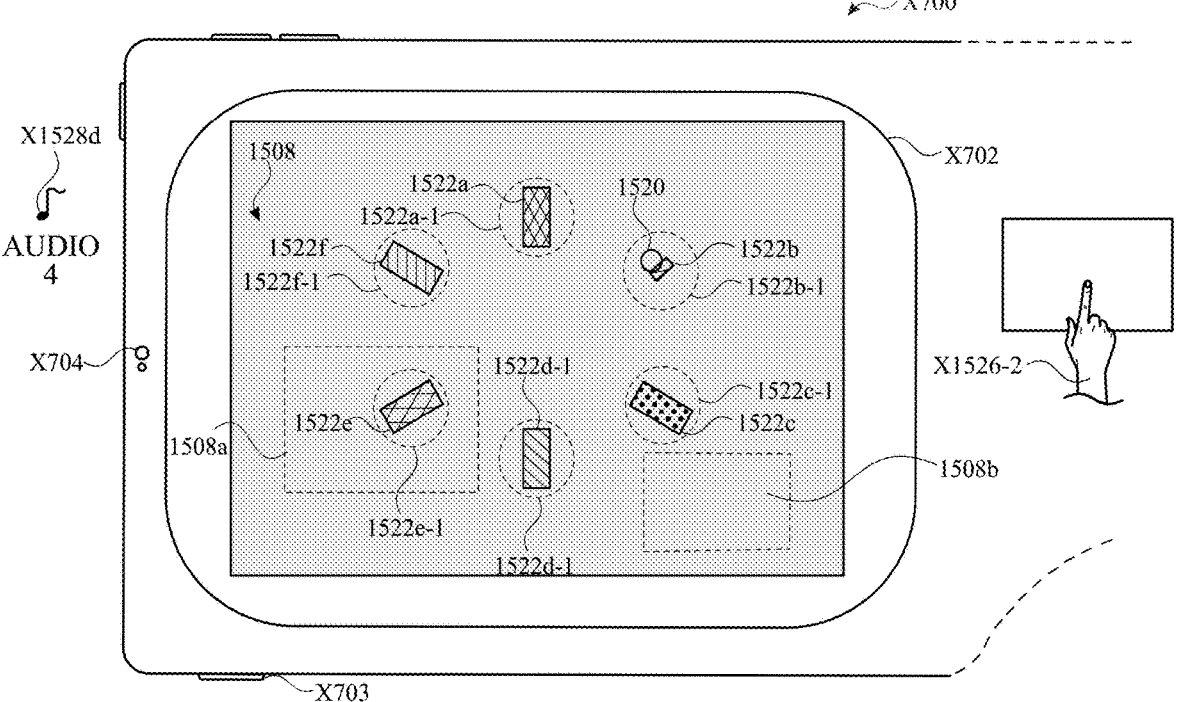
*FIG. 15G2*

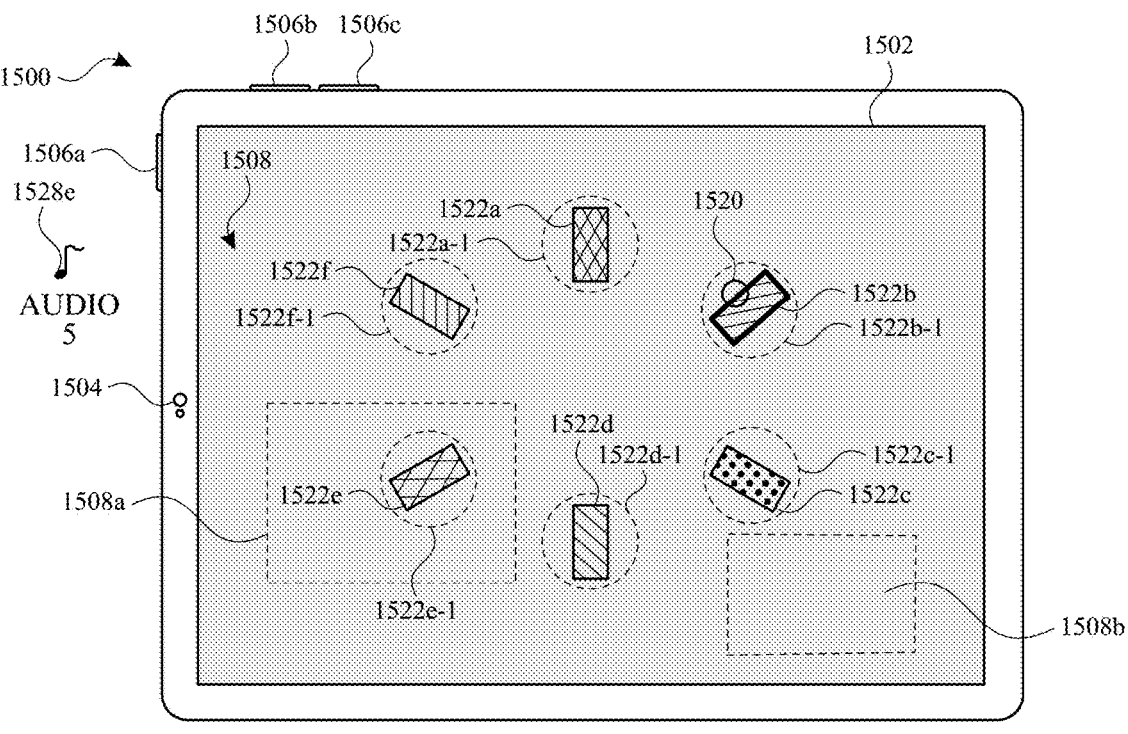
*FIG. 15H1*
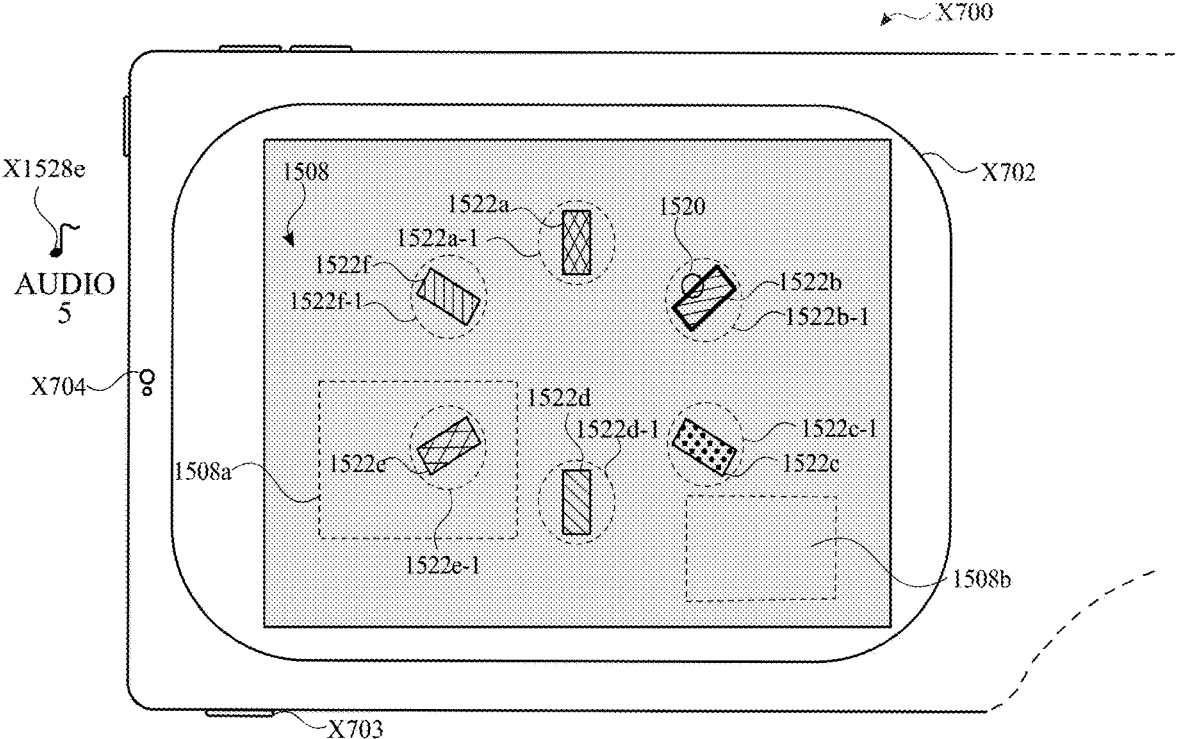
*FIG. 15H2*

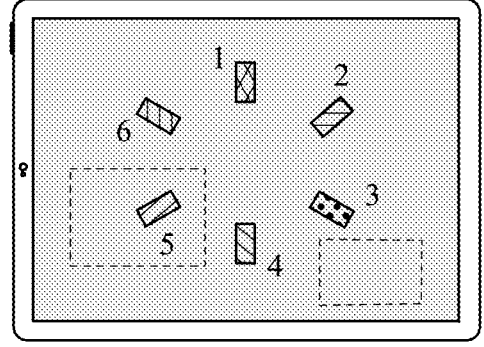
| OBJECT | AUDIO |
|--------|----------|
| 1 | C4-G4-C5 |
| 2 | A3-E4-A4 |
| 3 | F3-C4-F4 |
| 4 | C3-G3-C4 |
| 5 | A2-E3-A3 |
| 6 | F2-C3-F3 |
| FINAL | F4-C5-F5 |
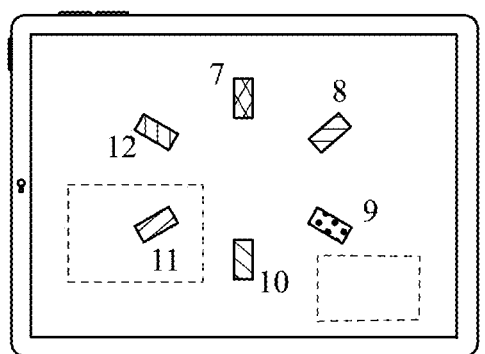
| OBJECT | AUDIO |
|--------|----------|
| 7 | A4-E5-A5 |
| 8 | F4-C5-F5 |
| 9 | C4-G4-C5 |
| 10 | A3-E4-A4 |
| 11 | F3-C4-F4 |
| 12 | C3-G4-C4 |
| FINAL | F2-C3-F3 |
*FIG. 15Y*

1600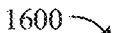

---

1602
Display, via the one or more display generation components, a first gaze enrollment user interface, wherein the first gaze enrollment user interface includes a first plurality of gaze target elements, including a first gaze target element and a second gaze target element.

↓

1604
While displaying the first gaze enrollment user interface, detect, via the one or more input devices, a selection input.

↓

1606
In response to detecting the selection input:

1608
In accordance with a determination that a gaze of a user was directed toward the first gaze target element when the selection input was detected, outputting first feedback indicating that gaze enrollment information corresponding to the first gaze target element has been recorded.

1610
In accordance with a determination that the gaze of the user was not directed toward the first gaze target element when the selection input was detected, forgoing outputting the first feedback.

*FIG. 16*

1700

---

1702
Display, via the one or more display generation components, a first gaze enrollment user interface, wherein the first gaze enrollment user interface includes a first plurality of gaze target elements, including a first gaze target element and a second gaze target element.

↓

1704
While displaying the first gaze enrollment user interface, detect, via the one or more input devices, a selection input.

↓

1706
In response to detecting the selection input:

1708
In accordance with a determination that the selection input is directed toward the first gaze target element, output first audio feedback corresponding to the first gaze target element.

1710
In accordance with a determination that the selection input is directed toward the second gaze target element, output second audio feedback corresponding to the second gaze target element and different from the first audio feedback.

1900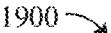

<u>1902</u>
Display, via the one or more display generation components, a first biometric enrollment user interface that is part of a biometric enrollment process for enrolling one or more biometric features of a user, including:

<u>1904</u>
In accordance with a determination that a set of accessibility conditions are met:

<u>1906</u>
Display a first selectable option that is selectable to indicate a user request to skip at least a portion of the biometric enrollment process.

<u>1908</u>
In accordance with a determination that the set of accessibility conditions are not met:

<u>1910</u>
Forgo display of the first selectable option.

*FIG. 19*

USER INTERFACES FOR GAZE TRACKING ENROLLMENT

CROSS-REFERENCE TO RELATED APPLICATIONS

This application claims priority to U.S. Provisional Patent Application Ser. No. 63/522,091, entitled "USER INTER-FACES FOR GAZE TRACKING ENROLLMENT," filed Jun. 20, 2023; U.S. Provisional Patent Application Ser. No. 63/470,943, entitled "USER INTERFACES FOR GAZE TRACKING ENROLLMENT," filed Jun. 4, 2023; and U.S. Provisional Patent Application Ser. No. 63/409,051, entitled "USER INTERFACES FOR GAZE TRACKING ENROLLMENT," filed Sep. 22, 2022. The entire contents of these applications are hereby incorporated by reference in their entirety.

TECHNICAL FIELD

The present disclosure relates generally to computer systems that are in communication with a display generation component and one or more input devices that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for gaze tracking enrollment are cumbersome, inefficient, and limited. For example, systems that provide insufficient feedback for performing actions associated with gaze tracking enrollment, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for gaze tracking enroll-ment and for providing computer-generated experiences to users that make interaction with the computer systems more efficient and intuitive for a user. Such methods and interfaces optionally complement or replace conventional methods for enrolling a user's gaze and providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking compo-nents. In some embodiments, the computer system has one or more hand-tracking components. In some embodiments, the computer system has one or more output devices in addition to the display generation component, the output devices including one or more tactile output generators and/or one or more audio output devices. In some embodi-ments, the computer system has a graphical user interface (GUI), one or more processors, memory and one or more modules, programs or sets of instructions stored in the memory for performing multiple functions. In some embodi-ments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for gaze tracking enrollment. Such methods and interfaces may complement or replace conven-tional methods for gaze tracking enrollment. Such methods and interfaces reduce the number, extent, and/or the nature of the inputs from a user and produce a more efficient human-machine interface. In addition, such methods and interfaces enable quicker and more accurate gaze tracking enrollment. For battery-operated computing devices, such methods and interfaces conserve power and increase the time between battery charges.

In accordance with some embodiments, a method is disclosed. The method comprises: at a computer system that is in communication with a display generation component and one or more input devices: displaying, via the display generation component, a target; while displaying the target, detecting, via at least one input device of the one or more input devices, a gaze of a user of the computer system; in response to detecting the gaze of the user: in accordance with a determination that the gaze of the user is directed at the target for a threshold amount of time, replacing, via the display generation component, display of the target with an enrollment progress user interface element; while displaying the enrollment progress user interface element, detecting, via at least one input device of the one or more input devices, one or more changes in the gaze of the user; and in response to detecting the one or more changes in the gaze of the user, changing, via the display generation component, a visual appearance of the enrollment progress user interface element based on the one or more changes detected in the gaze of the user.

In accordance with some embodiments, a non-transitory computer-readable storage medium is disclosed. The non-transitory computer-readable storage medium stores one or more programs configured to be executed by one or more processors of a computer system that is in communication with a display generation component and one or more input devices, the one or more programs including instructions for: displaying, via the display generation component, a target; while displaying the target, detecting, via at least one input device of the one or more input devices, a gaze of a user of the computer system; in response to detecting the gaze of the user: in accordance with a determination that the gaze of the user is directed at the target for a threshold amount of time, replacing, via the display generation component, display of the target with an enrollment progress user interface element; while displaying the enrollment progress user interface element, detecting, via at least one input device of the one or more input devices, one or more changes in the gaze of the user; and in response to detecting the one or more changes in the gaze of the user, changing, via the display generation component, a visual appearance of the enrollment progress user interface element based on the one or more changes detected in the gaze of the user.

In accordance with some embodiments, a transitory computer-readable storage medium is disclosed. The transitory computer-readable storage medium stores one or more programs configured to be executed by one or more processors of a computer system that is in communication with a display generation component and one or more input devices, the one or more programs including instructions for: displaying, via the display generation component, a target; while displaying the target, detecting, via at least one input device of the one or more input devices, a gaze of a user of the computer system; in response to detecting the gaze of the user: in accordance with a determination that the gaze of the user is directed at the target for a threshold amount of time, replacing, via the display generation component, display of the target with an enrollment progress user interface element; while displaying the enrollment progress user interface element, detecting, via at least one input device of the one or more input devices, one or more changes in the gaze of the user; and in response to detecting the one or more changes in the gaze of the user, changing, via the display generation component, a visual appearance of the enrollment progress user interface element based on the one or more changes detected in the gaze of the user.

In accordance with some embodiments, a computer system is disclosed. The computer system is configured to communicate with a display generation component and one or more input devices, the computer system comprising: one or more processors; and memory storing one or more programs configured to be executed by the one or more processors, the one or more programs including instructions for: displaying, via the display generation component, a target; while displaying the target, detecting, via at least one input device of the one or more input devices, a gaze of a user of the computer system; in response to detecting the gaze of the user: in accordance with a determination that the gaze of the user is directed at the target for a threshold amount of time, replacing, via the display generation component, display of the target with an enrollment progress user interface element; while displaying the enrollment progress user interface element, detecting, via at least one input device of the one or more input devices, one or more changes in the gaze of the user; and in response to detecting the one or more changes in the gaze of the user, changing, via the display generation component, a visual appearance of the enrollment progress user interface element based on the one or more changes detected in the gaze of the user.

In accordance with some embodiments, a computer system is disclosed. The computer system is configured to communicate with a display generation component and one or more input devices. The computer system comprises: means for displaying, via the display generation component, a target; means, while displaying the target, for detecting, via at least one input device of the one or more input devices, a gaze of a user of the computer system; means, responsive to detecting the gaze of the user, for: in accordance with a determination that the gaze of the user is directed at the target for a threshold amount of time, replacing, via the display generation component, display of the target with an enrollment progress user interface element; means, while displaying the enrollment progress user interface element, for detecting, via at least one input device of the one or more input devices, one or more changes in the gaze of the user; and in response to detecting the one or more changes in the gaze of the user, changing, via the display generation component, a visual appearance of the enrollment progress user interface element based on the one or more changes detected in the gaze of the user.

In accordance with some embodiments, a computer program product is disclosed. The computer program product comprises one or more programs configured to be executed by one or more processors of a computer system that is in communication with a display generation component and one or more input devices. The one or more programs includes instructions for: displaying, via the display generation component, a target; while displaying the target, detecting, via at least one input device of the one or more input devices, a gaze of a user of the computer system; in response to detecting the gaze of the user: in accordance with a determination that the gaze of the user is directed at the target for a threshold amount of time, replacing, via the display generation component, display of the target with an enrollment progress user interface element; while displaying the enrollment progress user interface element, detecting, via at least one input device of the one or more input devices, one or more changes in the gaze of the user; and in response to detecting the one or more changes in the gaze of the user, changing, via the display generation component, a visual appearance of the enrollment progress user interface element based on the one or more changes detected in the gaze of the user.

In accordance with some embodiments, a method is disclosed. The method comprises: at a computer system that is in communication with a display generation component and one or more input devices: displaying, via the display generation component, a plurality of user interface elements; while displaying the plurality of user interface elements, detecting, via at least one input device of the one or more input devices, a gaze of a user of the computer system; and in response to detecting the gaze of the user of the computer system: in accordance with a determination that the gaze of the user of the computer system is directed to a first location that corresponds to a first user interface element of the plurality of user interface elements, animating movement, via the display generation component, of the first user interface element from the first location toward a respective location that is different from the first location; and in accordance with a determination that the gaze of the user of the computer system is directed to a second location that corresponds to a second user interface element of the plurality of user interface elements, animating movement, via the display generation component, of the second user interface element from the second location toward the respective location that is different from the second location.

In accordance with some embodiments, a non-transitory computer-readable storage medium is disclosed. The non-transitory computer-readable storage medium stores one or more programs configured to be executed by one or more processors of a computer system that is in communication with a display generation component and one or more input devices, the one or more programs including instructions for: displaying, via the display generation component, a plurality of user interface elements; while displaying the plurality of user interface elements, detecting, via at least one input device of the one or more input devices, a gaze of a user of the computer system; and in response to detecting the gaze of the user of the computer system: in accordance with a determination that the gaze of the user of the computer system is directed to a first location that corresponds to a first user interface element of the plurality of user interface elements, animating movement, via the display generation component, of the first user interface element from the first location toward a respective location that is different from the first location; and in accordance with a determination that the gaze of the user of the computer system is directed to a second location that corresponds to a second user interface element of the plurality of user interface elements, animating movement, via the display generation component, of the second user interface element from the second location toward the respective location that is different from the second location.

In accordance with some embodiments, a transitory computer-readable storage medium is disclosed. The transitory computer-readable storage medium stores one or more programs configured to be executed by one or more processors of a computer system that is in communication with a display generation component and one or more input devices, the one or more programs including instructions for: displaying, via the display generation component, a plurality of user interface elements; while displaying the plurality of user interface elements, detecting, via at least one input device of the one or more input devices, a gaze of a user of the computer system; and in response to detecting the gaze of the user of the computer system: in accordance with a determination that the gaze of the user of the computer system is directed to a first location that corresponds to a first user interface element of the plurality of user interface elements, animating movement, via the display generation component, of the first user interface element from the first location toward a respective location that is different from the first location; and in accordance with a determination that the gaze of the user of the computer system is directed to a second location that corresponds to a second user interface element of the plurality of user interface elements, animating movement, via the display generation component, of the second user interface element from the second location toward the respective location that is different from the second location.

In accordance with some embodiments, a computer system is disclosed. The computer system is configured to communicate with a display generation component and one or more input devices. The computer system comprises: one or more processors; and memory storing one or more programs configured to be executed by the one or more processors, the one or more programs including instructions for: displaying, via the display generation component, a plurality of user interface elements; while displaying the plurality of user interface elements, detecting, via at least one input device of the one or more input devices, a gaze of a user of the computer system; and in response to detecting the gaze of the user of the computer system: in accordance with a determination that the gaze of the user of the computer system is directed to a first location that corresponds to a first user interface element of the plurality of user interface elements, animating movement, via the display generation component, of the first user interface element from the first location toward a respective location that is different from the first location; and in accordance with a determination that the gaze of the user of the computer system is directed to a second location that corresponds to a second user interface element of the plurality of user interface elements, animating movement, via the display generation component, of the second user interface element from the second location toward the respective location that is different from the second location.

In accordance with some embodiments, a computer system is disclosed. The computer system is configured to communicate with a display generation component and one or more input devices. The computer system comprises: means for displaying, via the display generation component, a plurality of user interface elements; means, while displaying the plurality of user interface elements, for detecting, via at least one input device of the one or more input devices, a gaze of a user of the computer system; and means, responsive to detecting the gaze of the user of the computer system, for: in accordance with a determination that the gaze of the user of the computer system is directed to a first location that corresponds to a first user interface element of the plurality of user interface elements, animating movement, via the display generation component, of the first user interface element from the first location toward a respective location that is different from the first location; and in accordance with a determination that the gaze of the user of the computer system is directed to a second location that corresponds to a second user interface element of the plurality of user interface elements, animating movement, via the display generation component, of the second user interface element from the second location toward the respective location that is different from the second location.

In accordance with some embodiments, a computer program product is disclosed. The computer program product comprises one or more programs configured to be executed by one or more processors of a computer system that is in communication with a display generation component and one or more input devices. The one or more programs include instructions for: displaying, via the display generation component, a plurality of user interface elements; while displaying the plurality of user interface elements, detecting, via at least one input device of the one or more input devices, a gaze of a user of the computer system; and in response to detecting the gaze of the user of the computer system: in accordance with a determination that the gaze of the user of the computer system is directed to a first location that corresponds to a first user interface element of the plurality of user interface elements, animating movement, via the display generation component, of the first user interface element from the first location toward a respective location that is different from the first location; and in accordance with a determination that the gaze of the user of the computer system is directed to a second location that corresponds to a second user interface element of the plurality of user interface elements, animating movement, via the display generation component, of the second user interface element from the second location toward the respective location that is different from the second location.

In accordance with some embodiments, a method is disclosed. The method comprises: at a computer system that is in communication with a display generation component and one or more input devices: displaying, via the display generation component, a plurality of user interface elements; while displaying the plurality of user interface elements with a first visual appearance, detecting, via at least one input device of the one or more input devices, a gaze of a user of the computer system that is directed to a plurality of different user interface objects including a gaze directed toward a first user interface element and gaze directed toward a second user interface element; and in response to detecting the gaze of the user of the computer system: in accordance with a determination that the gaze of the user of the computer system is directed to a location corresponding to the first user interface element of the plurality of user interface elements for less than a threshold amount of time, updating display, via the display generation component, of the first user interface element to have a second visual appearance that is different from the first visual appearance; in accordance with a determination that the gaze of the user of the computer system is directed to a location corresponding to a second user interface element, different from the first user interface element, of the plurality of user interface elements for less than the threshold amount of time, updating display, via the display generation component, of the second user interface element to have the second visual appearance; in accordance with a determination that the gaze of the user is directed to the location corresponding to the first user interface element for more than the threshold amount of time, changing, via the display generation component, the first user interface element to a third visual appearance different from the first visual appearance and the second visual appearance; and in accordance with a determination that the gaze of the user is directed to the location corresponding to the second user interface element for more than the threshold amount of time, changing, via the display generation component, the second user interface element to the third visual appearance.

In accordance with some embodiments, a non-transitory computer-readable storage medium is disclosed. The non-transitory computer-readable storage medium stores one or more programs configured to be executed by one or more processors of a computer system that is in communication with a display generation component and one or more input devices, the one or more programs including instructions for: displaying, via the display generation component, a plurality of user interface elements; while displaying the plurality of user interface elements with a first visual appearance, detecting, via at least one input device of the one or more input devices, a gaze of a user of the computer system that is directed to a plurality of different user interface objects including a gaze directed toward a first user interface element and gaze directed toward a second user interface element; and in response to detecting the gaze of the user of the computer system: in accordance with a determination that the gaze of the user of the computer system is directed to a location corresponding to the first user interface element of the plurality of user interface elements for less than a threshold amount of time, updating display, via the display generation component, of the first user interface element to have a second visual appearance that is different from the first visual appearance; in accordance with a determination that the gaze of the user of the computer system is directed to a location corresponding to a second user interface element, different from the first user interface element, of the plurality of user interface elements for less than the threshold amount of time, updating display, via the display generation component, of the second user interface element to have the second visual appearance; in accordance with a determination that the gaze of the user is directed to the location corresponding to the first user interface element for more than the threshold amount of time, changing, via the display generation component, the first user interface element to a third visual appearance different from the first visual appearance and the second visual appearance; and in accordance with a determination that the gaze of the user is directed to the location corresponding to the second user interface element for more than the threshold amount of time, changing, via the display generation component, the second user interface element to the third visual appearance.

In accordance with some embodiments, a transitory computer-readable storage medium is disclosed. The transitory computer-readable storage medium stores one or more programs configured to be executed by one or more processors of a computer system that is in communication with a display generation component and one or more input devices, the one or more programs including instructions for: displaying, via the display generation component, a plurality of user interface elements; while displaying the plurality of user interface elements with a first visual appearance, detecting, via at least one input device of the one or more input devices, a gaze of a user of the computer system that is directed to a plurality of different user interface objects including a gaze directed toward a first user interface element and gaze directed toward a second user interface element; and in response to detecting the gaze of the user of the computer system: in accordance with a determination that the gaze of the user of the computer system is directed to a location corresponding to the first user interface element of the plurality of user interface elements for less than a threshold amount of time, updating display, via the display generation component, of the first user interface element to have a second visual appearance that is different from the first visual appearance; in accordance with a determination that the gaze of the user of the computer system is directed to a location corresponding to a second user interface element, different from the first user interface element, of the plurality of user interface elements for less than the threshold amount of time, updating display, via the display generation component, of the second user interface element to have the second visual appearance; in accordance with a determination that the gaze of the user is directed to the location corresponding to the first user interface element for more than the threshold amount of time, changing, via the display generation component, the first user interface element to a third visual appearance different from the first visual appearance and the second visual appearance; and in accordance with a determination that the gaze of the user is directed to the location corresponding to the second user interface element for more than the threshold amount of time, changing, via the display generation component, the second user interface element to the third visual appearance.

In accordance with some embodiments, a computer system is disclosed. The computer system is configured to communicate with a display generation component and one or more input devices. The computer system comprises: one or more processors; and memory storing one or more programs configured to be executed by the one or more processors, the one or more programs including instructions for: displaying, via the display generation component, a plurality of user interface elements; while displaying the plurality of user interface elements with a first visual appearance, detecting, via at least one input device of the one or more input devices, a gaze of a user of the computer system that is directed to a plurality of different user interface objects including a gaze directed toward a first user interface element and gaze directed toward a second user interface element; and in response to detecting the gaze of the user of the computer system: in accordance with a determination that the gaze of the user of the computer system is directed to a location corresponding to the first user interface element of the plurality of user interface elements for less than a threshold amount of time, updating display, via the display generation component, of the first user interface element to have a second visual appearance that is different from the first visual appearance; in accordance with a determination that the gaze of the user of the computer system is directed to a location corresponding to a second user interface element, different from the first user interface element, of the plurality of user interface elements for less than the threshold amount of time, updating display, via the display generation component, of the second user interface element to have the second visual appearance; in accordance with a determination that the gaze of the user is directed to the location corresponding to the first user interface element for more than the threshold amount of time, changing, via the display generation component, the first user interface element to a third visual appearance different from the first visual appearance and the second visual appearance; and in accordance with a determination that the gaze of the user is directed to the location corresponding to the second user interface element for more than the threshold amount of time, changing, via the display generation component, the second user interface element to the third visual appearance.

In accordance with some embodiments, a computer system is disclosed. The computer system is configured to communicate with a display generation component and one or more input devices. The computer system comprises: means for displaying, via the display generation component, a plurality of user interface elements; means, while displaying the plurality of user interface elements with a first visual appearance, for detecting, via at least one input device of the one or more input devices, a gaze of a user of the computer system that is directed to a plurality of different user interface objects including a gaze directed toward a first user interface element and gaze directed toward a second user interface element; and means, responsive to detecting the gaze of the user of the computer system, for: in accordance with a determination that the gaze of the user of the computer system is directed to a location corresponding to the first user interface element of the plurality of user interface elements for less than a threshold amount of time, updating display, via the display generation component, of the first user interface element to have a second visual appearance that is different from the first visual appearance; in accordance with a determination that the gaze of the user of the computer system is directed to a location corresponding to a second user interface element, different from the first user interface element, of the plurality of user interface elements for less than the threshold amount of time, updating display, via the display generation component, of the second user interface element to have the second visual appearance; in accordance with a determination that the gaze of the user is directed to the location corresponding to the first user interface element for more than the threshold amount of time, changing, via the display generation component, the first user interface element to a third visual appearance different from the first visual appearance and the second visual appearance; and in accordance with a determination that the gaze of the user is directed to the location corresponding to the second user interface element for more than the threshold amount of time, changing, via the display generation component, the second user interface element to the third visual appearance.

In accordance with some embodiments, a computer program product is disclosed. The computer program product comprises one or more programs configured to be executed by one or more processors of a computer system that is in communication with a display generation component and one or more input devices, the one or more programs including instructions for: displaying, via the display generation component, a plurality of user interface elements; while displaying the plurality of user interface elements with a first visual appearance, detecting, via at least one input device of the one or more input devices, a gaze of a user of the computer system that is directed to a plurality of different user interface objects including a gaze directed toward a first user interface element and gaze directed toward a second user interface element; and in response to detecting the gaze of the user of the computer system: in accordance with a determination that the gaze of the user of the computer system is directed to a location corresponding to the first user interface element of the plurality of user interface elements for less than a threshold amount of time, updating display, via the display generation component, of the first user interface element to have a second visual appearance that is different from the first visual appearance; in accordance with a determination that the gaze of the user of the computer system is directed to a location corresponding to a second user interface element, different from the first user interface element, of the plurality of user interface elements for less than the threshold amount of time, updating display, via the display generation component, of the second user interface element to have the second visual appearance; in accordance with a determination that the gaze of the user is directed to the location corresponding to the first user interface element for more than the threshold amount of time, changing, via the display generation component, the first user interface element to a third visual appearance different from the first visual appearance and the second visual appearance; and in accordance with a determination that the gaze of the user is directed to the location corresponding to the second user interface element for more than the threshold amount of time, changing, via the display generation component, the second user interface element to the third visual appearance.

In accordance with some embodiments, a method is disclosed. The method comprises: at a computer system that is in communication with a display generation component and one or more input devices: displaying, via the display generation component, a user interface element that moves gradually over time; while the user interface element is moving gradually over time, detecting, via the one or more input devices, movement of one or more eyes to track the moving user interface element; and in response to detecting the movement of the one or more eyes, in accordance with a determination that sufficient information about the one or more eyes has been captured to enroll the one or more eyes, providing feedback indicating that sufficient information has been captured.

In accordance with some embodiments, a non-transitory computer-readable storage medium is disclosed. The non-transitory computer-readable storage medium stores one or more programs configured to be executed by one or more processors of a computer system that is in communication with a display generation component and one or more input devices, the one or more programs including instructions for: displaying, via the display generation component, a user interface element that moves gradually over time; while the user interface element is moving gradually over time, detecting, via the one or more input devices, movement of one or more eyes to track the moving user interface element; and in response to detecting the movement of the one or more eyes, in accordance with a determination that sufficient information about the one or more eyes has been captured to enroll the one or more eyes, providing feedback indicating that sufficient information has been captured.

In accordance with some embodiments, a transitory computer-readable storage medium is disclosed. The transitory computer-readable storage medium stores one or more programs configured to be executed by one or more processors of a computer system that is in communication with a display generation component and one or more input devices, the one or more programs including instructions for: displaying, via the display generation component, a user interface element that moves gradually over time; while the user interface element is moving gradually over time, detecting, via the one or more input devices, movement of one or more eyes to track the moving user interface element; and in response to detecting the movement of the one or more eyes, in accordance with a determination that sufficient information about the one or more eyes has been captured to enroll the one or more eyes, providing feedback indicating that sufficient information has been captured.

In accordance with some embodiments, a computer system is disclosed. The computer system is configured to communicate with a display generation component and one or more input devices. The computer system comprises: one or more processors; and memory storing one or more programs configured to be executed by the one or more processors, the one or more programs including instructions for: displaying, via the display generation component, a user interface element that moves gradually over time; while the user interface element is moving gradually over time, detecting, via the one or more input devices, movement of one or more eyes to track the moving user interface element; and in response to detecting the movement of the one or more eyes, in accordance with a determination that sufficient information about the one or more eyes has been captured to enroll the one or more eyes, providing feedback indicating that sufficient information has been captured.

In accordance with some embodiments, a computer system is disclosed. The computer system is configured to communicate with a display generation component and one or more input devices. The computer system comprises: means for displaying, via the display generation component, a user interface element that moves gradually over time; means, while the user interface element is moving gradually over time, for detecting, via the one or more input devices, movement of one or more eyes to track the moving user interface element; and means, responsive to detecting the movement of the one or more eyes, in accordance with a determination that sufficient information about the one or more eyes has been captured to enroll the one or more eyes, for providing feedback indicating that sufficient information has been captured.

In accordance with some embodiments, a computer program product is disclosed. The computer program product comprises one or more programs configured to be executed by one or more processors of a computer system that is in communication with a display generation component and one or more input devices, the one or more programs including instructions for: displaying, via the display generation component, a user interface element that moves gradually over time; while the user interface element is moving gradually over time, detecting, via the one or more input devices, movement of one or more eyes to track the moving user interface element; and in response to detecting the movement of the one or more eyes, in accordance with a determination that sufficient information about the one or more eyes has been captured to enroll the one or more eyes, providing feedback indicating that sufficient information has been captured.

In accordance with some embodiments, a method is disclosed. The method comprises: at a computer system that is in communication with one or more display generation components and one or more input devices: displaying, via the one or more display generation components, a first gaze enrollment user interface, wherein: the first gaze enrollment user interface includes a first set of user interface elements that prompt movement of one or more eyes of a user; and the first gaze enrollment user interface is displayed with a respective type of element having a first average brightness; and subsequent to displaying the first gaze enrollment user interface, displaying, via the one or more display generation components, a second gaze enrollment user interface, wherein: the second gaze enrollment user interface includes a second set of user interface elements that prompt movement of one or more eyes of a user; and the second gaze enrollment user interface is displayed with the respective type of element having a second average brightness different from the first average brightness.

In accordance with some embodiments, a non-transitory computer-readable storage medium is described. The non-transitory computer-readable storage medium stores one or more programs configured to be executed by one or more processors of a computer system that is in communication with one or more display generation components and one or more input devices, the one or more programs including instructions for: displaying, via the one or more display generation components, a first gaze enrollment user interface, wherein: the first gaze enrollment user interface includes a first set of user interface elements that prompt movement of one or more eyes of a user; and the first gaze enrollment user interface is displayed with a respective type of element having a first average brightness; and subsequent to displaying the first gaze enrollment user interface, displaying, via the one or more display generation components, a second gaze enrollment user interface, wherein: the second gaze enrollment user interface includes a second set of user interface elements that prompt movement of one or more eyes of a user; and the second gaze enrollment user interface is displayed with the respective type of element having a second average brightness different from the first average brightness.

In accordance with some embodiments, a transitory computer-readable storage medium is described. The transitory computer-readable storage medium stores one or more programs configured to be executed by one or more processors of a computer system that is in communication with one or more display generation components and one or more input devices, the one or more programs including instructions for: displaying, via the one or more display generation components, a first gaze enrollment user interface, wherein: the first gaze enrollment user interface includes a first set of user interface elements that prompt movement of one or more eyes of a user; and the first gaze enrollment user interface is displayed with a respective type of element having a first average brightness; and subsequent to displaying the first gaze enrollment user interface, displaying, via the one or more display generation components, a second gaze enrollment user interface, wherein: the second gaze enrollment user interface includes a second set of user interface elements that prompt movement of one or more eyes of a user; and the second gaze enrollment user interface is displayed with the respective type of element having a second average brightness different from the first average brightness.

In accordance with some embodiments, a computer system is disclosed. The computer system is configured to communicate with one or more display generation components and one or more input devices and comprises: one or more processors; and memory storing one or more programs configured to be executed by the one or more processors, the one or more programs including instructions for: displaying, via the one or more display generation components, a first gaze enrollment user interface, wherein: the first gaze enrollment user interface includes a first set of user interface elements that prompt movement of one or more eyes of a user; and the first gaze enrollment user interface is displayed with a respective type of element having a first average brightness; and subsequent to displaying the first gaze enrollment user interface, displaying, via the one or more display generation components, a second gaze enrollment user interface, wherein: the second gaze enrollment user interface includes a second set of user interface elements that prompt movement of one or more eyes of a user; and the second gaze enrollment user interface is displayed with the respective type of element having a second average brightness different from the first average brightness.

In accordance with some embodiments, a computer system is disclosed. The computer system is configured to communicate with one or more display generation components and one or more input devices and comprises: means for displaying, via the one or more display generation components, a first gaze enrollment user interface, wherein: the first gaze enrollment user interface includes a first set of user interface elements that prompt movement of one or more eyes of a user; and the first gaze enrollment user interface is displayed with a respective type of element having a first average brightness; and means, subsequent to displaying the first gaze enrollment user interface, for displaying, via the one or more display generation components, a second gaze enrollment user interface, wherein: the second gaze enrollment user interface includes a second set of user interface elements that prompt movement of one or more eyes of a user; and the second gaze enrollment user interface is displayed with the respective type of element having a second average brightness different from the first average brightness.

In accordance with some embodiments, a computer program product is disclosed. The computer program product comprises one or more programs configured to be executed by one or more processors of a computer system that is in communication with one or more display generation components and one or more input devices, the one or more programs including instructions for: displaying, via the one or more display generation components, a first gaze enrollment user interface, wherein: the first gaze enrollment user interface includes a first set of user interface elements that prompt movement of one or more eyes of a user; and the first gaze enrollment user interface is displayed with a respective type of element having a first average brightness; and subsequent to displaying the first gaze enrollment user interface, displaying, via the one or more display generation components, a second gaze enrollment user interface, wherein: the second gaze enrollment user interface includes a second set of user interface elements that prompt movement of one or more eyes of a user; and the second gaze enrollment user interface is displayed with the respective type of element having a second average brightness different from the first average brightness.

In accordance with some embodiments, a method is disclosed. The method comprises: at a computer system that is in communication with one or more display generation components and one or more input devices: displaying, via the one or more display generation components, a plurality of user interface elements; while displaying the plurality of user interface elements, detecting, via the one or more input devices, a change in a direction of a gaze of the user; and in response to detecting the change in direction of the gaze of the user: in accordance with a determination that the gaze of the user is directed toward a first user interface element, outputting a first audio output indicative of the gaze of the user being directed toward the first user interface element; and in accordance with a determination that the gaze of the user is not directed toward the first user interface element, forgoing outputting the first audio output indicative of the gaze of the user being directed toward the first user interface element.

In accordance with some embodiments, a non-transitory computer-readable storage medium is disclosed. The non-transitory computer-readable storage medium stores one or more programs configured to be executed by one or more processors of a computer system that is in communication with one or more display generation components and one or more input devices, the one or more programs including instructions for: displaying, via the one or more display generation components, a plurality of user interface elements; while displaying the plurality of user interface elements, detecting, via the one or more input devices, a change in a direction of a gaze of the user; and in response to detecting the change in direction of the gaze of the user: in accordance with a determination that the gaze of the user is directed toward a first user interface element, outputting a first audio output indicative of the gaze of the user being directed toward the first user interface element; and in accordance with a determination that the gaze of the user is not directed toward the first user interface element, forgoing outputting the first audio output indicative of the gaze of the user being directed toward the first user interface element.

In accordance with some embodiments, a transitory computer-readable storage medium is disclosed. The transitory computer-readable storage medium stores one or more programs configured to be executed by one or more processors of a computer system that is in communication with one or more display generation components and one or more input devices, the one or more programs including instructions for: displaying, via the one or more display generation components, a plurality of user interface elements; while displaying the plurality of user interface elements, detecting, via the one or more input devices, a change in a direction of a gaze of the user; and in response to detecting the change in direction of the gaze of the user: in accordance with a determination that the gaze of the user is directed toward a first user interface element, outputting a first audio output indicative of the gaze of the user being directed toward the first user interface element; and in accordance with a determination that the gaze of the user is not directed toward the first user interface element, forgoing outputting the first audio output indicative of the gaze of the user being directed toward the first user interface element.

In accordance with some embodiments, a computer system is disclosed. The computer system is configured to communicate with one or more display generation components and one or more input devices, comprising: one or more processors; and memory storing one or more programs configured to be executed by the one or more processors, the one or more programs including instructions for: displaying, via the one or more display generation components, a plurality of user interface elements; while displaying the plurality of user interface elements, detecting, via the one or more input devices, a change in a direction of a gaze of the user; and in response to detecting the change in direction of the gaze of the user: in accordance with a determination that the gaze of the user is directed toward a first user interface element, outputting a first audio output indicative of the gaze of the user being directed toward the first user interface element; and in accordance with a determination that the gaze of the user is not directed toward the first user interface element, forgoing outputting the first audio output indicative of the gaze of the user being directed toward the first user interface element.

In accordance with some embodiments, a computer system is disclosed. The computer system is configured to communicate with one or more display generation components and one or more input devices and comprises: means for displaying, via the one or more display generation components, a plurality of user interface elements; means, while displaying the plurality of user interface elements, for detecting, via the one or more input devices, a change in a direction of a gaze of the user; and means, responsive to detecting the change in direction of the gaze of the user, for: in accordance with a determination that the gaze of the user is directed toward a first user interface element, outputting a first audio output indicative of the gaze of the user being directed toward the first user interface element; and in accordance with a determination that the gaze of the user is not directed toward the first user interface element, forgoing outputting the first audio output indicative of the gaze of the user being directed toward the first user interface element.

In accordance with some embodiments, a computer program product is disclosed. The computer program product comprises one or more programs configured to be executed by one or more processors of a computer system that is in communication with one or more display generation components and one or more input devices, the one or more programs including instructions for: displaying, via the one or more display generation components, a plurality of user interface elements; while displaying the plurality of user interface elements, detecting, via the one or more input devices, a change in a direction of a gaze of the user; and in response to detecting the change in direction of the gaze of the user: in accordance with a determination that the gaze of the user is directed toward a first user interface element, outputting a first audio output indicative of the gaze of the user being directed toward the first user interface element; and in accordance with a determination that the gaze of the user is not directed toward the first user interface element, forgoing outputting the first audio output indicative of the gaze of the user being directed toward the first user interface element.

In accordance with some embodiments, a method is disclosed. The method comprises: at a computer system that is in communication with one or more display generation components and one or more input devices: displaying, via the one or more display generation components, a first gaze enrollment user interface, wherein the first gaze enrollment user interface includes a first plurality of gaze target elements, including a first gaze target element and a second gaze target element; while displaying the first gaze enrollment user interface, detecting, via the one or more input devices, a selection input; and in response to detecting the selection input: in accordance with a determination that a gaze of a user was directed toward the first gaze target element when the selection input was detected, outputting first feedback indicating that gaze enrollment information corresponding to the first gaze target element has been recorded.

In accordance with some embodiments, a non-transitory computer-readable storage medium is disclosed. The non-transitory computer-readable storage medium stores one or more programs configured to be executed by one or more processors of a computer system that is in communication with one or more display generation components and one or more input devices, the one or more programs including instructions for: displaying, via the one or more display generation components, a first gaze enrollment user interface, wherein the first gaze enrollment user interface includes a first plurality of gaze target elements, including a first gaze target element and a second gaze target element; while displaying the first gaze enrollment user interface, detecting, via the one or more input devices, a selection input; and in response to detecting the selection input: in accordance with a determination that a gaze of a user was directed toward the first gaze target element when the selection input was detected, outputting first feedback indicating that gaze enrollment information corresponding to the first gaze target element has been recorded.

In accordance with some embodiments, a transitory computer-readable storage medium is disclosed. The transitory computer-readable storage medium stores one or more programs configured to be executed by one or more processors of a computer system that is in communication with one or more display generation components and one or more input devices, the one or more programs including instructions for: displaying, via the one or more display generation components, a first gaze enrollment user interface, wherein the first gaze enrollment user interface includes a first plurality of gaze target elements, including a first gaze target element and a second gaze target element; while displaying the first gaze enrollment user interface, detecting, via the one or more input devices, a selection input; and in response to detecting the selection input: in accordance with a determination that a gaze of a user was directed toward the first gaze target element when the selection input was detected, outputting first feedback indicating that gaze enrollment information corresponding to the first gaze target element has been recorded.

In accordance with some embodiments, a computer system is disclosed. The computer system is configured to communicate with one or more display generation components and one or more input devices and comprises: one or more processors; and memory storing one or more programs configured to be executed by the one or more processors, the one or more programs including instructions for: displaying, via the one or more display generation components, a first gaze enrollment user interface, wherein the first gaze enrollment user interface includes a first plurality of gaze target elements, including a first gaze target element and a second gaze target element; while displaying the first gaze enrollment user interface, detecting, via the one or more input devices, a selection input; and in response to detecting the selection input: in accordance with a determination that a gaze of a user was directed toward the first gaze target element when the selection input was detected, outputting first feedback indicating that gaze enrollment information corresponding to the first gaze target element has been recorded.

In accordance with some embodiments, a computer system is disclosed. The computer system is configured to communicate with one or more display generation components and one or more input devices and comprises: means for displaying, via the one or more display generation components, a first gaze enrollment user interface, wherein the first gaze enrollment user interface includes a first plurality of gaze target elements, including a first gaze target element and a second gaze target element; means, while displaying the first gaze enrollment user interface, for detecting, via the one or more input devices, a selection input; and means, responsive to detecting the selection input, for: in accordance with a determination that a gaze of a user was directed toward the first gaze target element when the selection input was detected, outputting first feedback indicating that gaze enrollment information corresponding to the first gaze target element has been recorded.

In accordance with some embodiments, a computer program product is disclosed. The computer program product comprises one or more programs configured to be executed by one or more processors of a computer system that is in communication with one or more display generation components and one or more input devices, the one or more programs including instructions for: displaying, via the one or more display generation components, a first gaze enrollment user interface, wherein the first gaze enrollment user interface includes a first plurality of gaze target elements, including a first gaze target element and a second gaze target element; while displaying the first gaze enrollment user interface, detecting, via the one or more input devices, a selection input; and in response to detecting the selection input: in accordance with a determination that a gaze of a user was directed toward the first gaze target element when the selection input was detected, outputting first feedback indicating that gaze enrollment information corresponding to the first gaze target element has been recorded.

In accordance with some embodiments, a method is disclosed. The method comprises: at a computer system that is in communication with one or more display generation components and one or more input devices: displaying, via the one or more display generation components, a first gaze enrollment user interface, wherein the first gaze enrollment user interface includes a first plurality of gaze target elements, including a first gaze target element and a second gaze target element; while displaying the first gaze enrollment user interface, detecting, via the one or more input devices, a selection input; and in response to detecting the selection input: in accordance with a determination that the selection input is directed toward the first gaze target element, outputting first audio feedback corresponding to the first gaze target element; and in accordance with a determination that the selection input is directed toward the second gaze target element, outputting second audio feedback corresponding to the second gaze target element and different from the first audio feedback.

In accordance with some embodiments, a non-transitory computer-readable storage medium is disclosed. The non-transitory computer-readable storage medium stores one or more programs configured to be executed by one or more processors of a computer system that is in communication with one or more display generation components and one or more input devices, the one or more programs including instructions for: displaying, via the one or more display generation components, a first gaze enrollment user interface, wherein the first gaze enrollment user interface includes a first plurality of gaze target elements, including a first gaze target element and a second gaze target element; while displaying the first gaze enrollment user interface, detecting, via the one or more input devices, a selection input; and in response to detecting the selection input: in accordance with a determination that the selection input is directed toward the first gaze target element, outputting first audio feedback corresponding to the first gaze target element; and in accordance with a determination that the selection input is directed toward the second gaze target element, outputting second audio feedback corresponding to the second gaze target element and different from the first audio feedback.

In accordance with some embodiments, a transitory computer-readable storage medium is disclosed. The transitory computer-readable storage medium stores one or more programs configured to be executed by one or more processors of a computer system that is in communication with one or more display generation components and one or more input devices, the one or more programs including instructions for: displaying, via the one or more display generation components, a first gaze enrollment user interface, wherein the first gaze enrollment user interface includes a first plurality of gaze target elements, including a first gaze target element and a second gaze target element; while displaying the first gaze enrollment user interface, detecting, via the one or more input devices, a selection input; and in response to detecting the selection input: in accordance with a determination that the selection input is directed toward the first gaze target element, outputting first audio feedback corresponding to the first gaze target element; and in accordance with a determination that the selection input is directed toward the second gaze target element, outputting second audio feedback corresponding to the second gaze target element and different from the first audio feedback.

In accordance with some embodiments, a computer system is disclosed. The computer system is configured to communicate with one or more display generation components and one or more input devices and comprises: one or more processors; and memory storing one or more programs configured to be executed by the one or more processors, the one or more programs including instructions for: displaying, via the one or more display generation components, a first gaze enrollment user interface, wherein the first gaze enrollment user interface includes a first plurality of gaze target elements, including a first gaze target element and a second gaze target element; while displaying the first gaze enrollment user interface, detecting, via the one or more input devices, a selection input; and in response to detecting the selection input: in accordance with a determination that the selection input is directed toward the first gaze target element, outputting first audio feedback corresponding to the first gaze target element; and in accordance with a determination that the selection input is directed toward the second gaze target element, outputting second audio feedback corresponding to the second gaze target element and different from the first audio feedback.

In accordance with some embodiments, a computer system is disclosed. The computer system is configured to communicate with one or more display generation components and one or more input devices and comprises: means for displaying, via the one or more display generation components, a first gaze enrollment user interface, wherein the first gaze enrollment user interface includes a first plurality of gaze target elements, including a first gaze target element and a second gaze target element; means, while displaying the first gaze enrollment user interface, for detecting, via the one or more input devices, a selection input; and means, responsive to detecting the selection input, for: in accordance with a determination that the selection input is directed toward the first gaze target element, outputting first audio feedback corresponding to the first gaze target element; and in accordance with a determination that the selection input is directed toward the second gaze target element, outputting second audio feedback corresponding to the second gaze target element and different from the first audio feedback.

In accordance with some embodiments, a computer program product is disclosed. The computer program product comprises one or more programs configured to be executed by one or more processors of a computer system that is in communication with one or more display generation components and one or more input devices, the one or more programs including instructions for: displaying, via the one or more display generation components, a first gaze enrollment user interface, wherein the first gaze enrollment user interface includes a first plurality of gaze target elements, including a first gaze target element and a second gaze target element; while displaying the first gaze enrollment user interface, detecting, via the one or more input devices, a selection input; and in response to detecting the selection input: in accordance with a determination that the selection input is directed toward the first gaze target element, outputting first audio feedback corresponding to the first gaze target element; and in accordance with a determination that the selection input is directed toward the second gaze target element, outputting second audio feedback corresponding to the second gaze target element and different from the first audio feedback.

In accordance with some embodiments, a method is disclosed. The method comprises: at a computer system that is in communication with one or more display generation components and one or more input devices: displaying, via the one or more display generation components, a first biometric enrollment user interface that is part of a biometric enrollment process for enrolling one or more biometric features of a user, including: in accordance with a determination that a set of accessibility conditions are met, displaying a first selectable option that is selectable to indicate a user request to skip at least a portion of the biometric enrollment process; and in accordance with a determination that the set of accessibility conditions are not met, forgoing display of the first selectable option.

In accordance with some embodiments, a non-transitory computer-readable storage medium is disclosed. The non-transitory computer-readable storage medium stores one or more programs configured to be executed by one or more processors of a computer system that is in communication with one or more display generation components and one or more input devices, the one or more programs including instructions for: displaying, via the one or more display generation components, a first biometric enrollment user interface that is part of a biometric enrollment process for enrolling one or more biometric features of a user, including: in accordance with a determination that a set of accessibility conditions are met, displaying a first selectable option that is selectable to indicate a user request to skip at least a portion of the biometric enrollment process; and in accordance with a determination that the set of accessibility conditions are not met, forgoing display of the first selectable option.

In accordance with some embodiments, a transitory computer-readable storage medium is disclosed. The transitory computer-readable storage medium stores one or more programs configured to be executed by one or more processors of a computer system that is in communication with one or more display generation components and one or more input devices, the one or more programs including instructions for: displaying, via the one or more display generation components, a first biometric enrollment user interface that is part of a biometric enrollment process for enrolling one or more biometric features of a user, including: in accordance with a determination that a set of accessibility conditions are met, displaying a first selectable option that is selectable to indicate a user request to skip at least a portion of the biometric enrollment process; and in accordance with a determination that the set of accessibility conditions are not met, forgoing display of the first selectable option.

In accordance with some embodiments, a computer system is disclosed. The computer system is configured to communicate with one or more display generation components and one or more input devices, and comprises: one or more processors; and memory storing one or more programs configured to be executed by the one or more processors, the one or more programs including instructions for: displaying, via the one or more display generation components, a first biometric enrollment user interface that is part of a biometric enrollment process for enrolling one or more biometric features of a user, including: in accordance with a determination that a set of accessibility conditions are met, displaying a first selectable option that is selectable to indicate a user request to skip at least a portion of the biometric enrollment process; and in accordance with a determination that the set of accessibility conditions are not met, forgoing display of the first selectable option.

In accordance with some embodiments, a computer system is disclosed. The computer system is configured to communicate with one or more display generation components and one or more input devices, and comprises: means for displaying, via the one or more display generation components, a first biometric enrollment user interface that is part of a biometric enrollment process for enrolling one or more biometric features of a user, including: in accordance with a determination that a set of accessibility conditions are met, displaying a first selectable option that is selectable to indicate a user request to skip at least a portion of the biometric enrollment process; and in accordance with a determination that the set of accessibility conditions are not met, forgoing display of the first selectable option.

In accordance with some embodiments, a computer program product is disclosed. The computer program product comprises one or more programs configured to be executed by one or more processors of a computer system that is in communication with one or more display generation components and one or more input devices, the one or more programs including instructions for: displaying, via the one or more display generation components, a first biometric enrollment user interface that is part of a biometric enrollment process for enrolling one or more biometric features of a user, including: in accordance with a determination that a set of accessibility conditions are met, displaying a first selectable option that is selectable to indicate a user request to skip at least a portion of the biometric enrollment process; and in accordance with a determination that the set of accessibility conditions are not met, forgoing display of the first selectable option.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4 is a block diagram illustrating a hand tracking unit of a computer system that is configured to capture gesture inputs of the user in accordance with some embodiments.

FIG. 8 is a flow diagram of methods of displaying an enrollment progress user indicator, in accordance with various embodiments.

FIG. 9 is a flow diagram of methods of animating movement of user interface elements, in accordance with various embodiments.

FIG. 10 is a flow diagram of methods of changing the appearances of user interface elements, in accordance with various embodiments.

FIG. 11 is a flow diagram of methods of moving a user interface element over time, in accordance with various embodiments.

FIG. 13 is a flow diagram of methods of gaze tracking enrollment, in accordance with various embodiments.

FIG. 14 is a flow diagram of methods of providing feedback during gaze tracking enrollment, in accordance with various embodiments.

FIG. 16 is a flow diagram of methods of gaze tracking enrollment, in accordance with various embodiments.

FIG. 17 is a flow diagram of methods of providing feedback during gaze tracking enrollment, in accordance with various embodiments.

FIG. 19 is a flow diagram of methods of user enrollment, in accordance with various embodiments.

DESCRIPTION OF EMBODIMENTS

The present disclosure relates to user interfaces for providing an extended reality (XR) experience to a user, in accordance with some embodiments.

Figure 12A:
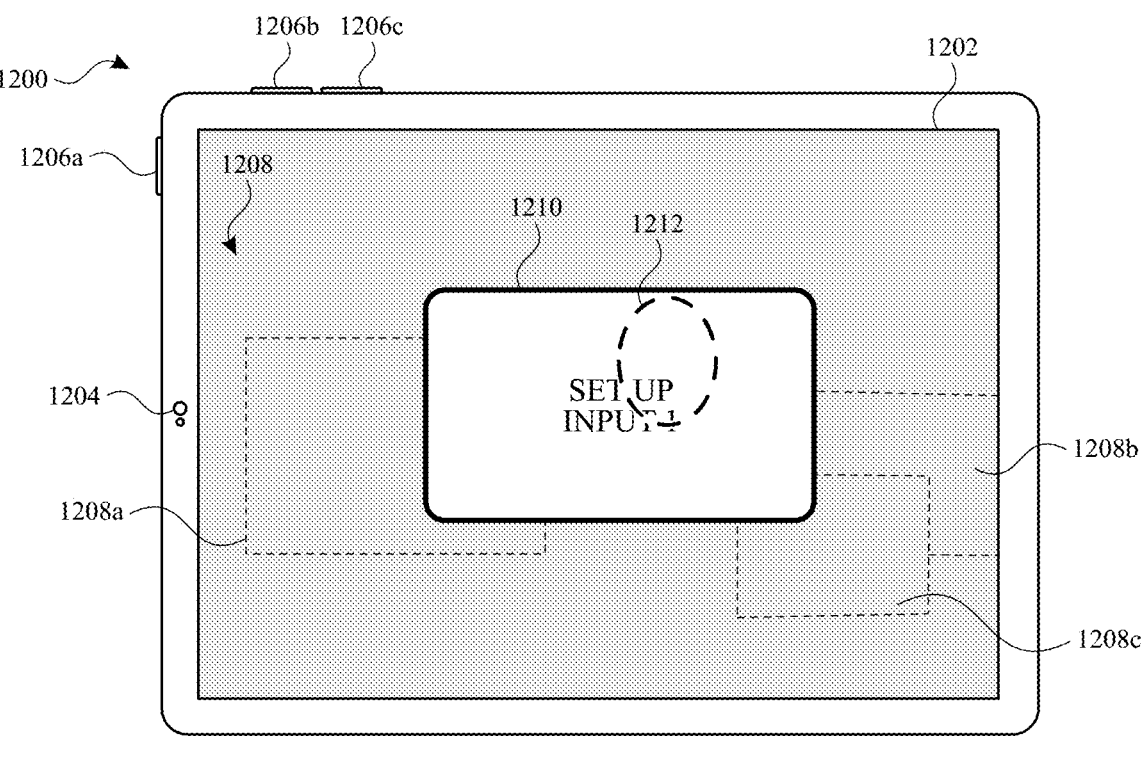
FIGS. 12A-12X illustrate example techniques for gaze tracking enrollment, in accordance with some embodiments.

FIGS. 1A-6 provide a description of example computer systems for providing XR experiences to users. FIGS. 7A-7Y illustrate example techniques for gaze tracking enrollment, in accordance with some embodiments. FIG. 8 is a flow diagram of methods of displaying an enrollment progress user indicator, in accordance with various embodiments. FIG. 9 is a flow diagram of methods of animating movement of user interface elements, in accordance with various embodiments. FIG. 10 is a flow diagram of methods of changing the appearances of user interface elements, in accordance with various embodiments. FIG. 11 is a flow diagram of methods of moving a user interface element over time, in accordance with various embodiments. The user interfaces in FIGS. 7A-7Y are used to illustrate the processes in FIGS. 8-11. FIGS. 12A-12X illustrate example techniques for gaze tracking enrollment, in accordance with some embodiments. FIG. 13 is a flow diagram of methods of gaze tracking enrollment, in accordance with various embodiments. FIG. 14 is a flow diagram of methods of providing feedback during gaze tracking enrollment, in accordance with various embodiments. The user interfaces in FIGS. 12A-12X are used to illustrate the processes in FIGS. 13-14. FIGS. 15A-15Y illustrate example techniques for gaze tracking enrollment in accordance with some embodiments. FIG. 16 is a flow diagram of methods of gaze tracking enrollment, in accordance with various embodiments. FIG. 17 is a flow diagram of methods of providing feedback during gaze tracking enrollment, in accordance with various embodiments. The user interfaces in FIGS. 15A-15Y are used to illustrate the processes in FIGS. 16-17. FIGS. 18A-18H illustrate example techniques for user enrollment in accordance with some embodiments. FIG. 19 is a flow diagram of methods of user enrollment, in accordance with various embodiments. The user interfaces in FIGS. 18A-18H are used to illustrate the processes in FIG. 19.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Figure 1A:
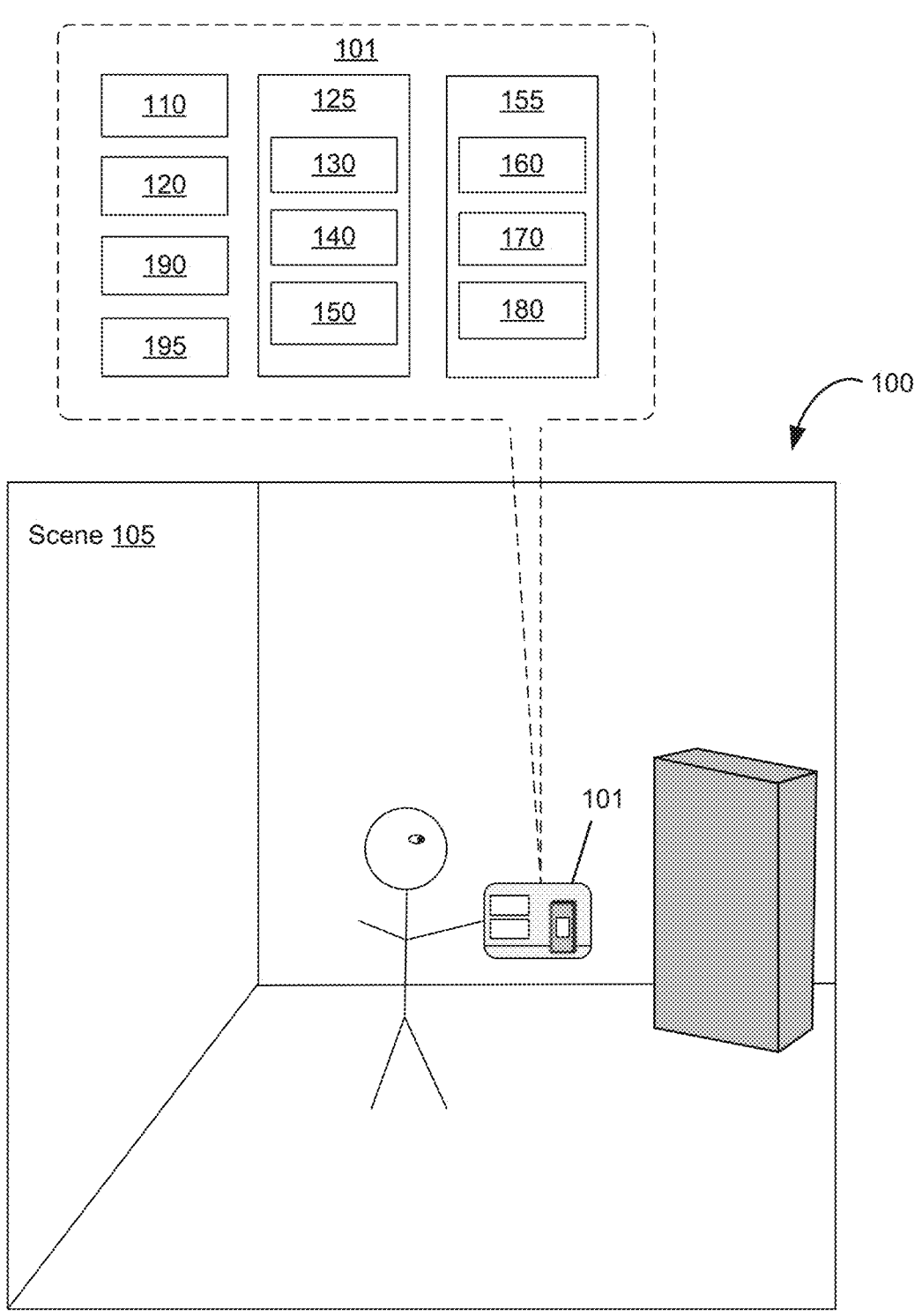
FIG. 1A is a block diagram illustrating an operating environment of a computer system for providing XR experiences in accordance with some embodiments.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof).

For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

In some embodiments, spatial media includes spatial visual media and/or spatial audio. In some embodiments, a spatial capture is a capture of spatial media. In some embodiments, spatial visual media (also referred to as stereoscopic media) (e.g., a spatial image and/or a spatial video) is media that includes two different images or sets of images, representing two perspectives of the same or overlapping fields-of-view, for concurrent display. A first image representing a first perspective is presented to a first eye of the viewer and a second image representing a second perspective, different from the first perspective, is concurrently presented to a second eye of the viewer. The first image and the second image have the same or overlapping fields-of-view. In some embodiments, a computer system displays the first image via a first display that is positioned for viewing by the first eye of the viewer and concurrently displays the second image via a second display, different from the first display, that is position for viewing by the second eye of the viewer. In some embodiments, the first image and the second image, when viewed together, create a depth effect and provide the viewer with depth perception for the contents of the images. In some embodiments, a first video representing a first perspective is presented to a first eye of the viewer and a second video representing a second perspective, different from the first perspective, is concurrently presented to a second eye of the viewer. The first video and the second video have the same or overlapping fields-of-view. In some embodiments, the first video and the second video, when viewed together, create a depth effect and provide the viewer with depth perception for the contents of the videos. In some embodiments, spatial audio experiences in headphones are produced by manipulating sounds in the headphone's two audio channels (e.g., left and right) so that they resemble directional sounds arriving in the ear-canal. For example, the headphones can reproduce a spatial audio signal that simulates a soundscape around the listener (also referred to as the user). An effective spatial sound reproduction can render sounds such that the listener perceives the sound as coming from a location within the soundscape external to the listener's head, just as the listener would experience the sound if encountered in the real world.

The geometry of the listener's ear, and in particular the outer ear (pinna), has a significant effect on the sound that arrives from a sound source to a listener's eardrum. The spatial audio sound experience is possible by taking into account the effect of the listener's pinna, the listener's head, and/or the listener's torso to the sound that enters to the listener's ear-canal. The geometry of the user's ear is optionally determined by using a three-dimensional scanning device that produces a three-dimensional model of at least a portion of the visible parts of the user's ear. This geometry is optionally used to produce a filter for producing the spatial audio experience. In some embodiments, spatial audio is audio that has been filtered such that a listener of the audio perceives the audio as coming from one or more directions and/or locations in three-dimensional space (e.g., from above, below, and/or in front of the listener).

An example of such a filter is a Head-Related Transfer Function (HRTF) filter. These filters are used to provide an effect that is similar to how a human ear, head, and torso filter sounds. When the geometry of the ears of a listener is known, a personalized filter (e.g., a personalized HRTF filter) can be produced so that the sound experienced by that listener through headphones (e.g., in-ear headphones, on-ear headphones, and/or over-ear headphones) is more realistic. In some embodiments, two filters are produced-one filter per ear-so that each ear of the listener has a corresponding personalized filter (e.g., personalized HRTF filter), as the ears of the listener may be of different geometry.

In some embodiments, a HRTF filter includes some (or all) acoustic information required to describe how sound reflects or diffracts around a listener's head before entering the listener's auditory system. In some embodiments, a personalized HRTF filter can be selected from a database of previously determined HRTFs for users having similar anatomical characteristics. In some embodiments, a personalized HRTF filter can be generated by numerical modeling based on the geometry of the listener's ear. One or more processors of the computer system optionally apply the personalized HRTF filter for the listener to an audio input signal to generate a spatial input signal for playback by headphones that are connected (e.g., wirelessly or by wire) to the computer system.

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may include speakers and/or other audio output devices integrated into the head-mounted system for providing audio output. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touchscreen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1B:
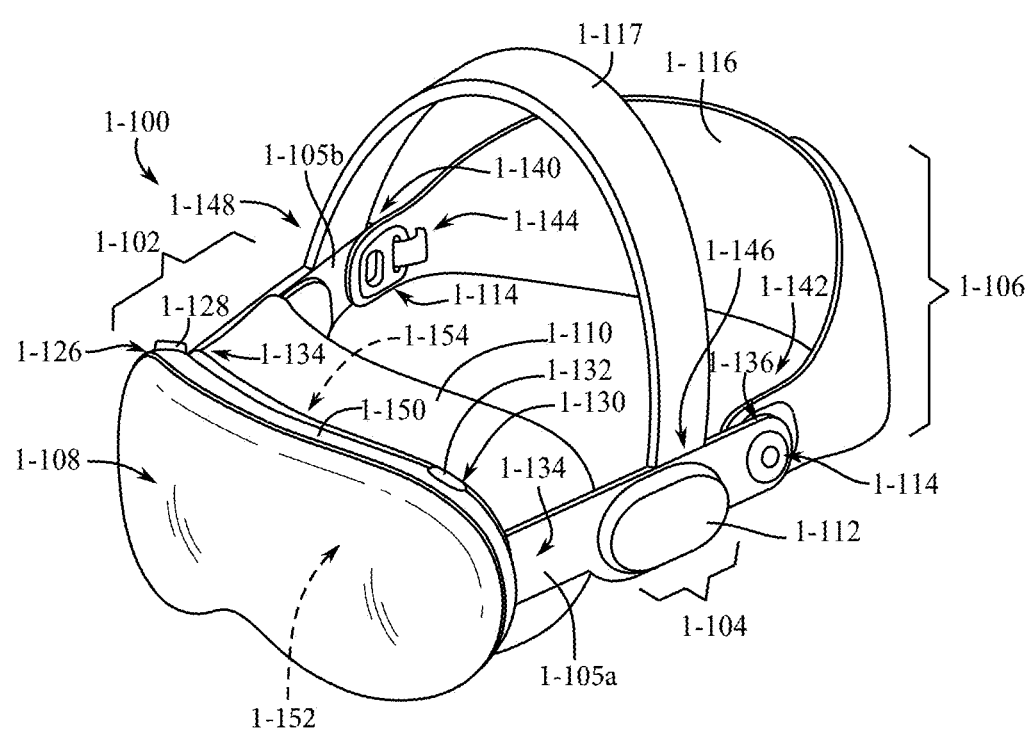
FIGS. 1B-1P are examples of a computer system for providing XR experiences in the operating environment of FIG. 1A.
Figure 1C:
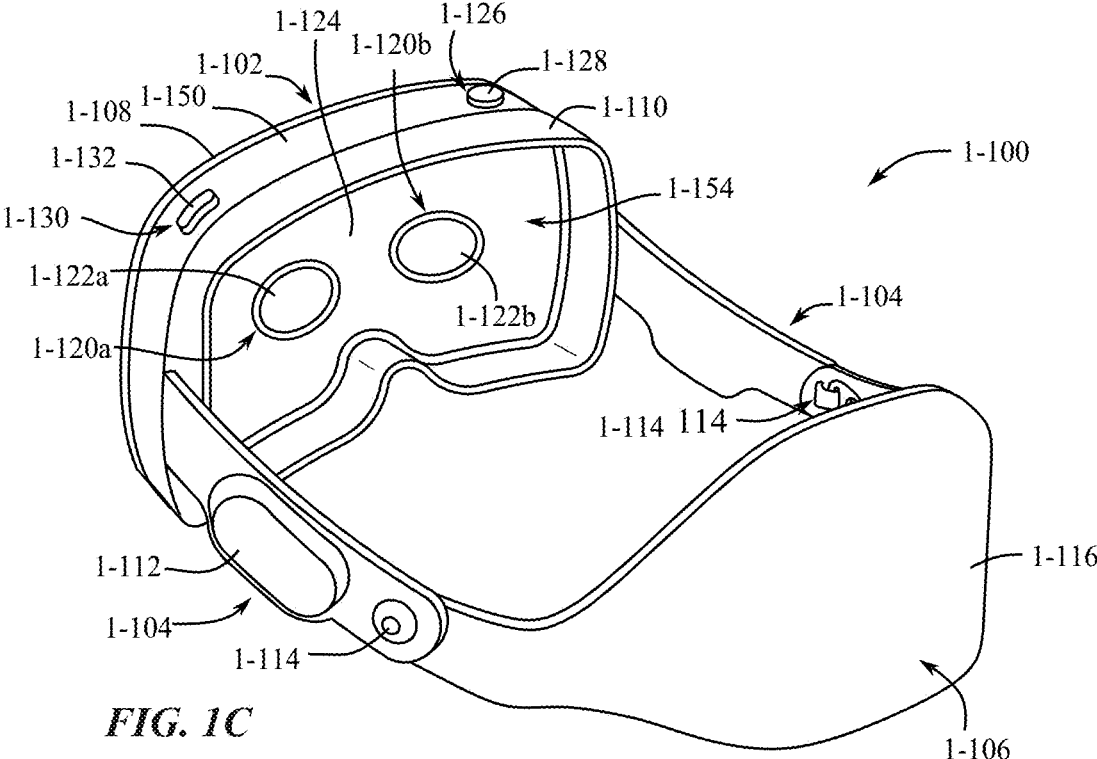
Figure 1D:
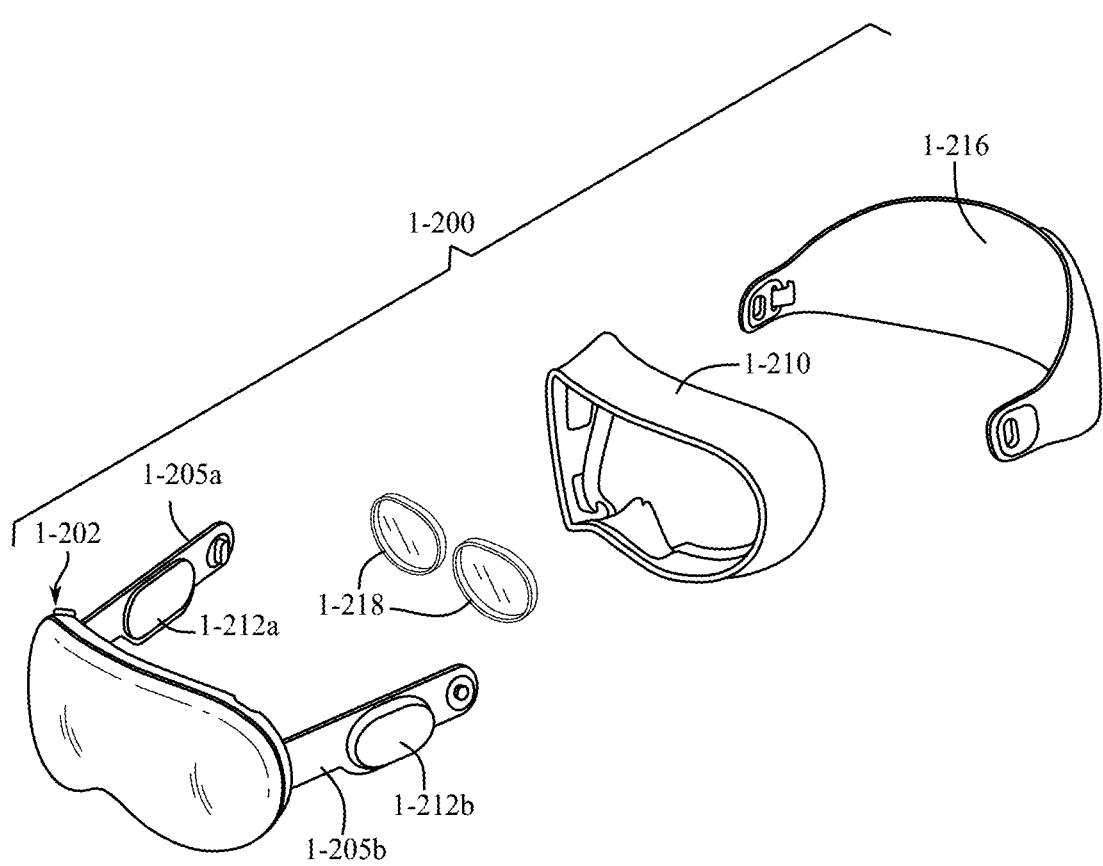
Figure 1E:
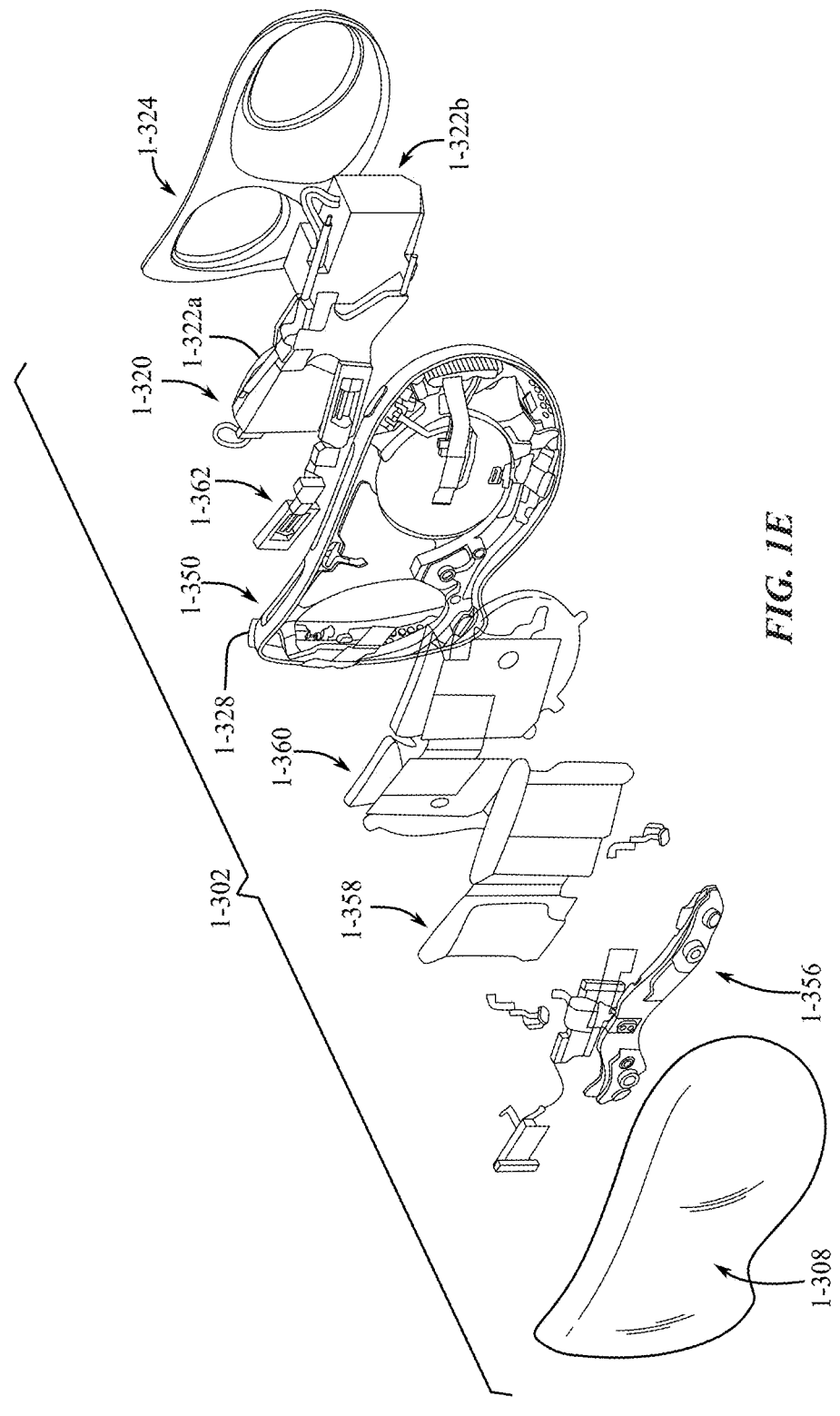
Figure 1F:
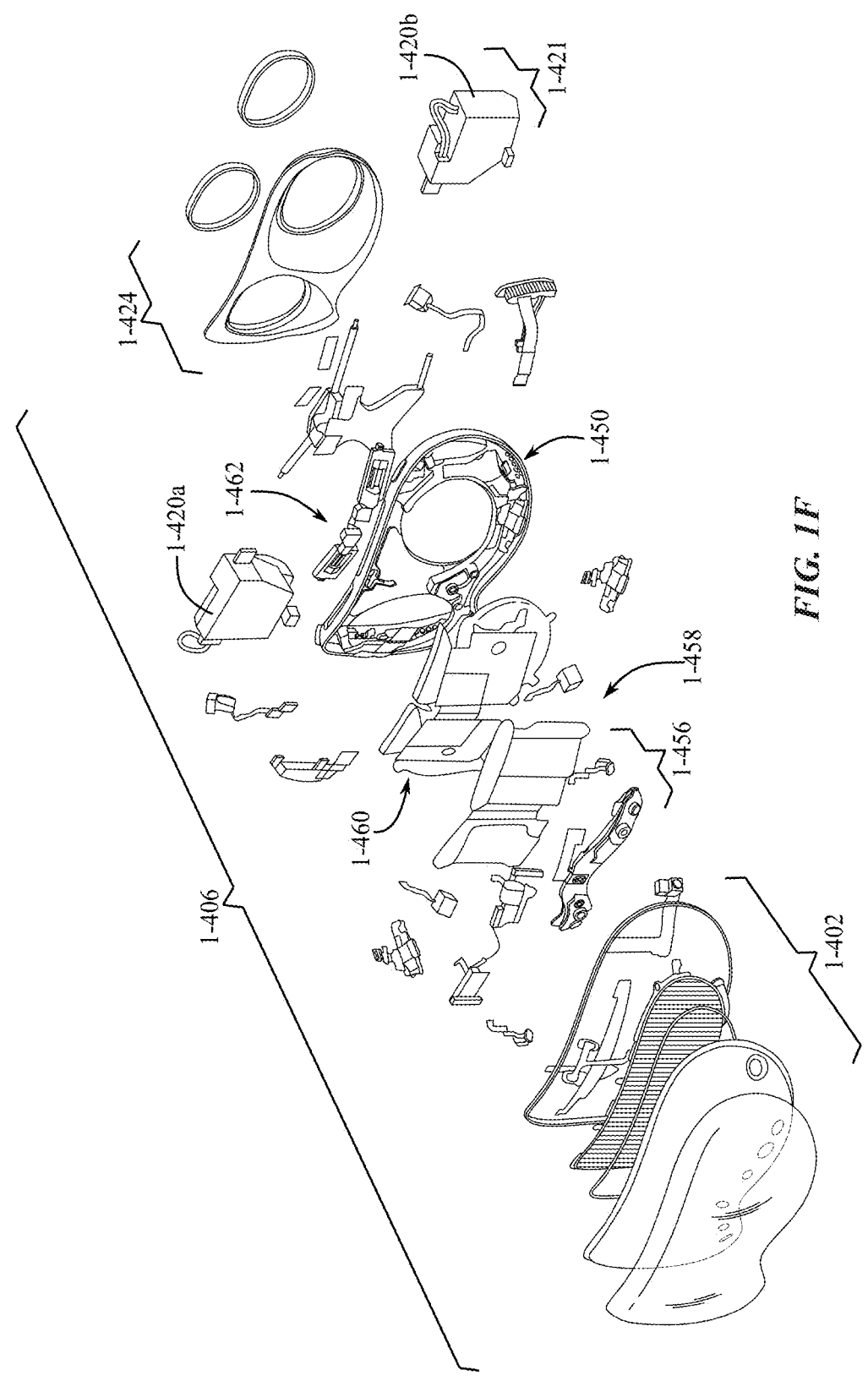
Figure 1G:
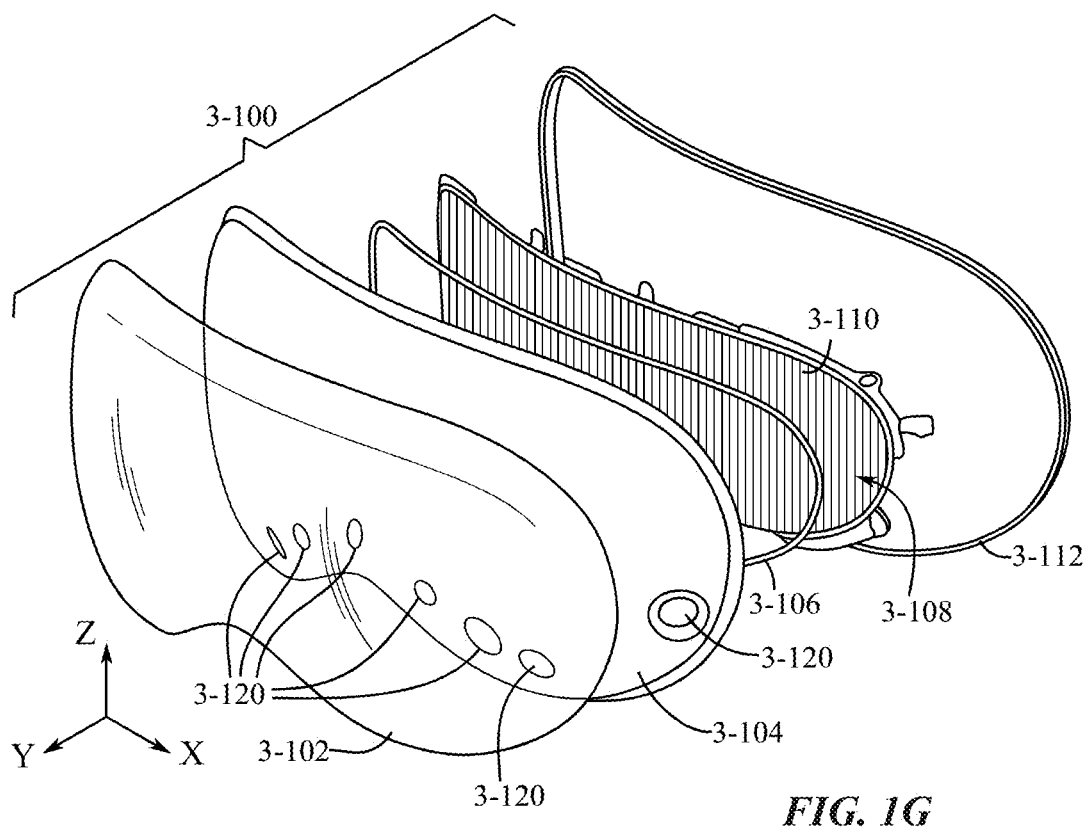
Figure 1H:
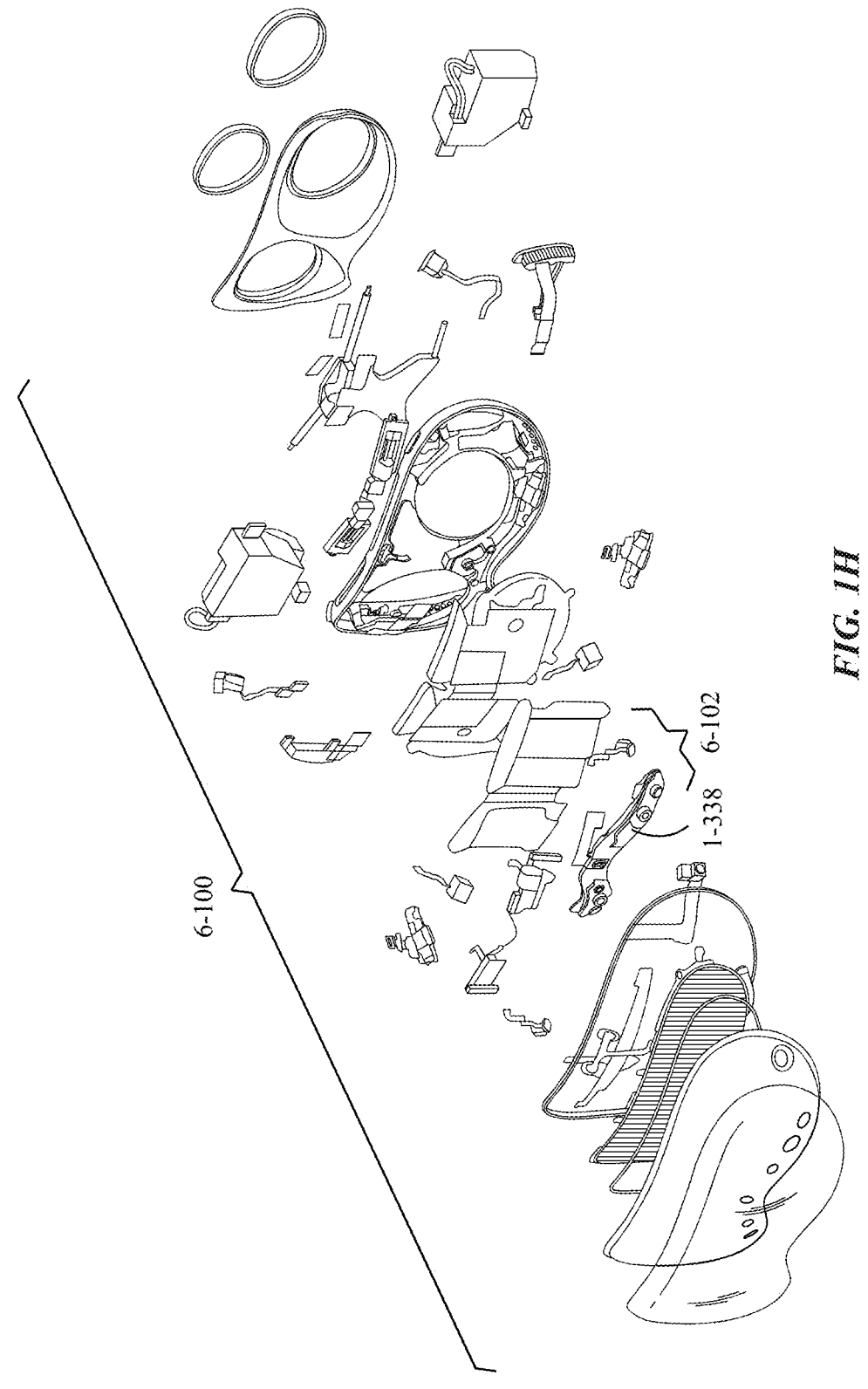
Figure 1I:
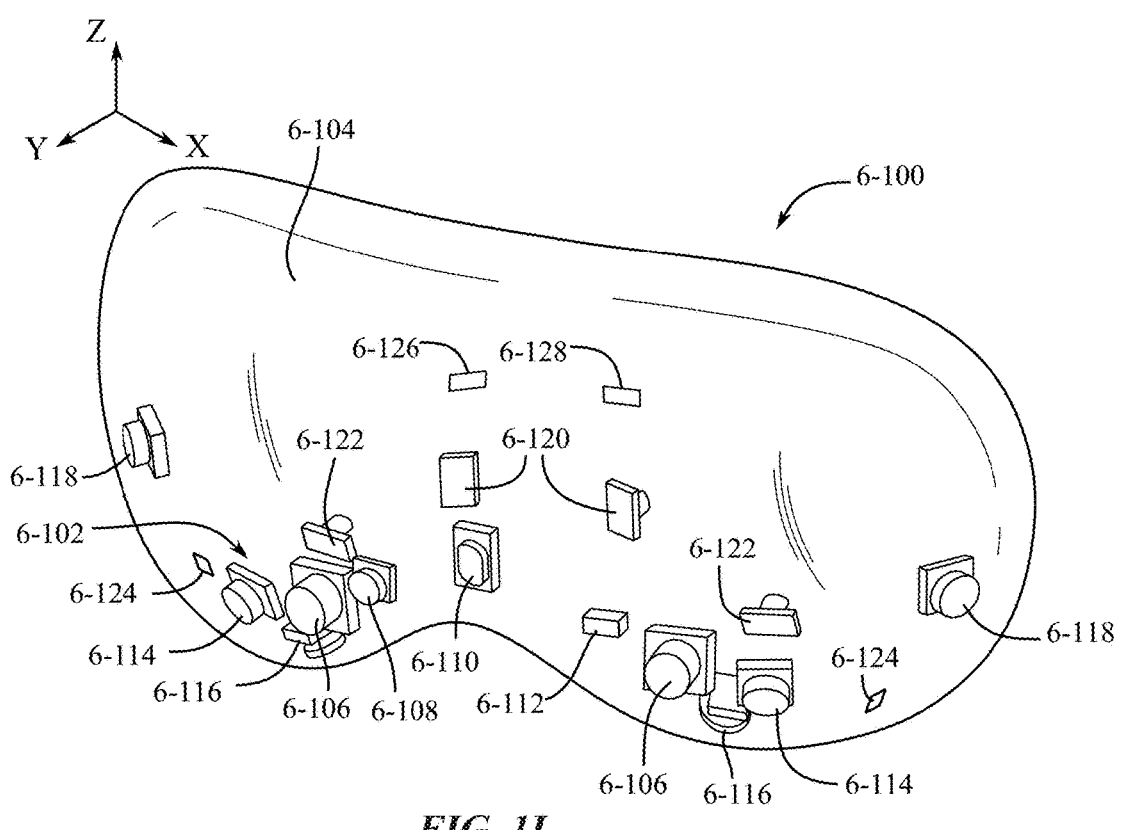
Figure 1J:
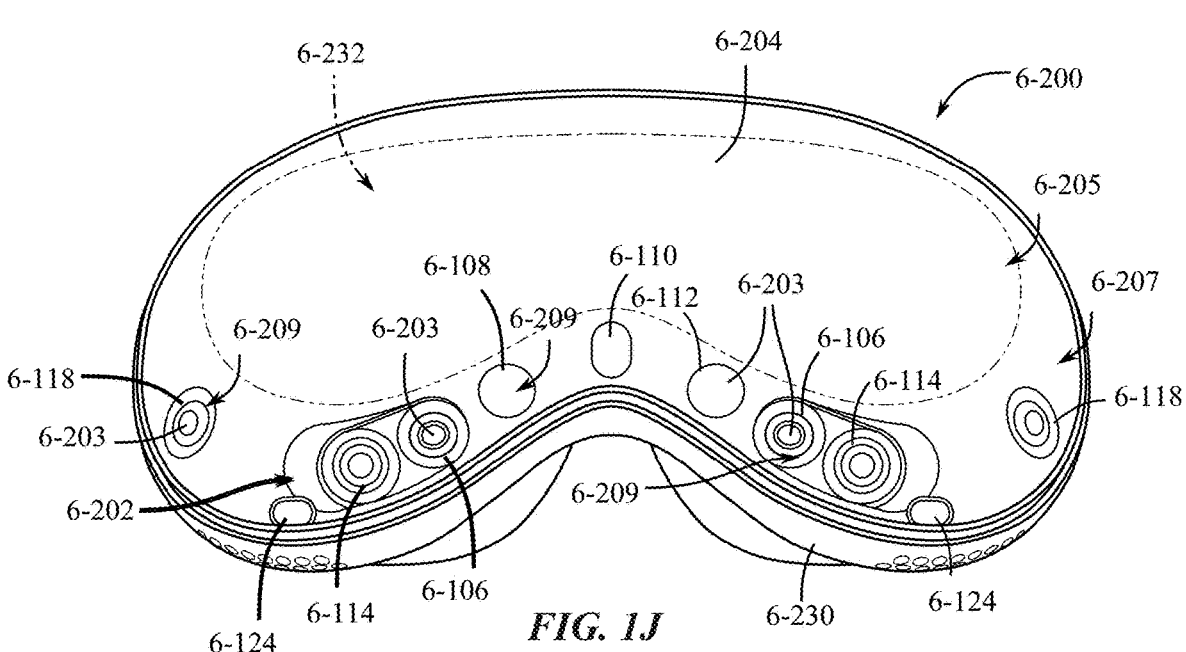
Figures 1K, 1L:
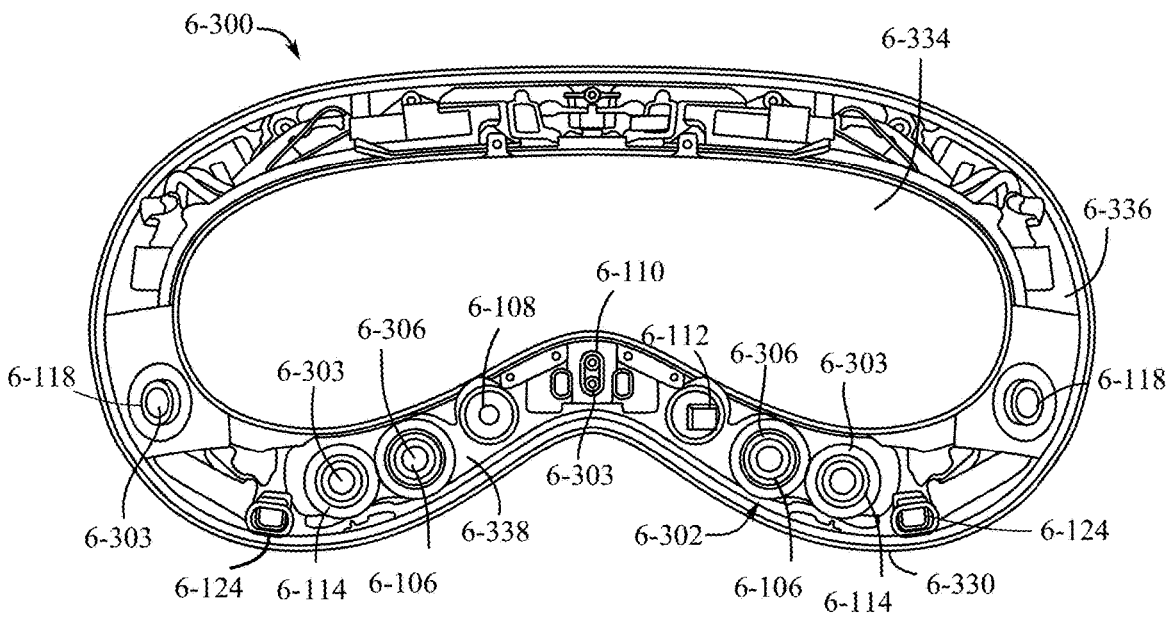
Figure 1M:
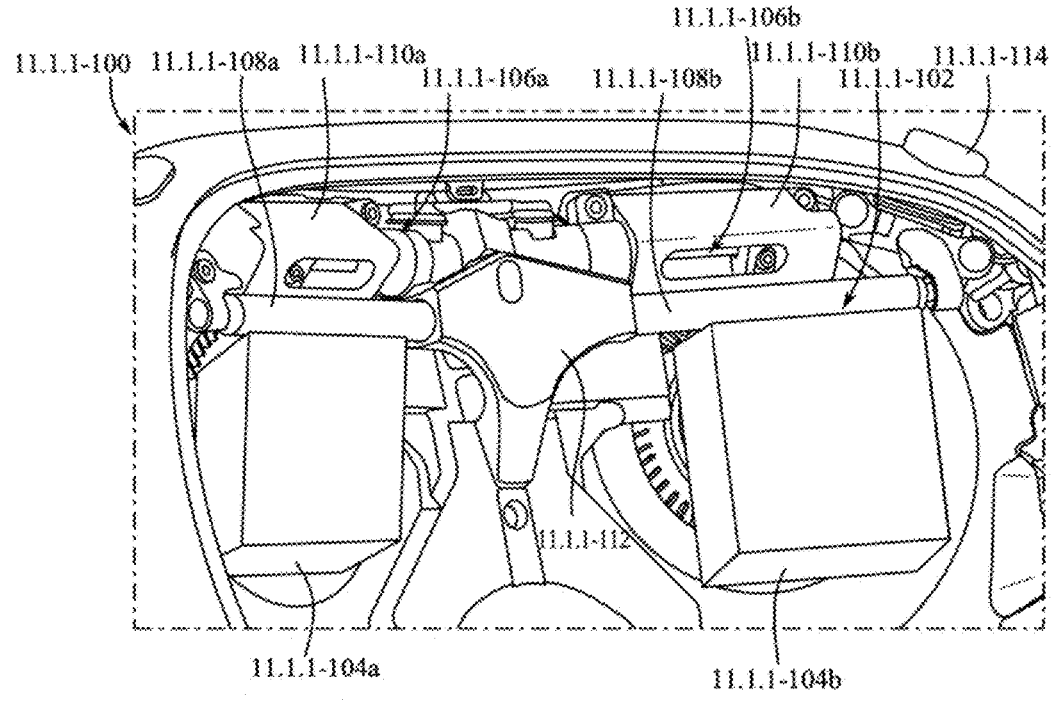
Figure 1N:
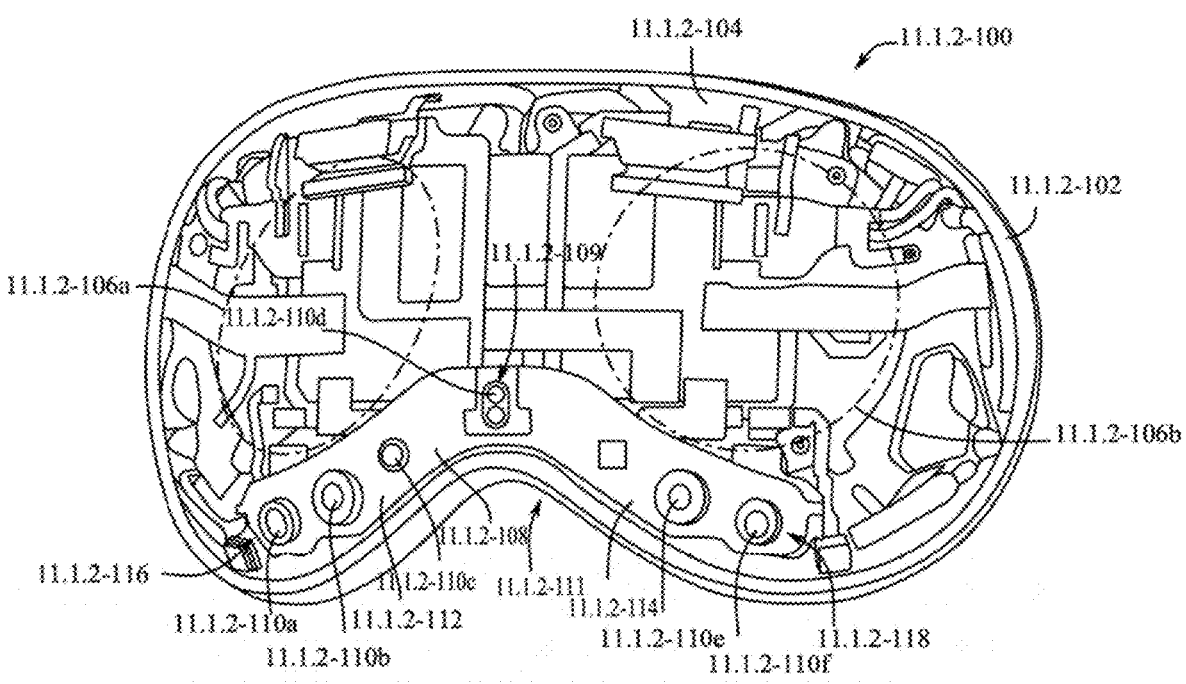
Figure 1O:
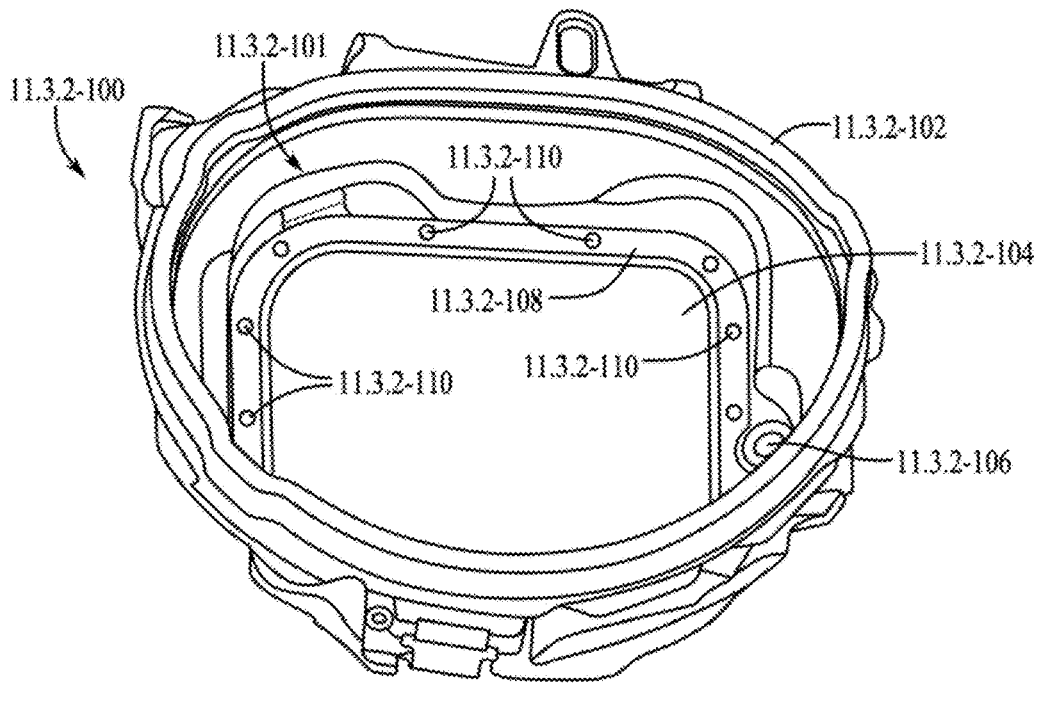
Figure 1P:
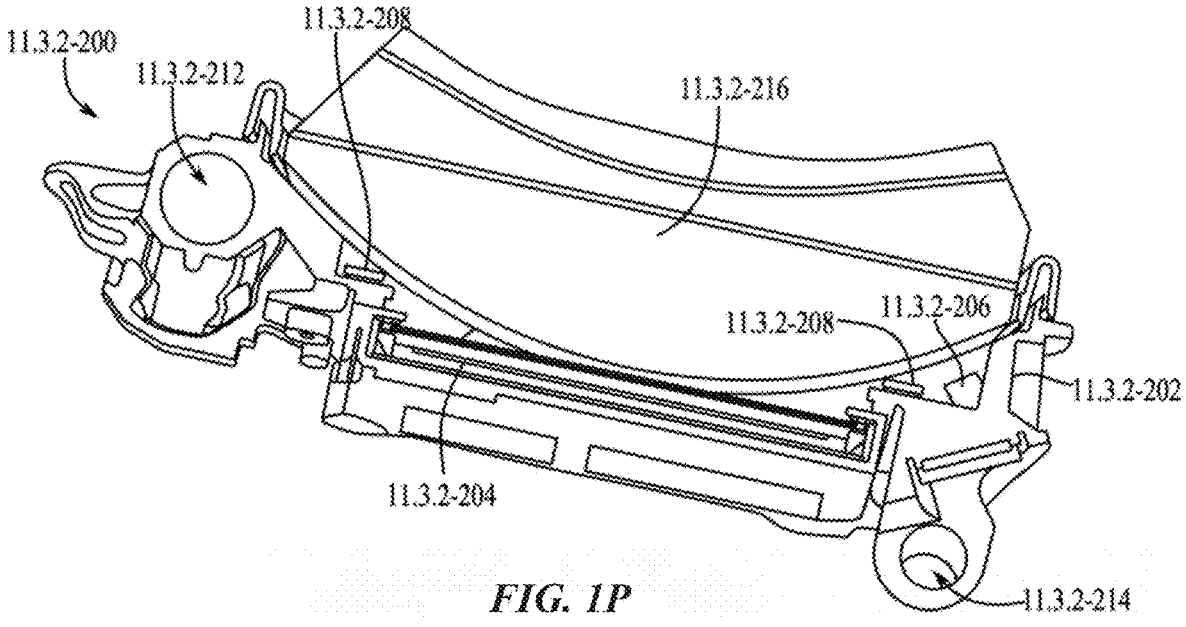

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120*a*, 1-120*b* and/or first and second optical modules 11.1.1-104*a* and 11.1.1-104*b*) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120*a*, 1-120*b* and/or first and second optical modules 11.1.1-104*a* and 11.1.1-104*b*), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120*a*, 1-120*b* and/or first and second optical modules 11.1.1-104*a* and 11.1.1-104*b*).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105a, 1-105b of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105a including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105b including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105a and the second electronic strap 1-105b. The straps 1-105a-b and band 1-116 can be coupled via connection mechanisms or assemblies 1-114. In at least one example, the second band 1-117 includes a first end 1-146 coupled to the first electronic strap 1-105a between the first proximal end 1-134 and the first distal end 1-136 and a second end 1-148 coupled to the second electronic strap 1-105b between the second proximal end 1-138 and the second distal end 1-140.

In at least one example, the first and second electronic straps 1-105a-b include plastic, metal, or other structural materials forming the shape the substantially rigid straps 1-105a-b. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105a-b can define internal strap volumes and include one or more electronic components disposed in the internal strap volumes. In one example, as shown in FIG. 1B, the first electronic strap 1-105a can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120a, 1-120b disposed at or in the rearward facing second opening 1-154 defined by the housing 1-150 and/or disposed in the internal volume of the housing 1-150 and configured to project light through the second opening 1-154. In at least one example, each display assembly 1-120a-b can include respective display screens 1-122a, 1-122b configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122a-b can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120a-b. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205*a*, 1-205*b*. The first securement strap 1-205*a* can include a first electronic component 1-212*a* and the second securement strap 1-205*b* can include a second electronic component 1-212*b*. In at least one example, the first and second straps 1-205*a-b* can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205*a-b* can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322*a*, 1-322*b* disposed between the frame 1-350 and the curtain assembly 1-324.

In at least one example, the display unit 1-306 can also include a motor assembly 1-362 configured as an adjustment mechanism for adjusting the positions of the display screens 1-322*a-b* of the display assembly 1-320 relative to the frame 1-350. In at least one example, the display assembly 1-320 is mechanically coupled to the motor assembly 1-362, with at least one motor for each display screen 1-322*a-b*, such that the motors can translate the display screens 1-322*a-b* to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322*a-b*.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420*a*, 1-420*b* of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the cheeks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. for hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124.

These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104*a-b* slidably engaging/coupled to respective guide-rods 11.1.1-108*a-b* and motors 11.1.1-110*a-b* of left and right adjustment subsystems 11.1.1-106*a-b*. The IPD adjustment system 11.1.1-102 can be coupled to a bracket 11.1.1-112 and include a button 11.1.1-114 in electrical communication with the motors 11.1.1-110*a-b*. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b*, respectively, to change position relative to one another.

In at least one example, the first and second optical modules 11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106*a*, 11.1.2-106*b*. The apertures 11.1.2-106*a-b* are shown in dotted lines in FIG. 1N because a view of the apertures 11.1.2-106a-b can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106a-b.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106a-b such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110a-f. Each sensor of the plurality of sensors 11.1.2-110a-f can include various types of sensors, including cameras, IR sensors, and so forth. In some examples, one or more of the sensors 11.1.2-110a-f can be used for object recognition in three-dimensional space such that it is important to maintain a precise relative position of two or more of the plurality of sensors 11.1.2-110a-f. The cantilevered nature of the mounting bracket 11.1.2-108 can protect the sensors 11.1.2-110a-f from damage and altered positioning in the case of accidental drops by the user. Because the sensors 11.1.2-110a-f are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110a-f coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an AMD, including HDM devices described herein. As shown in one or more other examples described herein, the optical module 11.3.2-100 can be one of two optical modules within an AMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
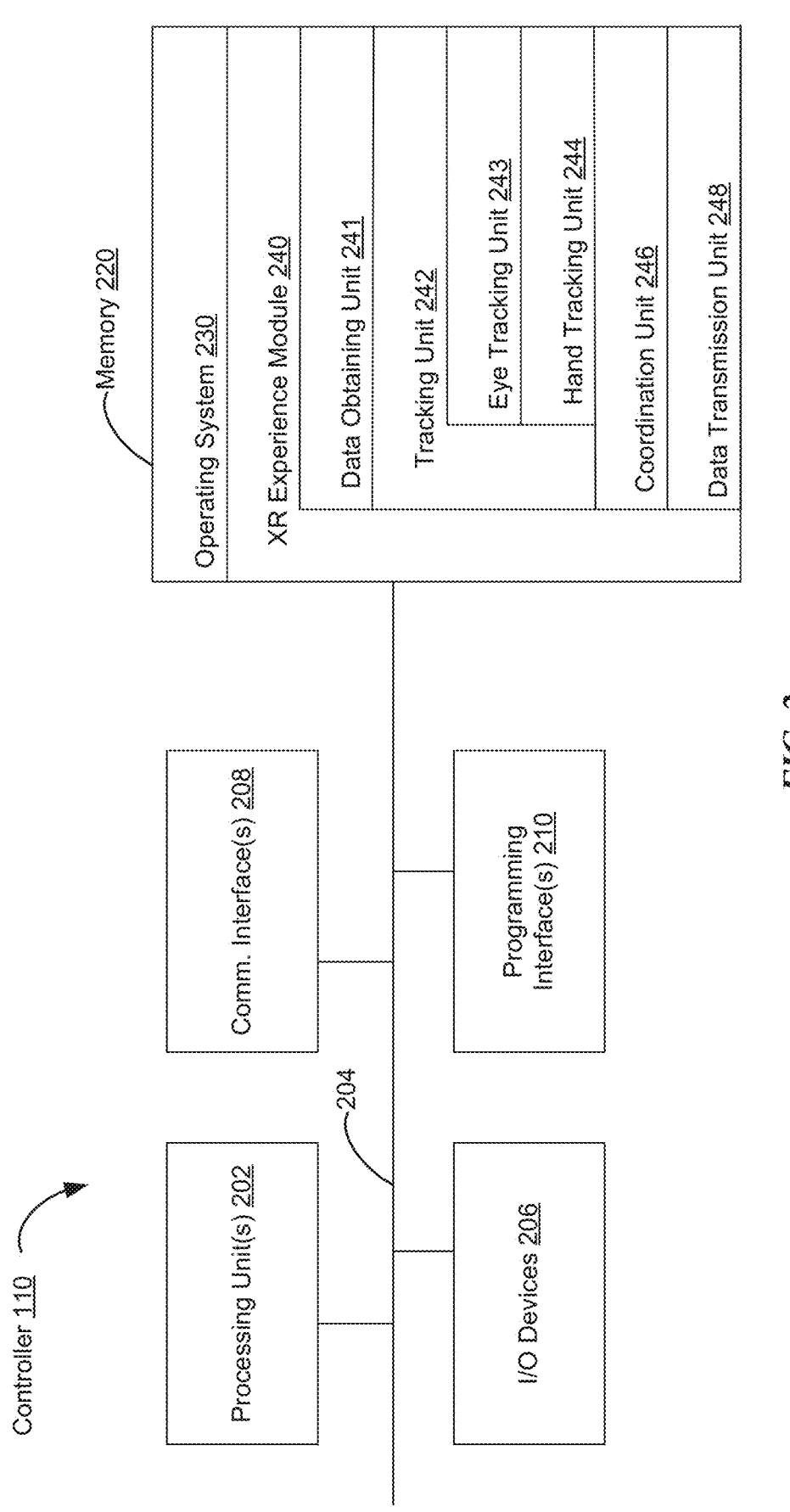
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLU-ETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
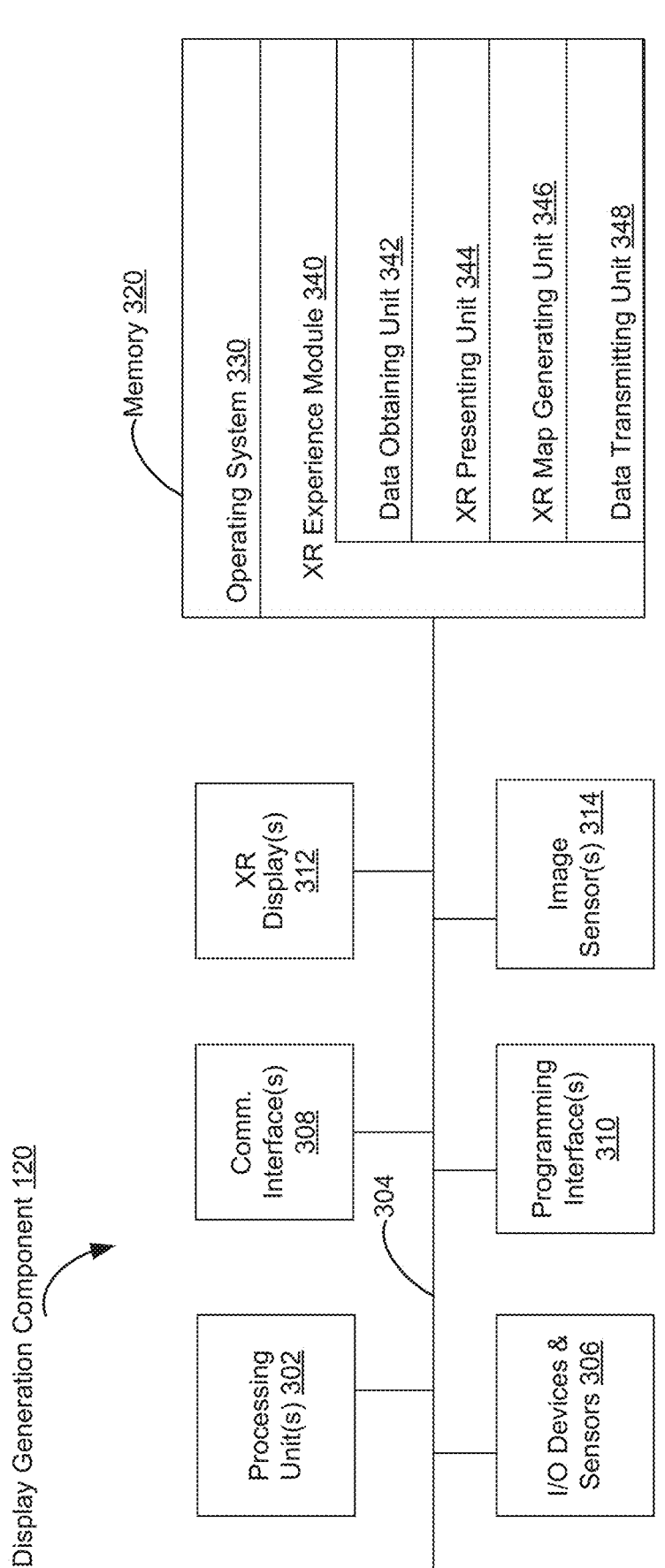
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (TR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand). In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) (or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture (e.g., an air drag gesture or an air swipe gesture) includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand). In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of move-ment away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requir-ing other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configura-tion of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodi-ments, the ready state is used to determine whether inter-active elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag (e.g., an air drag gesture or an air swipe gesture) could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
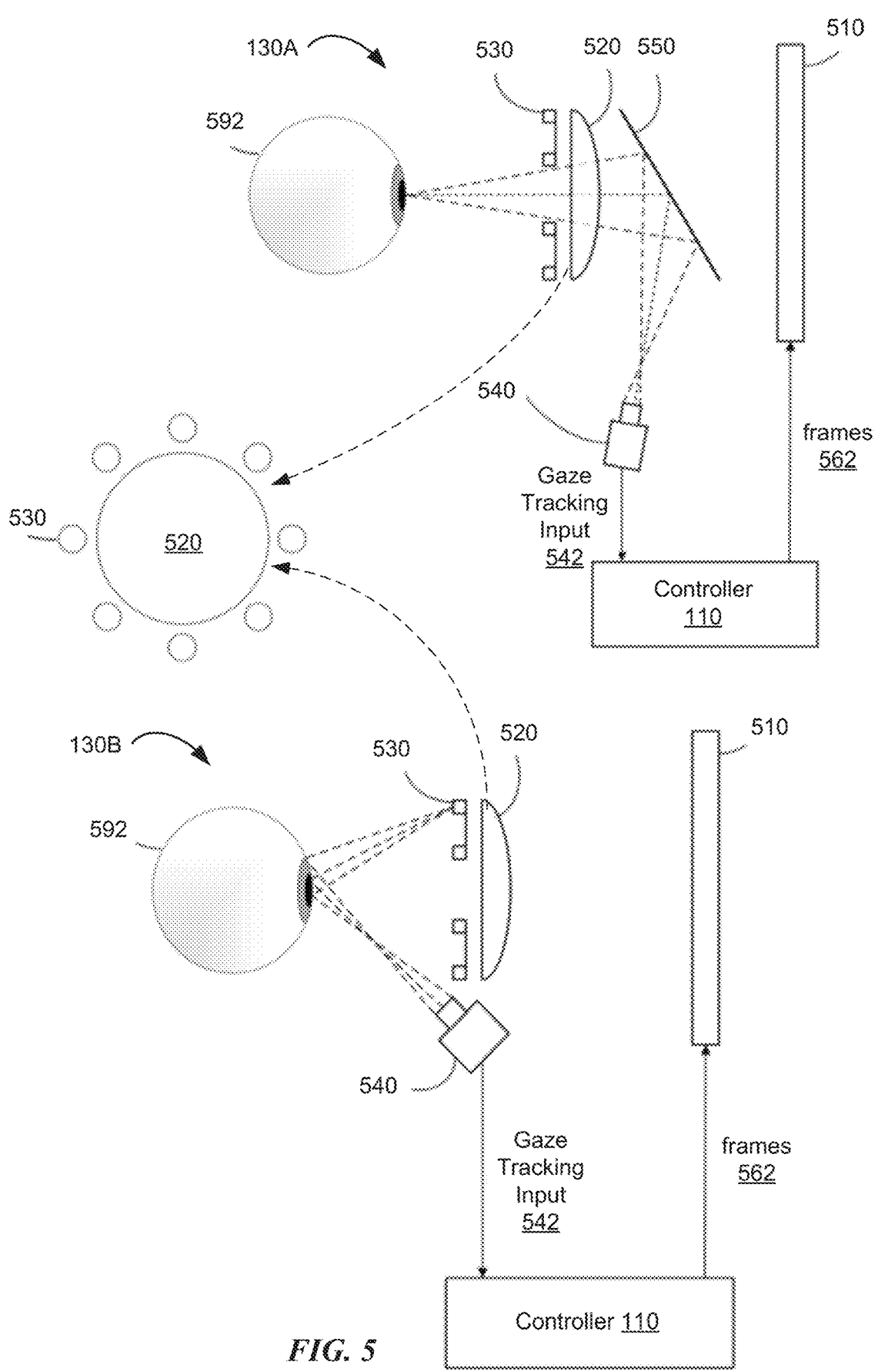
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs)), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
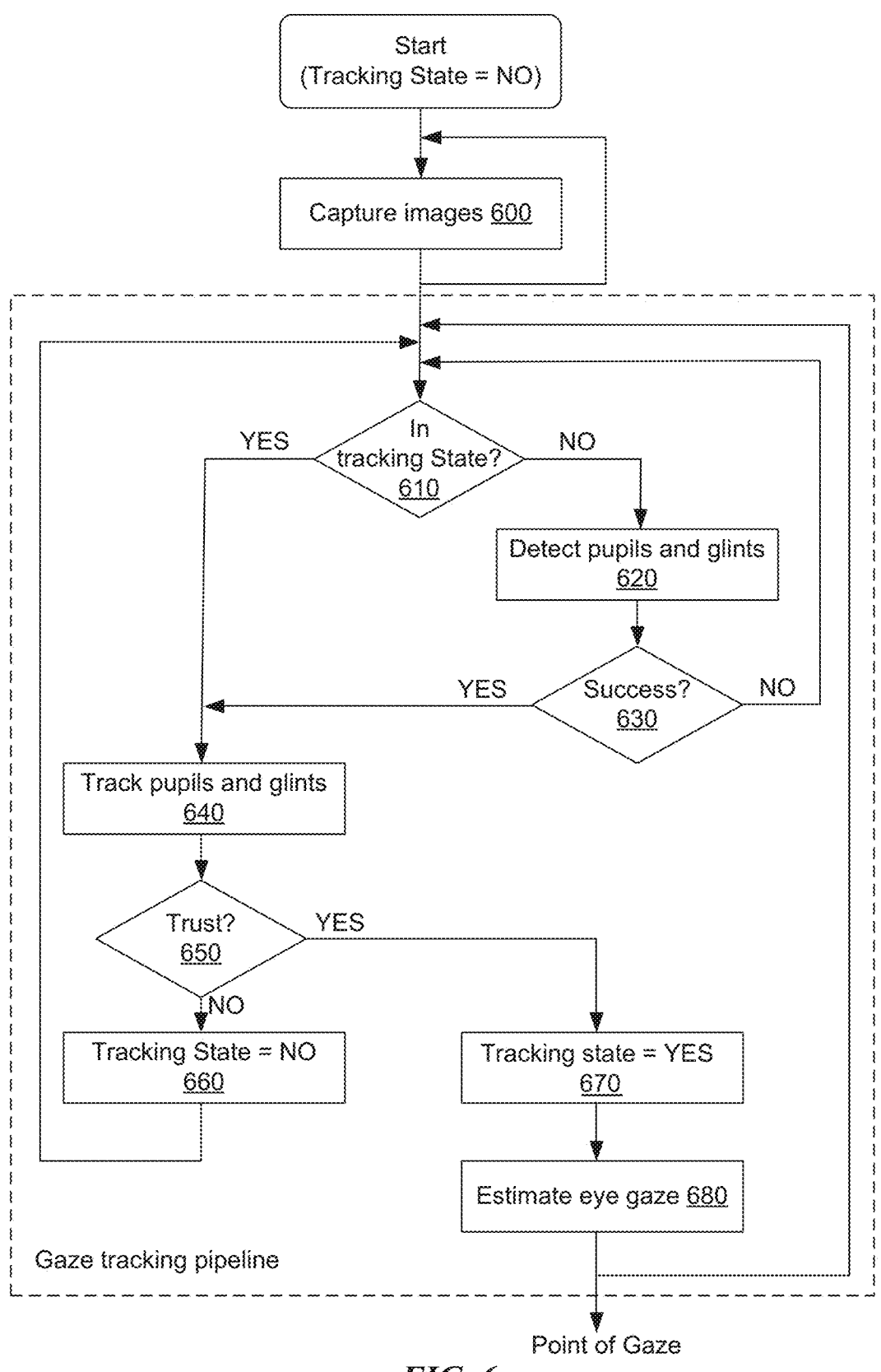
FIG. 6 is a flow diagram illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with a display generation component and one or more input devices.

FIGS. 7A-7Y illustrate example techniques for gaze tracking enrollment, in accordance with some embodiments. FIG. 8 is a flow diagram of methods of displaying an enrollment progress user indicator, in accordance with various embodiments. FIG. 9 is a flow diagram of methods of animating movement of user interface elements, in accordance with various embodiments. FIG. 10 is a flow diagram of methods of changing the appearances of user interface elements, in accordance with various embodiments. FIG. 11 is a flow diagram of methods of moving a user interface element over time, in accordance with various embodiments.

The user interfaces in FIGS. 7A-7Y are used to illustrate the processes below, including the processes in FIGS. 8-11.

FIG. 7A illustrates computer system 700 with display 702. As illustrated in FIG. 7A, prior to stating the process for enrolling the gaze of the user, computer system 700 displays indication 704 of a company, such as the manufacturer of computer system 700 and/or the manufacturer of the software (e.g., application and/or operating system) of computer system 700. In some embodiments, computer system 700 is configured to present virtual objects on one or more transparent or translucent displays (e.g., 702), so that a person, using the system, perceives virtual objects superimposed over the physical environment. In some embodiments, computer system 700 is configured to use pass-through video, meaning one or more camera or image sensors capture images of the physical environment, and uses those images in presenting the AR environment on the opaque display.

Although FIGS. 7A-7Y illustrate techniques using computer system 700 that is a tablet, the techniques are optionally also applicable using a head-mounted device. In some embodiments where computer system 700 is a head-mounted device, computer system 700 optionally includes two displays (one for each eye of the user of computer system 700), with each display displaying respective various content, to enable the user to perceive the various depths of the various content. For a head-mounted device multiple displays are optionally used to present slightly different images to different eyes of the user to create a stereoscopic depth effect. Additionally for a head-mounted device, different sensors or sets of sensors might be used to track different eyes of the user to more accurately determine a location of gaze corresponding to the eyes. Accurate gaze tracking is particularly important for a head-mounted device, where gaze is often used to indicate a location in the three-dimensional environment to which attention is being directed and is optionally used to determine what element of the three-dimensional environment an input is directed to (e.g., via a hardware input, an air gesture, and/or a gaze input). For devices that use gaze tracking (such as tablets, phones, desktop computers, and head-mounted devices) improved gaze enrollment leads to improved gaze tracking by the device which makes inputs more precise and reduces the need for repeated attempts to perform an operation, thereby reducing power usage and increasing battery life (for battery powered devices).

In some embodiments, indication 704 of the company is displayed as an initial screen after (and/or in response to) computer system 700 starting up. After some time (e.g., 1 second, 2 seconds, or 5 seconds), computer system 700 automatically transitions to displaying three-dimensional environment 712, as illustrated in FIG. 7B1.

At FIG. 7B1, three-dimensional environment 712 is part of an extended reality environment. In some embodiments, three-dimensional environment 712 is a virtual reality environment and couch 712A is a virtual object displayed as part of the extended reality environment. In some embodiments, three-dimensional environment 712 is an augmented reality environment and couch 712A is a representation of a physical object in the physical environment. In some embodiments where three-dimensional environment 712 is part of an augmented reality environment, couch 712A (and other physical objects from the physical environment) is presented to the user of computer system 700 using pass-through video (e.g., couch 712A is presented by capturing video of the couch via one or more cameras and displaying the video (e.g., in real time) on display 702). In some embodiments where three-dimensional environment 712 is part of an augmented reality environment, couch 712A (and other physical objects from the physical environment) is presented to the user of computer system 700 using one or more transparent or translucent displays (e.g., couch 712A is presented to the user by enabling the user to see through display 702 to see couch 712A). Three-dimensional environment 712 also includes display of target 714, which is a virtual object displayed as part of three-dimensional environment 712. In some embodiments, target 714 is a three-dimensional virtual object (e.g., a sphere and/or a cylinder). Target 714 optionally includes a light source that simulates light emanating from target 714 into objects (e.g., virtual objects and/or physical objects) of three-dimensional environment 712.

While computer system 700 displays target 714, computer system 700 detects gaze 750A of the user of computer system 700. Gaze indications (such as gaze 750A) indicate where the gaze of the user is directed and are illustrated for a better understanding of the technique. In some embodiments, the indication of the location of the user's gaze is not displayed as part of the user interface of computer system 700. In some embodiments, the indication of the location of the user's gaze is displayed. In response to detecting gaze 750A and in accordance with a determination that gaze 750A has been directed to target 714 for a threshold amount of time, computer system 700 initiates an animation of target 714, as further described below. In some embodiments, the threshold amount of time is zero and any gaze at target 714 initiates the animation. In some embodiments, the threshold amount of time is non-zero and the gaze directed at target 714 must be sustained for the duration of the threshold amount of time to initiate the animation.

In some embodiments, the techniques and user interface(s) described in FIGS. 7A-7Y are provided by one or more of the devices described in FIGS. 1A-1P. For example, FIG. 7B2 illustrates an embodiment in which target 714 (e.g., as described in FIG. 7B1) is displayed on display module X702 of head-mounted device (HMD) X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

At FIG. 7B2, three-dimensional environment 712 is part of an extended reality environment. In some embodiments, three-dimensional environment 712 is a virtual reality environment and couch 712A is a virtual object displayed as part of the extended reality environment. In some embodiments, three-dimensional environment 712 is an augmented reality environment and couch 712A is a representation of a physical object in the physical environment. In some embodiments where three-dimensional environment 712 is part of an augmented reality environment, couch 712A (and other physical objects from the physical environment) is presented to the user of HMD X700 using pass-through video (e.g., couch 712A is presented by capturing video of the couch via one or more cameras and displaying the video (e.g., in real time) on display X702). In some embodiments where three-dimensional environment 712 is part of an augmented reality environment, couch 712A (and other physical objects from the physical environment) is presented to the user of HMD X700 using one or more transparent or translucent displays (e.g., couch 712A is presented to the user by enabling the user to see through display X702 to see couch 712A).

Three-dimensional environment 712 also includes display of target 714, which is a virtual object displayed as part of three-dimensional environment 712. In some embodiments, target 714 is a three-dimensional virtual object (e.g., a sphere and/or a cylinder). Target 714 optionally includes a light source that simulates light emanating from target 714 into objects (e.g., virtual objects and/or physical objects) of three-dimensional environment 712.

While HMD X700 displays target 714, HMD X700 detects gaze X750A of the user of HMD X700. Gaze indications (such as gaze X750A) indicate where the gaze of the user is directed and are illustrated for a better understanding of the technique. In some embodiments, the indication of the location of the user's gaze is not displayed as part of the user interface of HMD X700. In some embodiments, the indication of the location of the user's gaze is displayed. In response to detecting gaze X750A and in accordance with a determination that gaze X750A has been directed to target 714 for a threshold amount of time, HMD X700 initiates an animation of target 714, as further described below. In some embodiments, the threshold amount of time is zero and any gaze at target 714 initiates the animation. In some embodiments, the threshold amount of time is non-zero and the gaze directed at target 714 must be sustained for the duration of the threshold amount of time to initiate the animation.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122a-b, first and second rear-facing display screens 1-322a, 1-322b, display 11.3.2-104, first and second display assemblies 1-120a, 1-120b, display assembly 1-320, display assembly 1-421, first and second display sub-assemblies 1-420a, 1-420b, display assembly 3-108, display assembly 11.3.2-204, first and second optical modules 11.1.1-104a and 11.1.1-104b, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110a-f, either alone or in any combination. In some embodiments, HMD X700 includes one or more input devices, which include any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

Figure 7C:
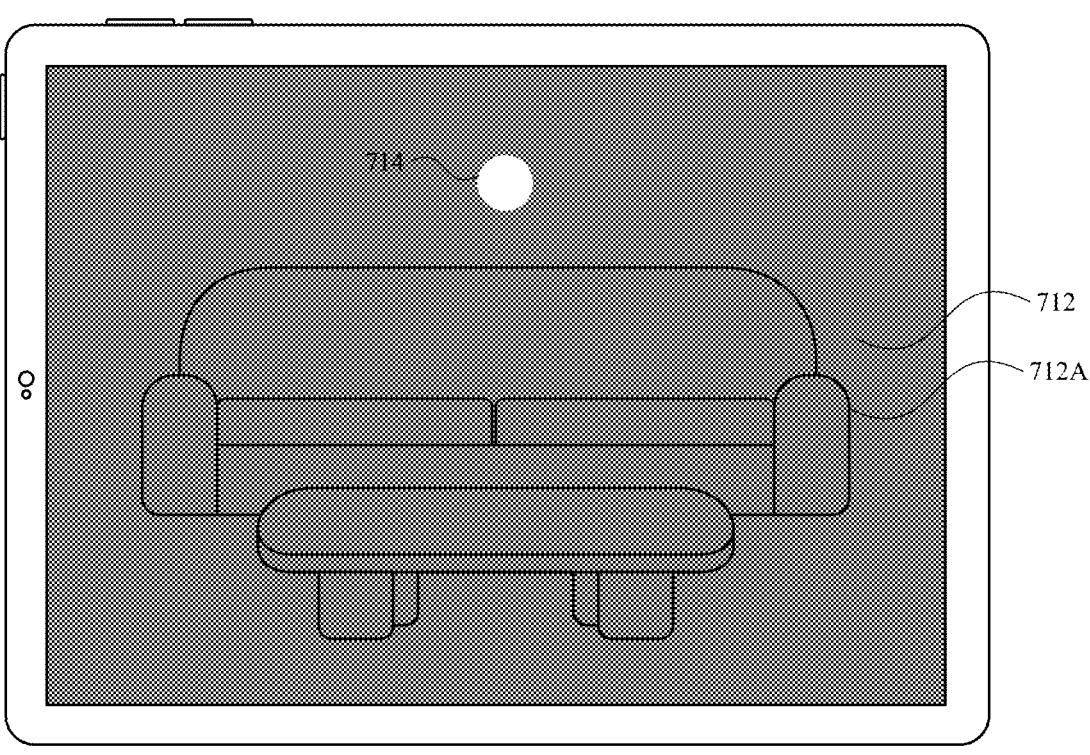
FIGS. 7A-7Y illustrate example techniques for gaze tracking enrollment, in accordance with some embodiments.

At FIG. 7C, computer system 700 has initiated the animation of target 714 and, as a result, target 714 shrinks down, as shown in FIG. 7C. After shrinking down, target 714 is replaced with (e.g., expands into and/or morphs into)

an enrollment element to start the gaze enrollment process (e.g., to calibrate the detection of the gaze of the user and/or to train the user how to use their gaze to interact with elements of the three-dimensional environment). In some embodiments, target 714 shrinks down, then expands into the enrollment element. In some embodiments, the enrollment element indicates an amount of progress made towards enrolling the user's gaze and, optionally, the visual appearance of the enrollment element changes based on computer system 700 detecting changes in the user's gaze.

In some embodiments, in addition to (or in place of) detecting a location of the user's gaze, computer system 700 detects pupil dilation information (e.g., an amount of dilation or constriction and/or a pupil size) about the user. For example, computer system 700 may gradually (or abruptly) increase and/or decrease the overall brightness of content presented to the user via display 702 to cause pupil dilation and/or constriction of the user. For example, computer system 700 may darken and/or brighten the appearance of the physical environment via display 702 before, during, and/or during the gaze enrollment process to cause pupil dilation and/or constriction and detect/collect corresponding pupil dilation information. For example, computer system 700 optionally collects pupil dilation information at FIG. 7A, when the environment presented to the user is dark, and again throughout the gaze enrollment process as the brightness (e.g., overall brightness) of the content presented to the user changes (brightens and/or darkens).

Figure 7D:
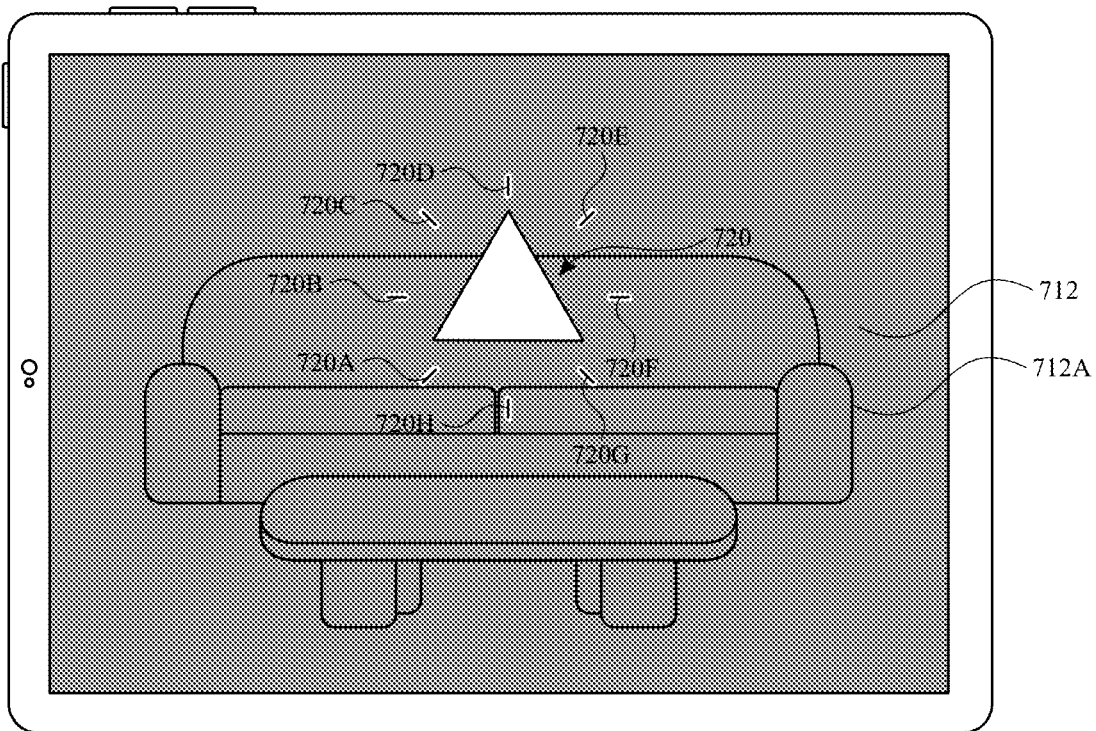

In some embodiments, target 714 is viewpoint-locked. In some embodiments, target 714 is environment-locked. As discussed, target 714 is replaced with an enrollment element (e.g., the enrollment element is displayed at the same location as target 714). In some embodiments, the enrollment element is environment-locked. In some embodiments, as illustrated in FIG. 7D, target 714 is replaced with enrollment element 720, which includes a plurality of portions 720A-720H. In some embodiments, as illustrated in FIG. 7H, target 714 is replaced with enrollment element 730, which includes a plurality of portions, including portions 730A-730E. In some embodiments, as illustrated in FIG. 7L, target 714 is replaced with enrollment element 740, which includes a plurality of portions, including portions 740A-740E. In some embodiments, as illustrated in FIG. 7Q, target 714 is replaced with enrollment element 760, which includes a plurality of portions, including portions 760A-760E. In some embodiments, as illustrated in FIG. 7V, target 714 is replaced with enrollment element 770.

At FIG. 7D, enrollment element 720 is displayed as part of three-dimensional environment 712. Enrollment element 720 is optionally three-dimensional. Enrollment element 720 includes central portion 7201 and a plurality of portions 720A-720H that at least partially surround central portion 7201. When initially displayed, portions 720A-720H have the same appearance (e.g., same length, same color, same size, and/or same shape).

Figure 7E:
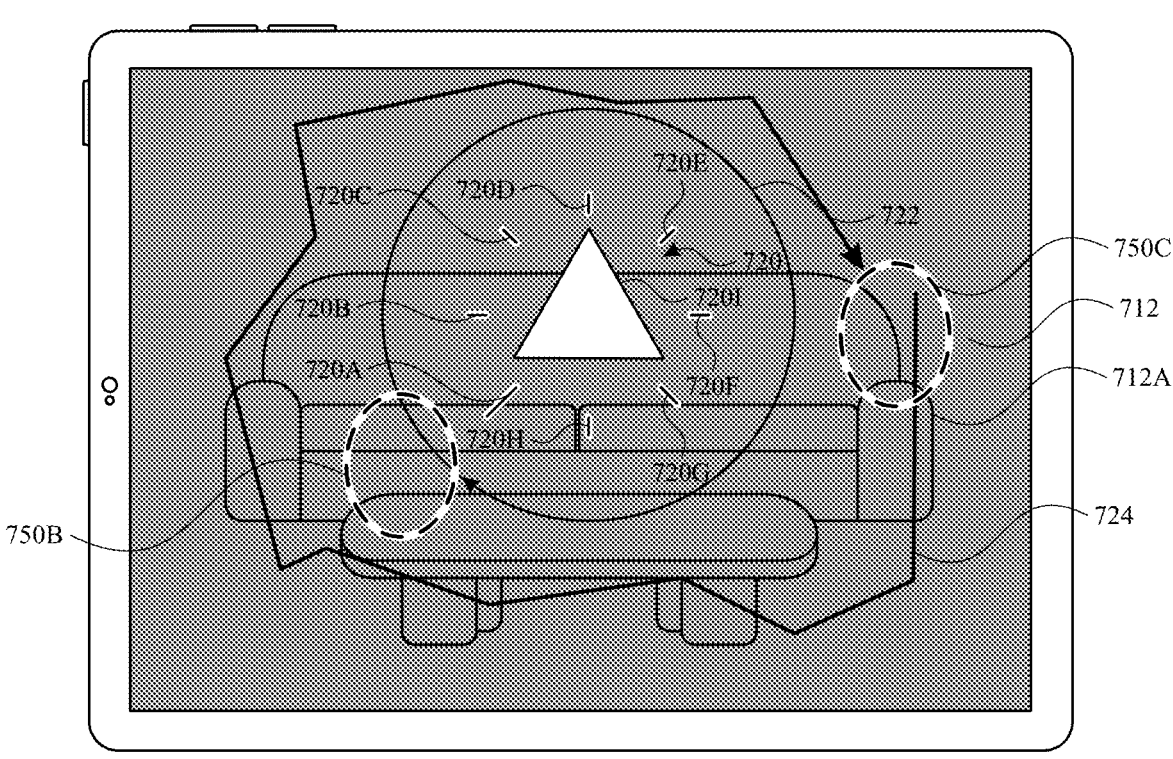

At FIG. 7E, as computer system 700 begins to detect the user gazing around three-dimensional environment 712, computer system 700 changes the appearance of respective portions 720A-720H based on the location of the user's gaze. FIG. 7E illustrates two alternative gaze paths 722 (corresponding to gaze 750B) and 724 (corresponding to gaze 750C) within three-dimensional environment 712. Both gaze paths 722 and 724 are valid paths (with different starting/ending locations) and enable computer system 700 to detect gaze information during the gaze enrollment process. Gaze paths indicate the path that the user's gaze takes and are illustrated for a better understanding of the technique. In some embodiments, gaze paths are not displayed as part of the user interface of computer system 700.

Figure 7F:
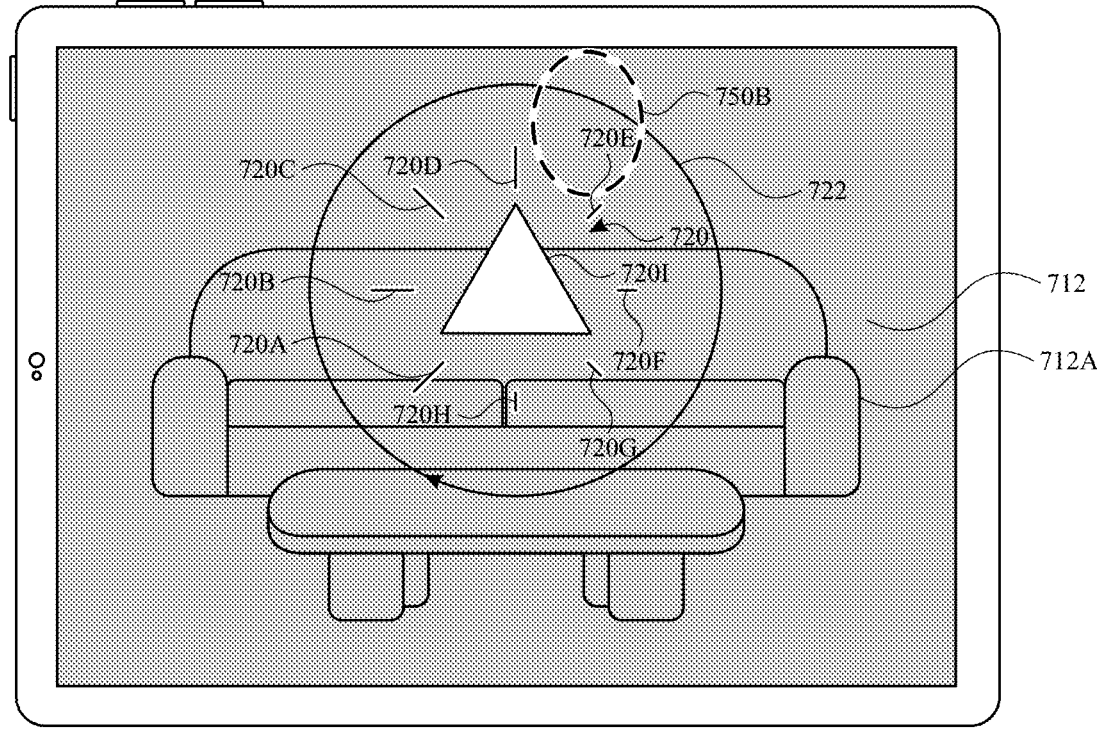
Figure 7G:
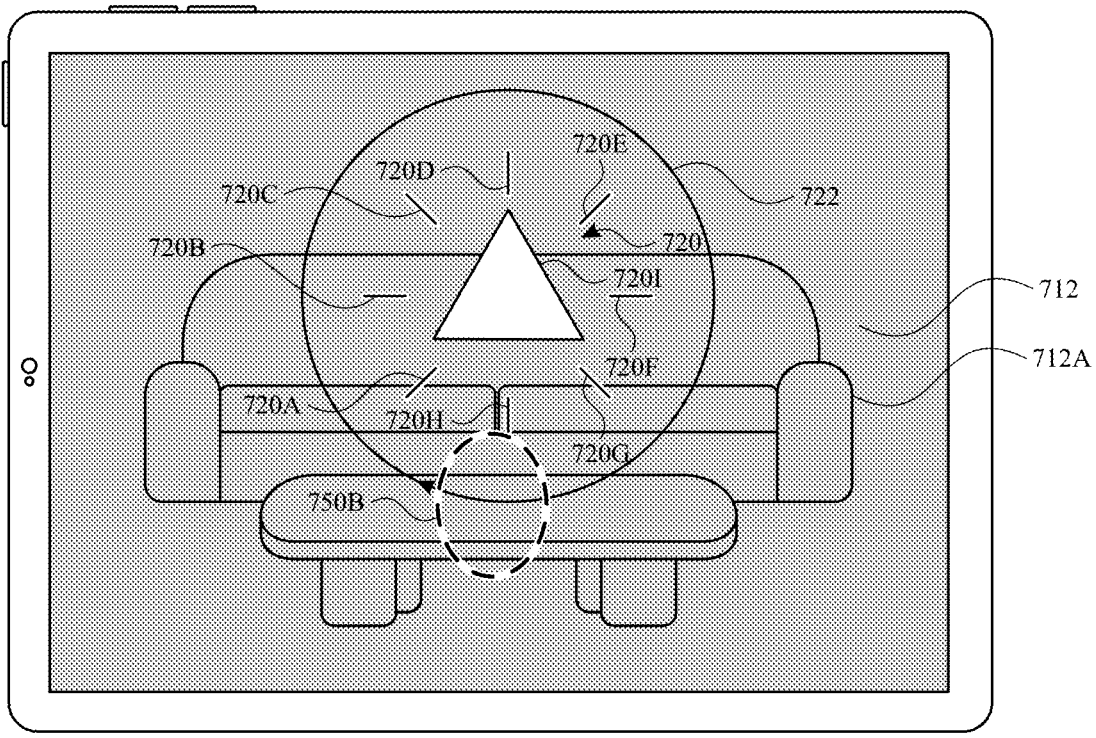
Figure 7H:
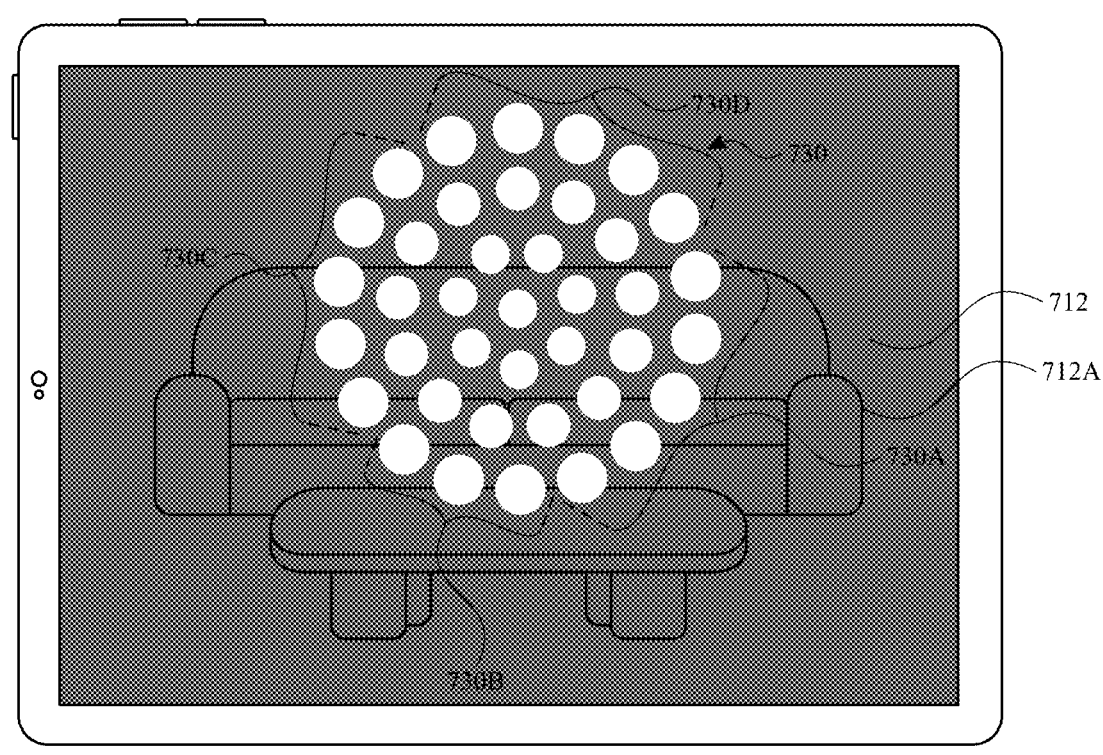

In some embodiments, respective portions 720A-720H grow in length to indicate that computer system 700 has detected the user gazing at a location that corresponds to the respective portion. For example, at FIG. 7E, gaze 750B starts below and to the left of enrollment element 720. Based on the location of gaze 750B at FIG. 7E, computer system 700 changes the appearance of portion 720A to indicate that the user's gaze has been detected gazing at a location that corresponds to portion 720A. At FIG. 7F, as computer system 700 continues to detect gaze 750B move along gaze path 722, computer system 700 sequentially changes the appearances of portions 720B-720D to indicate that the user's gaze has been detected at locations corresponding to those portions. At FIG. 7G, computer system 700 has detected gaze 750B having moved along gaze path 722 completely (or near-completely) around central portion 720I of enrollment element 720 and, as a result, the appearance of all portions 720A-720H have changed to be longer in length (as compared to FIG. 7D) to indicate that computer system 700 has detected the user gazing at locations that correspond to those respective portions. Because computer system 700 has detected the user gazing at locations corresponding to all of portions 720A-720H, this portion of the gaze enrollment is complete and computer system 700 proceeds to replacing enrollment element 720 with (e.g., shrinking into and/or morphing into) target 714, as illustrated in FIG. 7Y.

In some embodiments, computer system 700 changes the brightness of three-dimensional environment 712 during the process of FIGS. 7A-7G, including during the gaze enrollment process. In some embodiments, computer system 700 collects gaze information and/or pupil dilation information throughout the described process (including with the varied brightness) so as to enroll the user's gaze such that the user can more accurately target elements (physical elements and/or virtual elements) in three-dimensional environments (such as three-dimensional environment 712).

Returning to FIG. 7H, enrollment element 730 is displayed as part of three-dimensional environment 712. Enrollment element 730 is optionally three-dimensional (e.g., a sphere and/or a cylinder). Enrollment element 730 includes a plurality of portions (e.g., circles and/or spheres that make up enrollment element 730), which in this example have been grouped into portions 730A-730D. When initially displayed, portions 730A-730D have the same appearance (e.g., same color and/or same shape).

Figure 7I:
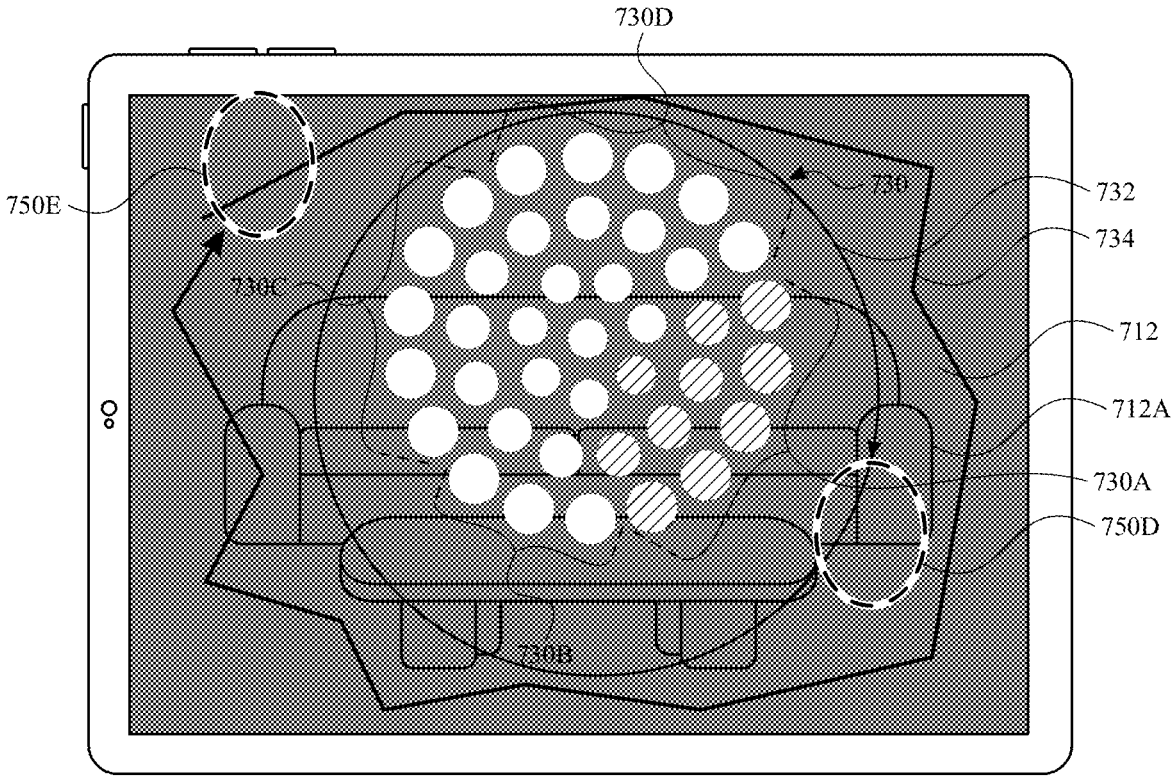

At FIG. 7I, as computer system 700 begins to detect the user gazing around three-dimensional environment 712, computer system 700 changes the appearance of respective portions 730A-730D based on the location of the user's gaze. FIG. 7I illustrates two alternative gaze paths 732 (corresponding to gaze 750D) and 734 (corresponding to gaze 750E) within three-dimensional environment 712. Both gaze paths 732 and 734 are valid paths (with different starting/ending locations) and enable computer system 700 to detect gaze information during the gaze enrollment process. Gaze paths indicate the path that the user's gaze takes and are illustrated for a better understanding of the technique. In some embodiments, gaze paths are not displayed as part of the user interface of computer system 700.

Figure 7J:
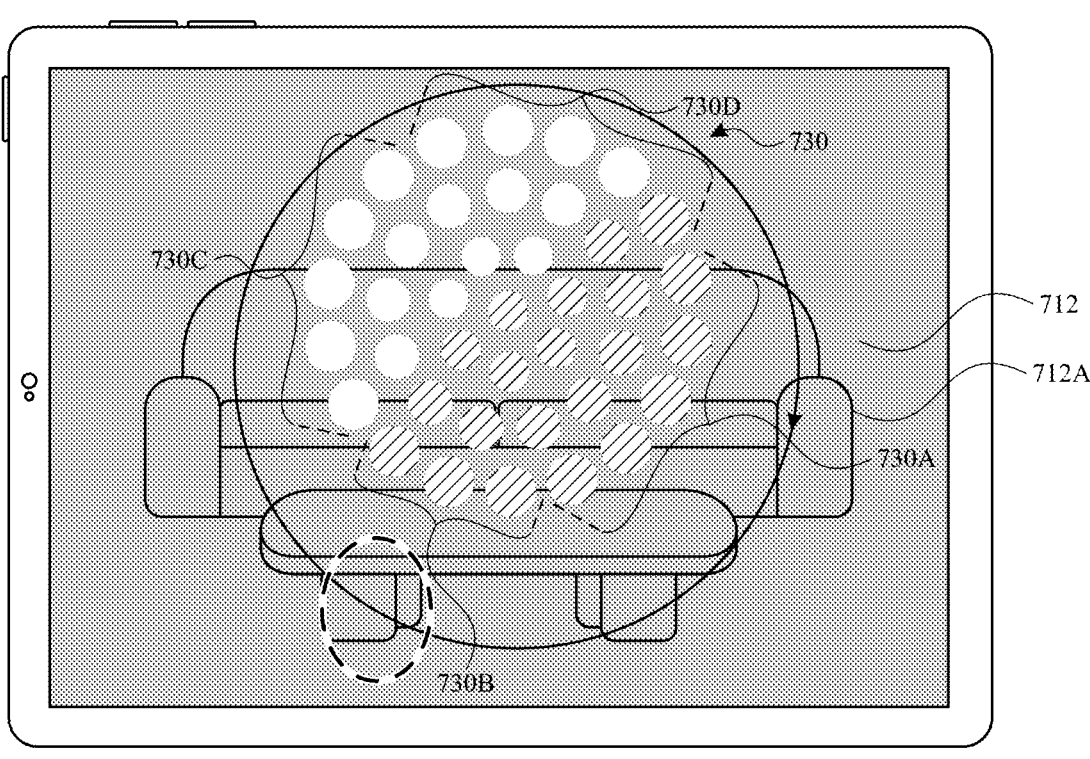
Figure 7K:
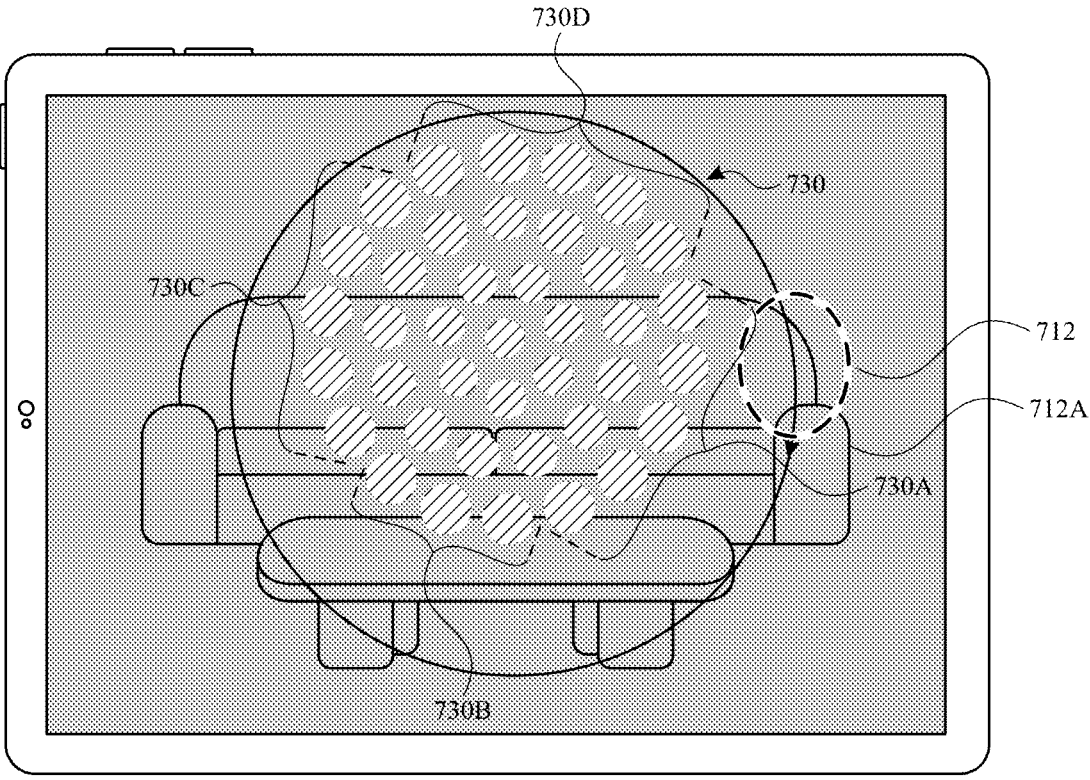

In some embodiments, respective portions of enrollment element 730 change in appearance to indicate that computer system 700 has detected the user gazing at a location that corresponds to the respective portion. For example, at FIG. 7H, gaze 750D starts below and to the right of enrollment element 730. Based on the location of gaze 750D at FIG. 7I, computer system 700 changes the appearances of portions 730A to indicate that the user's gaze has been detected gazing at a location that corresponds to portions 730A, such as by changing the color of portions 730A to a darker color and/or changing an amount of light originating from portions 730A. At FIG. 7J, as computer system 700 continues to detect gaze 750D move along gaze path 722, computer system 700 changes the appearances of portions 730B to indicate that the user's gaze has been detected at locations corresponding to portions 730B, such as by changing the color of portions 730A to a darker color and/or changing an amount of light originating from portions 730B. At FIG. 7K, computer system 700 has detected gaze 750D having moved along gaze path 722 completely (or near-completely) around enrollment element 730 and, as a result, has updated the appearance of all portions 730A-730D to indicate that computer system 700 has detected the user gazing at locations that correspond to those respective portions, such as by additionally changing the color of portions 730C-730D to a darker color and/or changing an amount of light originating from portions 730C-730D. Because computer system 700 has detected the user gazing at locations corresponding to all of portions 730A-730D, this portion of the gaze enrollment is complete and computer system 700 proceeds to replacing enrollment element 730 with (e.g., shrinking into and/or morphing into) target 714, as illustrated in FIG. 7Y.

In some embodiments, computer system 700 changes the brightness of three-dimensional environment 712 during the process of FIGS. 7A-7C and/or 7H-7K, including during the gaze enrollment process. In some embodiments, computer system 700 collects gaze information and/or pupil dilation information throughout the described process (including with the varied brightness) so as to enroll the user's gaze such that the user can more accurately target elements (physical elements and/or virtual elements) in three-dimensional environments (such as in three-dimensional environment 712).

Returning to FIG. 7L, enrollment element 740, including elements 740A-740F, is displayed as part of three-dimensional environment 712. In some embodiments, the elements (including elements 740A-740F) of enrollment element 740 are spaced apart (e.g., with equal spacing or with unequal spacing). In some embodiments, the elements (including elements 740A-740F) of enrollment element 740 are arranged in a two-dimensional arrangement (e.g., a two-dimensional array or two-dimensional grid). As computer system 700 detects the gaze of the user of computer system 700 being directed to respective locations in three-dimensional environment 712, computer system 700 displays indication 780 corresponding to the respective location in three-dimensional environment 712 of the gaze of the user. Indication 780 corresponding to the location in three-dimensional environment 712 of the gaze of the user moves as the detected location of the user's gaze moves. In some embodiments, indication 780 illuminates (e.g., using simulated lighting, such as a simulated spot light) an area in three-dimensional environment 712 corresponding to the location (and/or direction) of the user's gaze.

At FIG. 7L, computer system 700 highlights 742 element 740A. As illustrated in FIG. 7L, the other elements (e.g., including 740B-740F) of enrollment element 740 are not highlighted. This encourages the user of computer system 700 to direct their gaze at the highlighted element. At FIG. 7L, computer system 700 is detecting the user's gaze 750E directed towards element 740A and, in response, computer system 700 has changed the visual appearance of element 740A (e.g., as compared to before gaze 750E was directed towards element 740A). At FIG. 7L, the other elements (e.g., including 740B-740F) of enrollment element 740 have a visual appearance that is different from element 740A because the user's gaze 750E is not directed at those elements.

At FIG. 7M1, computer system 700 continues to highlight 742 element 740A. As computer system 700 determines that the user's gaze 750E continues to be directed at element 740A (e.g., for less than a threshold amount of time), computer system 700 gradually changes the visual appearance of element 740A, as shown in FIG. 7M1. In the example of FIG. 7M1, element 740A continues to get lighter in color as computer system 700 continues to detect the user's gaze 750E continuing to be directed at element 740A.

In some embodiments, the techniques and user interface(s) described in FIGS. 7A-7Y are provided by one or more of the devices described in FIGS. 1A-1P. For example, FIG. 7M2 illustrates an embodiment in which highlight 742 of element 740A (e.g., as described in FIG. 7M1) is displayed on display module X702 of head-mounted device (HMD) X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

At FIG. 7M2, HMD X700 continues to highlight 742 element 740A. As HMD X700 determines that the user's gaze X750E continues to be directed at element 740A (e.g., for less than a threshold amount of time), HMD X700 gradually changes the visual appearance of element 740A, as shown in FIG. 7M2. In the example of FIG. 7M2, element 740A continues to get lighter in color as HMD X700 continues to detect the user's gaze X750E continuing to be directed at element 740A.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, either alone or in any combination. In some embodiments, HMD X700 includes one or more input devices, which include any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

At FIG. 7N, computer system 700 has determined that the user's gaze 750E has been (e.g., continuously) directed at element 740A for more than a threshold amount of time (e.g., 1 second, 3 seconds, or 5 seconds). In response, computer system 700 has updated the appearance of element 740A (e.g., changed the color to white (or another color), changed the shape, and/or changed the size). Further in response to the determination that the user's gaze 750E has been (e.g., continuously) directed at element 740A for more than the threshold amount of time, computer system moves (e.g., via an animated movement over time) highlighting 742 from element 740A to element 740E, as shown in FIG. 7N. Moving highlighting 742 to element 740E is intended to encourage and/or prompt the user of computer system 700 to move their gaze to element 740E, thereby enabling computer system 700 to capture additional gaze information about the gaze of the user.

Figure 7O:
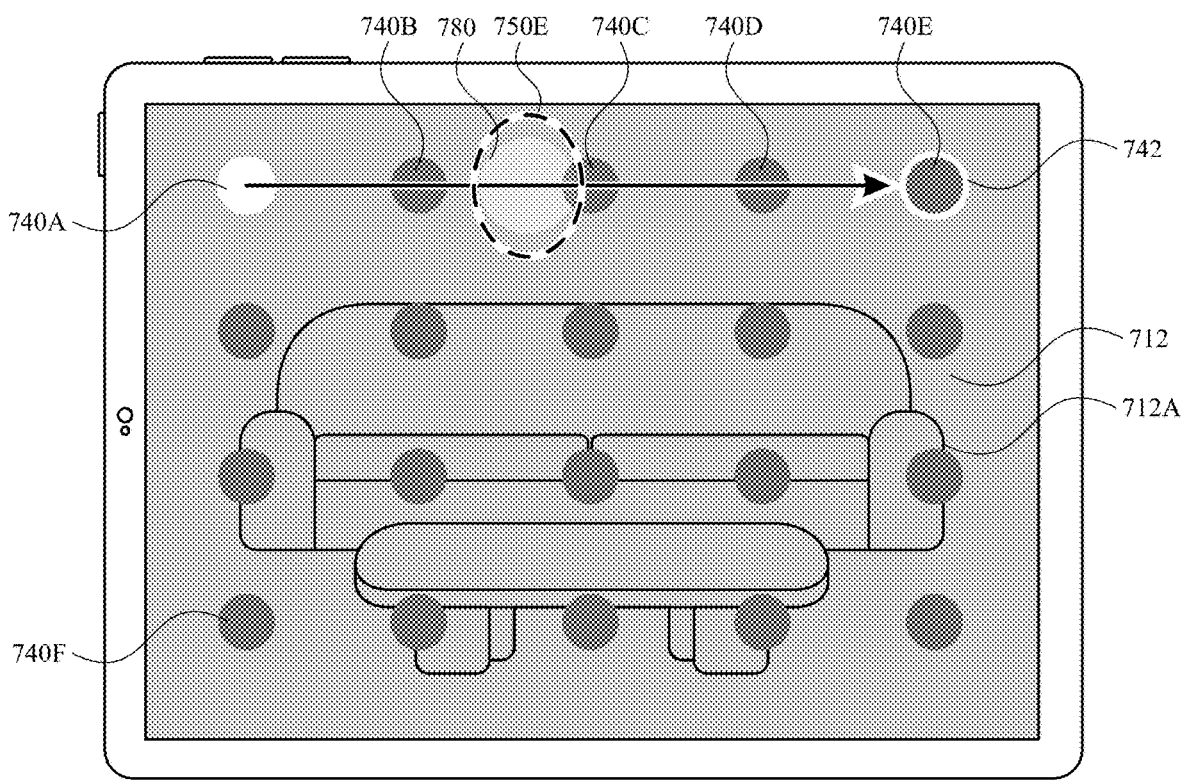

At FIG. 7O, computer system 700 detects the user's gaze 750E moving past element 740C and, in response, displays indication 780 corresponding to the respective location in three-dimensional environment 712 of the gaze of the user as partially at the location of element 740C (e.g., and partially not at the location of element 740C). In some embodiments, indication 780 illuminates (e.g., using simulated lighting, such as a simulated spot light) a portion (or all of) element 740C in three-dimensional environment 712 without illuminating other elements of enrollment element 740. At FIG. 7O, in response to the user's gaze 750E no longer being directed to element 740A, computer system 700 begins to change (and/or revert) the appearance of element 740A (e.g., changing the color back to being dark, changing the shape, and/or changing the size).

Figure 7P:
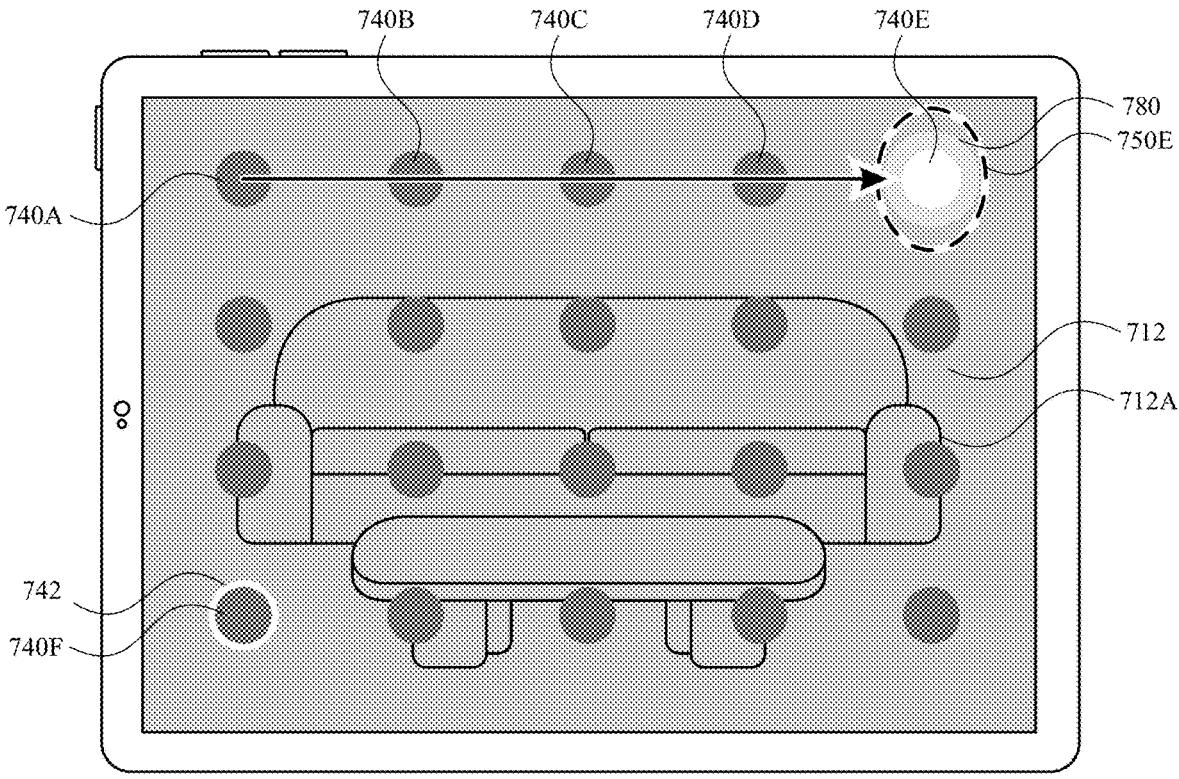
Figure 7Q:
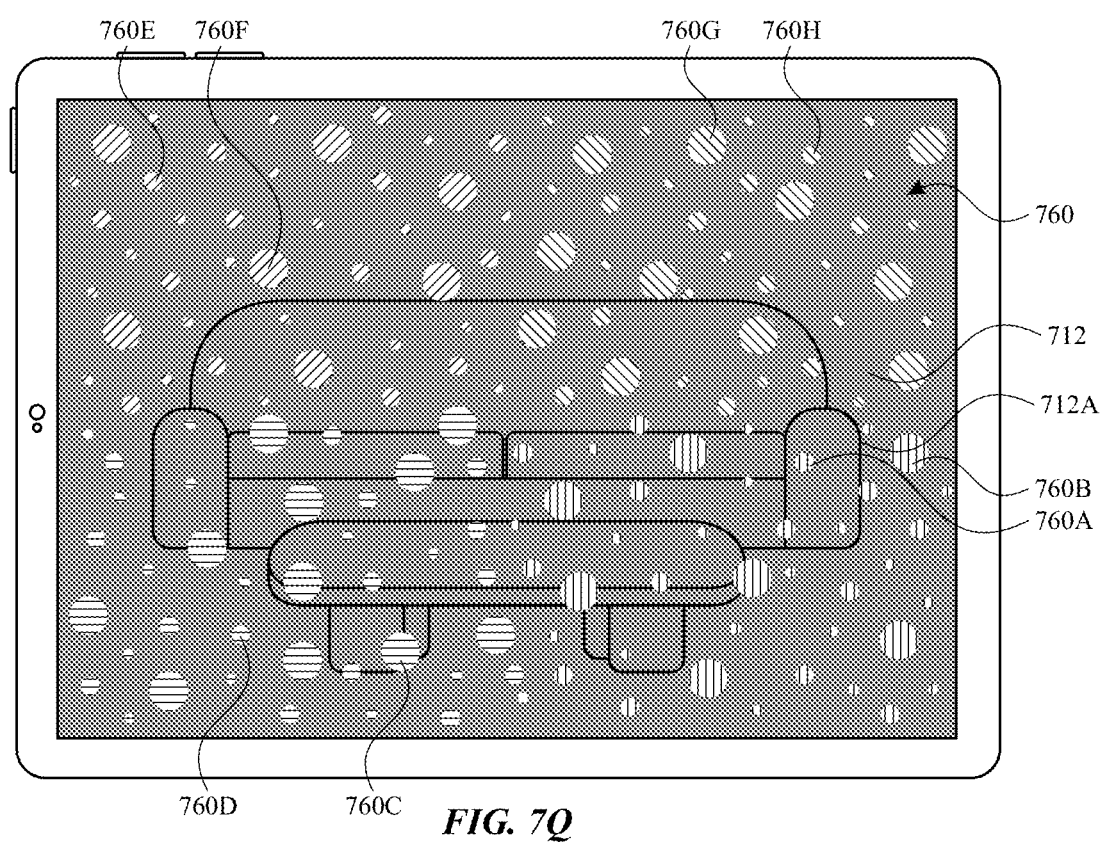

At FIG. 7P, computer system 700 has continued to change (and/or revert) the appearance of element 740A based on the user's gaze 750E not being directed to element 740A. As a result, at FIG. 7P, the visual appearance of element 740A is the same as it was prior to the user's gaze 750E being directed to element 740A (at FIG. 7L). At FIG. 7P, computer system 700 has detected the user's gaze 750E being directed at element 740E for more than the threshold amount of time and, in response, has changed the visual appearance of element 740E (e.g., changed the color to white (or another color), changed the shape, and/or changed the size). In some embodiments, computer system 700 gradually changes the appearance of element 740E over time while detecting that the user's gaze 750E is being directed to element 740E, thereby providing the user with visual feedback that their gaze is directed at the respective element. At FIG. 7P, further in response to computer system 700 having detected the user's gaze 750E had been directed at element 740E for more than the threshold amount of time, computer system 700 has moved (e.g., via an animated movement over time) highlighting 742 from element 740E to element 740F. Moving highlighting 742 to element 740F is intended to encourage and/or prompt the user of computer system 700 to move their gaze to element 740F, thereby enabling computer system 700 to capture additional gaze information about the gaze of the user.

In some embodiments, once computer system 700 detects that the user's gaze 750E is no longer directed at element 740E, computer system 700 will being to change (and/or revert) the appearance of element 740E (e.g., changing the color back to being dark, changing the shape, and/or changing the size). In some embodiments, when the computer system detects the user's gaze being directed to a respective element that is not highlighted, computer system 700 forgoes gradually modifying the appearance of the respective element over time (e.g., only changes the appearance based on indication 780 illuminating (e.g., using simulated lighting, such as a simulated spot light) the respective element in three-dimensional environment 712).

In some embodiments, once computer system 700 has detected the user gazing at a respective number of highlighted elements (e.g., 4 locations, 6 locations, or 8 locations) for the threshold amount of time, this portion of the gaze enrollment is complete and computer system 700 proceeds to replacing enrollment element 740 with (e.g., shrinking into and/or morphing into) target 714, as illustrated in FIG. 7Y.

In some embodiments, computer system 700 changes the brightness of three-dimensional environment 712 during the process of FIGS. 7A-7C and/or 7L-7P, including during the gaze enrollment process. In some embodiments, computer system 700 collects gaze information and/or pupil dilation information throughout the described process (including with the varied brightness) so as to enroll the user's gaze such that the user can more accurately target elements (physical elements and/or virtual elements) in three-dimensional environments (such as in three-dimensional environment 712).

Returning to FIG. 7Q, target 714 (of FIG. 7C) has optionally broken apart to form enrollment element 760, including elements 760A-760F, positioned as part of three-dimensional environment 712. In some embodiments, the elements (including elements 740A-740H) of enrollment element 760 are spaced apart (e.g., with equal spacing or with unequal spacing) in three axes in the three-dimensional space. In some embodiments, the elements (including elements 740A-740H) of enrollment element 760 are arranged in a three-dimensional arrangement (e.g., a three-dimensional array or three-dimensional grid). In some embodiments, the elements (including elements 740A-740H) of enrollment element 760 are distributed randomly or pseudo-randomly within a three-dimensional area of three-dimensional environment 712. In some embodiments, the elements (including elements 740A-740H) of enrollment element 760 have varying colors. In some embodiments, the elements (including elements 740A-740H) of enrollment element 760 are of varying sizes.

Figure 7R:
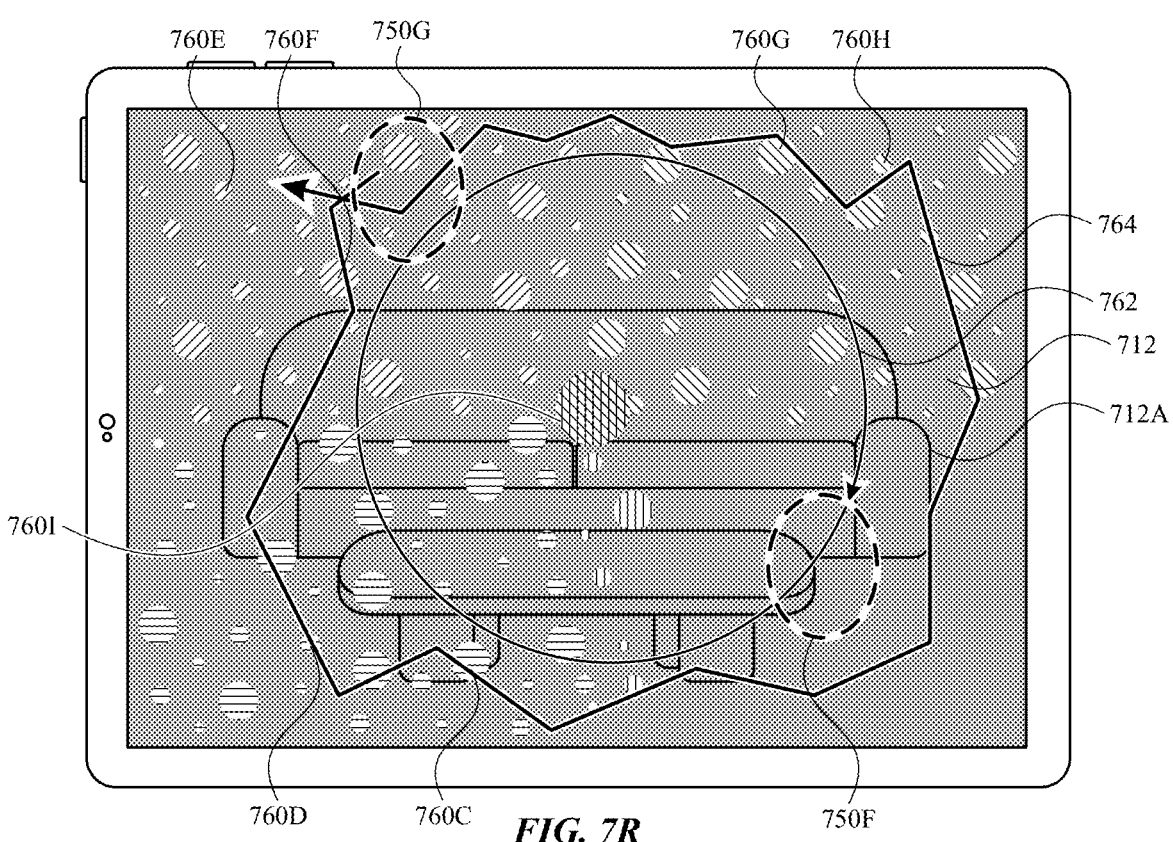

As computer system 700 detects the gaze of the user of computer system 700 being directed to respective directions and/or respective locations in three-dimensional environment 712, computer system 700 animates elements of enrollment element 760 that correspond to those respective directions and/or respective locations to move to (and/or to come together at) a particular location in three-dimensional environment 712. FIG. 7R illustrates two alternative gaze paths 762 (corresponding to gaze 750F) and 764 (corresponding to gaze 750G) within three-dimensional environment 712. Both gaze paths 762 and 764 are valid paths (with different starting/ending locations and different directions) and enable computer system 700 to detect gaze information during the gaze enrollment process. Gaze paths indicate the path that the user's gaze takes and are illustrated for a better understanding of the technique. In some embodiments, gaze paths are not displayed as part of the user interface of computer system 700.

At FIG. 7R, computer system 700 detects gaze 750F of the user of computer system 700 being directed to a location within three-dimensional environment 712. In response to having detected gaze 750F being directed to the location, computer system has animated those elements of enrollment element 760 at locations corresponding to gaze 750F (e.g., within a threshold distance of gaze 750F and/or at locations of gaze 750F), including elements 760A and 760B, to move from their respective locations to a central location. At FIG. 7R, the elements that have moved (including elements 760A and 760B) to the central location have visually combined to form element 760I. In some embodiments, the color of element 760I is optionally based on the colors (and, optionally, sizes) of the elements that have moved to the central location and visually combined to form element 760I. In some embodiments, the size of element 760I is optionally based on the quantity (and, optionally, the size) of elements that have moved to the central location and visually combined to form element 760I. At FIG. 7R, the color of element 760I is based on the elements that have moved to the central location and are no longer distinctly displayed (as they previously were in FIG. 7Q). At FIG. 7R, the size of element 760I is based on the number of elements have moved to the central location and are no longer distinctly displayed (as they previously were in FIG. 7Q).

At FIG. 7S1, computer system 700 detects movement along path 762 of gaze 750F of the user of computer system 700 to a new location within three-dimensional environment 712. In response to having detected movement of gaze 750F to the new location, computer system has animated those elements of enrollment element 760 at locations corresponding to the new location (and corresponding to the intermediate locations during movement) of gaze 750F (e.g., within a threshold distance of gaze 750F and/or at locations of gaze 750F), including elements 760C and 760D, to move from their respective locations to the central location. At FIG. 7S1, the elements that have moved (including elements 760A-760D) to the central location have visually combined to form element 760I. In some embodiments, the color of element 760I is optionally based on the colors (and, optionally, sizes) of the elements that have moved to the central location and visually combined to form element 760I. In some embodiments, the size of element 760I is optionally based on the quantity (and, optionally, the size) of elements that have moved to the central location and visually combined to form element 760I. At FIG. 7S1, the color of element 760I has changed as compared to FIG. 7R as additional elements have moved to the central location and are no longer distinctly displayed. At FIG. 7S1, the size of element 760I has increased based on the increased number of elements that have moved to the central location and are no longer distinctly displayed.

In some embodiments, the techniques and user interface(s) described in FIGS. 7A-7Y are provided by one or more of the devices described in FIGS. 1A-1P. For example, FIG. 7S2 illustrates an embodiment in which enrollment element 760 (e.g., as described in FIGS. 7Q-7S1) is displayed on display module X702 of head-mounted device (HMD) X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

At FIG. 7S2, HMD X700 detects movement along path 762 of gaze X750F of the user of HMD X700 to a new location within three-dimensional environment 712. In response to having detected movement of gaze X750F to the new location, HMD X700 has animated those elements of enrollment element 760 at locations corresponding to the new location (and corresponding to the intermediate locations during movement) of gaze X750F (e.g., within a threshold distance of gaze X750F and/or at locations of gaze X750F), including elements 760C and 760D, to move from their respective locations to the central location. At FIG. 7S2, the elements that have moved (including elements 760A-760D) to the central location have visually combined to form element 760I. In some embodiments, the color of element 760I is optionally based on the colors (and, optionally, sizes) of the elements that have moved to the central location and visually combined to form element 760I. In some embodiments, the size of element 760I is optionally based on the quantity (and, optionally, the size) of elements that have moved to the central location and visually combined to form element 760I. At FIG. 7S2, the color of element 760I has changed as compared to FIG. 7R as additional elements have moved to the central location and are no longer distinctly displayed. At FIG. 7S2, the size of element 760I has increased based on the increased number of elements that have moved to the central location and are no longer distinctly displayed.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122a-b, first and second rear-facing display screens 1-322a, 1-322b, display 11.3.2-104, first and second display assemblies 1-120a, 1-120b, display assembly 1-320, display assembly 1-421, first and second display sub-assemblies 1-420a, 1-420b, display assembly 3-108, display assembly 11.3.2-204, first and second optical modules 11.1.1-104a and 11.1.1-104b, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110a-f, either alone or in any combination. In some embodiments, HMD X700 includes one or more input devices, which include any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

Figure 7T:
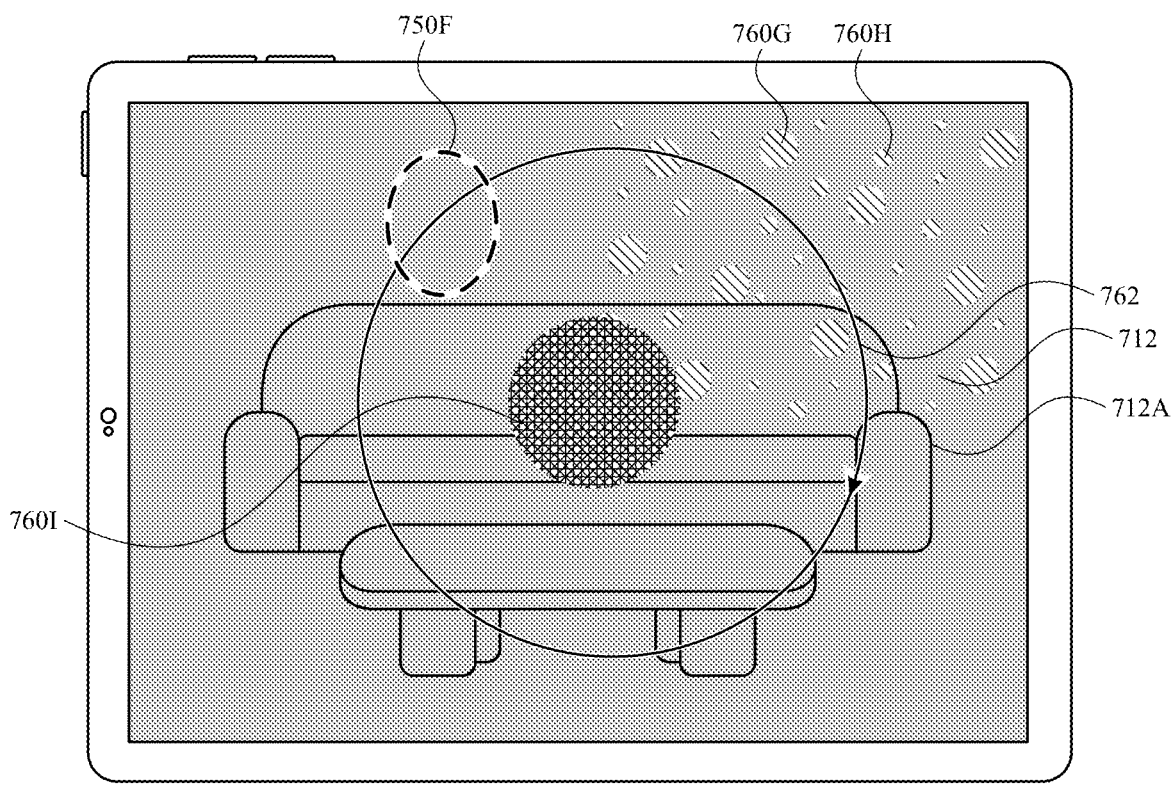

At FIG. 7T, computer system 700 detects further movement along path 762 of gaze 750F of the user of computer system 700 to a third location within three-dimensional environment 712. In response to having detected movement of gaze 750F to the third location, computer system has animated those elements of enrollment element 760 at locations corresponding to the third location (and corresponding to the intermediate locations during movement) of gaze 750F (e.g., within a threshold distance of gaze 750F and/or at locations of gaze 750F), including elements 760E and 760F, to move from their respective locations to the central location. At FIG. 7T, the elements that have moved (including elements 760A-760F) to the central location have visually combined to form element 760I. In some embodiments, the color of element 760I is optionally based on the colors (and, optionally, sizes) of the elements that have moved to the central location and visually combined to form element 760I. In some embodiments, the size of element 760I is optionally based on the quantity (and, optionally, the size) of elements that have moved to the central location and visually combined to form element 760I. At FIG. 7T, the color of element 760I has changed as compared to FIGS. 7S1 and/or 7S2 as additional elements have moved to the central location and are no longer distinctly displayed. At FIG. 7T, the size of element 760I has increased based on the increased number of elements that have moved to the central location and are no longer distinctly displayed.

Figure 7U:
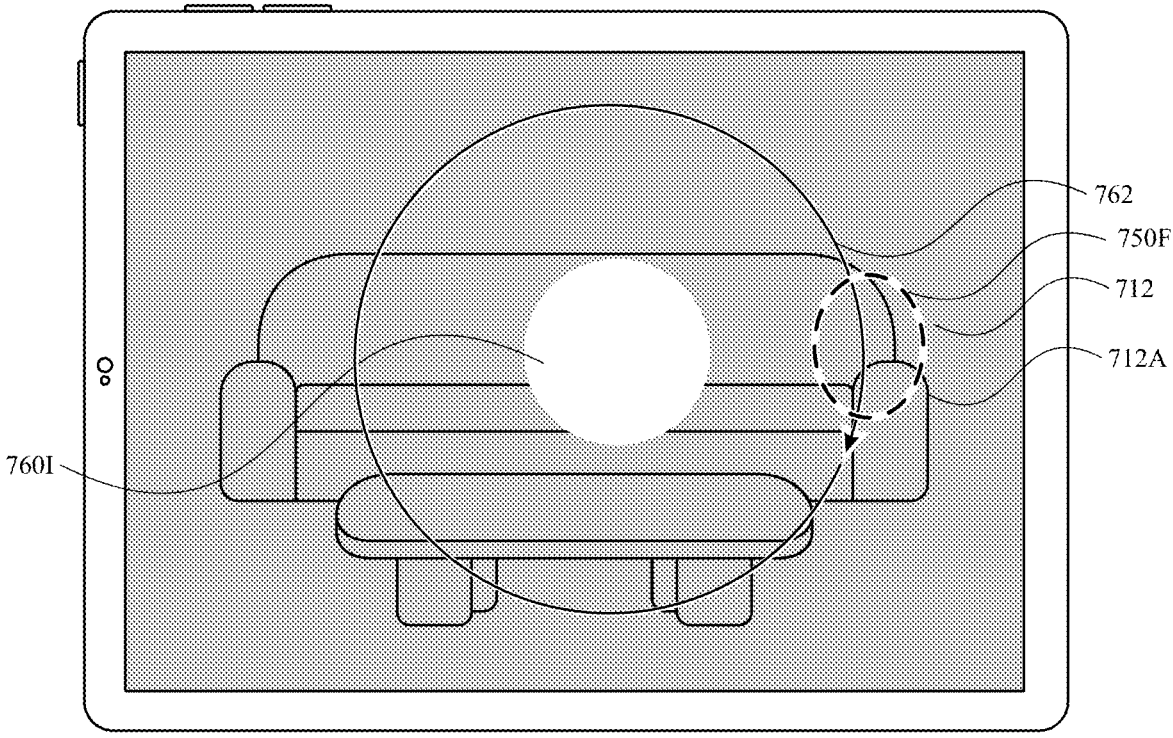

At FIG. 7U, computer system 700 detects further movement along path 762 of gaze 750F of the user of computer system 700. In response to having detected the further movement of gaze 750F, computer system has animated those elements of enrollment element 760 at locations corresponding to the location (and corresponding to the intermediate locations during movement) of gaze 750F (e.g., within a threshold distance of gaze 750F and/or at locations of gaze 750F), including elements 760G and 760H, to move from their respective locations to the central location. At FIG. 7U, the elements that have moved (including elements 760A-760F) to the central location have visually combined to form element 760I. In some embodiments, the color of element 760I is optionally based on the colors (and, optionally, sizes) of the elements that have moved to the central location and visually combined to form element 760I. In some embodiments, the size of element 760I is optionally based on the quantity (and, optionally, the size) of elements that have moved to the central location and visually combined to form element 760I. At FIG. 7U, the color of element 760I has changed to white, which is different from the color of element 760I at FIGS. 7R-7S2, as additional elements have moved to the central location and are no longer distinctly displayed. At FIG. 7U, the size of element 760I has further increased based on the increased number of elements that have moved to the central location and are no longer distinctly displayed.

In some embodiments, once computer system 700 has detected the user's gaze directed at various locations that cause all elements of enrollment element 760 to combined into 760I, this portion of the gaze enrollment is complete and computer system 700 proceeds to replacing enrollment element 760 (e.g., 760I as shown in FIG. 7U) with (e.g., shrinking into and/or morphing into) target 714, as illustrated in FIG. 7Y.

In some embodiments, computer system 700 changes the brightness of three-dimensional environment 712 during the process of FIGS. 7A-7C and/or 7Q-7U, including during the gaze enrollment process. In some embodiments, computer system 700 collects gaze information and/or pupil dilation information throughout the described process (including with the varied brightness) so as to enroll the user's gaze such that the user can more accurately target elements (physical elements and/or virtual elements) in three-dimensional environments (such as in three-dimensional environment 712).

Returning to FIG. 7V, target 714 (of FIG. 7C) has changed to enrollment element 770, which includes trail 770A that indicates the path that enrollment element 770 has recently taken. For example, as enrollment element 770 moves within three-dimensional environment 712, trail 770A indicates the most recent path within three-dimensional environment 712 that enrollment element 770 has taken by fading out (over time) earlier indications of the path.

In some embodiments, enrollment element 770 moves along a fixed path, such as a circle or oval. In some embodiments, the speed and/or direction of movement of enrollment element 770 is independent from a detected gaze of the user of the computer system. The animated movement of enrollment element 770 encourages the user of computer system 700 to gaze at enrollment element 770 as it moves. As enrollment element 770 moves within three-dimensional environment 712, computer system 700 detects the gaze of the user of computer system 700 being directed to respective directions and/or respective locations in three-dimensional environment 712. In some embodiments, computer system 700 determines the path of enrollment element 770 based on a determination that certain gaze information has not been collected (e.g., to encourage the user to look left or right to collect information corresponding to that direction).

In some embodiments, computer system 700 renders enrollment element 770 to include a simulated light source that produces light within the three-dimensional environment. As enrollment element 770 moves within three-dimensional environment 712, computer system 700 simulates light emanating from enrollment element 770 and shining onto various surfaces of objects (e.g., physical objects and/or virtual objects) of three-dimensional environment 712.

As shown in FIG. 7V, as enrollment element 770 moves in three-dimensional environment 712, enrollment element 770 shines light onto nearby objects, such as on a portion of couch 712A. As described in further detail above, in some embodiments, three-dimensional environment 712 is a virtual reality environment and couch 712A is a virtual object displayed as part of the extended reality environment and, in some embodiments, three-dimensional environment 712 is an augmented reality environment and couch 712A is a representation of a physical object in the physical environment.

At FIG. 7V, as enrollment element 770 moves in three-dimensional environment 712, computer system 700 detects movement of gaze 750H of the user of computer system 700 (e.g., along path 766). At FIG. 7W1, enrollment element 770 has continued to move in three-dimensional environment 712 and computer system 700 continues to detect the movement of gaze 750H of the user of computer system 700. At FIG. 7W1, as enrollment element 770 moves in three-dimensional environment 712, enrollment element 770 shines light onto nearby objects, such as on a portion of table 712B (e.g., a virtual object or a physical object) and the floor. For example, portions of table 712B closer to enrollment element 770 receive more light than other portions of table 712B that are further from enrollment element 770. For another example, enrollment element 770 optionally casts a shadow under table 712B. At FIG. 7X, enrollment element 770 has continued to move in three-dimensional environment 712 and computer system 700 continues to detect the movement of gaze 750H of the user of computer system 700. At FIG. 7X, as enrollment element 770 moves in three-dimensional environment 712, enrollment element 770 shines light onto nearby objects, such as on a portion of couch 712A.

In some embodiments, the techniques and user interface(s) described in FIGS. 7A-7Y are provided by one or more of the devices described in FIGS. 1A-1P. For example, FIG. 7W2 illustrates an embodiment in which enrollment element 770 (e.g., as described in FIGS. 7V and/or 7W1) is displayed on display module X702 of head-mounted device (HMD) X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

At FIG. 7W2, enrollment element 770 has continued to move in three-dimensional environment 712 and HMD X700 continues to detect the movement of gaze X750H of the user of HMD X700. At FIG. 7W2, as enrollment element 770 moves in three-dimensional environment 712, enrollment element 770 shines light onto nearby objects, such as on a portion of table 712B (e.g., a virtual object or a physical object) and the floor. For example, portions of table 712B closer to enrollment element 770 receive more light than other portions of table 712B that are further from enrollment element 770. For another example, enrollment element 770 optionally casts a shadow under table 712B.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, either alone or in any combination. In some embodiments, HMD X700 includes one or more input devices, which include any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

In some embodiments, computer system 700 changes the brightness of three-dimensional environment 712 during the process of FIGS. 7A-7C and/or 7V-7X, including during the gaze enrollment process. In some embodiments, computer system 700 collects gaze information and/or pupil dilation information throughout the described process (including with the varied brightness) so as to enroll the user's gaze such that the user can more accurately target elements (physical elements and/or virtual elements) in three-dimensional environments (such as in three-dimensional environment 712).

Figure 7X:
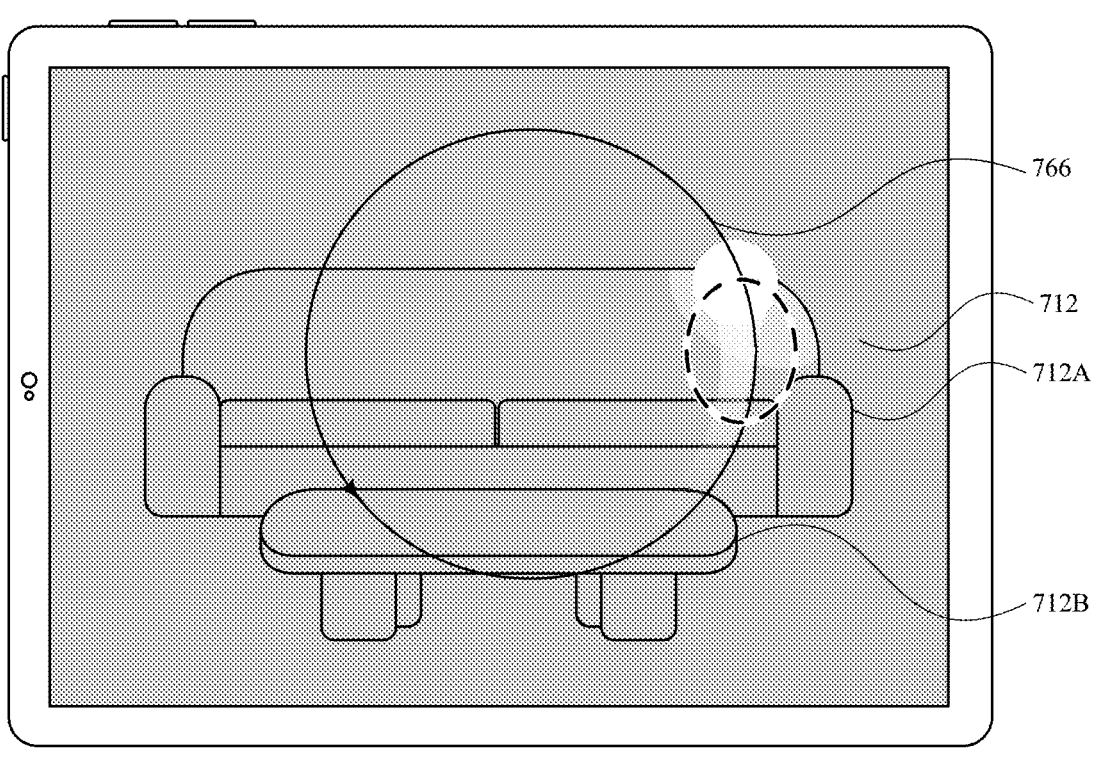
Figure 7Y:
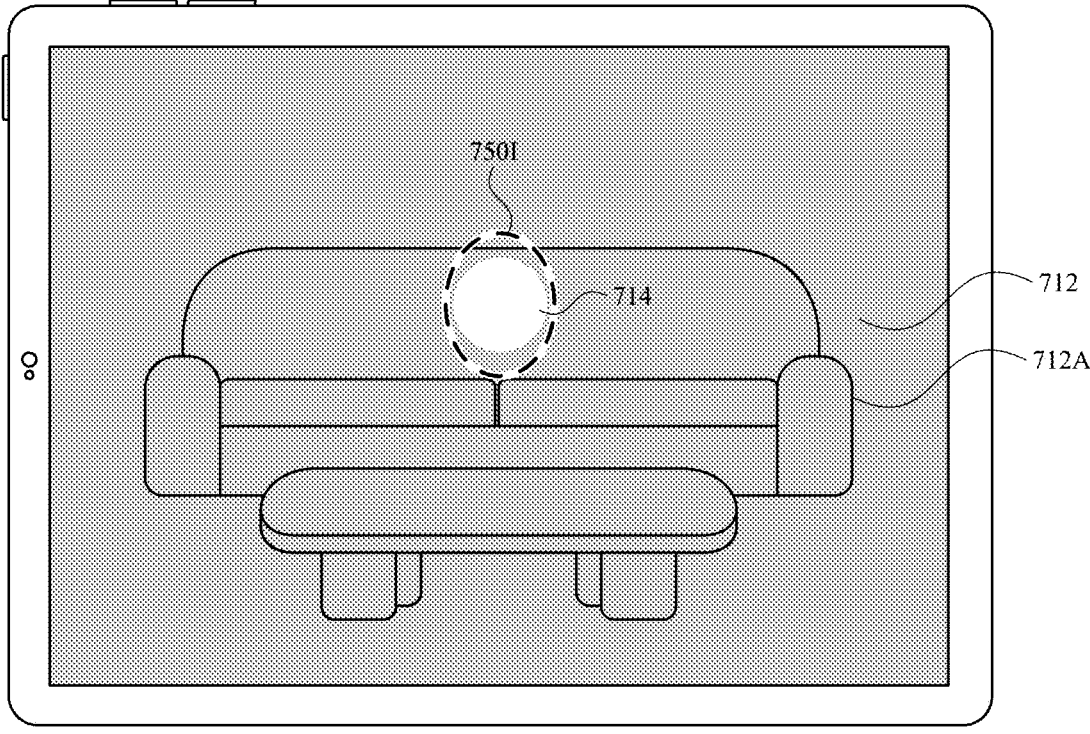

At FIGS. 7V-7X, because computer system 700 has not captured sufficient information (e.g., gaze information and/or pupil information) about the user, computer system 700 does not provide the user with feedback (e.g., audio, visual and/or haptic output) indicating that sufficient information has been captured. At FIG. 7X, once computer system 700 has detected sufficient information, computer system 700 transitions/morphs enrollment element 770 into target 714 (e.g., that is not moving and/or that does not have a trail, as shown in FIG. 7Y, thereby providing feedback to the user that sufficient information has been collected.

At FIG. 7Y, while computer system 700 displays target 714, computer system 700 detects gaze 750I of the user of computer system 700. In response to detecting gaze 750I and in accordance with a determination that gaze 750I has been directed to target 714 for a threshold amount of time, computer system 700 does not proceed with the gaze enroll-ment process (e.g., does not transition to the next step of the process and does not complete the process). In response to detecting gaze 750I and in accordance with a determination that gaze 750I has been directed to target 714 for a threshold amount of time, computer system 700 proceeds with the gaze enrollment process (e.g., onto a next step of the process and/or completes the process). In some embodiments, the threshold amount of time is zero and any gaze at target 714 causes computer system 700 to proceed with the gaze enrollment process. In some embodiments, the threshold amount of time is non-zero and the gaze directed at target 714 must be sustained for the duration of the threshold amount of time for computer system 700 to proceed with the gaze enrollment process.

Additional descriptions regarding FIGS. 7A-7Y are provided below in reference to methods 800, 900, 1000, and 1100.

FIG. 8 is a flow diagram of an exemplary method 800 for displaying an enrollment progress user indicator, in accor-dance with some embodiments. In some embodiments, method 800 is performed at a computer system (e.g., com-puter system 101 in FIG. 1A, computer system 700, and/or HMD X700) (e.g., a desktop computer, a portable device (e.g., a notebook computer, tablet computer, and/or hand-held device), and/or a personal electronic device (e.g., a wearable electronic device, such as a watch or a head-mounted display)) that is in communication with a display generation component (e.g., a heads-up display, a display, a touchscreen, and/or a projector) (e.g., display generation component 120 in FIGS. 1A, 3, and 4, display 702, and/or display X702) and one or more input devices (e.g., a touchpad, a touch-sensitive display, one or more cameras, and/or one or more eye-tracking components). In some embodiments, the display generation component is at least partially opaque. In some embodiments, the method 800 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 800 are, optionally, combined and/or the order of some operations is, optionally, changed.

The computer system (e.g., 700 and/or X700) displays (802), via the display generation component (e.g., 702 and/or X702), a target (e.g., 714) (e.g., a target object, a target element, a fixation target, a user interface element, a fixation point, and/or a virtual object). In some embodi-ments, the target (e.g., 714) includes a circle (e.g., a filled-in circle) or a dot. In some embodiments, the target includes a user interface element that is brighter than another portion of a user interface being displayed via the display generation component. In some embodiments, the target is at least partially opaque such that a physical environment is able to be seen through the target. In some embodiments, other portions besides the target are at least partially opaque such that a physical environment is able to be seen around the target.

While displaying the target (e.g., 714), the computer system (e.g., 700 and/or X700) detects (804), via at least one input device of the one or more input devices, a gaze (e.g., 750A and/or X750A) of a user of the computer system (e.g., 700 and/or X700) (e.g., a focus point of one or more eyes of the user) (e.g., detecting that the attention of the user is directed to a particular location). In some embodiments, the at least one input device includes a camera and/or a gaze-detection sensor. In some embodiments, the focus point corresponds to a location at which the user is looking.

In response to detecting the gaze of the user and in accordance with a determination that the gaze (e.g., 750A and/or X750A) of the user is directed at the target (e.g., 714) for a threshold amount of time (e.g., detecting that the user is gazing (e.g., looking) at a display position that corre-sponds to the target and/or detecting that a position and/or orientation of the user's eyes (e.g., irises and/or pupils) corresponds to a display position of the target), the computer system (e.g., 700 and/or X700) replaces (806), via the display generation component (e.g., 702 and/or X702), display of the target (e.g., 714) (e.g., the target is no longer displayed) with an enrollment progress user interface ele-ment (e.g., 720, 730, 740, and/or 760) (e.g., a virtual object) (e.g., display of the target is replaced with display of the enrollment progress user interface element after changing the visual appearance of the target). In some embodiments, the enrollment progress user interface element (e.g., 720, 730, 740, 760, and/or 770) indicates an amount of progress of enrollment, such as 10% or 20%. In some embodiments, the enrollment progress user interface element (e.g., 720, 730, 740, 760, and/or 770) is at least partially opaque such that a physical environment is able to be seen through the enrollment progress user interface element. In some embodi-ments, the determination is that the focus point corresponds to the target (e.g., 714) for a threshold amount of time (e.g., a threshold amount of time that is zero or greater than zero).

While displaying the enrollment progress user interface element, the computer system (e.g., 700 and/or X700) detects (808), via at least one input device of the one or more input devices, one or more changes in the gaze (e.g., 750B-750H, X750E, X750F, and/or X750H), of the user (e.g., detecting that the attention of the user is directed to a new location). In some embodiments, the at least one input device detecting the movement is the same input device(s) detecting the gaze of the user. In some embodiments, the movement corresponds to the user looking in a different direction, such as at a different location in a physical environment.

In response to detecting the one or more changes in the gaze of the user (e.g., detecting the gaze being directed at various positions of the one or more display generation components), the computer system (e.g., 700 and/or X700) changes (810) (e.g., updating), via the display generation component (e.g., 702 and/or X702), a visual appearance of the enrollment progress user interface element (e.g., 720, 730, 740, 760, and/or 770) based on the one or more changes detected in the gaze (e.g., 750B-750H, X750E, X750F, and/or X750H) of the user. In some embodiments, the first set of progress criteria includes a criterion is met when the gaze of the user is moved to a particular location, different from a location at which the gaze has already been tracked (e.g., previous locations that were already tracked do not cause the visual appearance to change). In some embodiments, changing the enrollment progress user interface element includes displaying a different amount of progress of enrollment, such as from 20% to 30%. In some embodiments, in accordance with a determination that the first set of progress criteria are not met, forgoing changing the enrollment progress user interface element. Displaying a target that is replaced by the enrollment progress user interface element allows the process to require detection of a gaze of a user at an initial location before initiating detection of changes to the gaze at other locations. Replacing the target after detecting a gaze of the user for the threshold amount of time ensures that a user's gaze was not unintentionally directed at the target. Changing a visual appearance of the enrollment progress user interface element allows to show progress of enrolling a gaze in a way that the user will know that more gaze needs to be detected, thereby providing the user with improved visual feedback.

In accordance with some embodiments, the target (e.g., 712) and the enrollment progress user interface element (e.g., 720, 730, 740, 760, and/or 770) are displayed as part of a user interface. The computer system (e.g., 700 and/or X700) changes (e.g., increasing and/or decreasing), via the display generation component and over a period of time, a brightness of the user interface (e.g., as shown in the changing brightness throughout FIGS. 7B1-7Y). The computer system (e.g., 700 and/or X700) detects, via the one or more input devices, at one or more times (e.g., one, twice, or five times) over the period of time, pupil dilation information (e.g., an amount of dilation or constriction and/or a pupil size) (e.g., about a first eye of a user, a second eye of the user, or both eyes of the user). In some embodiments, the computer system detects pupil dilation information at various times during the period of time (e.g., when the user interface is at a first brightness and when the user interface is at a second brightness that is different from the first brightness), including when the target and/or the enrollment progress user interface element is displayed. In some embodiments, the pupil dilation information is used during enrollment of the user's gaze to improve the accuracy of tracking the user's gaze while the computer system performs operations based on gaze information (e.g., direction of user's gaze) detected about the user's eyes. In some embodiments, the enrollment progress user interface element indicates the progress of enrollment of the user's gaze. Changing the brightness of the user interface over time allows for the computer system to detect pupil dilation as the pupil responds to the change in brightness.

In accordance with some embodiments, changing the brightness of the user interface over the period of time includes displaying, at a first time and via the display generation component, a pass-through portion that includes a representation of at least a portion of the real world surrounding computer system at a first brightness level (e.g., a first level of tint) and displaying, at a second time that is different from the first time and via the display generation component, a pass-through portion that includes the representation of at least the portion of the real world surrounding computer system at a second brightness level (e.g., a second level of tint that is less tinted than the first level of tint) that is brighter than the first brightness level. In accordance with some embodiments, changing the brightness level of the passthrough from darker to brighter over time enables the computer system to detect pupil dilation.

In accordance with some embodiments, prior to displaying the enrollment progress user interface element (e.g., at FIGS. 7A, 7B1, and/or 7B2), the computer system (e.g., 700 and/or X700) detects, via the one or more input devices, first pupil dilation information (e.g., an amount of dilation or constriction and/or a pupil size) (e.g., about a first eye of a user, a second eye of the user, or both eyes of the user). In some embodiments, the first pupil dilation information detected prior to displaying the enrollment progress user interface element is used to adjust the brightness of the user interface (that includes the target and the enrollment progress user interface element) (e.g., used to determine the amount of brightness change). Detecting pupil dilation information before displaying the enrollment progress user interface elements enables the computer system to more easily capture pupil dilation information at different levels of pupil dilation (e.g., by controlling a level of brightness, such as when there are less and/or smaller user interface elements being displayed).

In accordance with some embodiments, while displaying the enrollment progress user interface element (e.g., at FIGS. 7D-7X), the computer system (e.g., 700 and/or X700) detects, via the one or more input devices, second pupil dilation information (e.g., an amount of dilation or constriction and/or a pupil size that is, optionally, different from the first pupil dilation information collected prior to displaying the enrollment progress user interface) (e.g., about a first eye of a user, a second eye of the user, or both eyes of the user). Detecting pupil dilation information while displaying the enrollment progress user interface elements allows for the computer system to capture gaze information and pupil dilation information at the same time, instead of requiring two different processes, thereby reducing the number of inputs required and making the process more efficient.

In accordance with some embodiments, the target (e.g., 714) and the enrollment progress user interface element (e.g., 720, 730, 740, 760, and/or 770) are displayed as part of a user interface. While displaying the user interface that includes the enrollment progress user interface element (e.g., 720, 730, 740, 760, and/or 770), the computer system (e.g., 700 and/or X700) changes (e.g., increasing and/or decreasing), via the display generation component (e.g., 702 and/or X702), a brightness of the user interface (e.g., as in FIGS. 7D-7X). In some embodiments, the brightness of the user interface is changed by increasing or decreasing the brightness of a user interface element (e.g., the enrollment progress user interface element or another user interface element) included in the user interface. In some embodiments, the brightness of the user interface is changed by adding or removing a user interface element in the user interface. Changing the brightness of the user interface over time allows for the computer system to detect pupil dilation as the pupil responds to the change in brightness.

In accordance with some embodiments, in response to detecting the gaze (e.g., 750A and/or X750A) of the user and in accordance with the determination that the gaze of the user is directed at the target (e.g., 714) for the threshold amount of time and prior to replacing display of the target (e.g., 714) with the enrollment progress user interface element (e.g., 720, 730, 740, 760, and/or 770), the computer system (e.g., 700 and/or X700) changes, via the display generation component (e.g., 702 and/or X702), a visual appearance of the target (e.g., 714 in FIG. 7C) (e.g., the target reacts when the gaze of the user corresponds to the target). In some embodiments, the visual appearance includes a location, size, shape, opacity, and/or brightness. Changing the visual appearance of the target provides feedback to the user that the computer system has detected that the gaze of the user is directed at the target for the threshold amount of time, thereby providing improved visual feedback.

In accordance with some embodiments, changing the visual appearance of the target includes decreasing a size of the target (e.g., 714) from a first size to a second size that is smaller than the first size (as shown in the transition from FIGS. 7B1-7C) and, after decreasing the size of the target from the first size to the second size, increasing the size of the target (e.g., 714) from the second size to a third size (e.g., that is the same as the first size or that is different from the first size) that is larger than the second size (e.g., as shown in the transition from 7C to 7D). First shrinking and then expanding the target provides the user with visual feedback that the computer system has detected that the gaze of the user is directed at the target for the threshold amount of time, thereby providing improved visual feedback.

In accordance with some embodiments, replacing display of the target (e.g., 714) with the enrollment progress user interface element (e.g., 720, 730, 740, 760, and/or 770) includes displaying an animated transition in which the target expands into (e.g., increasing in size and morphing to become) the enrollment progress user interface element (e.g., the target transforms into the enrollment progress user interface element). Expanding the target into the enrollment progress user interface element provides the user with visual feedback that the computer system has detected that the gaze of the user is directed at the target for the threshold amount of time, thereby providing feedback about a state of the device.

In accordance with some embodiments, the target (e.g., 714) is viewpoint-locked. In some embodiments, while displaying the target at a first location within a field of view of a user, the computer system detects, via the one or more input devices, a change in orientation of the computer system relative to a physical environment and maintains display of the target at the first location. Displaying the target as a viewpoint-locked object allows the target to remain displayed and/or in a field of view of the user regardless of orientation of the computer system and/or the user, thereby preventing the user from losing sight of the target.

In accordance with some embodiments, the target (e.g., 714) is environment-locked. In some embodiments, while displaying the target at a first location within a field of view of a user, the computer system detects, via the one or more input devices, a change in orientation of the computer system (e.g., a direction that a user is facing) relative to a physical environment and, in response to detecting the change in orientation, displaying the target at a second location within a field of view of a user that is different from the first location, such that the target appears to remain stationary within the physical environment based on a point of view of the user. Displaying the target as an environment-locked object allows the user to change their point of view to cease seeing the target and enables the computer system to provide the user with a fixed location for the target within the user's physical environment, making it easy for the user to view the target when desired.

In accordance with some embodiments, the enrollment progress user interface element (e.g., 720, 730, 740, 760, and/or 770) is environment-locked. In some embodiments, while displaying the enrollment progress user interface element at a first location within a field of view of a user, the computer system detects, via the one or more input devices, a change in orientation of the computer system relative to a physical environment and maintains display of the enrollment progress user interface element at the first location within the field of view of a user. Displaying the enrollment progress user interface element as an environment-locked object allows the user to change their point of view to cease seeing the enrollment progress user interface element and enables the computer system to provide the user with a fixed location for the enrollment progress user interface element within the user's physical environment, making it easy for the user to view the enrollment progress user interface element when desired In accordance with some embodiments, changing the visual appearance of the enrollment progress user interface element (e.g., 720, 730, 740, 760, and/or 770) based on the one or more changes detected in the gaze (e.g., 750B-750H, X750E, X750F, and/or X750H) of the user includes: changing, via the display generation component (e.g., 702 and/or X702), a visual appearance of a first portion of the enrollment progress user interface element (e.g., 720, 730, 740, 760, and/or 770) based on a gaze of the user of the computer system being directed at a first area (e.g., corresponding to the first portion and/or in the direction of the first portion), without changing a visual appearance of a second portion of the enrollment progress user interface element that is different from the first portion and without changing a visual appearance of a third portion of the enrollment progress user interface element that is different from the first portion and second portion (e.g., 720A vs 720C-720H, 730A vs 730B-730D, 740A vs 740B-740F, and/or 760A-760B vs 760C-760H); and changing, via the display generation component, a visual appearance of the second portion of the enrollment progress user interface element based on a gaze of the user of the computer system being directed at a second area (e.g., corresponding to the second portion and/or in the direction of the second portion) that is different from the first area, without changing the visual appearance of the first portion of the enrollment progress user interface element and without changing the visual appearance of the third portion of the enrollment progress user interface element. Changing different portions of the enrollment progress user interface element as the gaze of the user moves provides an indication of what directions the user has looked at and directions remain to be looked at, thereby providing the user with improved visual feedback.

In accordance with some embodiments, changing the visual appearance of a respective portion (e.g., 740A, 740E, and/or 760I) of the enrollment progress user interface element (e.g., 720, 730, 740, 760, and/or 770) includes changing a color of the respective portion of the enrollment progress user interface element. Changing the color of portions of the enrollment progress user interface element as the computer system detects the user gazing at those portions provides the user with feedback about at which portions of the user interface the computer system has detected the gaze of the users, thereby providing the user with improved visual feedback.

In accordance with some embodiments, changing the visual appearance of a respective portion (e.g., 740A) of the enrollment progress user interface element (e.g., 740) includes changing the visual appearance (changing a size, length, and/or fill) of the respective portion of the enrollment progress user interface element, as the gaze (e.g., 750E and/or X750E) of the user is detected as being directed to the respective portion (e.g., 740A). In some embodiments, when the computer system detects the gaze of the user is directed to a respective direction, a corresponding respective portion of the enrollment progress user interface element begins to change in appearance over time as the computer system continues to detect the gaze of the user being directed in the respective direction. In some embodiments, the respective portion of the enrollment progress user interface element is a line, tic mark, and/or other visual element is displayed. In some embodiments, changing the visual appearance of the enrollment progress user interface element based on the one or more changes detected in the gaze of the user includes: in accordance with a determination that the gaze of the user of the computer system is directed at a first area (e.g., corresponding to the first portion and/or in the direction of the first portion), the computer system changes (e.g., gradually and/or over time), via the display generation component, a visual appearance of a first portion (e.g., that is displayed at the first area) of the enrollment progress user interface element without changing a visual appearance of a second portion of the enrollment progress user interface element that is different from the first portion; and in accordance with a determination that the gaze of the user of the computer system is directed at a second area (e.g., corresponding to the second portion and/or in the direction of the second portion), the computer system changes (e.g., gradually and/or over time), via the display generation component, a visual appearance of the second portion of the enrollment progress user interface element without changing the visual appearance of the first portion of the enrollment progress user interface element. Modifying the respective portion of the enrollment progress user interface element enables the computer system to provide visual feedback to the user that the gaze of the user is being detected in the respective direction, thereby providing the user with enhanced visual feedback.

In accordance with some embodiments, after (e.g., in response to or not in response to) completing enrollment, the computer system (e.g., 700 and/or X700) decreases a size of the enrollment progress user interface element from a fourth size to a fifth size that is smaller than the fourth size. Shrinking the enrollment progress user interface element provides the user with visual feedback that the enrollment process has completed, thereby providing the user with improved visual feedback.

In accordance with some embodiments, after (e.g., immediately after) decreasing the size of the enrollment progress user interface element from the fourth size to the fifth size, the computer system (e.g., 700 and/or X700) replaces the enrollment progress user interface element (e.g., 720, 730, 740, 760, and/or 770) with a second target (e.g., 714 of FIG. 7Y) (e.g., a target object, a target element, a fixation target, a user interface element, a fixation point, and/or a virtual object). In some embodiments, the second target includes a circle (e.g., a filled-in circle) or a dot. In some embodiments, the second target includes a user interface element that is brighter than another portion of a user interface being displayed via the display generation component. In some embodiments, the second target is at least partially opaque such that a physical environment is able to be seen through the second target. In some embodiments, some or all other portions besides the second target are at least partially opaque such that a physical environment is able to be seen. In some embodiments, the second target has the same appearance as the target. Replacing the enrollment progress user interface element with the second target provides the user with visual feedback that enrollment has been completed, thereby providing the user with improved visual feedback.

In accordance with some embodiments, while displaying the second target (e.g., 714 of FIG. 7Y), the computer system (e.g., 700 and/or X700) detects, via at least one input device of the one or more input devices, a second gaze (e.g., 750I) of a user of the computer system (e.g., 700 and/or X700) (e.g., a focus point of one or more eyes of the user) (e.g., detecting that the attention of the user is directed to a particular location). In some embodiments, the at least one input device includes a camera and/or a gaze-detection sensor. In some embodiments, the focus point corresponds to a location at which the user is looking. In response to detecting the second gaze of the user and in accordance with a determination that the second gaze (e.g., 750I) of the user is directed at the second target (e.g., 714 in FIG. 7Y) for a second threshold amount of time (e.g., a threshold amount of time that is zero or greater than zero) (e.g., detecting that the user is gazing at a display position that corresponds to the second target and/or detecting that a position and/or orientation of the user's eyes (e.g., irises and/or pupils) corresponds to a display position of the second target), the computer system (e.g., 700 and/or X700) completes enrollment. In some embodiments, the determination is that the focus point corresponds to the second target for a threshold amount of time. In response to detecting the second gaze (e.g., 750I) of the user and in accordance with a determination that the second gaze (e.g., 750I) of the user is not directed at the second target (e.g., 714 in FIG. 7Y) for the second threshold amount of time (e.g., the second gaze of the user is not directed at the second target, or the second gaze of the user is directed at the second target for less than the second threshold amount of time), the computer system (e.g., 700 and/or X700) forgoes completing enrollment. Completing the enrollment once the gaze of the user is directed at the second target for the second threshold amount of time enables the computer system to detect that the user is aware of the process for selecting an object via gaze, thereby improving the machine-man interface.

In accordance with some embodiments, the target (e.g., 714) is a first color. After decreasing the size of the enrollment progress user interface element (e.g., 720, 730, 740, 760, and/or 770) to the fifth size, the computer system (e.g., 700 and/or X700) replaces the enrollment progress user interface element (e.g., 720, 730, 740, 760, and/or 770) with a visual element (e.g., 714 of FIG. 7Y) (e.g., a second target or an object that is not a target) that is a second color that is different from the first color. In some embodiments, the visual element is a second target. In some embodiments, the second target includes a circle (e.g., a filled-in circle) or a dot. In some embodiments, the second target includes a user interface element that is brighter than another portion of a user interface being displayed via the display generation component. In some embodiments, the second target is at least partially opaque such that a physical environment is able to be seen through the second target. In some embodiments, other portions besides the second target are at least partially opaque such that a physical environment is at least partially visible around the second target. Replacing the enrollment progress user interface element with a visual element that is a different color than the target provides the user with feedback that the visual element is different from the target and that the enrollment process is complete, thereby providing the user with improved visual feedback.

In accordance with some embodiments, the enrollment progress user interface element (e.g., 720, 730, 740, 760, and/or 770) is a three-dimensional shape. In some embodiments, the three-dimensional shape is configured to show enrollment progress in three dimensions. In some embodiments, a change in the point of view of the user causes the computer system to display a different view of the enrollment progress user interface element. The enrollment progress user interface element being a three-dimensional shape allows for progress to be shown in three dimensions rather than just two dimensions, thereby providing the user with improved visual feedback.

In accordance with some embodiments, the enrollment progress user interface element (e.g., 720, 730, 740, 760, and/or 770) includes a plurality of visual elements (e.g., 720A-720H and/or 730A-730D) displayed at least partially around a location corresponding to the previously displayed target. In some embodiments, the plurality of visual elements are displayed fully around the location corresponding to the previously displayed target. In some embodiments, the plurality of visual elements are spaced equally apart from one another. In some embodiments, changing the visual appearance of the enrollment progress user interface element based on the one or more changes detected in the gaze of the user includes changing the plurality of visual elements. In some embodiments, changing the plurality of visual elements includes increasing a length of a respective visual element of the plurality of visual elements when a gaze is detected at a location (or direction) corresponding to the respective visual element. Displaying a plurality of visual elements displayed at least partially around a location corresponding to the previously displayed target allows the progress to be shown proximate to a location for which the gaze of the user was recently directed.

In accordance with some embodiments, before displaying the target (e.g., 714), the computer system (e.g., 700 and/or X700) displays, via the display generation component (e.g., 702 and/or X702), one or more instructions corresponding to the target (e.g., 714). In some embodiments, the one or more instructions corresponding to the target informs the user how to select/activate the target (e.g., by gazing at the target for the threshold amount of time). Displaying one or more instructions corresponding to the target before displaying the target provides guidance to a user for which how to interact with the target and how to change a state of the target, thereby providing the user with improved visual feedback.

In accordance with some embodiments, displaying the one or more instructions includes displaying textual instructions. Displaying text instructions corresponding to the target before displaying the target provides guidance to a user for which how to interact with the target and how to change a state of the target, thereby providing the user with improved visual feedback.

In accordance with some embodiments, displaying the one or more instructions includes displaying an animation of a requested movement (e.g., instructions to gaze at the target or instructions to gaze at the target for a non-zero threshold amount of time). Displaying an animation of a requested movement provides the user with feedback about how the user can cause the enrollment progress user interface element to be displayed, thereby providing improved visual feedback. The animation does not require the user to understand any text instructions and instead shows what actions the user should take. Additionally, displaying the one or more instructions as an animation of the requested movement also saves computer memory because the computer system does not need to store instructions in multiple languages.

In accordance with some embodiments, the threshold amount of time is zero. In some embodiments, the threshold amount of time is non-zero (e.g., greater than zero, 0.3 seconds, 1 second, 2 seconds, or 5 seconds). Replacing display of the target after the user's gaze is detected as being directed to the target (and without waiting for an additional amount of time) enables the computer system to more quickly progress through the enrollment.

In some embodiments, aspects/operations of methods 800, 900, 1000, 1100, 1300, 1400, 1600, and/or 1700 may be interchanged, substituted, and/or added between these methods. For example, the technique of method 800 can be used to initiate the techniques of methods 900, 1000, 1100, 1300, 1400, 1600, and/or 1700. For another example, the various techniques can be performed sequentially. For brevity, these details are not repeated here.

FIG. 9 is a flow diagram of an exemplary method 900 for animating movement of user interface elements, in accordance with some embodiments. In some embodiments, method 900 is performed at a computer system (e.g., computer system 101 in FIG. 1A, computer system 700, and/or HMD X700) (e.g., a desktop computer, a portable device (e.g., a notebook computer, tablet computer, and/or hand-held device), and/or a personal electronic device (e.g., a wearable electronic device, such as a watch or a head-mounted display)) that is in communication with a display generation component (e.g., display generation component 120 in FIGS. 1A, 3, and 4, display 702, and/or display X702) (e.g., a heads-up display, a display, a touchscreen, and/or a projector) and one or more input devices (e.g., a touchpad, a touch-sensitive display, one or more cameras, one or more eye-tracking components, and/or one or more hand-tracking components). In some embodiments, the display generation component is at least partially opaque. In some embodiments, the method 900 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 900 are, optionally, combined and/or the order of some operations is, optionally, changed.

The computer system (e.g., 700 and/or X700) displays (902), via the display generation component (e.g., 702 and/or X702), a plurality of user interface elements (e.g., 760, including 760A-760H) (e.g., particles, dots, fixation points, fixation targets, and/or virtual objects). In some embodiments, the plurality of user interface elements (e.g., 760, including 760A-760H) are placed a fixed distance from each other. In some embodiments, the plurality of user interface elements are placed with apparent randomness (e.g., randomly or pseudo-randomly). In some embodiments, the plurality of user interface elements are placed in a grid format or other regular pattern. In some embodiments, the plurality of user interface elements are placed irrespective of a physical environment in which the plurality of user interface elements appear to be placed within. In some embodiments, the plurality of user interface elements are placed based on a physical environment in which the plurality of user interface elements appear to be placed within.

While displaying the plurality of user interface elements (e.g., 760, including 760A-760H), the computer system (e.g., 700 and/or X700) detects (904), via at least one input device of the one or more input devices, a gaze (e.g., 750F, X750F, and/or 750G) of a user of the computer system (e.g., 702 and/or X702) (e.g., a focus point of one or more eyes of the user) (e.g., detecting that the attention of the user is directed to a particular location). In some embodiments, the at least one input device includes a camera and/or a gaze-detection sensor. In some embodiments, the gaze corresponds to a location at which the user is looking.

In response to (906) detecting the gaze (e.g., 750F and/or X750F) of the user of the computer system and in accordance with a determination that the gaze of the user of the computer system is directed to a first location (e.g., as in FIG. 7R) that corresponds to a first user interface element (e.g., 760A and/or 760B) of the plurality of user interface elements, the computer system (e.g., 700 and/or X700) animates (908) movement, via the display generation component (e.g., 702 and/or X702), of the first user interface element (e.g., 760A and/or 760B) (e.g., displaying, via the display generation component, the first user interface element moving) from the first location toward (or to) a respective location (e.g., at location of 760I) that is different from the first location (e.g., a destination region or a predefined region) (e.g., without animating movement of the second user interface element from the second location toward (or to) the respective location); and In some embodiments, the determination is that the focus point corresponds to the first user interface element for a threshold amount of time. In some embodiments, in accordance with the determination that the focus point corresponds to the first user interface element, forgoing displaying (e.g., no longer displaying) the first user interface element after the first user interface element reaches the respective location.

In response to (906) detecting the gaze (e.g., 750F and/or X750F) of the user of the computer system and in accordance with a determination that the gaze of the user of the computer system is directed to a second location (as in FIGS. 7S1 and/or 7S2) that corresponds to a second user interface element (e.g., 760C and/or 760D) of the plurality of user interface elements, the computer system (e.g., 700 and/or X700) animates (910) movement, via the display generation component (e.g., 702 And/or X702), of the second user interface element (e.g., 760C and/or 760D) (e.g., displaying, via the display generation component, the second user interface element moving) from the second location toward (or to) the respective location (e.g., at location of 760I) that is different from the second location (e.g., the destination region or the predefined region) (e.g., without animating movement of the first user interface element from the first location toward (or to) the respective location). In some embodiments, the determination is that the gaze of the user of the computer system is directed to the second location for a threshold amount of time. In some embodiments, in accordance with a determination that the gaze of the user is not directed to a location corresponding to a user interface element of the plurality of user interface element, forgoing animating movement, via the display generation component, of the user interface element from the location toward (or to) the respective location. In some embodiments, in accordance with the determination that the gaze of the user is directed to the second location, forgoing animating movement of the first user interface element toward (or to) the respective location. In some embodiments, in accordance with the determination that the gaze of the user is directed to the first location, forgoing animating movement of the second user interface element toward (or to) the respective location. Displaying multiple user interface elements that are each animated to move toward a respective location when a gaze is directed to the respective user interface 131 elements provides a way to track progress of areas that have not been looked at (as those areas will still have user interface elements) and that have been locked at (as those area will not have user interface elements), thereby providing the user with improved visual feedback.

In accordance with some embodiments, in response to detecting the gaze (e.g., 750F and/or X750F) of the user of the computer system (e.g., 702 and/or X702): in accordance with the determination that the gaze of the user of the computer system is directed to the first location that corresponds to the first user interface element (e.g., 760A and/or 760B) of the plurality of user interface elements and subsequent to animating movement of the first user interface element from the first location toward (or to) the respective location (e.g., at location of 760I), the computer system (e.g., 700 and/or X700) ceases to display the first user interface element (e.g., 760A and/or 760B) of the plurality of user interface elements (e.g., by disappearing or being visually combined with another user interface element); and in accordance with the determination that the gaze of the user of the computer system is directed to the second location that corresponds to the second user interface element (e.g., 760C and/or 760D) of the plurality of user interface elements and subsequent to animating movement of the second user interface element from the second location toward (or to) the respective location (e.g., at location of 760I), the computer system (e.g., 700 and/or X700) ceases to display the second user interface element (e.g., 760C and/or 760D) of the plurality of user interface elements (e.g., by disappearing or being visually combined with another user interface element). In some embodiments, the respective user interface element ceases to be displayed when the respective user interface element reaches the respective location. Ceasing to display respective user interface elements after the respective user interface elements move toward (or to) the respective location provides the user with visual feedback that the user's gaze was detected at the original location of those respective user interface elements, thereby providing the user with improved visual feedback.

In accordance with some embodiments, the respective location (e.g., at location of 760I) is in a central region of a field of view of a user of the computer system (e.g., 702 and/or X702) (e.g., in a center of the field of view of the user or within a threshold distance of the center of the field of view of the user). In some embodiments, a visual element is displayed at the respective location. Animating movement of user interface elements to a central region of the field of view of the user enables the computer system to animate objects from all directions to the respective location, thereby providing improved visual feedback. In addition, having user interface elements arranged around the central region of the user's field of view prompts the user to move their eyes in a way that enables the computer system to collect sufficient eye information (e.g., gaze information and/or pupil dilation information) during the enrollment process to enroll user's gaze.

In accordance with some embodiments, the computer system (e.g., 700 and/or X700) displays, via the display generation component (e.g., 702 and/or X702), a target (e.g., 714 as in FIG. 7Y) (e.g., a target object, a target element, a fixation target, a user interface element, a fixation point, and/or a virtual object) at the respective location. In some embodiments, the target is displayed at a first size. In some embodiments, the target includes a circle (e.g., a filled-in circle) or a dot. In some embodiments, the target is at least partially opaque such that a physical environment is able to be seen through the target. In some embodiments, other portions besides the target are at least partially opaque such that a physical environment at least partially visible around the target. Displaying the target at the respective location provides a visible element towards which the user interface elements are being animated, thereby providing the user with improved visual feedback.

In accordance with some embodiments, after animating movement of the first user interface element (e.g., 760A and/or 760B) from the first location toward the respective location (e.g., at location of 760I) that is different from the first location, the computer system (e.g., 700 and/or X700) increases a display size of the target (e.g., 760I) at the respective location from a first size to a second size (e.g., as in FIG. 7R). In accordance with some embodiments, after animating movement of the second user interface element (e.g., 760C and/or 760D) from the second location toward the respective location (e.g., at location of 760I) that is different from the second location, the computer system (e.g., 700 and/or X700) increases a display size of the target (e.g., 760I) at the respective location from the second size to a third size (e.g., as in FIGS. 7S1 and/or 7S2). In some embodiments, the size of the target increases as respective user interface elements move to the respective location. In some embodiments, the size of the target is based on the number of user interface elements that have moved to the respective location. The size of the target becoming larger as more user interface elements move toward the respective locations provides the user with visual feedback about the number of user interface elements that have moved toward the respective location, thereby providing the user with improved visual feedback.

In accordance with some embodiments, in response to detecting the gaze (e.g., 750F and/or X750F) of the user of the computer system and in accordance with a determination that the gaze (e.g., 750F and/or X750F) of the user of the computer system is directed to a third location that corresponds to a third user interface element (e.g., 760E and/or 760F) of the plurality of user interface elements, animating movement, via the display generation component, of the third user interface element (e.g., 760E and/or 760F) (e.g., displaying, via the display generation component, the third user interface element moving) from the third location toward (or to) the respective location (e.g., at location of 760I) that is different from the third location (e.g., a destination region or a predefined region) (e.g., without animating movement of the first or second user interface element toward the respective location). Animating movement of user interface elements of any portion of the plurality of user interface elements toward the respective location when a gaze is directed to the user interface elements of that portion provides the user with visual feedback that user interface elements can be moved by looking at the user interface elements, thereby providing the user with improved visual feedback.

In accordance with some embodiments, the computer system (e.g., 700 and/or X700) detects movement of a head of a user. In response to detecting movement of the head of the user and in accordance with a determination that the movement of the head of the user exceeds a threshold amount of movement, the computer system (e.g., 700 and/or X700) displays (e.g., while displaying the plurality of user interface elements), via the display generation component, an instruction to keep a head of the user still. In some embodiments, in response to detecting movement of the head of the user and in accordance with a determination that the movement of the head of the user does not exceed the threshold amount of movement, forgoing display, via the display generation component, of the instruction to keep the head of the user still. In some embodiments, the computer system is tracking the movement of the eyes of the user, rather than movement of the head of the user, to determine where the user is looking. In some embodiments, the plurality of user interface elements are viewpoint locked and thus movement of the head of the user does not enable the user to gaze at additional user interface elements. Displaying an instruction to keep the head of the user still provides feedback to the user that movement of the head will not allow the user to gaze at various user interface elements, thereby providing the user with improved visual feedback.

In accordance with some embodiments, the computer system (e.g., 700 and/or X700) displays (e.g., prior to displaying the plurality of user interface elements), via the display generation component (e.g., 702 and/or X702), an animation depicting a gaze of a simulated user being directed to one or more user interface elements to cause the one or more user interfaces elements to be animated to move toward (or to) a second respective location (e.g., the same as the respective location and/or different from the respective location). Displaying the animation provides a user with visual feedback about what the user is expected to do with respect to the plurality of user interface element, thereby providing the user with improved visual feedback.

In accordance with some embodiments, before displaying the plurality of user interface elements (e.g., 720, 730, 740, 760, and/or 770), displaying, via the display generation component (e.g., 702 and/or X702), an indication (e.g., 704) of a manufacturer of the computer system (e.g., 700 and/or X700) (e.g., a company logo and/or company name or other identifier for the manufacturer of the computer system or software of the computer system). Displaying the indication of the manufacturer of the computer system provides an indication of the organization that is responsible for display of the plurality of user interface elements.

In accordance with some embodiments, the computer system (e.g., 700 and/or X700) animates the indication (e.g., 704) of the manufacturer to reduce in size and transform into a target (e.g., 714 of FIGS. 7B1 and/or 7B2) (e.g., a target object, a target element, a fixation target, a user interface element, a fixation point, and/or a virtual object) that is different from the indication (e.g., 704) of the manufacturer (e.g., as in the transition between FIGS. 7A, 7B1, and 7B2). In some embodiments, the target includes a circle (e.g., a filled-in circle) or a dot. In some embodiments, the target is at least partially opaque such that a physical environment is able to be seen through the target. In some embodiments, other portions besides the target are at least partially opaque such that a physical environment is able to be seen around the target. In some embodiments, the indication changes to the target without user input (e.g., after the computer system is ready to display the target). Animating the indication to change to a target provides a connection between the indication and the target such that the user is assured of the origination of the target.

In accordance with some embodiments, the computer system (e.g., 700 and/or X700) animates the target (e.g., 704) to change into the plurality of user interface elements (e.g., 720, 730, 740, 760, and/or 770), including moving the plurality of user interface elements away from a location at which the target was displayed. Animating the indication to change into the plurality of user interface elements provides a connection between the target and the plurality of user interface elements such that the user is assured of the origination of the plurality of user interface elements, thereby providing feedback about a state of the device.

In accordance with some embodiments, the plurality of user interface elements (e.g., 760A-760H) are placed in three-dimensional space at a variety of different locations along three or more axes of the three-dimensional space (e.g., x, y, and z axes). In some embodiments, a location of a user interface element is behind a physical object in a physical environment. In some embodiments, a location of a user interface element is defined with an x, y, and z coordinate and the user interface elements are displayed at a plurality of different simulated depths along a z axis (e.g., with some elements closer to the viewpoint of the user and some elements further away from the viewpoint of the user). In some embodiments, one or more user interface elements placed closer to the viewpoint of the user are displayed at a larger size, one or more user interface elements placed further from the viewpoint of the user are displayed at a smaller size, and user interface elements equal distance from the viewpoint of the user are displayed at the same size. In some embodiments, as the user moves in a direction of a respective user interface element, the respective user interface element becomes larger. Placing the user interface elements in three-dimensional space allows for the user interface elements to change and adjust as the user moves around the physical environment, thereby making the process more interactive. In addition, the user interface elements being in three-dimensional space allows for more accurate gaze detection by requiring the user to look at user interface elements that are both near and far.

In accordance with some embodiments, the first user interface element (e.g., 760A) is a first color (e.g., blue, red, or green), the second user interface element (e.g., 760C) is a second color (e.g., blue, red, or green) that is different from the first color, a target (e.g., 760I) (e.g., a target object, a target element, a fixation target, a user interface element, a fixation point, and/or a virtual object) is displayed at the respective location, and a color of the target (e.g., 760I) is based on colors of user interface elements that have been animated to move toward the respective location. In some embodiments, in accordance with a determination that user interface elements of the first color are the only user interface elements that have been animated to move toward the respective location, the target is the first color. In some embodiments, in accordance with a determination that user interface elements of the second color are the only user interface elements that have been animated to move toward the respective location, the target is the second color. In some embodiments, in accordance with a determination that user interface elements of two or more colors have been animated to move toward the respective location, the target is a combination of the two or more colors. In some embodiments, the target is white after all user interface elements have been animated to move toward the respective location. In some embodiments, the color of the target changes over time (e.g., as user interface elements move toward (or to) the respective location over time). In some embodiments, in accordance with a determination that a first set of user interface elements have moved toward (or to) the respective location, the target is displayed using a third color (e.g., that is based on the colors of the first set of user interface element) and in accordance with a determination that a second set of user interface elements (different from the first set of user interface elements) have moved toward (or to) the respective location, the target is displayed using a fourth color (e.g., that is based on the colors of the second set of user interface elements). In some embodiments, the pattern of color changes of the target is based on an order with which user interface elements move toward (or to) the respective location (e.g., whether the user first looks at the first user interface element that is a first color and then looks at the second user interface element that is a second color or the user first looks at the second user interface element and then looks at the first user interface element). Having different user interface elements be displayed as different colors allows a user to differentiate between different user interface elements. Having the target be based on user interface elements that have already been animated allows a user to determine which user interface elements have been animated and which user interface elements have not been looked at. Having the color of the target be a combination of colors of user interface elements that have been animated allows the user to identify whether the user has finished looking at all of the user interface elements.

In some embodiments, aspects/operations of methods 800, 900, 1000, 1100, 1300, 1400, 1600, and/or 1700 may be interchanged, substituted, and/or added between these methods. For example, the technique of method 800 can be used to initiate the techniques of methods 900, 1000, 1100, 1300, 1400, 1600, and/or 1700. For another example, the various techniques can be performed sequentially. For brevity, these details are not repeated here.

FIG. 10 is a flow diagram of an exemplary method 1000 for changing the appearances of user interface elements, in accordance with some embodiments. In some embodiments, method 1000 is performed at a computer system (e.g., computer system 101 in FIG. 1A, computer system 700, and/or HMD X700) (e.g., a desktop computer, a portable device (e.g., a notebook computer, tablet computer, and/or handheld device), and/or a personal electronic device (e.g., a wearable electronic device, such as a watch or a head-mounted display)) that is in communication with a display generation component (e.g., display generation component 120 in FIGS. 1A, 3, and 4, display 702, and/or display X702) (e.g., a heads-up display, a display, a touchscreen, and/or a projector) and one or more input devices (e.g., a touchpad, a touch-sensitive display, one or more cameras, one or more eye-tracking components, and/or one or more hand-tracking components). In some embodiments, the display generation component is at least partially opaque. In some embodiments, the method 1000 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1000 are, optionally, combined and/or the order of some operations is, optionally, changed.

The computer system (e.g., 700 and/or X700) displays (1002), via the display generation component (e.g., 702 and/or X702), a plurality of user interface elements (e.g., particles, dots, fixation points, fixation targets, and/or virtual objects) (e.g., 740, including 740A-740F). In some embodiments, the plurality of user interface elements are placed a fixed distance from each other. In some embodiments, the plurality of user interface elements are placed with apparent randomness (e.g., randomly or pseudo-randomly). In some embodiments, the plurality of user interface elements are placed in a grid format. In some embodiments, the plurality of user interface elements are placed irrespective of a physical environment in which the plurality of user interface elements appear to be placed within.

While displaying the plurality of user interface elements with a first visual appearance (e.g., 740A-740F in FIG. 7L) (e.g., without being highlighted and/or identified as being selected), the computer system (e.g., 700 and/or X700) detects (1004), via at least one input device of the one or more input devices (In some embodiments, the at least one input device includes a camera and/or a gaze-detection sensor), a gaze (e.g., 750E and/or X750E) (e.g., a focus point of one or more eyes of the user) of a user of the computer system (e.g., 700 and/or X700) that is directed to a plurality of different user interface objects including a gaze directed toward a first user interface element (e.g., 740A) and gaze directed toward a second user interface element (e.g., 740) (e.g., detecting that the attention of the user is directed to the plurality of user interface elements). In some embodiments, the gaze of the user corresponds to a location at which the user is looking.

In response to (1006) detecting the gaze (e.g., 750E and/or X750E) of the user of the computer system and in accordance with a determination that the gaze (e.g., 750E and/or X750E) of the user of the computer system is directed to a location corresponding to the first user interface element (e.g., 740A) of the plurality of user interface elements for less than a threshold amount of time (e.g., as in FIGS. 7L, 7M1, and/or 7M2), the computer system (e.g., 700 and/or X700) updates (1008) display (e.g., changing or highlighting), via the display generation component (e.g., 702 and/or X702), of the first user interface element to have a second visual appearance (e.g., 740A as in FIGS. 7L, 7M1, and/or 7M2) that is different from the first visual appearance (e.g., without updating display of the second user interface element to have the second visual appearance). In some embodiments, the change from the first visual appearance to the second visual appearance includes a change in size, shape, opacity, and/or brightness. In some embodiments, the first user interface element has a visual appearance different from the second visual appearance before detecting the gaze of the user.

In response to (1006) detecting the gaze (e.g., 750E and/or X750E) of the user of the computer system and in accordance with a determination that the gaze (e.g., 750E and/or X750E) of the user of the computer system is directed to a location corresponding to a second user interface element (e.g., 740E), different from the first user interface element (e.g., 740A), of the plurality of user interface elements for less than the threshold amount of time, the computer system (e.g., 700 and/or X700) updates (1010) display (e.g., changing or highlighting), via the display generation component (e.g., 702 and/or X702), of the second user interface element (e.g., 740E) to have the second visual appearance (e.g., without updating display of the first user interface element to have the second visual appearance). In some embodiments, the second user interface element has a visual appearance different from the second visual appearance before detecting the gaze of the user. In some embodiments, the second user interface element maintains a visual appearance displayed before detecting the gaze of the user when the gaze of the user is directed to a location corresponding to the first user interface element instead of the second user interface element. In some embodiments, the first user interface element maintains a visual appearance displayed before detecting the gaze of the user when the gaze of the user is directed to a location correspond to the second user interface element instead of the first user interface element.

In response to (1006) detecting the gaze (e.g., 750E and/or X750E) of the user of the computer system and in accordance with a determination that the gaze (e.g., 750E and/or X750E) of the user is directed to the location corresponding to the first user interface element (e.g., 740A) for more than the threshold amount of time, the computer system (e.g., 700 and/or X700) changes (1012), via the display generation component (e.g., 702 and/or X702), the first user interface element (e.g., 740A) to a third visual appearance (e.g., 740A in FIG. 7N) different from the first visual appearance and the second visual appearance (e.g., 740A in FIGS. 7M1, 7M2, and/or 7N). In some embodiments, the change from the second visual appearance to the third visual appearance includes a change in size, shape, opacity, and/or brightness.

In response to (1006) detecting the gaze (e.g., 750E and/or X750E) of the user of the computer system and in accordance with a determination that the gaze (e.g., 750E and/or X750E) of the user is directed to the location corresponding to the second user interface element (e.g., 740E) for more than the threshold amount of time, the computer system (e.g., 700 and/or X700) changes (1014), via the display generation component, the second user interface element to the third visual appearance (e.g., 740E in FIG. 7P). In some embodiments, the change from the second visual appearance to the third visual appearance includes a change in size, shape, opacity, and/or brightness. Updating display of a user interface element to a second visual appearance after the gaze of the user has been determined to be directed to the user interface element for less than the threshold amount of time provides feedback about the state of the device with respect to progress of detecting the gaze directed at the user interface element. Similarly, updating display of a user interface element after the gaze of the user has been determined to be directed to the user interface element for more than the threshold amount of time provides feedback about the state of the device with respect to progress of detecting the gaze directed at the user interface element.

In accordance with some embodiments, in response to (1006) detecting the gaze (e.g., 750E and/or X750E) of the user of the computer system and in accordance with a determination that the gaze (e.g., 750E and/or X750E) of the user of the computer system ceases to be directed to the location corresponding to the first user interface element of the plurality of user interface elements after less than the threshold amount of time (e.g., if gaze 750E and/or gaze X750E moves off of element 740A at FIGS. 7M1 and/or 7M2), the computer system (e.g., 700 and/or X700) updates display (e.g., changing or highlighting), via the display generation component (e.g., 702 and/or X702), of the first user interface element (e.g., 740A) to have the first visual appearance. In some embodiments, the computer system has detected the gaze of the user of the computer system as being directed to the first user interface element for an amount of time that is less than the threshold amount of time and the appearance of the first user interface element changes to the second appearance for that amount of time before changing back to the first appearance once the computer system determines that the user is no longer directing their gaze at the first user interface element (because the threshold amount of time was not reached). In accordance with some embodiments, in response to detecting the gaze (e.g., 750E and/or X750E) of the user of the computer system and in accordance with a determination that the gaze (e.g., 750E and/or X750E) of the user of the computer system ceases to be directed to the location corresponding to the second user interface element of the plurality of user interface elements after less than the threshold amount of time, the computer system (e.g., 700 and/or X700) updates display (e.g., changing or highlighting), via the display generation component, of the second user interface element (e.g., 740E) to have the first visual appearance. In some embodiments, the computer system has detected the gaze of the user of the computer system as being directed to the second user interface element for an amount of time that is less than the threshold amount of time and the appearance of the second user interface element changes to the second appearance for that amount of time before changing back to the first appearance once the computer system determines that the user is no longer directing their gaze at the second user interface element (because the threshold amount of time was not reached). Updating display of a user interface element back to the original appearance if the user interface element is not dwelled on for long enough provides feedback that the gaze of the user has not dwelled on the user interface element for long enough.

In accordance with some embodiments, the first visual appearance varies (e.g., over time) based on a duration of time that the gaze of the user of the computer system has been directed to a location corresponding to a respective user interface element having the first visual appearance (e.g., 740A gets brighter in FIGS. 7M1 and/or 7M2 before reaching the brightness of 740A in FIG. 7N). In accordance with some embodiments, the second visual appearance varies (e.g., over time) based on a duration of time that the gaze of the user of the computer system has been directed to a location corresponding to the respective user interface element having the second visual appearance. Gradually updating display of a user interface element based on the duration of time that the gaze of the user has been directed to the user interface element provides the user with visual feedback that the gaze of the user is being detected as being directed to the user interface element, thereby providing the user with improved visual feedback.

In accordance with some embodiments, while detecting the gaze (e.g., 750E and/or X750E) of the user of the computer system, the computer system (e.g., 700 and/or X700) displays, via the display generation component (e.g., 702 and/or X702), an indication (e.g., 780) corresponding to a location of the gaze (e.g., 750E and/or X750E) of the user of the computer system (e.g., 700 and/or X700) such that the indication (e.g., 780) moves as a location of the gaze moves. In some embodiments, while the indication corresponding to the location of the gaze of the user of the computer system is displayed at a first portion of the user interface and/or display of the computer system, detecting movement of the gaze of the user of the computer system being directed to a second portion (different from the first portion) of the user interface and/or display of the computer system. In response to detecting the gaze of the user of the computer system being directed to the second portion, displaying, via the display generation component, the indication corresponding to the location of the gaze of the user of the computer system to the second portion of the user interface and/or display (e.g., by animating movement of the indication of the location of the gaze from the first portion to the second portion). Displaying an indication that follows the location of the gaze of the user provides the user with visual feedback about the detected location of the user's gaze, thereby providing the user with improved visual feedback.

In accordance with some embodiments, while detecting the gaze (e.g., 750E and/or X750E) of the user of the computer system and in accordance with a determination that the computer system has detected a first amount of data with respect to the gaze (e.g., gaze calibration data or a confidence level for whether the computer system has collected data to be able to determine that the gaze is directed to one or more locations), the computer system (e.g., 700 and/or X700) displays, via the display generation component (e.g., 702 and/or X702), the indication (e.g., 780) corresponding to a location of the gaze of the user of the computer system at a first size. In accordance with some embodiments, while detecting the gaze (e.g., 750E and/or X750E) of the user of the computer system and in accordance with a determination that the computer system has detected a second amount of data, different from the first amount of data, with respect to the gaze (e.g., gaze calibration data or a confidence level for whether the computer system has collected data to be able to determine that the gaze is directed to one or more locations), the computer system (e.g., 700 and/or X700) displays, via the display generation component (e.g., 702 and/or X702), the indication (e.g., 780) corresponding to a location of the gaze of the user of the computer system at a second size different from the first size (e.g., smaller or bigger). Changing the size of the indication of gaze as the computer system collects more data provides the user with visual feedback about an amount of data collected and/or an amount of accuracy able to be determined by the computer system.

In accordance with some embodiments, the second amount is more than the first amount, and the second size is smaller than the first size. Displaying the indication of gaze smaller as more data is collected provides feedback about an amount of data collected and/or an amount of accuracy able to be determined by the computer system.

In accordance with some embodiments, while displaying the plurality of user interface elements: in accordance with a determination that the user should gaze at a third user interface element (e.g., 740F) of the plurality of user interface elements, the computer system (e.g., 700 and/or X700) highlights, via the display generation component (e.g., 702 and/or X702), the third user interface element (e.g., 740F in FIG. 7P) without highlighting a fourth user interface element (e.g., 740A-740E in FIG. 7P) and in accordance with a determination that the user should gaze at a fourth user interface element, different from the third user interface element, of the plurality of user interface elements, the computer system (e.g., 700 and/or X700) highlights, via the display generation component (e.g., 702 and/or X702), the fourth user interface element without highlighting the third user interface element (e.g., 740F). Highlighting user interface elements which the user should gaze at provides the user with visual feedback about a location to gaze at to collect additional gaze information (e.g., because gaze information is missing for that location).

In accordance with some embodiments, in response to detecting the gaze (e.g., 750E and/or X750E) of the user of the computer system and in accordance with a determination that the gaze (e.g., 750E and/or X750E) of the user is directed to the location corresponding to the first user interface element (e.g., 740A) for more than the threshold amount of time, the computer system (e.g., 700 and/or X700) ceases to highlight (e.g., 742) the first user interface element (e.g., 740A as in FIG. 7N) and highlights (e.g., 742) the second user interface element (e.g., 740E as in FIG. 7N) (which was not previously highlighted). In some embodiments, the highlighting (e.g., bold border and/or circle around element) indicates which element the user should gaze at. In accordance with some embodiments, in response to detecting the gaze (e.g., 750E and/or X750E) of the user of the computer system and in accordance with a determination that the gaze (e.g., 750E and/or X750E) of the user is directed to the location corresponding to the second user interface element (e.g., 740E) for more than the threshold amount of time, the computer system (e.g., 700 and/or X700) ceases to highlight (e.g., 742) the second user interface element (e.g., 740E at FIG. 7P) and highlights (e.g., 742) a third user interface element (e.g., 740F at FIG. 7P) (which was not previously highlighted). In some embodiments, when a user interface element is highlighted, one or more of the other user interface elements are not highlighted. In some embodiments, when the first user interface element is highlighted, the second user interface element and the third user interface element are not highlighted. Similarly, in some embodiments, when the second user interface element is highlighted, the first user interface element and the third user interface element are not highlighted. Similarly, in some embodiments, when the third user interface element is highlighted, the first user interface element and the second user interface element are not highlighted. Highlighting a new user interface element after the gaze of the user has been directed to a previously highlighted user interface element for more than the threshold amount provides feedback about where the user should look next.

In some embodiments, aspects/operations of methods 800, 900, 1000, 1100, 1300, 1400, 1600, and/or 1700 may be interchanged, substituted, and/or added between these methods. For example, the technique of method 800 can be used to initiate the techniques of methods 900, 1000, 1100, 1300, 1400, 1600, and/or 1700. For another example, the various techniques can be performed sequentially. For brevity, these details are not repeated here.

FIG. 11 is a flow diagram of an exemplary method 1100 for moving a user interface element over time, in accordance with some embodiments. In some embodiments, method 1100 is performed at a computer system (e.g., computer system 101 in FIG. 1A) (e.g., a desktop computer, a portable device (e.g., a notebook computer, tablet computer, and/or handheld device), and/or a personal electronic device (e.g., a wearable electronic device, such as a watch or a head-mounted display)) that is in communication with a display generation component (e.g., display generation component 120 in FIGS. 1A, 3, and 4, display 702, and/or display X702) (e.g., a heads-up display, a display, a touchscreen, and/or a projector) and one or more input devices (e.g., a touchpad, a touch-sensitive display, one or more cameras, one or more eye-tracking components, and/or one or more hand-tracking components). In some embodiments, the display generation component is at least partially opaque. In some embodiments, the method 1100 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1100 are, optionally, combined and/or the order of some operations is, optionally, changed.

The computer system (e.g., 700 and/or X700) displays (1102), via the display generation component (e.g., 702 and/or X702), a user interface element (e.g., 770) (e.g., a dot, a fixation point, a fixation target, and/or a virtual object) that moves gradually over time.

While the user interface element (e.g., interface element 770) is moving gradually over time (e.g., as in FIGS. 7V-7X), the computer system (e.g., 700 and/or X700) detects (1104), via the one or more input devices, movement of one or more eyes (e.g., represented by gaze 750H and/or X750H) to track the moving user interface element. In some embodiments, the computer system is tracking whether the movement of the one or more eyes follows the moving user interface element (e.g., 770).

In response to detecting the movement of the one or more eyes and in accordance with a determination that sufficient information about the one or more eyes has been captured to enroll the one or more eyes (e.g., for gaze tracking and/or biometric authentication), the computer system (e.g., 700 and/or X700) provides (1106) feedback (e.g., display of target 714 as in FIG. 7Y) (e.g., audio, visual and/or haptic output) indicating that sufficient information has been captured. Detecting eye movement as the user interface element moves and providing feedback that sufficient information has been captured provides with used with feedback about a state of the computer system (e.g., that sufficient information has been captured, such as for future eye tracking, and that the user no longer needs to track the moving user interface element).

In accordance with some embodiments, in response to detecting the movement of the one or more eyes (e.g., represented by gaze 750H and/or X750H) and in accordance with a determination that sufficient information about the one or more eyes has not been captured to enroll the one or more eyes (e.g., for gaze tracking and/or biometric authentication), the computer system (e.g., 700 and/or X700) forgoes providing feedback (e.g., audio, visual and/or haptic output) indicating that sufficient information has been captured (e.g., does not display target 714 as in FIG. 7Y). Detecting eye movement as the user interface element moves and not providing feedback until sufficient information has been captured provides feedback about a state of the device (e.g., that sufficient information has not been captured yet, such as for future eye tracking, and that the user needs to continue to track the moving user interface element).

In accordance with some embodiments, in response to detecting the movement of the one or more eyes (e.g., represented by gaze 750H and/or X750H) and in accordance with a determination that sufficient information about the one or more eyes has not been captured to enroll the one or more eyes (e.g., for gaze tracking and/or biometric authentication), the computer system (e.g., 700 and/or X700) provides feedback (e.g., audio, visual and/or haptic output) indicating that sufficient information has not been captured (e.g., by continuing to move user interface element 770). Detecting eye movement as the user interface element moves and providing feedback even when sufficient information has not been captured provides feedback about a state of the device (e.g., that sufficient information has not been captured yet, such as for future eye tracking, and that the user needs to continue to track the moving user interface element).

In accordance with some embodiments, in response to detecting the movement of the one or more eyes (e.g., represented by gaze 750H and/or X750H) and in accordance with a determination that sufficient information about the one or more eyes has been captured to enroll the one or more eyes (e.g., for gaze tracking and/or biometric authentication), the computer system (e.g., 700 and/or X700) proceeds with enrolling a user (e.g., start a user enrollment process, continue a user enrollment process, and/or finish a user enrollment process), based on the detected movement of the one or more eyes, with a process being executed by the computer system (e.g., 700 and/or X700). In some embodiments, once sufficient information about the one or more eyes of the user has been captured to enroll the one or more eyes, the computer systems proceeds with enrolling the user (e.g., create or update a user profile associated with the user or create or update a user account associated with the user) using information that is based on the detected movement of the one or more eyes. In some embodiments, the process corresponds to an application provided by the manufacturer of the computer system. Enrolling the user with a process being executed by the computer system enables the user to use the computer system in the future without needing to re-perform eye capturing process for eye enrollment, thereby reducing the number of inputs needed to efficiently use the computer system.

In accordance with some embodiments, the user interface element (e.g., 770) is displayed as part of an extended reality environment (e.g., three-dimensional environment 712). While displaying the user interface element (e.g., 770) (e.g., stationary and/or moving), the computer system (e.g., 700 and/or X700) displays, via the display generation component (e.g., 702 and/or X702), light (e.g., as shown in FIGS. 7V-7X) being cast from the user interface element onto one or more (e.g., virtual and/or physical) objects that are part of the extended reality environment. In some embodiments, the one or more objects are different from the user interface element. In some embodiments, the source of light being cast from the user interface element moves in conjunction with the movement of the user interface element in the extended reality environment. In some embodiments, the amount of light being displayed on a surface of an object (e.g., a virtual object and/or a physical object) as being cast from the user interface element is based on a detected location (e.g., with respect to the user interface element) and/or size of the object. In some embodiments, the amount of light being displayed on a surface of an object as being cast from the user interface element is based on angles of surfaces of the object relative to the location of the user interface element and/or relative to a location of the viewpoint of the user of the computer system. In some embodiments, light from the user interface element is displayed as being cast onto one or more virtual objects and one or more physical objects in the extended reality environment. In some examples, the light from the user interface element is displayed as concurrently being cast onto one or more virtual objects and one or more physical objects. In some examples, the light from the user interface element is displayed as being cast onto one or more virtual objects before being cast onto one or more physical objects (e.g., as the user interface element moves around the extended reality environment). In some examples, the light from the user interface element is displayed as being cast onto one or more physical objects before being cast onto one or more virtual objects (e.g., as the user interface element moves around the extended reality environment). Displaying light being cast onto objects of the extended reality environment from the user interface element provides the user with visual feedback about the location of the user interface element, which is particularly helpful for identifying movement of the user interface element, thereby providing improved visual feedback.

In accordance with some embodiments, the one or more objects include one or more virtual objects (e.g., virtual couch 712A). In some embodiments, light being cast from the user interface element onto one or more virtual objects includes simulating a light source (in the three-dimensional environment) at the location of the user interface object (e.g., such that it appears that the user interface object is giving off light) and approximating the physics of light, such as through ray tracing and/or photon mapping, such that one or more surfaces of the one or more virtual objects is illuminated based on the simulated light source. In some embodiments, when light is not cast (in the three-dimensional environment) from the user interface object onto a virtual object, the appearance of the virtual object is darker than when light is cast (in the three-dimensional environment) from the user interface object onto the virtual object. Displaying light being cast from the user interface element onto one or more virtual objects of the extended reality environment provides the user with visual feedback about the location of the user interface element, which is particularly helpful for identifying movement of the user interface element, thereby providing improved visual feedback.

In accordance with some embodiments, the one or more objects include one or more physical objects (e.g., physical table 712B). In some embodiments, light being cast from the user interface element onto one or more physical objects includes simulating a light source (in the three-dimensional environment) at the location of the user interface object (e.g., such that it appears that the user interface object is giving off light) and approximating the physics of light, such as through ray tracing and/or photon mapping, such that one or more surfaces of the one or more physical objects appears to be illuminated based on the simulated light source. In a pass-through video implementation, the portions of the pass-through video corresponding to surfaces of the one or more physical objects are optionally brightened to simulate light on the respective surfaces. In a see-through display implementation, portions of the display corresponding to the surfaces of the one or more physical objects are optionally brightened and/or overlaid with brighter versions of the surfaces to simulate light on the respective surfaces. In some embodiments, when light is not cast (in the three-dimensional environment) from the user interface object onto a physical object, the appearance of the physical object is darker than when light is cast (in the three-dimensional environment) from the user interface object onto the virtual object. Displaying light being cast from the user interface element onto one or more physical objects of the extended reality environment provides the user with visual feedback about the location of the user interface element, which is particularly helpful for identifying movement of the user interface element, thereby providing improved visual feedback.

In accordance with some embodiments, while displaying the user interface element (e.g., 770) (e.g., stationary and/or moving), the computer system (e.g., 700 and/or X700) displays, via the display generation component (e.g., 702 and/or X702), a background (e.g., an area not including the user interface element) with a reduced brightness (as shown in FIG. 7V). In some embodiments, the background is a background of an extended reality environment. In some embodiments, displaying the background with a reduced brightness includes dimming the background (e.g., prior to displaying the user interface element or while the user interface element is displayed), such as to emphasize objects in the foreground (e.g., the user interface element). When the background includes a representation of a physical environment, displaying the background with a reduced brightness includes reducing a brightness of passthrough corresponding to the background (e.g., dimming an optical element through which optical passthrough of the physical environment is visible, or reducing a brightness of a display that is displaying virtual passthrough of the physical environment). Displaying the user interface element with a background that has a reduced brightness enables the computer system to emphasize the user interface element to draw the user's attention to the user interface element.

In accordance with some embodiments, the user interface element (e.g., 770) moves gradually over time along a fixed path (e.g., a circle). In some embodiments, the fixed path is a straight line. In some embodiments, the fixed path is curved. In some embodiments, the user interface element moving gradually over time moves along the fixed path. Moving the user interface element along a fixed path enables the path of movement to be independent from the user's ability to follow the user interface element.

In accordance with some embodiments, at least a portion of the fixed path is highlighted (e.g., by trail 770A). In some embodiments, the entire path is highlighted. In some embodiments, portions of the path not yet traversed by the user interface element are highlighted and portions of the path already traversed by the user interface element are no longer highlighted. Highlighting a portion of the fixed path provides the user with visual feedback about where the user interface element will move to and/or where the user interface element has moved from, thereby providing the user with improved visual feedback.

In accordance with some embodiments, the computer system (e.g., 700 and/or X700) displays, via the display generation component (e.g., 702 and/or X702), a trail (e.g., 770A) that follows the movement of the user interface element (e.g., 770) and that fades over time. In some embodiments, the trail is displayed along a portion of the path (e.g., without deviating from the path). In some embodiments, the trail indicates the portion of the path most recently traversed by the user interface element. In some embodiments, the oldest portion of the trail fades away while the most recent portion of the trail continues to be displayed (e.g., as the user interface element moves). Displaying a trail of the user interface element that fades over provides the user with visual feedback about where the user interface element has moved from, thereby providing the user with improved visual feedback.

In accordance with some embodiments, before displaying gradual movement of the user interface element the computer system (e.g., 700 and/or X700) displays, via the display generation component (e.g., 702 and/or X702), the user interface element (e.g., 770 and/or 714 at FIGS. 7B1 and/or 7B2) without moving (e.g., stationary) and detects, via the one or more input devices (e.g., a camera and/or a gaze-detection sensor), a gaze (e.g., 750H, X750H, 750A, and/or X750A) of a user of the computer system (e.g., 700 and/or X700). In response to detecting the gaze (e.g., 750H, X750H, 750A, and/or X750A) of the user and in accordance with a determination that the gaze of the user is directed to the user interface element (e.g., 770 and/or 714 at FIGS. 7B1 and/or 7B2) for a threshold amount of time (e.g., a threshold amount of time that is zero or greater than zero), the computer system (e.g., 700 and/or X700) initiates movement of the user interface element over time (e.g., gradually starting to move the user interface element at a speed that increases over time starting from a time when the gaze of the user was directed to the user interface element for the threshold amount of time). In some embodiments, in response to detecting the gaze of the user and in accordance with a determination that the gaze of the user is not directed to the user interface element for the threshold amount of time (e.g., the gaze of the user was not directed to the user interface element or the gaze of the user was not directed to the user interface element for the threshold amount of time), forgoing initiating moving the user interface element (maintaining the user interface element as stationary). Initiating gradual movement of the user interface element in response to the user gazing at the user interface element for a threshold amount of time enables the computer system to not move the user interface element until the user is ready to follow the movement of the user interface element, thereby improving the man-machine interface.

In some embodiments, aspects/operations of methods 800, 900, 1000, 1100, 1300, 1400, 1600, and/or 1700 may be interchanged, substituted, and/or added between these methods. For example, the technique of method 800 can be used to initiate the techniques of methods 900, 1000, 1100, 1300, 1400, 1600, and/or 1700. For another example, the various techniques can be performed sequentially. For brevity, these details are not repeated here.

FIGS. 12A-12X illustrate examples of gaze tracking enrollment. FIG. 13 is a flow diagram of an exemplary method 1300 for gaze tracking enrollment. FIG. 14 is a flow diagram of an exemplary method 1400 for providing feedback during gaze tracking enrollment. The user interfaces in FIGS. 12A-12X are used to illustrate the processes described below, including the processes in FIGS. 13 and 14.

FIG. 12A depicts electronic device 1200, which is a tablet that includes touch-sensitive display 1202, one or more input sensors 1204 (e.g., one or more cameras, eye gaze trackers, hand movement trackers, and/or head movement trackers), and one or more buttons 1206a-1206c. In some embodiments described below, electronic device 1200 is a tablet. In some embodiments, electronic device 1200 is a smart phone, a wearable device, a wearable smartwatch device, a head-mounted system (e.g., a headset), or other computer system that includes and/or is in communication with one or more display devices (e.g., display screen, projection device, or the like). In some embodiments in which electronic device 1200 is a head-mounted system, electronic device 1200 optionally includes two displays (e.g., one for each eye of a user), with each display displaying respective various content, to enable a user of electronic device 1200 to perceive the various depths of the various content (e.g., physical objects and/or virtual objects) of three-dimensional environments. Electronic device 1200 is a computer system (e.g., computer system 101 in FIG. 1A).

At FIG. 12A, electronic device 1200 displays user interface 1210 overlaid on three-dimensional environment 1208. In the depicted scenario, three-dimensional environment 1208 includes objects 1208a-1208c. In some embodiments, three-dimensional environment 1208 is displayed by a display (e.g., display 1202, as depicted in FIG. 12A). In some embodiments, three-dimensional environment 1208 includes a virtual environment or an image (or video) of a physical environment captured by one or more cameras (e.g., one or more cameras that are part of input sensors 1204 and/or one or more external cameras). For example, in some embodiments, object 1208a is a virtual object that is representative of a physical object that has been captured by one or more cameras and/or detected by one or more sensors; and object 1208b is a virtual object that is representative of a second physical object that has been captured by one or more cameras and/or detected by one or more sensors, and so forth. In some embodiments, three-dimensional environment 1208 is visible to a user behind user interface 1210 but is not displayed by a display. For example, in some embodiments, three-dimensional environment 1208 is a physical environment (and, for example, objects 1208a-1208c are physical objects) that is visible to a user (e.g., through one or more transparent displays) behind user interface 1210 without being displayed by a display. In some embodiments, user interface 1210 and/or three-dimensional environment 1208 are part of an extended reality experience.

In some embodiments, user interface 1210 corresponds to input enrollment for a particular type of user input. In some embodiments, user interface 1210 corresponds to input enrollment for gaze inputs (e.g., eye-based user inputs). At FIG. 12A, electronic device 1200 detects user input 1212. In FIG. 12A, user input 1212 is a tap input on touch-sensitive display 1202. However, in some embodiments, user input 1212 is a different type of user input, such as a gesture or other action taken by a user. For example, in some embodiments, electronic device 1200 is a head-mounted system, and detecting user input 1212 includes, for example, detecting a user performing a gesture (e.g., an air gesture (e.g., an air tap gesture; and/or an air pinch gesture)) while electronic device 1200 is worn, detecting a button press while electronic device 1200 is worn, detecting rotation of a rotatable input mechanism while electronic device 1200 is worn, detecting a gaze-based gesture (e.g., detecting the user looking at an object and/or moving his or her gaze in a particular manner), and/or any combination of the foregoing (e.g., detecting a gaze at user interface 1210 in conjunction with an air pinch gesture).

Figure 12B:
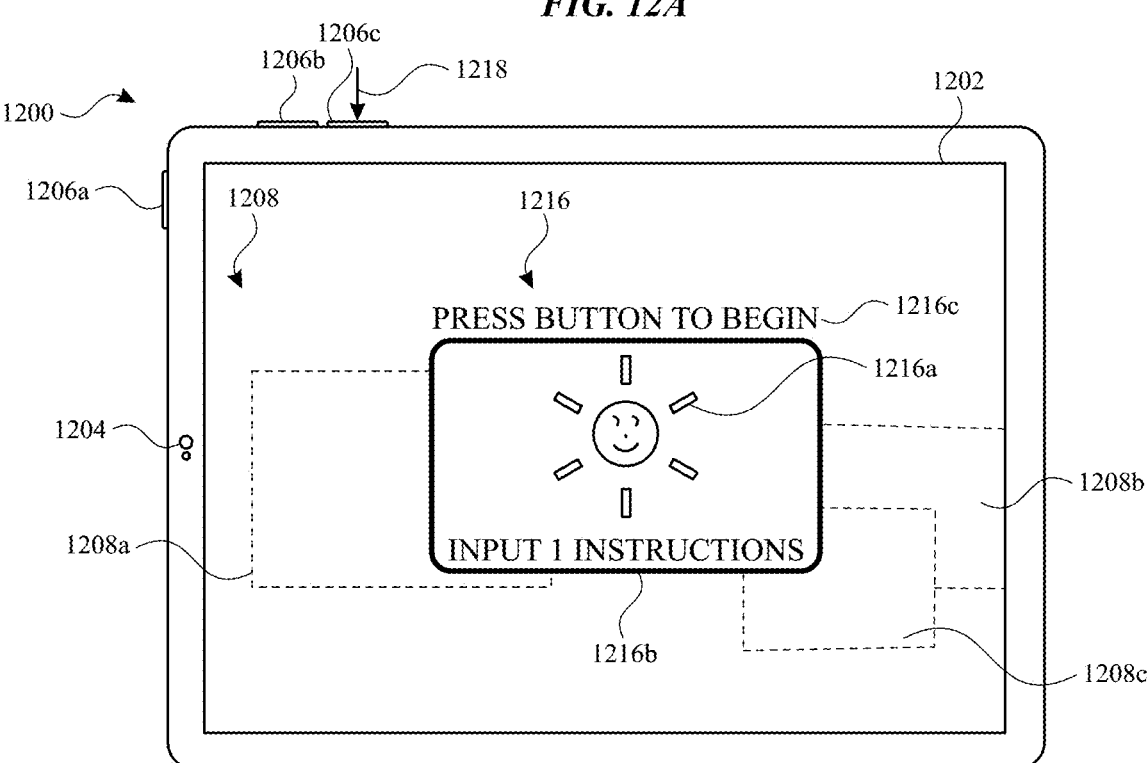

At FIG. 12B, in response to detecting user input 1212, electronic device 1200 changes a brightness of three-dimensional environment 1208, and displays user interface 1216. In some embodiments, user interface 1216 corresponds to a gaze tracking enrollment process in which a user is instructed to look sequentially at a plurality of gaze targets, and biometric information (e.g., one or more scans of the user's eyes) is collected while the user looks at the gaze targets. In some embodiments, the brightness of three-dimensional environment 1208 is changed in order to cause the eyes of the user to dilate more or dilate less for the gaze tracking enrollment process. In the depicted embodiment, user interface 1216 includes introduction animation 1216a which provides a user with a preview of the gaze tracking enrollment process, as well as instructions 1216b instructing the user on how to perform gaze tracking enrollment. For example, in some embodiments, animation 1216a shows a plurality of gaze targets positioned around a representation of a user (e.g., a face), and instruction 1216b instructs the user to look at each gaze target as it is displayed until a subsequent gaze target is displayed. User interface 1216 also includes instruction 1216c instructing the user to press a button to begin gaze tracking enrollment. At FIG. 12B, electronic device 1200 detects user input 1218, which is a press of button 1206c.

Figure 12C:
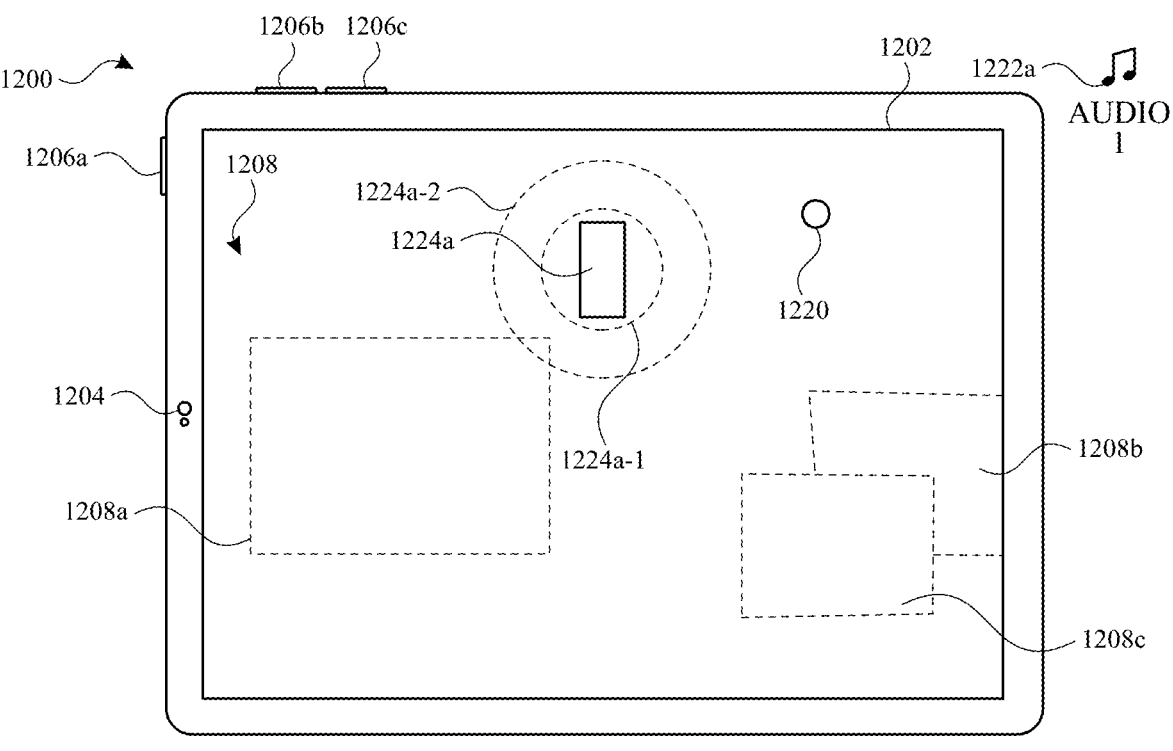

At FIG. 12C, in response to detecting user input 1218, electronic device 1200 displays gaze target 1224a and outputs audio output 1222a. In some embodiments, audio output 1222a is a background audio output that is output during the gaze tracking enrollment process. In the depicted embodiment, gaze target 1224a is surrounded by a first region 1224a-1, and a second region 1224a-2. In some embodiments, region 1224a-1 and region 1224a-2 and/or gaze target 1224a are concentric. As the gaze of the user approaches gaze target 1224a and enters region 1224a-2, electronic device 1200 outputs audio feedback. When the gaze of the user is within region 1224a-1, electronic device 1200 captures biometric information (e.g., one or more scans of the user's eyes) while the gaze of the user is maintained within region 1224a-1. At FIG. 12C, the gaze of the user is outside of regions 1224a-1 and 1224a-2, as indicated by gaze indication 1220. In some embodiments, gaze indication 1220 is provided in the figures to provide an indication of where the gaze of the user is detected, and is not a displayed and/or visible object. In some embodiments, regions 1224a-1 and 1224a-2 (and corresponding regions for other gaze targets described in later figures) are depicted in the figures to provide an explanation of the techniques described herein, and are not displayed and/or visible objects.

Figure 12D:
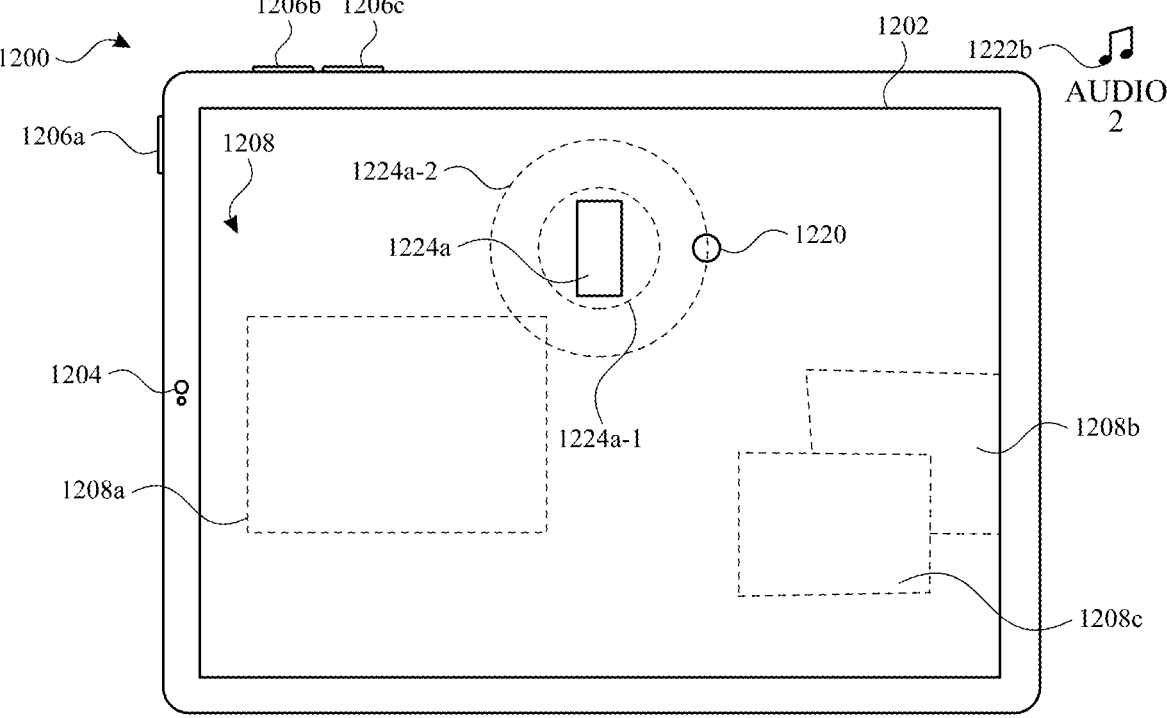

At FIG. 12D, electronic device 1200 detects that the gaze of the user has moved into region 1224a-2. In response to detecting that the gaze of the user has moved into region 1224a-2, electronic device 1200 outputs audio output 1222b. In some embodiments, audio output 1222b indicates that the gaze of the user is approaching gaze target 1224a (e.g., audio output 1222b is a proximity indication). In some embodiments, audio output 1222b includes one or more tones and/or notes (e.g., one or more tones and/or notes indicative of proximity to the gaze target) layered on audio output 1222a (e.g., a default and/or background audio output).

Figure 12E:
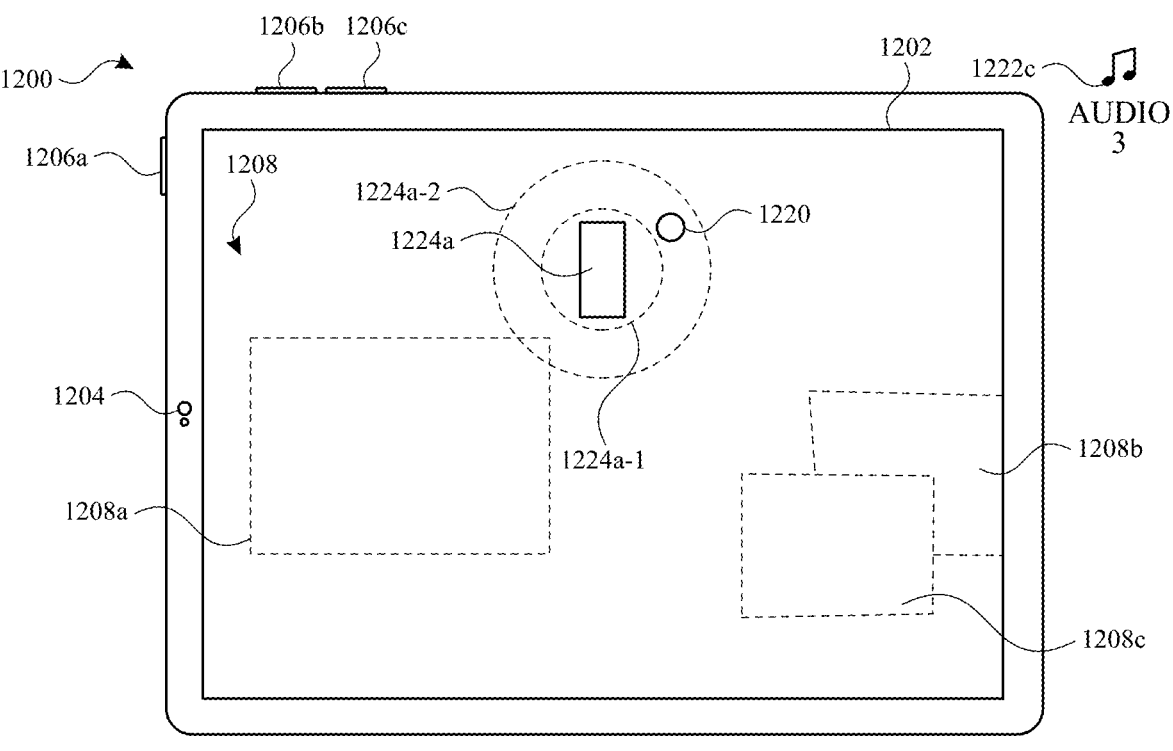

At FIG. 12E, electronic device 1200 detects that the gaze of the user has moved deeper into region 1224a-2 and is closer to gaze target 1224a. In response to detecting that the gaze of the user has moved closer to gaze target 1224a, electronic device 1200 outputs audio output 1222c. In some embodiments, audio output 1222c is different from audio output 1222b. In some embodiments, audio output 1222c representations a modification of one or more audio characteristics of audio output 1222b. For example, in some embodiments, as the gaze of the user moves closer to gaze target 1224a, the audio output increases in pitch and/or volume.

Figure 12F:
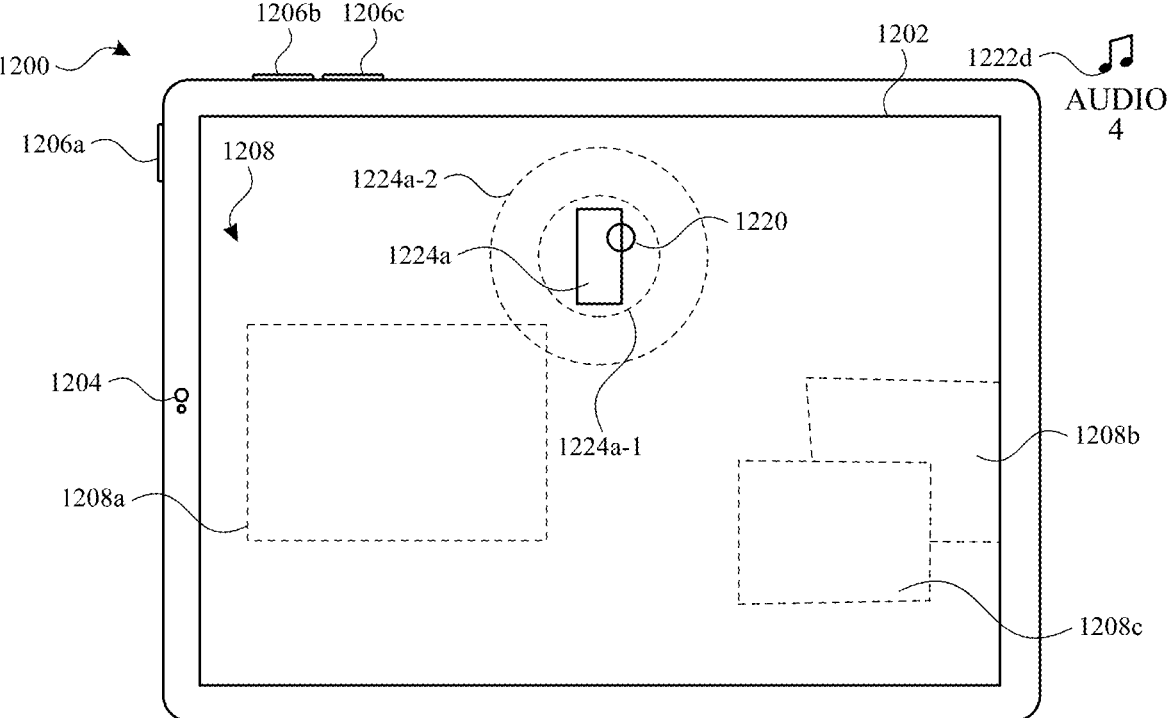

At FIG. 12F, electronic device 1200 detects that the gaze of the user is now in region 1224a-1. In response to detecting that the gaze of the user is now in region 1224a-1, electronic device 1200 outputs audio output 1222d. In some embodiments, audio output 1222d is different from audio output 1222c. In some embodiments, audio output 1222d layers one or more tones and/or notes on top of audio output 1222c. Furthermore, in response to detecting that the gaze of the user is now in region 1224a-1, electronic device 1200 collects biometric information corresponding to the user while the gaze of the user is maintained within region 1224a-1. In some embodiments, if the user stops looking within region 1224a-1, electronic device 1200 ceases collection of biometric information until the gaze of the user returns to region 1224a-1. In some embodiments, the user is required to look within region 1224a-1 for a threshold duration of time (e.g., cumulatively and/or in an uninterrupted or substantially uninterrupted fashion) in order to progress the gaze tracking enrollment process.

Figure 12G:
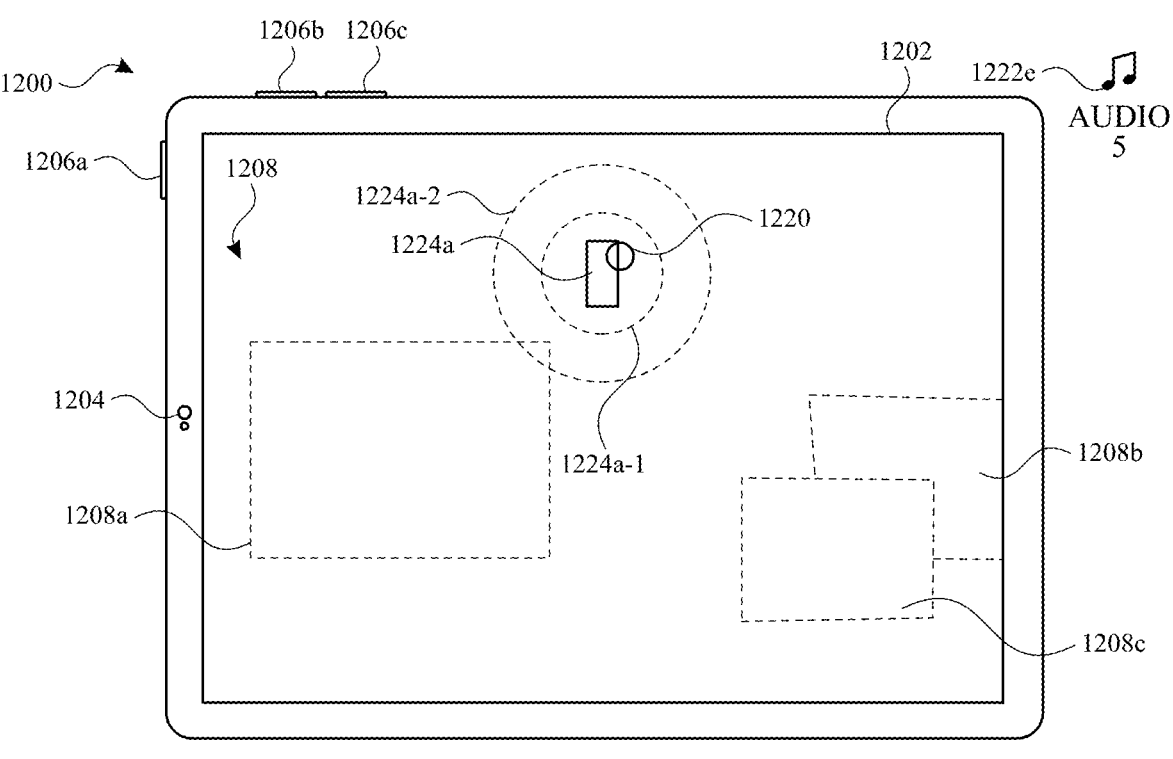

At FIG. 12G, electronic device 1200 detects that the gaze of the user is maintained within region 1224a-1, and continues to collect biometric information (e.g., one or more eye scans) from the user. In response to detecting that the gaze of the user has been maintained within region 1224a-1, electronic device 1200 outputs audio output 1222e. In some embodiments, audio output 1222e is different from audio output 1222d. In some embodiments, audio output 1222e represents modification of audio output 1222d in one or more audio characteristics. For example, in some embodiments, as the user maintains his or her gaze on region 1224a-1 and/or gaze target 1224a, the audio output of electronic device 1200 increases in pitch and/or volume. Furthermore, in FIG. 12G, in response to detecting that the gaze of the user has been maintained within region 1224a-1, electronic device 1200 displays gaze target 1224a shrinking in size.

Figure 12H:
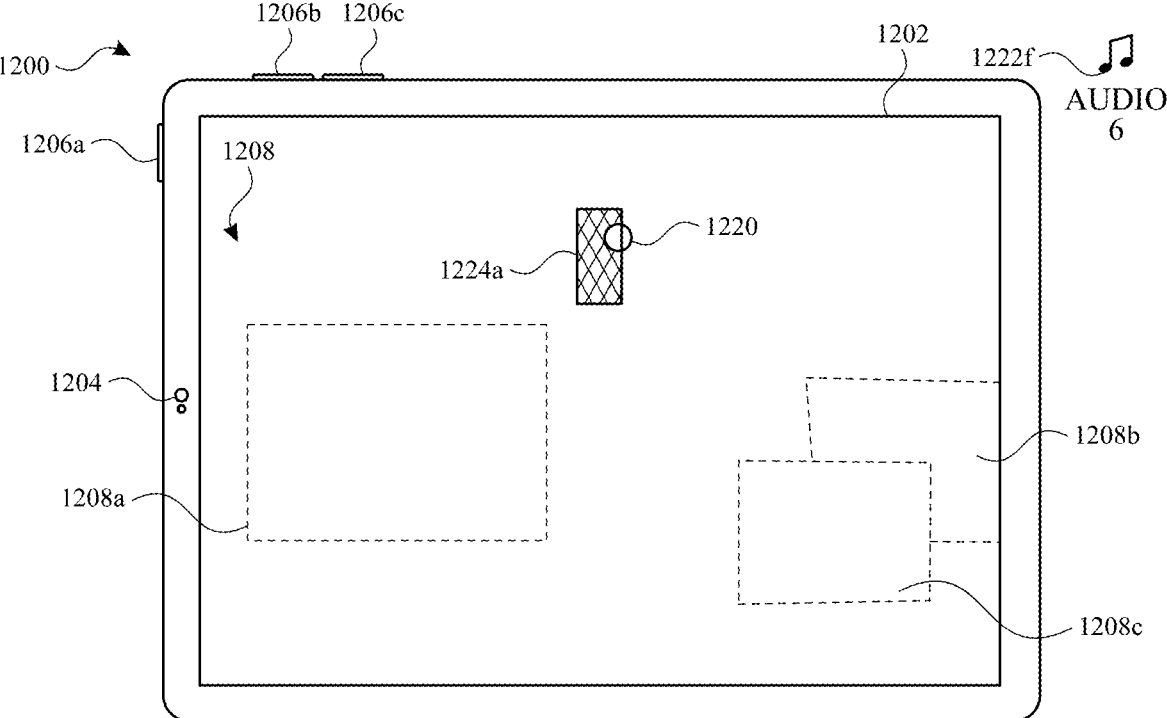

At FIG. 12H, electronic device 1200 detects that the gaze of the user has been maintained on gaze target 1224a (e.g., within region 1224a-1) for a threshold duration of time and/or for a sufficiently long time to capture the needed biometric information from the user. In response to this determination, electronic device 1200 outputs audio output 1222*f,* and displays gaze target 1224*a* increasing in size (e.g., back to its original size). In some embodiments, gaze target 1224*a* is also changed in one or more visual characteristics (e.g., color, shape, and/or opacity) to indicate that gaze tracking enrollment for gaze target 1224*a* has been completed. In some embodiments, audio output 1222*f* is different from audio output 1222*e*. In some embodiments, audio output 1222*f* is indicative of successful completion of gaze tracking enrollment corresponding to gaze target 1224*a*. As will be seen in later figures, the gaze tracking enrollment process includes display of a plurality of gaze targets and similar collection of biometric information (e.g., user gaze information) as the user looks at the gaze targets. In some embodiments, each gaze target corresponds to a collection of audio outputs (e.g., in some embodiments, a unique collection of audio outputs corresponding uniquely to each respective gaze target). For example, in some embodiments, gaze target 1224*a* corresponds to a first proximity audio output having a particular note and/or collection of notes that is output while the gaze of the user is in region 1224*a*-2, a first progression audio output having a second note and/or collection of notes that is output while the gaze of the user is in region 1224*a*-1, and a first success audio output having a third note and/or collection of notes that is output when gaze enrollment corresponding to gaze target 1224*a* is successfully completed. In some embodiments, different gaze targets have different proximity audio outputs, progression audio outputs, and/or success audio outputs. In some embodiments, the proximity audio output, the progression audio output, and the success audio output for gaze target 1224*a* are selected to be tonally harmonious. In some embodiments, the proximity audio output, the progression audio output, and the success audio output for gaze target 1224*a* are selected to be tonally harmonious with a background audio output (e.g., audio output 1222*a*). In some embodiments, proximity audio outputs, progression audio outputs, and success audio outputs for all gaze targets are selected to be tonally harmonious with one another and/or a background audio output.

Figure 12I:
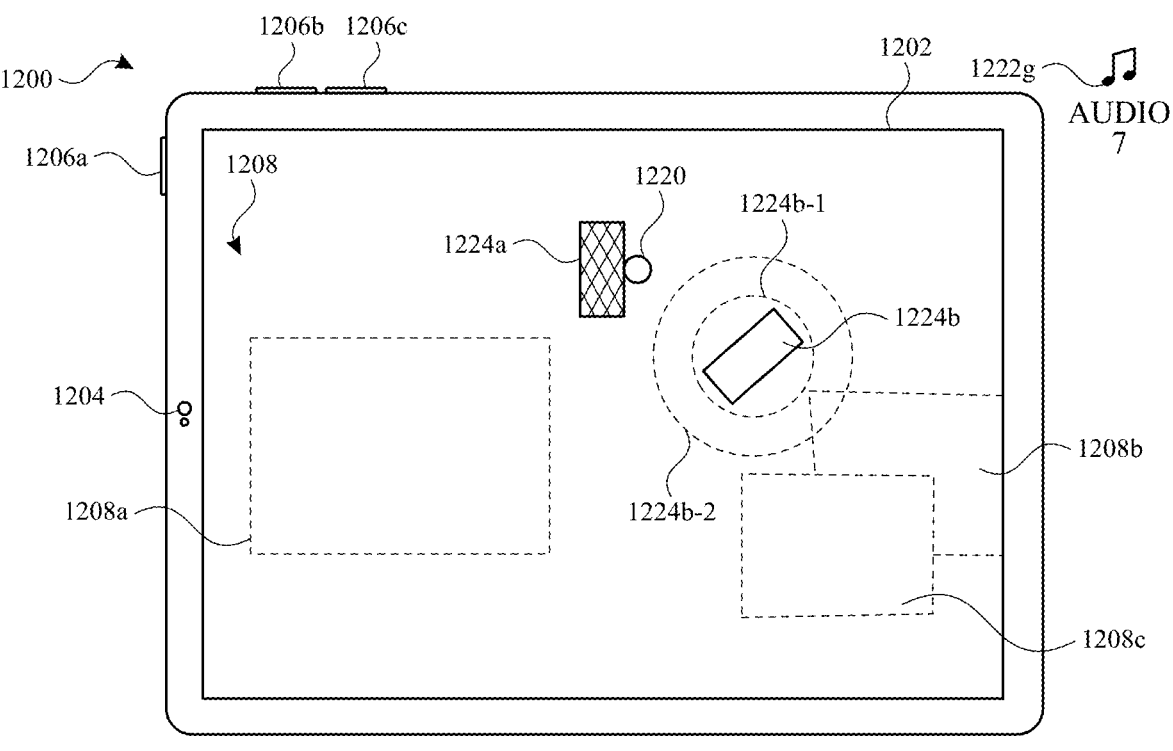

At FIG. 12I, in response to successful completion of gaze tracking enrollment at gaze target 1224*a*, electronic device 1200 displays a next gaze target 1224*b*. While displaying gaze target 1224*b*, electronic device 1200 outputs audio output 1222*g*. In some embodiments, audio output 1222*g* is a background audio output. In some embodiments, audio output 1222*g* is the same as audio output 1222*a*. Similar to gaze target 1224*a*, gaze target 1224*b* is surrounded by two regions 1224*b*-1, 1224*b*-2.

Figure 12J:
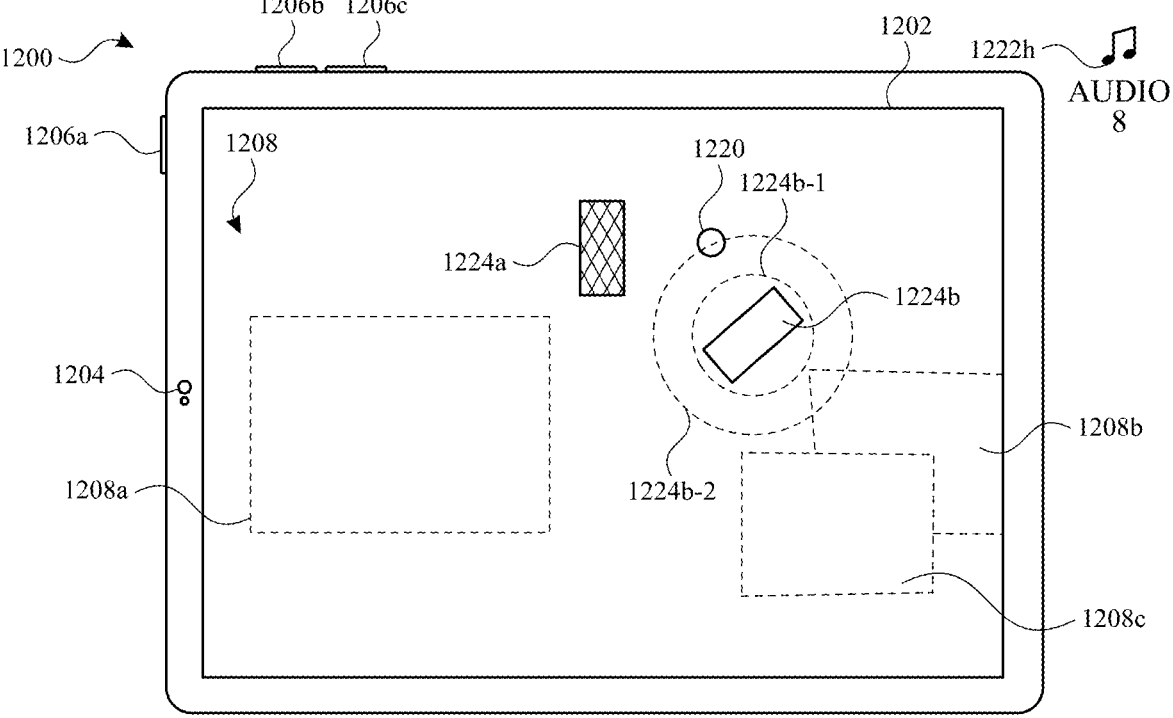

At FIG. 12J, electronic device 1200 detects that the gaze of the user has moved within region 1224*b*-2, as indicated by gaze indication 1220 and, in response, outputs audio output 1222*h*. In some embodiments, audio output 1222*h* indicates that the gaze of the user is approaching gaze target 1224*b* (e.g., audio output 1222*h* is a proximity indication and/or a proximity audio output). In some embodiments, audio output 1222*h* includes one or more tones and/or notes (e.g., one or more tones and/or notes indicative of proximity to the gaze target) layered on audio output 1222*g* (e.g., a default and/or background audio output).

Figure 12K:
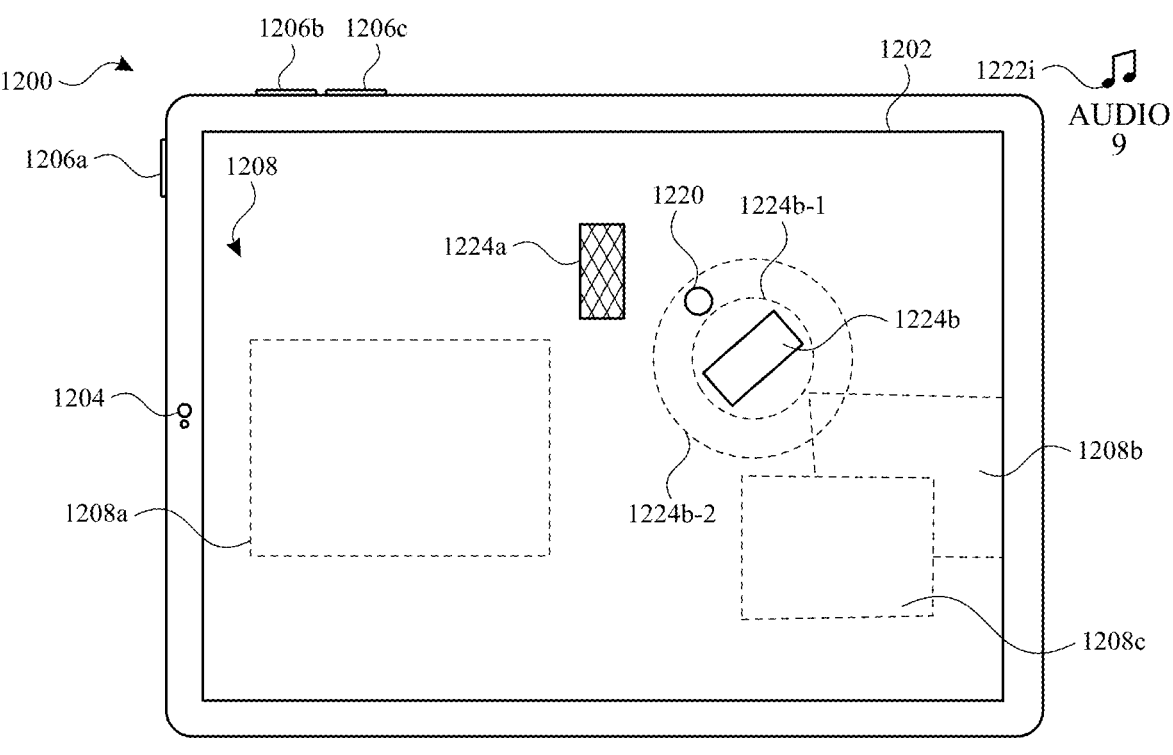

At FIG. 12K, electronic device 1200 detects that the gaze of the user has moved deeper into region 1224*b*-2 and is closer to gaze target 1224*b*. In response to detecting that that the gaze of the user has moved closer to gaze target 1224*b*, electronic device 1200 outputs audio output 1222*i*. In some embodiments, audio output 1222*i* is different from audio output 1222*h*. In some embodiments, audio output 1222*i* representations a modification of one or more audio characteristics of audio output 1222*h*. For example, in some embodiments, as the gaze of the user moves closer to gaze target 1224*b*, the audio output increases in pitch and/or volume.

Figure 12L:
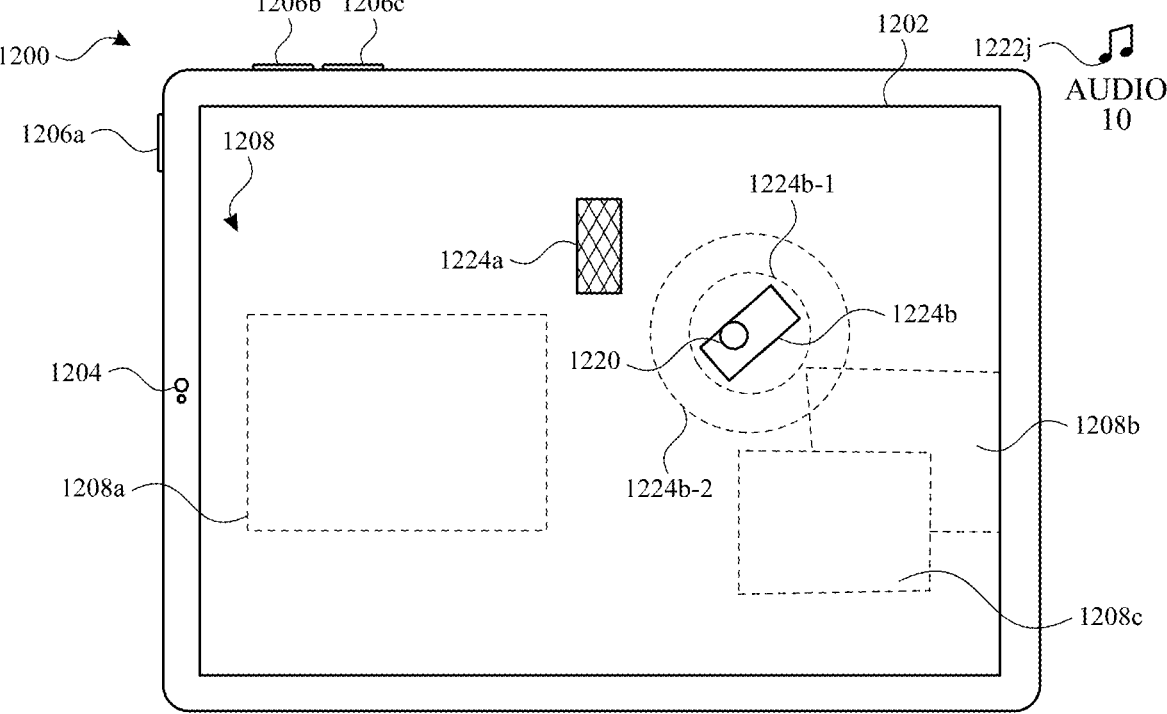

At FIG. 12L, electronic device 1200 detects that the gaze of the user is now in region 1224*b*-1. In response to detecting that the gaze of the user is now in region 1224*b*-1, electronic device 1200 outputs audio output 1222*j*. In some embodiments, audio output 1222*j* is different from audio output 1222*i*. In some embodiments, audio output 1222*j* layers one or more tones and/or notes on top of audio output 1222*i*. Furthermore, in response to detecting that the gaze of the user is now in region 1224*b*-1, electronic device 1200 collects biometric information corresponding to the user while the gaze of the user is maintained within region 1224*b*-1. In some embodiments, if the user stops looking within region 1224*b*-1, electronic device 1200 ceases collection of biometric information until the gaze of the user returns to region 1224*b*-1. In some embodiments, the user is required to look within region 1224*b*-1 for a threshold duration of time (e.g., cumulatively and/or in an uninterrupted or substantially uninterrupted fashion) in order to progress the gaze tracking enrollment process.

At FIG. 12M1, electronic device 1200 detects that the gaze of the user is maintained within region 1224*b*-1, and continues to collect biometric information (e.g., one or more eye scans) from the user. In response to detecting that the gaze of the user has been maintained within region 1224*b*-1, electronic device 1200 outputs audio output 1222*k*. In some embodiments, audio output 1222*k* is different from audio output 1222*j*. In some embodiments, audio output 1222*k* represents modification of audio output 1222*j* in one or more audio characteristics. For example, in some embodiments, as the user maintains his or her gaze on region 1224*b*-1 and/or gaze target 1224*b*, the audio output of electronic device 1200 increases in pitch and/or volume. Furthermore, in FIG. 12M1, in response to detecting that the gaze of the user has been maintained within region 1224*b*-1, electronic device 1200 displays gaze target 1224*b* shrinking in size.

In some embodiments, the techniques and user interface (s) described in FIGS. 12A-12X are provided by one or more of the devices described in FIGS. 1A-1P. For example, FIG. 12M2 illustrates an embodiment in which gaze target 1224*b* (e.g., as described in FIGS. 12I-12M1) is displayed on display module X702 of head-mounted device (HMD) X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

At FIG. 12M2, HMD X700 detects that the gaze of the user is maintained within region 1224*b*-1, and continues to collect biometric information (e.g., one or more eye scans) from the user. In response to detecting that the gaze of the user has been maintained within region 1224*b*-1, HMD X700 outputs audio output X1222*k*. In some embodiments, audio output X1222*k* is different from audio output 1222*j*. In some embodiments, audio output X1222*k* represents modification of audio output 1222*j* in one or more audio characteristics. For example, in some embodiments, as the user maintains his or her gaze on region 1224*b*-1 and/or gaze target 1224*b*, the audio output of HMD X700 increases in pitch and/or volume. Furthermore, in FIG. 12M2, in response to detecting that the gaze of the user has been maintained within region 1224*b*-1, HMD X700 displays gaze target 1224*b* shrinking in size.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, either alone or in any combination. In some embodiments, HMD X700 includes one or more input devices, which include any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output X1222*k*), optionally generated based on detected events and/or user inputs detected by the HMD X700.

Figure 12N:
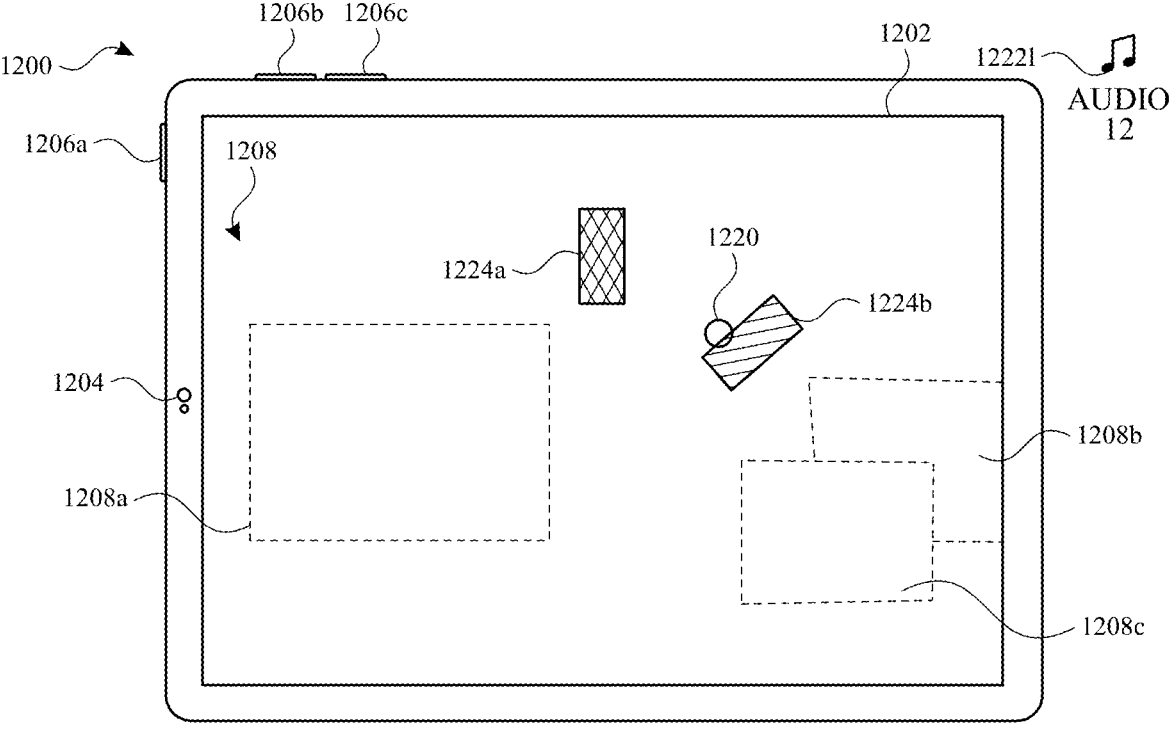

At FIG. 12N, electronic device 1200 detects that the gaze of the user has been maintained on gaze target 1224*b* (e.g., within region 1224*b*-1) for a threshold duration of time and/or for a sufficiently long time to capture the needed biometric information from the user. In response to this determination, electronic device 1200 outputs audio output 1222l, and displays gaze target 1224*b* increasing in size (e.g., back to its original size). In some embodiments, gaze target 1224*b* is also changed in one or more visual characteristics (e.g., color, shape, and/or opacity) to indicate that gaze tracking enrollment corresponding to gaze target 1224*b* has been completed. In some embodiments, audio output 1222l is different from audio output 1222*k*. In some embodiments, audio output 1222l is indicative of successful completion of gaze tracking enrollment corresponding to gaze target 1224*b*. As described above, in some embodiments, each gaze target corresponds to a collection of audio outputs (e.g., in some embodiments, a unique collection of audio outputs corresponding uniquely to each respective gaze target). For example, in some embodiments, gaze target 1224*b* corresponds to a proximity audio output having a particular note and/or collection of notes that is output while the gaze of the user is in region 1224*b*-2, a progression audio output having a second note and/or collection of notes that is output while the gaze of the user is in region 1224*b*-1, and a success audio output having a third note and/or collection of notes that is output when gaze enrollment corresponding to gaze target 1224*b* is successfully completed. In some embodiments, the proximity audio output, the progression audio output, and the success audio output for gaze target 1224*b* are selected to be tonally harmonious. In some embodiments, the proximity audio output, the progression audio output, and the success audio output for gaze target 1224*b* are selected to be tonally harmonious with a background audio output (e.g., audio output 1222*g*). In some embodiments, proximity audio outputs, progression audio outputs, and success audio outputs for all gaze targets are selected to be tonally harmonious with one another and/or a background audio output.

Figure 12O:
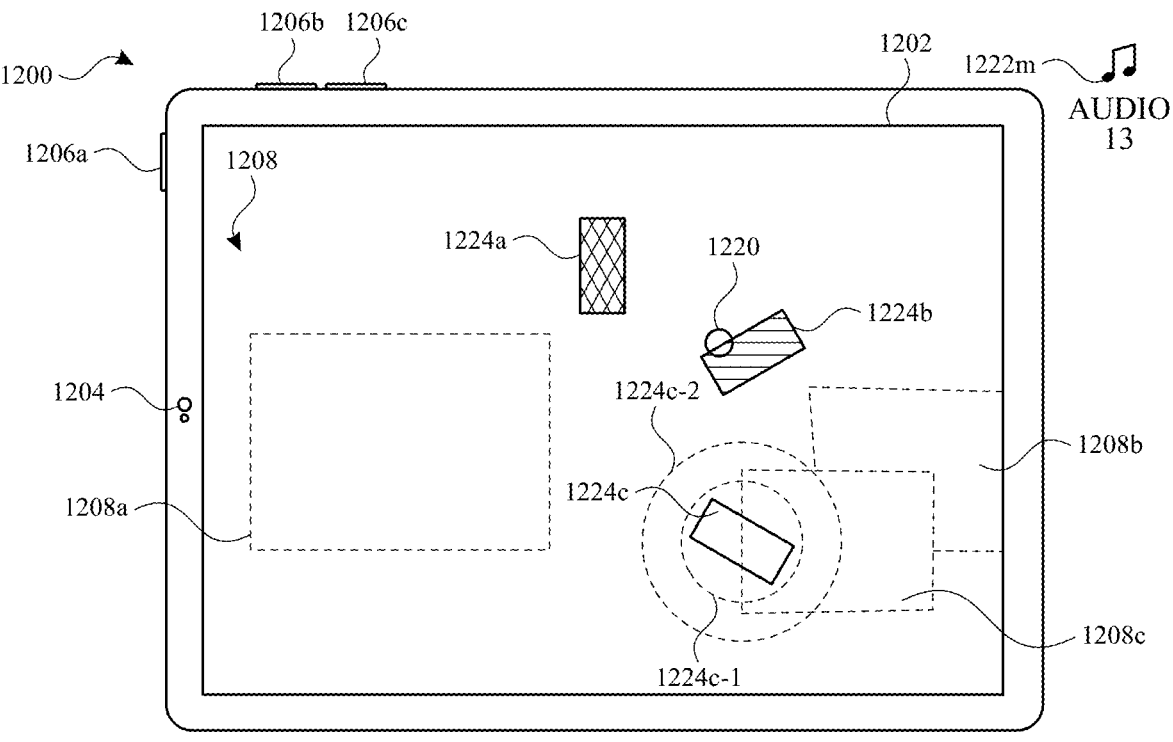

At FIG. 12O, in response to successful completion of gaze tracking enrollment at gaze target 1224*b*, electronic device 1200 displays a next gaze target 1224*c*. While displaying gaze target 1224*c*, electronic device 1200 outputs audio output 1222*n*. In some embodiments, audio output 1222*n* is a background audio output. In some embodiments, audio output 1222*n* is the same as audio output 1222*a* and/or audio output 1222*g*. Similar to gaze target 1224*a* and gaze target 1224*b*, gaze target 1224*c* is surrounded by two regions 1224*c*-1, 1224*c*-2.

Figure 12P:
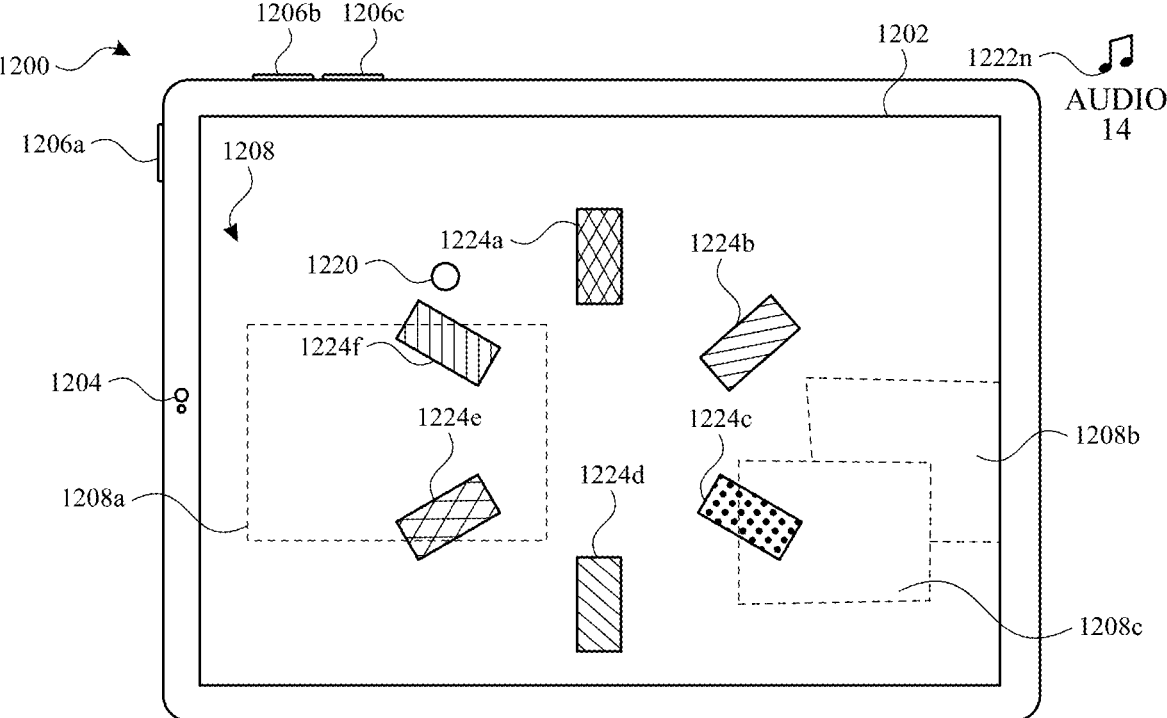

FIG. 12P skips forward, and gaze tracking enrollment for six gaze targets 1224*a*-1224*f* has now been completed (e.g., in a manner similar to that described above with reference to gaze targets 1224*a*, 1224*b*). At FIG. 12P, in response to determining that gaze tracking enrollment has been completed for all gaze targets, electronic device 1200 outputs audio output 1222*n* indicative of successful completion of this stage in the gaze tracking enrollment process.

Figure 12Q:
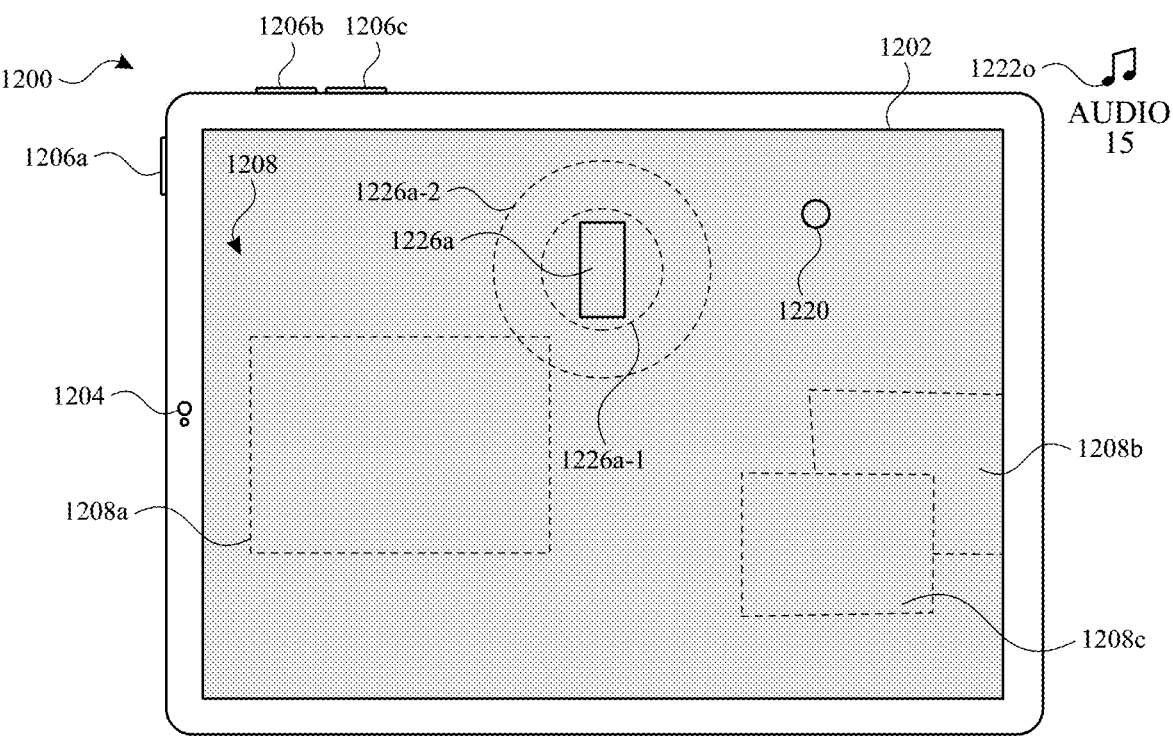

In some embodiments, the gaze tracking enrollment process includes a plurality of stages, and FIGS. 12C-12P represent a first stage in the gaze tracking enrollment process. In some embodiments, the various stages are displayed at different brightness levels in order to collect eye scans from the user while the user's pupils are in various states of dilation. At FIG. 12Q, subsequent to successful completion of the first stage of gaze tracking enrollment, electronic device 1200 displays gaze target 1226*a* (e.g., in some embodiments, at the location gaze target 1224*a* was previously displayed). In FIG. 12Q, three-dimensional environment 1208 is displayed at a less bright and/or darker brightness than in FIGS. 12C-12P, and gaze target 1226*a* is darker than gaze target 1224*a*. With the brightness of displayed components changed to a darker brightness, electronic device 1200 repeats the gaze tracking enrollment process that was described above with reference to FIGS. 12C-12P. In FIG. 12Q, electronic device 1200 displays gaze target 1226*a*, and outputs audio output 1222*p*. In some embodiments, audio output 1222*p* is a background audio output that is output during the gaze tracking enrollment process. In some embodiments, audio output 1222*p* is the same as audio output 1222*a*. In some embodiments, 1222*p* is different from audio output 1222*a*. For example, in some embodiments, for darker enrollment stages, the background audio output is lower in pitch than for brighter enrollment stages. In the depicted embodiment, gaze target 1226*a* is surrounded by a first region 1226*a*-1, and a second region 12246-2. In some embodiments, region 1226-1, region 1226-2 and/or gaze target 1226*a* are concentric.

Figure 12R:
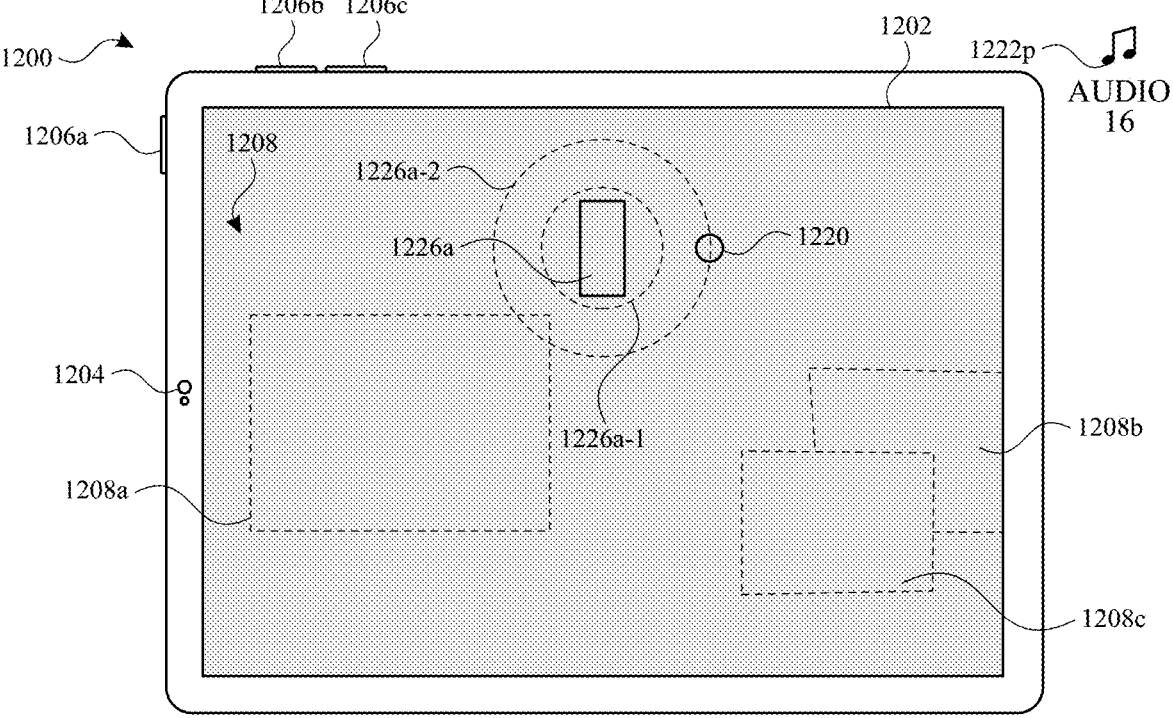

At FIG. 12R, electronic device 1200 detects that the gaze of the user has moved into region 1226*a*-2. In response to detecting that the gaze of the user has moved into region 12246-2, electronic device 1200 outputs audio output

1222p. In some embodiments, audio output 1222p indicates that the gaze of the user is approaching gaze target 1226a (e.g., audio output 1222p is a proximity indication and/or a proximity audio output). In some embodiments, audio output 1222p includes one or more tones and/or notes (e.g., one or more tones and/or notes indicative of proximity to the gaze target) layered on audio output 1222o (e.g., a default and/or background audio output).

At FIG. 12S, electronic device 1200 detects that the gaze of the user is now in region 1226a-1. In response to detecting that the gaze of the user is now in region 1226a-1, electronic device 1200 outputs audio output 1222q. In some embodiments, audio output 1222q is different from audio output 1222p. In some embodiments, audio output 1222q layers one or more tones and/or notes on top of audio output 1222p. Furthermore, in response to detecting that the gaze of the user is now in region 1226a-1, electronic device 1200 collects biometric information corresponding to the user while the gaze of the user is maintained within region 1226a-1. In some embodiments, if the user stops looking within region 12246-1, electronic device 1200 ceases collection of biometric information until the gaze of the user returns to region 12246-1. In some embodiments, the user is required to look within region 12246-1 for a threshold duration of time (e.g., cumulatively and/or in an uninterrupted or substantially uninterrupted fashion) in order to progress the gaze tracking enrollment process.

At FIG. 12T1, electronic device 1200 detects that the gaze of the user is maintained within region 1226a-1, and continues to collect biometric information (e.g., one or more eye scans) from the user. In response to detecting that the gaze of the user has been maintained within region 1226a-1, electronic device 1200 outputs audio output 1222r. In some embodiments, audio output 1222r is different from audio output 1222q. In some embodiments, audio output 1222r represents modification of audio output 1222q in one or more audio characteristics. For example, in some embodiments, as the user maintains his or her gaze on region 1226a-1 and/or gaze target 1226a, the audio output of electronic device 1200 increases in pitch and/or volume. Furthermore, in FIG. 12T1, in response to detecting that the gaze of the user has been maintained within region 1226a-1, electronic device 1200 displays gaze target 1226a shrinking in size.

In some embodiments, the techniques and user interface(s) described in FIGS. 12A-12X are provided by one or more of the devices described in FIGS. 1A-1P. For example, FIG. 12T2 illustrates an embodiment in which gaze target 1226a (e.g., as described in FIGS. 12Q-12T1) is displayed on display module X702 of head-mounted device (HMD) X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

At FIG. 12T2, HMD X700 detects that the gaze of the user is maintained within region 1226a-1, and continues to collect biometric information (e.g., one or more eye scans) from the user. In response to detecting that the gaze of the user has been maintained within region 1226a-1, HMD X700 outputs audio output X1222r. In some embodiments, audio output X1222r is different from audio output 1222q. In some embodiments, audio output X1222r represents modification of audio output 1222q in one or more audio characteristics. For example, in some embodiments, as the user maintains his or her gaze on region 1226a-1 and/or gaze target 1226a, the audio output of HMD X700 increases in pitch and/or volume. Furthermore, in FIG. 12T2, in response to detecting that the gaze of the user has been maintained within region 1226a-1, HMD X700 displays gaze target 1226a shrinking in size.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122a-b, first and second rear-facing display screens 1-322a, 1-322b, display 11.3.2-104, first and second display assemblies 1-120a, 1-120b, display assembly 1-320, display assembly 1-421, first and second display sub-assemblies 1-420a, 1-420b, display assembly 3-108, display assembly 11.3.2-204, first and second optical modules 11.1.1-104a and 11.1.1-104b, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110a-f, either alone or in any combination. In some embodiments, HMD X700 includes one or more input devices, which include any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output X1222r), optionally generated based on detected events and/or user inputs detected by the HMD X700.

Figure 12U:
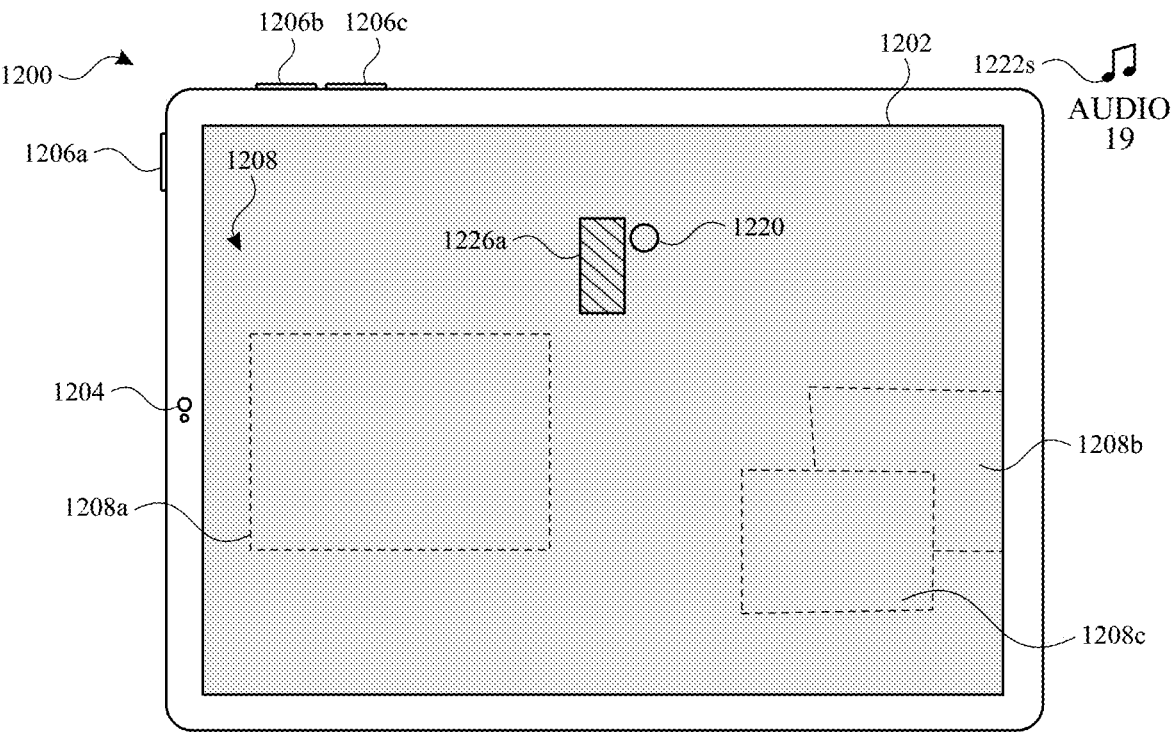

At FIG. 12U, electronic device 1200 detects that the gaze of the user has been maintained on gaze target 1226a (e.g., within region 12246-1) for a threshold duration of time and/or for a sufficiently long time to capture the needed biometric information from the user. In response to this determination, electronic device 1200 outputs audio output 1222s, and displays gaze target 1226a increasing in size (e.g., back to its original size). In some embodiments, gaze target 1226a is also changed in one or more visual characteristics (e.g., color, shape, and/or opacity) to indicate that gaze tracking enrollment for gaze target 1226a has been completed. In some embodiments, audio output 1222s is different from audio output 1222r. In some embodiments, audio output 1222s is indicative of successful completion of gaze tracking enrollment corresponding to gaze target 1226a. As discussed above, in some embodiments, each gaze target corresponds to a collection of audio outputs (e.g., in some embodiments, a unique collection of audio outputs corresponding uniquely to each respective gaze target). For example, in some embodiments, gaze target 1226a corresponds to a proximity audio output having a particular note and/or collection of notes that is output while the gaze of the user is in region 1226*a*-2, a progression audio output having a second note and/or collection of notes that is output while the gaze of the user is in region 1226*a*-1, and a success audio output having a third note and/or collection of notes that is output when gaze enrollment corresponding to gaze target 1226*a* is successfully completed. In some embodiments, different gaze targets have different proximity audio outputs, progression audio outputs, and/or success audio outputs. In some embodiments, the proximity audio output, the progression audio output, and the success audio output for gaze target 1226*a* are selected to be tonally harmonious. In some embodiments, the proximity audio output, the progression audio output, and the success audio output for gaze target 1226*a* are selected to be tonally harmonious with a background audio output (e.g., audio output 1222*o*). In some embodiments, proximity audio outputs, progression audio outputs, and success audio outputs for all gaze targets are selected to be tonally harmonious with one another and/or a background audio output.

Figure 12V:
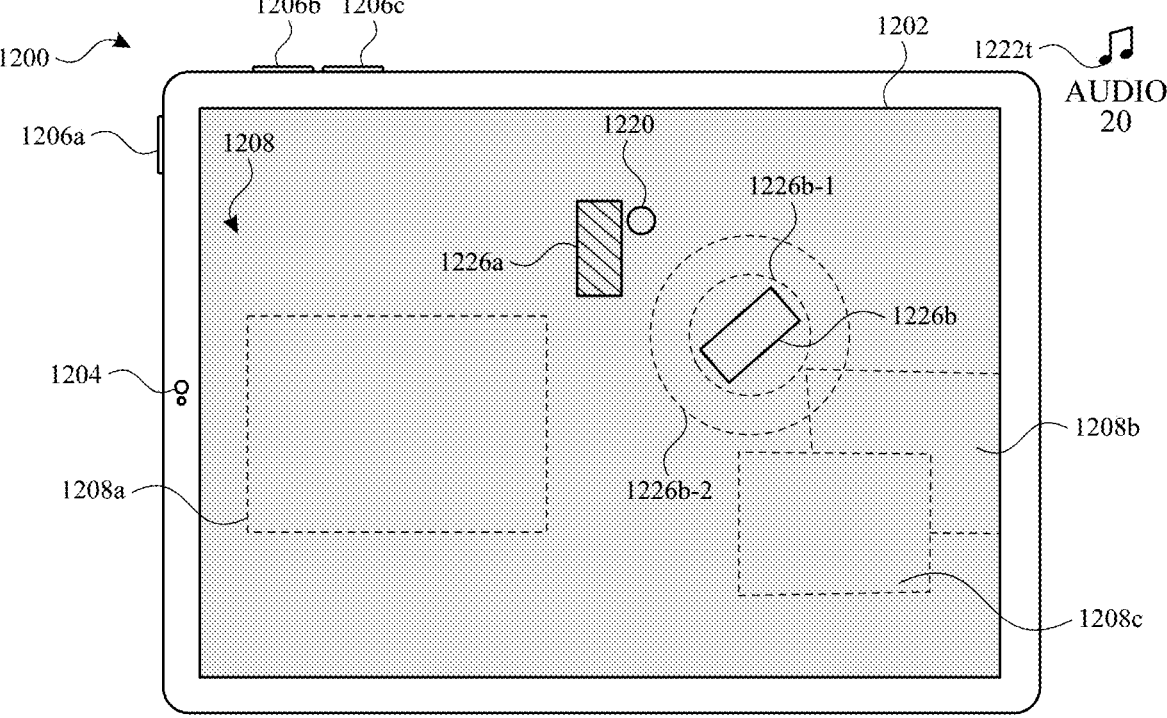

At FIG. 12V, in response to successful completion of gaze tracking enrollment at gaze target 1226*a*, electronic device 1200 displays a next gaze target 1226*b*. While displaying gaze target 1226*b*, electronic device 1200 outputs audio output 1222*t*. In some embodiments, audio output 1222*t* is a background audio output. In some embodiments, audio output 1222*t* is the same as audio output 1222*o*. Similar to gaze target 1226*a*, gaze target 1226*b* is surrounded by two regions 1226*b*-1, 1226*b*-2.

Figure 12W:
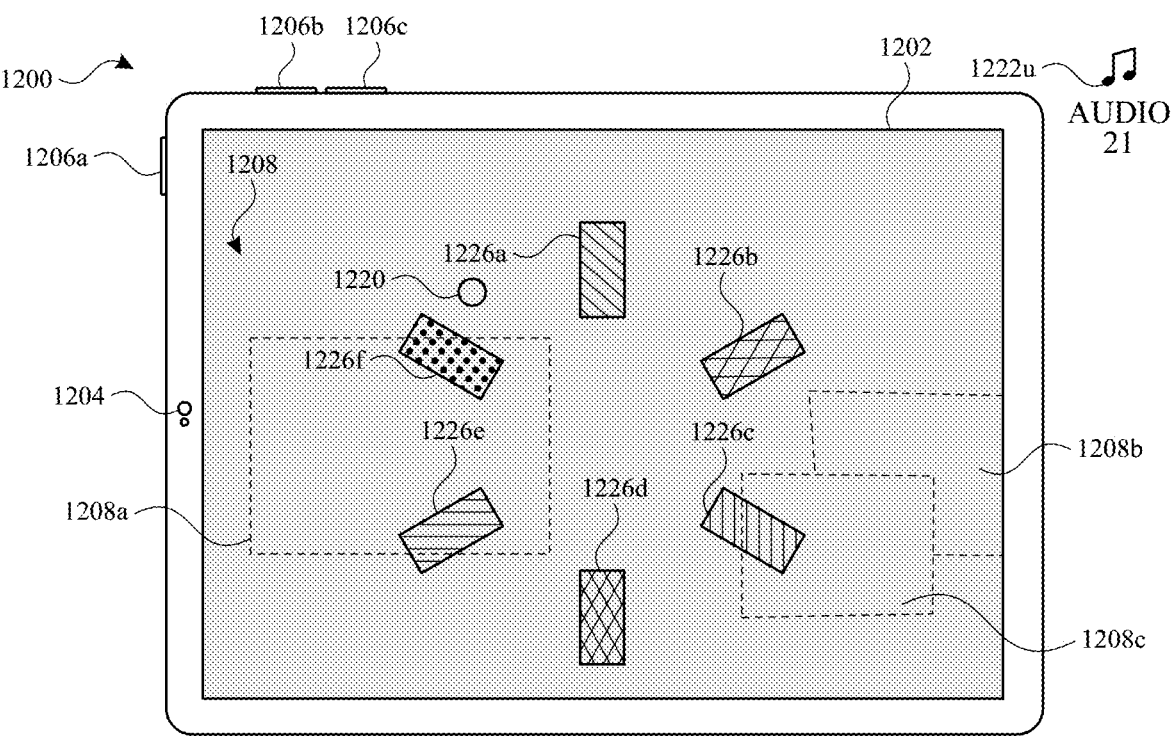
Figure 12X:
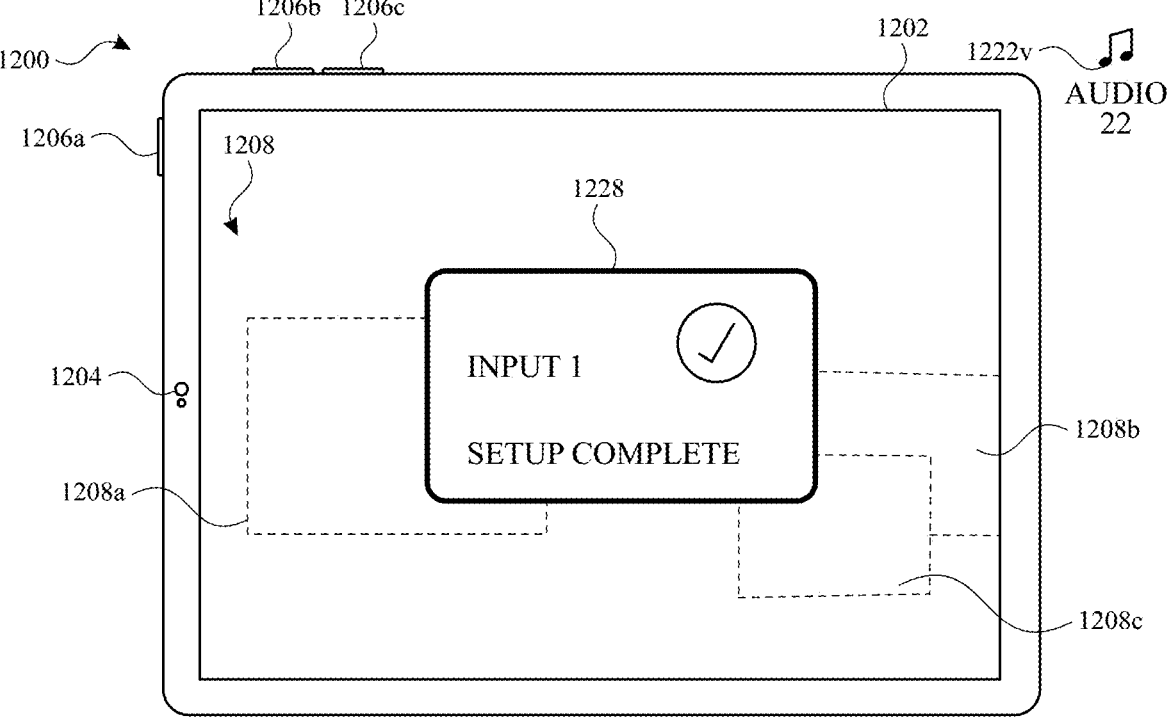

FIG. 12W skips forward, and gaze tracking enrollment for six gaze targets 1226*a*-1226*f* has now been completed (e.g., in a manner similar to that described above with reference to gaze targets 1224*a*, 1224*b*, and 1226*a*). At FIG. 12W, in response to determining that gaze tracking enrollment has been completed for all gaze targets in this enrollment stage, electronic device 1200 outputs audio output 1222*u* indicative of successful completion of this stage in the gaze tracking enrollment process.

At FIG. 12X, electronic device 1200 determines that all stages of gaze tracking enrollment have been successfully completed. While the depicted embodiments, show two different stages with two different brightness levels, in some embodiments, more stages having different brightness levels are possible (e.g., 3 stages with 3 different brightness level, 4 stages with 4 different brightness levels, and so forth). At FIG. 12X, in response to determining that gaze tracking enrollment for the user is completed, electronic device 1200 outputs audio output 1222*v* and displays user interface 1228.

Additional descriptions regarding FIGS. 12A-12X are provided below in reference to methods 1300 and 1400 described with respect to FIGS. 12A-12X.

FIG. 13 is a flow diagram of exemplary method 1300 of gaze tracking enrollment, in accordance with various embodiments. In some embodiments, method 1300 is performed at a computer system (e.g., 1200 and/or X700) (e.g., computer system 101 in FIG. 1A) (e.g., a smart phone, a smart watch, a tablet, a laptop, a desktop, a wearable device, and/or head-mounted device) that is in communication with one or more display generation components (e.g., a visual output device, a 3D display, a display having at least a portion that is transparent or translucent on which images can be projected (e.g., a see-through display), a projector, a heads-up display, and/or a display controller) and one or more input devices (e.g., a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an audio input device; a biometric sensor (e.g., a fingerprint sensor, a face identification sensor, a gaze tracking sensor, and/or an iris identification sensor) and/or one or more mechanical input devices (e.g., a depressible input mechanism; a button; a rotatable input mechanism; a crown; and/or a dial)). In some embodiments, the method 1300 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1300 are, optionally, combined and/or the order of some operations is, optionally, changed.

The computer system (e.g., 1200 and/or X700) displays (1302), via the one or more display generation components (e.g., 1202 and/or X702), a first gaze enrollment user interface (e.g., FIGS. 12C-12P), wherein: the first gaze enrollment user interface (1304) includes a first set of user interface elements (e.g., 1224*a*-1224*f*) that prompt movement of one or more eyes of a user (e.g., a first set of user interface elements that prompt the user to look at a plurality of different locations within the first gaze enrollment user interface; and/or a first set of user interface elements displayed at a plurality of different locations within the first gaze enrollment user interface to prompt the user to look at the plurality of different locations within the first gaze enrollment user interface) and the first gaze enrollment user interface (1306) is displayed with a respective type of element (e.g., 1208 and/or 1224*a*-1224*f*) having a first average brightness (e.g., a first overall brightness, and/or a first overall amount of light output by the one or more display generation components). In some embodiments, the first set of user interface elements are positioned at a plurality of different locations within the first gaze enrollment user interface to form a first predefined shape and/or pattern.

Subsequent to displaying the first gaze enrollment user interface, the computer system (e.g., 1200 and/or X700) displays (1308), via the one or more display generation components, a second gaze enrollment user interface (e.g., FIGS. 12Q-12W), wherein: the second gaze enrollment user interface (1310) includes a second set of user interface elements (e.g., 1226*a*-1226*f*) that prompt movement of one or more eyes of a user (e.g., a second set of user interface elements that prompt the user to look at a plurality of different locations within the second gaze enrollment user interface; and/or a second set of user interface elements displayed at a plurality of different locations within the second gaze enrollment user interface to prompt the user to look at the plurality of different locations within the second gaze enrollment user interface) and the second gaze enrollment user interface (1312) is displayed with the respective type of element (e.g., 1208 and/or 1226*a*-1226*f*) having a second average brightness (e.g., a second overall brightness, and/or a second overall amount of light output by the one or more display generation components) different from the first average brightness. In some embodiments, the second set of user interface elements are positioned at a plurality of different locations within the second gaze enrollment user interface to form a second predefined shape and/or pattern. In some embodiments, the second predefined shape and/or pattern is the same as the first predefined shape and/or pattern.

In some embodiments, the second average brightness causes the one or more eyes of the user to dilate more or dilate less than the first average brightness. In some embodiments, the respective type of element comprises a background element and/or one or more interactive elements (e.g., one or more gaze targets and/or one or more elements that the user is instructed to interact with). In some embodiments, the first gaze enrollment user interface includes a first set of the respective type of element, and the second gaze enrollment user interface includes a second set of the respective type of element. In some embodiments, the second set of the respective type of element corresponds to the first set of the respective type of element (e.g., has the same shape(s), size(s), and/or display position(s)). In some embodiments, while displaying the first gaze enrollment user interface, the computer system collects a first set of biometric information (e.g., one or more scans of the one or more eyes of the user) from the one or more eyes of the user; and while displaying the second gaze enrollment user interface, the computer system collects a second set of biometric information (e.g., one or more scans of the one or more eyes of the user) (e.g., a second set of biometric information different from and/or distinct from the first set of biometric information) from the one or more eyes of the user. In some embodiments, the first set of biometric information is distinct from the second set of biometric information due, at least in part, to the first gaze enrollment user interface being displayed with the respective type of element having the first average brightness and the second gaze enrollment user interface being displayed with the respective type of element having the second average brightness different from the first average brightness (e.g., the first set of biometric information is collected while the one or more eyes of the user are dilated by a first amount; and the second set of biometric information is collected while the one or more eyes of the user are dilated by a second amount different from the first amount). Displaying a first gaze enrollment user interface with a respective type of element having a first average brightness, and then displaying a second gaze enrollment user interface with the respective type of element having a second average brightness, allows for collection of more accurate and more useful gaze tracking information, which enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the respective type of element is a background element (e.g., 1208). In some embodiments, displaying the first gaze enrollment user interface includes displaying the first set of user interface (e.g., 1224a-1224f) elements overlaid on the background element (e.g., 1208). In some embodiments, displaying the second gaze enrollment user interface includes displaying the second set of user interface elements (e.g., 1226a-1226f) overlaid on the background element (e.g., 1208). Displaying a first gaze enrollment user interface with a respective type of element having a first average brightness, and then displaying a second gaze enrollment user interface with the respective type of element having a second average brightness, allows for collection of more accurate and more useful gaze tracking information, which enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the background element (e.g., 1208) is a passthrough environment (e.g., a three-dimen-sional passthrough environment, an environment that is representative of an environment that surrounds the computer system, a virtual passthrough environment, and/or an optical passthrough environment). Displaying a first gaze enrollment user interface with a respective type of element having a first average brightness, and then displaying a second gaze enrollment user interface with the respective type of element having a second average brightness, allows for collection of more accurate and more useful gaze tracking information, which enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, subsequent to displaying the second gaze enrollment user interface, the computer system (e.g., 1200 and/or X700) displays, via the one or more display generation components, a respective user interface (e.g., 1228) overlaid (e.g., at least partially overlaid) on the background element (e.g., 1208), wherein the respective user interface is different from the first gaze enrollment user interface and the second gaze enrollment user interface, and is displayed with the background element having a third average brightness (e.g., a third overall brightness, and/or a third overall amount of light output by the one or more display generation components) different from the first average brightness and the second average brightness. Displaying a first gaze enrollment user interface with a respective type of element having a first average brightness, and then displaying a second gaze enrollment user interface with the respective type of element having a second average brightness, allows for collection of more accurate and more useful gaze tracking information, which enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the respective type of element is a gaze target (e.g., 1224a-f and/or 1226a-f) (e.g., an element that is displayed and the user is prompted to look at; and/or an element that is displayed and when it is determined that the user is looking at the gaze target, biometric information corresponding to the user (e.g., one or more eye scans and/or one or more images of the user's eyes) is captured). Displaying a first gaze enrollment user interface with a respective type of element having a first average brightness, and then displaying a second gaze enrollment user interface with the respective type of element having a second average brightness, allows for collection of more accurate and more useful gaze tracking information, which enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, prior to displaying the first gaze enrollment user interface, the computer system (e.g., 1200 and/or X700) displays, via the one or more display generation components, a first user interface (e.g., 1210 and/or 1216a-1216c) with a first respective type of element (e.g., a first respective type of element that is the same as the respective type of element or different from the respective type of element) (e.g., a three-dimensional environment and/or a passthrough background; and/or an element of the first user interface) having a fourth average brightness (e.g., a fourth overall brightness, and/or a fourth overall amount of light output by the one or more display generation components) different from the first average brightness. In response to one or more user inputs (e.g., one or more touch inputs, one or more gaze inputs, one or more gesture inputs, one or more air gesture inputs, and/or one or more hardware inputs) corresponding to a user request to progress a gaze enrollment process (e.g., a user request to initiate and/or start a gaze enrollment process and/or a user request to move the gaze enrollment process to a subsequent step) (e.g., a gaze enrollment process that includes display of the first gaze enrollment user interface and the second gaze enrollment user interface), the computer system (e.g., 1200 and/or X700) changes the average brightness of the first respective type of element from the fourth average brightness to a fifth average brightness (e.g., a fifth overall brightness, and/or a fifth overall amount of light output by the one or more display generation components) different from the fourth average brightness (e.g., FIGS. 12A-12B) (e.g., a fifth average brightness that is the same as the first average brightness or different from the first average brightness). Modifying the brightness of displayed and/or visible elements prior to displaying the first gaze enrollment user interface provides time for a user's eyes to dilate and/or constrict, which allows for collection of more accurate and more useful gaze tracking information, which enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, prior to displaying the first gaze enrollment user interface, computer system (e.g., 1200 and/ or X700) displays, via the one or more display generation components, a first tutorial animation (e.g., 1216a) (e.g., one or more images, video, and/or moving graphic) that includes: a representation of a face of user; and representations of one or more gaze targets (e.g., representations of one or more displayed objects that a user is intended to look at during a gaze enrollment process; and/or representations of one or more displayed objects that a user is intended to look at in order to collect biometric information (e.g., one or more eye scans and/or images) while the user is looking at the displayed object). Providing the user with a tutorial animation helps the user to provide the correct inputs (e.g., during a gaze enrollment process), which enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, subsequent to displaying the first tutorial animation (e.g., 1216a) (e.g., while displaying the first tutorial animation and/or after displaying the first tutorial animation), the computer system (e.g., 1200 and/or X700) receives, via the one or more input devices, a first hardware input (e.g., 1218) (e.g., a press of a physical button, a press of a depressible input mechanism, a press of a rotatable and depressible input mechanism, a rotation of a rotatable input mechanism; and/or a rotation of a rotatable and depressible input mechanism). In response to receiving the first hardware input, the computer system (e.g., 1200 and/or X700) displays, via the one or more display generation components, the first gaze enrollment user interface (e.g., FIG. 12C). In some embodiments, in response to receiving the first hardware input, the computer system initiates a gaze enrollment process for enrolling one or more eyes of a user. In some embodiments, the computer system the gaze enrollment process includes display of the first gaze enrollment user interface. Allowing a user to provide a hardware input to display the first gaze enrollment user interface allows for performance of this operation without cluttering the display space with additional controls. Furthermore, doing so also enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first set of user interface elements (e.g., 1224a-1224f) includes a first plurality of gaze targets (e.g., a plurality of gaze target locations and/or positions; and/or a plurality of gaze targets that are configured to be displayed at a plurality of different display positions) that are arranged in a sequential order (e.g., a predetermined and/or predefined sequential order). In some embodiments, displaying the first gaze enrollment user interface further comprises: displaying, via the one or more display generation components, a first gaze target (e.g., 1224a) of the first plurality of gaze targets (e.g., displaying the first gaze target at a first display position (e.g., a first display position that corresponds to the first gaze target; and/or a first predefined display position)); and subsequent to displaying the first gaze target (e.g., while displaying the first gaze target and/or after displaying the first gaze target), in accordance with a determination (e.g., in response to a determination that) that gaze target criteria are met (e.g., in accordance with a determination that the user has looked at the first gaze target (e.g., for a threshold duration of time (e.g., 0.1 seconds, 0.3 seconds, 0.5 seconds, 0.7 seconds, 1 second, and/or 2 seconds)) and/or biometric information corresponding to the user (e.g., one or more eye scans or images) has been collected while the user looks at the first gaze target), displaying, via the one or more display generation components, a second gaze target (e.g., 1224b) of the first plurality of gaze targets (e.g., displaying the second gaze target at a second display position (e.g., a second display position that corresponds to the second gaze target; and/or a second predefined display position)), wherein the second gaze target is different from the first gaze target (e.g., where the second gaze target was optionally not displayed prior to detecting that the gaze target criteria were met for the first gaze target). In some embodiments, subsequent to displaying the first gaze target, in accordance with a determination that the gaze target criteria are not met (e.g., in accordance with a determination that the user has not looked at the first gaze target (e.g., has not looked at the first gaze target for a threshold duration of time (e.g., 0.1 seconds, 0.3 seconds, 0.5 seconds, 0.7 seconds, 1 second, and/or 2 seconds)) and/or biometric information corresponding to the user (e.g., one or more eye scans or images) has not been collected while the user looks at the first gaze target), the computer system forgoes display of the second gaze target (e.g., maintains display of the first gaze target without displaying the second gaze target). In some embodiments, subsequent to displaying the second gaze target (e.g., while displaying the second gaze target and/or after displaying the second gaze target), in accordance with a determination that the gaze target criteria are met (e.g., in accordance with a determination that the user has looked at the second gaze target (e.g., for a threshold duration of time (e.g., 0.1 seconds, 0.3 seconds, 0.5 seconds, 0.7 seconds, 1 second, and/or 2 seconds)) and/or biometric information correspond-ing to the user (e.g., one or more eye scans or images) has been collected while the user looks at the second gaze target), the computer system displays, via the one or more display generation components, a third gaze target of the first plurality of gaze targets (e.g., displays the third gaze target at a third display position (e.g., a third display position that corresponds to the third gaze target; and/or a third predefined display position)), wherein the third gaze target is different from the first gaze target and the second gaze target (e.g., where the third gaze target was optionally not dis-played prior to detecting that the gaze target criteria were met for the second gaze target). Providing sequentially displayed gaze targets for a user to look at enhances the operability of the system and makes the user-system inter-face more efficient (e.g., by helping the user to provide proper inputs and reducing errors) which, additionally, reduces power usage and improves battery life of the device by enabling the user to use the system more quickly and efficiently. Furthermore, displaying gaze targets in a specific order improves the quality of user gaze information that is captured, which also improves the quality of gaze enroll-ment of a user.

In some embodiments, displaying the first gaze enroll-ment user interface further comprises displaying, via the one or more display generation components, a first gaze target object (e.g., 1224a). While displaying the first gaze target object, the computer system (e.g., 1200 and/or X700) detects, via the one or more input devices, a gaze of a user (e.g., 1220) directed at the first gaze target object (e.g., FIG. 12F) (e.g., determining that the user is looking at the first gaze target object and/or is looking at a display region that surrounds and/or includes the first gaze target object). In response to detecting the gaze of the user directed at the first gaze target object, the computer system (e.g., 1200 and/or X700) displays, via the one or more display generation components, a first progress indication (e.g., FIG. 12G) indicating that the computer system has detected the gaze of the user directed at the first gaze target object. In some embodiments, displaying the second gaze enrollment user interface further comprises displaying, via the one or more display generation components, a second gaze target object; and, while displaying the second gaze target object, the computer system detects, via the one or more input devices, a gaze of a user directed at the second gaze target object (e.g., determining that the user is looking at the second gaze target object and/or is looking at a display region that surrounds and/or includes the second gaze target object); and in response to detecting the gaze of the user directed at the second gaze target object, the computer system displays, via the one or more display generation components, a second progress indication indicating that the computer system has detected the gaze of the user directed at the second gaze target object. Displaying an indication that the computer system has detected the gaze of the user directed at the first gaze target object enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides feedback about a state of the device.

In some embodiments, displaying the first progress indi-cation includes changing a color of the first gaze target object (e.g., FIG. 12H) (e.g., changing the color of the first gaze target object from a first color to a second color different from the first color; filling the first gaze target object with a color; and/or emptying the first gaze target object of color). In some embodiments, displaying the second progress indication includes changing a color of the second gaze target object. Displaying an indication that the computer system has detected the gaze of the user directed at the first gaze target object enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides feedback about a state of the device.

In some embodiments, displaying the first progress indi-cation includes displaying the first gaze target object shrink-ing in size (e.g., FIG. 12G). In some embodiments, display-ing the second progress indication includes displaying the second gaze target object shrinking in size. Displaying an indication that the computer system has detected the gaze of the user directed at the first gaze target object enhances the operability of the system and makes the user-system inter-face more efficient (e.g., by helping the user to provide proper inputs and reducing errors) which, additionally, reduces power usage and improves battery life of the device by enabling the user to use the system more quickly and efficiently. Furthermore, doing so also provides feedback about a state of the device.

In some embodiments, displaying the first gaze target object comprises displaying the first gaze target object a first location (e.g., FIG. 12H). Subsequent to displaying the first gaze target object at the first location (e.g., while displaying the first gaze target object at the first location and/or after displaying the first gaze target object at the first location): in accordance with a determination that gaze target criteria are met (e.g., in accordance with a determination that the user has looked at the first gaze target object at the first location (e.g., for a threshold duration of time (e.g., 0.1 seconds, 0.3 seconds, 0.5 seconds, 0.7 seconds, 1 second, and/or 2 seconds)) and/or biometric information corresponding to the user (e.g., one or more eye scans or images) has been collected while the user looks at the first gaze target object at the first location), the computer system (e.g., 1200 and/or X700) displays, via the one or more display generation components, movement of the first gaze target object from the first location to a second location different from the first location (e.g., from FIGS. 12H-12I, displaying movement of an object from the location of gaze target 1224a to the location of gaze target 1224b). In some embodiments, sub-sequent to displaying the first gaze target object at the first location, in accordance with a determination that gaze target criteria are not met (e.g., in accordance with a determination that the user has not looked at the first gaze target object at the first location (e.g., the user has not looked at the first gaze target object at the first location for a threshold duration of time (e.g., 0.1 seconds, 0.3 seconds, 0.5 seconds, 0.7 sec-onds, 1 second, and/or 2 seconds)) and/or biometric infor-mation corresponding to the user (e.g., one or more eye scans or images) has not been collected while the user looks at the first gaze target object at the first location), the computer system forgoes displaying movement of the first gaze target object from the first location to the second location (e.g., maintains display of the first gaze target object at the first location). Displaying movement of the gaze target from a first location to a second location indicates to the user that the user should look at the gaze target at the second location, which enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, displaying movement of the first gaze target object from the first location to the second location comprises displaying expansion of the first gaze target object (e.g., displaying the first gaze target object growing in size) as it moves from the first location to the second location (e.g., from FIGS. 12H-12I, displaying an objects moving from the location of gaze target 1224a to the location of gaze target 1224b while expanding). Displaying movement of the gaze target from a first location to a second location and expansion of the gaze target indicates to the user that the user should look at the gaze target at the second location, which enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, while displaying movement of the first gaze target object from the first location to the second location, the computer system (e.g., 1200 and/or X700) displays, via the one or more display generation components, a first representation of the first gaze target object at the first location (e.g., 1224a in FIG. 12I) (in some embodiments, the first representation of the first gaze target object has the same shape as the first gaze target object; in some embodiments, the first representation of the first gaze target object is indicative of gaze enrollment being completed for the first location). Displaying a representation of the first gaze target object at the first location indicates to the user that the user has completed gaze enrollment at the first location, which enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, while displaying the first gaze enrollment user interface and in accordance with a determination that a user of the computer system (e.g., 1200 and/or X700) has not gazed (e.g., has not looked) at a first user interface element (e.g., a first gaze target) of the first set of user interface elements within a threshold duration of time (e.g., has not gazed at the first user interface element within the last 3 seconds, for 5 seconds, for 7 seconds, or 10 seconds), the computer system (e.g., 1200 and/or X700) displays, via the one or more display generation components, a prompt (e.g., in FIG. 12C, if the user does not look at gaze target 1224a for a threshold duration of time, displaying a prompt) prompting the user to look at the first user interface element (e.g., a text prompt, a graphic prompt, and/or displaying movement of the first user interface element (e.g., pulsing of the first user interface element)). In some embodiments, while displaying the first gaze enrollment user interface: in accordance with a determination that the user of the computer system has gazed at the first user interface element within the threshold duration of time, the computer system forgoes display of the prompt prompting the user to look at the first user interface element. Displaying a prompt prompting the user to look at the first user interface element enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the computer system (e.g., 1200 and/or X700) displays, via the one or more display generation components (e.g., as part of the first gaze enrollment user interface), a first user interface element (e.g., 1224a-1224f) (e.g., a first gaze target) of the first set of user interface elements. While displaying the first user interface element, the computer system (e.g., 1200 and/or X700) detects, via the one or more input devices, a gaze of a user (e.g., 1220) directed at the first user interface element (e.g., determining that the user is looking at the first user interface element and/or is looking at a display region that surrounds and/or includes the first user interface element). In response to detecting the gaze of the user directed at the first user interface element, the computer system (e.g., 1200 and/or X700) displays, via the one or more display generation components, the first user interface element changing color from a first color (e.g., a single color; a first set of colors; a first pattern of colors; and/or a first arrangement of colors) to a second color (e.g., a second single color; a second set of colors; a second pattern of colors; and/or a second arrangement of colors) different from the first color (e.g., 1224a in FIGS. 12F-12H). In some embodiments, the computer system displays, via the one or more display generation components (e.g., as part of the second gaze enrollment user interface), a second user interface element (e.g., a first gaze target) of the second set of user interface elements. While displaying the second user interface element, the computer system detects, via the one or more input devices, a gaze of a user directed at the second user interface element (e.g., determining that the user is looking at the second user interface element and/or is looking at a display region that surrounds and/or includes the second user interface element); and in response to detecting the gaze of the user directed at the second user interface element, the computer system displays, via the one or more display generation components, the second user interface element changing color. Displaying an indication that the computer system has detected the gaze of the user directed at the first user interface element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides feedback about a state of the device.

In some embodiments, subsequent to displaying the first user interface element (e.g., 1224a) changing color from the first color to the second color, the computer system (e.g., 1200 and/or X700) displays, via the one or more display generation components (e.g., as part of the first gaze enrollment user interface), a second user interface element (e.g., 1224b) (e.g., a second gaze target) of the first set of user interface elements, wherein the second user interface element is different from the first user interface element. While displaying the second user interface element, the computer system (e.g., 1200 and/or X700) detects, via the one or more input devices, a gaze of a user (e.g., 1220) directed at the second user interface element (e.g., determining that the user is looking at the second user interface element and/or is looking at a display region that surrounds and/or includes the second user interface element). In response to detecting the gaze of the user directed at the second user interface element, the computer system (e.g., 1200 and/or X700) displays, via the one or more display generation components, the second user interface element changing color from a third color (e.g., a third single color; a third set of colors; a third pattern of colors; and/or a third arrangement of colors) to a fourth color (e.g., a fourth single color; a fourth set of colors; a fourth pattern of colors; and/or a fourth arrangement of colors) different from the third color and the second color (e.g., 1224*b* in FIGS. 12L-12N). In some embodiments, different gaze targets are displayed with different colors (e.g., before or after gaze enrollment for the gaze target has been completed). Displaying an indication that the computer system has detected the gaze of the user directed at the second user interface element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides feedback about a state of the device.

In some embodiments, the computer system (e.g., 1200 and/or X700) displays, via the one or more display generation components (e.g., as part of the first gaze enrollment user interface), a first gaze element (e.g., 1224*a*) (e.g., a first gaze target) (e.g., a first gaze element of the first set of user interface elements) at a first location. Subsequent to displaying the first gaze element at the first location (e.g., while displaying the first gaze element at the first location and/or after displaying the first gaze element at the first location) and in accordance with a determination that first gaze criteria are met (e.g., in accordance with a determination that the user has looked at the first gaze element at the first location (e.g., for a threshold duration of time (e.g., 0.1 seconds, 0.3 seconds, 0.5 seconds, 0.7 seconds, 1 second, and/or 2 seconds)) and/or biometric information corresponding to the user (e.g., one or more eye scans or images) has been collected while the user looks at the first gaze element at the first location), the computer system (e.g., 1200 and/or X700) displays, via the one or more display generation components, a second gaze element (e.g., 1224*b*) (e.g., a second gaze target) (e.g., a second gaze element of the first set of user interface elements) at a second location different from the first location. In some embodiments, subsequent to displaying the first gaze element at the first location, in accordance with a determination that the first gaze criteria are not met (e.g., in accordance with a determination that the user has not looked at the first gaze element at the first location (e.g., the user has not looked at the first gaze element at the first location for a threshold duration of time (e.g., 0.1 seconds, 0.3 seconds, 0.5 seconds, 0.7 seconds, 1 second, and/or 2 seconds)) and/or biometric information corresponding to the user (e.g., one or more eye scans or images) has not been collected while the user looks at the first gaze element at the first location), the computer system forgoes displaying the second gaze element at the second location (and, optionally, maintains display of the first gaze element at the first location). In some embodiments, the computer system displays, via the one or more display generation components (e.g., as part of the second gaze enrollment user interface), a third gaze element (e.g., 1224*c*) (e.g., a first gaze target) (e.g., a first gaze element of the first set of user interface elements) at a third location; and subsequent to displaying the third gaze element at the third location (e.g., while displaying the third gaze element at the third location and/or after displaying the third gaze element at the third location): in accordance with a determination that the first gaze criteria are met (e.g., in accordance with a determination that the user has looked at the third gaze element at the third location (e.g., for a threshold duration of time (e.g., 0.1 seconds, 0.3 seconds, 0.5 seconds, 0.7 seconds, 1 second, and/or 2 seconds)) and/or biometric information corresponding to the user (e.g., one or more eye scans or images) has been collected while the user looks at the third gaze element at the third location), the computer system displays, via the one or more display generation components, a fourth gaze element (e.g., a second gaze target) (e.g., a second gaze element of the first set of user interface elements) at a fourth location different from the third location. Displaying the second gaze element when the first gaze criteria are met enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, subsequent to displaying the first gaze element (e.g., 1224*a*) at the first location (e.g., while displaying the first gaze element at the first location and/or after displaying the first gaze element at the first location) and in accordance with a determination that the first gaze criteria are met, the computer system (e.g., 1200 and/or X700) fades out the first gaze element at the first location (e.g., gradually ceasing display of the first gaze element at the first location). Gradually fading out the first gaze element at the first location when the first gaze criteria are met enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, displaying the first gaze enrollment user interface further includes displaying a first element (e.g., 1224*a*) (e.g., a first gaze target) of the first set of user interface elements at a first display position. While displaying the first element at the first display position, the computer system (e.g., 1200 and/or X700) detects a gaze of the user (e.g., 1220) directed at a first display region (e.g., 1224*a*-1 and/or 1224*a*-2) that includes the first display position (e.g., a first display region that surrounds the first display region). In response to detecting the gaze of the user directed at the first display region, the computer system (e.g., 1200 and/or X700) outputs first audio feedback (e.g., 1222*b*, 1222*c*, and/or 1222*d*) (e.g., first audio feedback corresponding to the first display region, first audio feedback corresponding to the first element, and/or first audio feedback indicating the that gaze of the user is directed at the first display region). In some embodiments, displaying the second gaze enrollment user interface further includes displaying a second element (e.g., a second gaze target) of the second set of user interface elements at a second display position. While displaying the second element at the second display position, the computer system detects a gaze of the user directed at a second display region that includes the second display position (e.g., a second display region that surrounds the second display region); and in response to detecting the gaze of the user directed at the second display region, the computer system outputs second audio feedback (e.g., second audio feedback corresponding to the second display region, second audio feedback corresponding to the second element, and/or second audio feedback indicating the that gaze of the user is directed at the second display region). Outputting audio feedback when the gaze of the user is directed at and/or near the first element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the first set of user interface elements (e.g., 1224a-1224f and/or 1226a-1226f) includes a first plurality of gaze targets arranged in a sequential order (e.g., a predetermined order; a sequential order of display), including: a first gaze target (e.g., 1224a) that is displayed at a first display location; a second gaze target (e.g., 1224b) that is displayed after the first gaze target and that is displayed at a second display location different from the first display location; and a final gaze target (e.g., a final gaze target that is displayed at the location of gaze target 1224a) that is displayed after the first gaze target and the second gaze target (e.g., is displayed last of the first plurality of gaze targets), and is displayed at the first display location. In some embodiments, displaying the first gaze enrollment user interface further comprises: displaying, via the one or more display generation components, the first gaze target (e.g., 1224a) at the first display location (e.g., with the respective type of element having the first average brightness); subsequent to displaying the first gaze target at the first display location, displaying, via the one or more display generation components, the second gaze target (e.g., 1224b) at the second display location (e.g., with the respective type of element having the first average brightness); and subsequent to displaying the second gaze target at the second display location, displaying, via the one or more display generation components, the final gaze target at the first display location (e.g., with the respective type of element having the first average brightness). In some embodiments, the first plurality of gaze targets are configured to be displayed at a plurality of display locations that define a closed shape (e.g., triangle, square, pentagon, hexagon, heptagon, octagon, nonagon, and/or decagon) (e.g., in some embodiments, an equilateral shape). In some embodiments, the second set of user interface elements includes a second plurality of gaze targets arranged in a sequential order (e.g., a predetermined order; a sequential order of display), including: a first gaze target of the second plurality of gaze target that is displayed at the first display location; a second gaze target of the second plurality of gaze targets that is displayed after the first gaze target of the second plurality of gaze targets and that is displayed at the second display location; and a final gaze target of the second plurality of gaze targets that is displayed after the first gaze target of the second plurality of gaze targets and the second gaze target of the second plurality of gaze targets (e.g., is displayed last of the second plurality of gaze targets), and is displayed at the first display location; and displaying the second gaze enrollment user interface further comprises: displaying, via the one or more display generation components, the first gaze target of the second plurality of gaze targets at the first display location (e.g., with the respective type of element having the second average brightness); subsequent to displaying the first gaze target at the first display location, displaying, via the one or more display generation components, the second gaze target of the second plurality of gaze targets at the second display location (e.g., with the respective type of element having the second average brightness); and subsequent to displaying the second gaze target at the second display location, displaying, via the one or more display generation components, the final gaze target of the second plurality of gaze targets at the first display location (e.g., with the respective type of element having the second average brightness). In some embodiments, the second plurality of gaze targets are configured to be displayed at a plurality of display locations that define a closed shape (e.g., triangle, square, pentagon, hexagon, heptagon, octagon, nonagon, and/or decagon) (e.g., in some embodiments, an equilateral shape). Displaying the first plurality of gaze targets at various locations that define a closed shape enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the first set of user interface elements includes a first plurality of gaze target elements (e.g., 1224a-1224f) arranged in a sequential order (e.g., a predetermined order; a sequential order of display), including: a first gaze target element (e.g., a first gaze target) that is displayed at a first display position; and a second gaze target element (e.g., a second gaze target) that is displayed after the first gaze target and that is displayed at a second display position different from the first display position. In some embodiments, the second set of user interface elements (e.g., 1226a-1226f) includes a second plurality of gaze target elements arranged in a second sequential order, including: a third gaze target element (e.g., a third gaze target) that is displayed at the first display position; and a fourth gaze target element (e.g., a fourth gaze target) that is displayed after the third gaze target element and that is displayed at the second display position. In some embodiments, displaying the first gaze enrollment user interface further comprises: displaying, via the one or more display generation components, the first gaze target element (e.g., 1224a) at the first display position with the respective type of element having the first average brightness; and subsequent to displaying the first gaze target element at the first display position, displaying, via the one or more display generation components, the second gaze target element (e.g., 1224b) at the second display position with the respective type of element having the first average brightness. In some embodiments, displaying the second gaze enrollment user interface further comprises: displaying (e.g., subsequent to displaying the second gaze target element at the second display position and/or subsequent to displaying all the gaze target elements of the first plurality of gaze target elements at their respective display positions), via the one or more display generation components, the third gaze target element (e.g., 1226a) at the first display position with the respective type of element having the second average brightness; and subsequent to displaying the third gaze target element at the first display position, displaying, via the one or more display generation components, the fourth gaze target element (e.g., 1226b) at the second display position with the respective type of element having the second average brightness. Displaying the first plurality of gaze targets elements at various locations with a first brightness, and then displaying the second plurality of gaze target elements at the various location with a second brightness improves the quality of biometric information that is collected from a user, which enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first gaze target element (e.g., 1224*a*) is displayed at the first display position with a first color (e.g., a first set of colors, a first arrangement of colors, a first pattern of colors, and/or a first single color); the third gaze target element (e.g., 1226*a*) is displayed at the first display position with a second color different from the first color (e.g., a second set of colors, a second arrangement of colors, a second pattern of colors, and/or a second single color) (e.g., a second color different from the first color, the third color, and/or the fourth color); the second gaze target element (e.g., 1224*b*) is displayed at the second display position with a third color (e.g., a third set of colors, a third arrangement of colors, a third pattern of colors, and/or a third single color) (e.g., a third color different from the first color, the second color, and/or the fourth color); and the fourth gaze target element (e.g., 1226*b*) is displayed at the second display position with a fourth color different from the third color (e.g., a second set of colors, a second arrangement of colors, a second pattern of colors, and/or a second single color) (e.g., a fourth color different from the first color, the second color, and/or the third color). In some embodiments, the first gaze target element and the third gaze target element are displayed at the same location, but in different colors. In some embodiments, the second gaze target element and the fourth gaze target element are displayed at the same location, but in different colors. Displaying the first plurality of gaze targets elements at various locations with certain colors, and then displaying the second plurality of gaze target elements at the various location with different colors enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, displaying the first gaze enrollment user interface includes displaying the first gaze enrollment user interface within a first passthrough environment (e.g., 1208) (e.g., a three-dimensional environment, an environment that is representative of a physical environment that surrounds the computer system, a virtual passthrough environment, and/or an optical passthrough environment); and displaying the second gaze enrollment user interface includes displaying the second gaze enrollment user interface within the first passthrough environment (e.g., 1208). Displaying a first gaze enrollment user interface within a first passthrough environment with a respective type of element having a first average brightness, and then displaying a second gaze enrollment user interface within the first passthrough environment with the respective type of element having a second average brightness, allows for collection of more accurate and more useful gaze tracking information, which enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, displaying the first gaze enrollment user interface includes displaying the first gaze enrollment user interface within a first passthrough environment (e.g., 1208) with a first tint (e.g., a first filter, first masking, first brightening, and/or first darkening) applied to the first passthrough environment (e.g., 1208 in FIGS. 12C-12P); and displaying the second gaze enrollment user interface includes displaying the second gaze enrollment user interface within the first passthrough environment with a second tint (e.g., a second filter, second masking, second brightening, and/or second darkening) applied to the first passthrough environment, wherein the second tint is different from the first tint (e.g., 1208 in FIGS. 12Q-12W). Displaying the first gaze enrollment user interface with a first tint applied to the first passthrough environment, and then displaying the second gaze enrollment user interface with a different tint applied to the first passthrough environment, allows for collection of more accurate and more useful gaze tracking information, which enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, displaying the first gaze enrollment user interface includes displaying the first gaze enrollment user interface within a respective virtual environment (e.g., 1208) (e.g., a three-dimensional environment, and/or an environment that is representative of a physical environment that surrounds the computer system). In some embodiments, displaying the second gaze enrollment user interface includes displaying the second gaze enrollment user interface within the respective virtual environment (e.g., 1208), wherein: in accordance with a determination that a current time of day (e.g., when the computer system is being used and/or when the determination is being made) satisfies first criteria (e.g., the current time of day corresponds to daytime, nighttime, dusk, and/or dawn), the respective virtual environment (e.g., 1208) is a first virtual environment; and in accordance with a determination that the current time of day satisfies second criteria different from the first criteria (e.g., the current time of day corresponds to daytime, nighttime, dusk, and/or dawn), the respective virtual environment (e.g., 1208) is a second virtual environment different from the first virtual environment. In some embodiments, the first gaze enrollment user interface and the second gaze enrollment user interface are displayed within a virtual environment, and the virtual environment changes based on the time of day. Displaying different virtual environments based on the time of day enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more interesting, detailed, and/or immersive user experience.

In some embodiments, subsequent to displaying the second gaze enrollment user interface and in accordance with a determination that gaze enrollment criteria are satisfied (e.g., in accordance with a determination that one or more eyes of the user have been successfully enrolled and/or a device calibration profile corresponding to the one or more eyes of the user has been successfully created), the computer system (e.g., 1200 and/or X700) displays, via the one or more display generation components, a success indication (e.g., 1228) indicating that the gaze enrollment criteria are satisfied. In some embodiments, subsequent to displaying the second gaze enrollment user interface: in accordance with a determination that the gaze enrollment criteria are not satisfied (e.g., in accordance with a determination that the one or more eyes of the user have not been successfully enrolled and/or a device calibration profile corresponding to the one or more eyes of the user has not been successfully created), the computer system forgoes display of the success indication (e.g., in some embodiments, displays a failure indication indicating that the gaze enrollment criteria are not satisfied). Displaying a success indication when gaze enrollment criteria are satisfied enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, subsequent to displaying the second gaze enrollment user interface with the respective type of element having the second average brightness, the computer system (e.g., 1200 and/or X700) displays a third user interface (e.g., 1228) (e.g., a third user interface different from the second gaze enrollment user interface) with the respective type of element (e.g., 1208) having a sixth average brightness (e.g., a sixth overall brightness, and/or a sixth overall amount of light output by the one or more display generation components) different from the second average brightness (e.g., displayed elements brighten from FIG. 12W to FIG. 12X). In some embodiments, the sixth average brightness is different from the first average brightness. In some embodiments, the sixth average brightness has a brightness that is between the first average brightness as the second average brightness. For example, in some embodiments, the sixth average brightness is brighter than the first average brightness and darker than the second average brightness; or the sixth average brightness is darker than the first average brightness and brighter than the second average brightness. Modifying the brightness of the respective type of element after displaying the second gaze enrollment user interface enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, subsequent to displaying the second gaze enrollment user interface (e.g., FIGS. 12Q-12W), the computer system (e.g., 600) displays, via the one or more display generation components, a third gaze enrollment user interface, wherein: the third gaze enrollment user interface includes a third set of user interface elements that prompt movement of one or more eyes of the user (e.g., a third set of user interface elements that prompt the user to look at a plurality of different locations within the third gaze enrollment user interface; and/or a third set of user interface elements displayed at a plurality of different locations within the third gaze enrollment user interface to prompt the user to look at the plurality of different locations within the third gaze enrollment user interface); and the third gaze enrollment user interface is displayed with the respective type of element having a seventh average brightness (e.g., a seventh overall brightness, and/or a seventh overall amount of light output by the one or more display generation components) different from the second average brightness (and, in some embodiments, different from the first average brightness) (e.g., repeating FIGS. 12C-12P and/or FIGS. 12Q-12W with a different brightness). In some embodiments, the third set of user interface elements are positioned at a plurality of different locations within the third gaze enrollment user interface to form a third predefined shape and/or pattern. In some embodiments, the third predefined shape and/or pattern is the same as the first predefined shape and/or pattern and/or the second predefined shape and/or pattern. In some embodiments, the seventh average brightness is also different from the first average brightness. In some embodiments, the seventh average brightness has a brightness that is between the first average brightness as the second average brightness. For example, in some embodiments, the seventh average brightness is brighter than the first average brightness and darker than the second average brightness; or the seventh average brightness is darker than the first average brightness and brighter than the second average brightness. In some embodiments, the seventh average brightness is darker than both the first average brightness and the second average brightness. In some embodiments, the seventh average brightness is brighter than both the first average brightness and the second average brightness. In some embodiments, the seventh average brightness causes the one or more eyes of the user to dilate more or dilate less than the second average brightness and/or the first average brightness. In some embodiments, the respective type of element comprises a background element and/or one or more interactive elements (e.g., one or more gaze targets and/or one or more elements that the user is instructed to interact with). In some embodiments, the first gaze enrollment user interface includes a first set of the respective type of element, the second gaze enrollment user interface includes a second set of the respective type of element, and the third gaze enrollment user interface includes a third set of the respective type of element. In some embodiments, the third set of the respective type of elements corresponds to the second set of the respective type of element and/or the first set of the respective type of element (e.g., has the same shape(s), size(s), and/or display position(s)). In some embodiments, while displaying the first gaze enrollment user interface, the computer system collects a first set of biometric information (e.g., one or more scans of the one or more eyes of the user) from the one or more eyes of the user; while displaying the second gaze enrollment user interface, the computer system collects a second set of biometric information (e.g., one or more scans of the one or more eyes of the user) (e.g., a second set of biometric information different from and/or distinct from the first set of biometric information) from the one or more eyes of the user; and while displaying the third gaze enrollment user interface, the computer system collects a third set of biometric information (e.g., one or more scans of the one or more eyes of the user) (e.g., a third set of biometric information different from and/or distinct from the first set of biometric information and/or the second set of biometric information) from the one or more eyes of the user. In some embodiments, the first set of biometric information is distinct from the second set of biometric information due, at least in part, to the first gaze enrollment user interface being displayed with the respective type of element having the first average brightness and the second gaze enrollment user interface being displayed with the respective type of element having the second average brightness different from the first average brightness (e.g., the first set of biometric information is collected while the one or more eyes of the user are dilated by a first amount; and the second set of biometric information is collected while the one or more eyes of the user are dilated by a second amount different from the first amount). In some embodiments, the third set of biometric information is distinct from the second set of biometric information due, at least in part, to the third gaze enrollment user interface being displayed with the respective type of element having the seventh average brightness and the second gaze enrollment user interface being displayed with the respective type of element having the second average brightness different from the seventh average brightness (e.g., the third set of biometric information is collected while the one or more eyes of the user are dilated by a third amount; and the second set of biometric information is collected while the one or more eyes of the user are dilated by a second amount different from the third amount). Displaying a first gaze enrollment user interface with a respective type of element having a first average brightness, and then displaying a second gaze enrollment user interface with the respective type of element having a second average brightness, and then displaying a third gaze enrollment user interface with the respective type of element having a seventh average brightness, allows for collection of more accurate and more useful gaze tracking information, which enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, aspects/operations of methods 800, 900, 1000, 1100, 1300, 1400, 1600, and/or 1700 may be interchanged, substituted, and/or added between these methods. For example, the technique of method 800 can be used to initiate the techniques of methods 900, 1000, 1100, 1300, 1400, 1600, and/or 1700. For brevity, these details are not repeated here.

FIG. 14 is a flow diagram of an exemplary method 1400 for providing feedback during gaze tracking enrollment, in accordance with some embodiments. In some embodiments, method 1400 is performed at a computer system (e.g., 1200 and/or X700) (e.g., computer system 101 in FIG. 1A) (e.g., a smart phone, a smart watch, a tablet, a laptop, a desktop, a wearable device, and/or head-mounted device) that is in communication with one or more display generation components (e.g., a visual output device, a 3D display, a display having at least a portion that is transparent or translucent on which images can be projected (e.g., a see-through display), a projector, a heads-up display, and/or a display controller) and one or more input devices (e.g., a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an audio input device; a biometric sensor (e.g., a fingerprint sensor, a face identification sensor, a gaze tracking sensor, and/or an iris identification sensor) and/or one or more mechanical input devices (e.g., a depressible input mechanism; a button; a rotatable input mechanism; a crown; and/or a dial)). In some embodiments, the method 1400 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1400 are, optionally, combined and/or the order of some operations is, optionally, changed.

The computer system (e.g., 1200 and/or X700) displays (1402), via the one or more display generation components, a plurality of user interface elements (e.g., 1224a-1224f and/or 1226-1226f) (e.g., particles, dots, fixation points, fixation targets, gaze targets, and/or virtual objects). In some embodiments, the plurality of user interface elements are placed a fixed distance from each other. In some embodiments, the plurality of user interface elements are placed randomly (e.g., pseudo-randomly). In some embodiments, the plurality of user interface elements are placed in a grid format. In some embodiments, the plurality of gaze target elements form a shape and/or pattern. In some embodiments, the plurality of user interface elements are placed irrespective of a physical environment in which the plurality of user interface elements appear to be placed within.

While displaying the plurality of user interface elements, the computer system (e.g., 1200 and/or X700) detects (1404), via the one or more input devices, a change in a direction of a gaze of the user (e.g., 1220) (e.g., detecting a new direction for the gaze and/or detecting movement of the gaze).

In response (1406) to detecting the change in direction of the gaze of the user and in accordance with a determination that the gaze of the user is directed toward a first user interface element (e.g., 1224a-1224f and/or 1226a-1226f), the computer system (e.g., 1200 and/or X700) outputs (1408) a first audio output (e.g., 1222b, 1222c, 1222d, 1222e, 1222f, 1222i, 1222j, 1222k, X1222k, and/or 1222l) (e.g., a first sound and/or a first set of sounds) (e.g., a first audio output indicating that the user is looking at the first user interface element and/or at a first region that includes the first user interface element) indicative of the gaze of the user being directed toward the first user interface element.

In response (1406) to detecting the change in direction of the gaze of the user and in accordance with a determination that the gaze of the user is not directed toward the first user interface element, the computer system (e.g., 1200 and/or X700) forgoes (1410) outputting the first audio output (e.g., a first sound and/or a first set of sounds) indicative of the gaze of the user being directed toward the first user interface element (e.g., in FIGS. 12C, 12I, and/or 12Q). In some embodiments, when the gaze of the user is not directed at the first user interface element (e.g., when the user is not looking at the first user interface element) the computer system forgoes outputting the first audio output. In some embodiments, when the gaze of the user is not directed at any user interface element of the plurality of user interface elements (e.g., when the user is not looking at any user interface element of the plurality of user interface elements), the computer system forgoes outputting the first audio output. Outputting audio output when the gaze of the user is directed toward the first user interface element encourages the user to look at the first user interface element, which enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, in response to detecting the change in direction of the gaze of the user and in accordance with a determination that the gaze of the user (e.g., 1220) is not directed toward the first user interface element (e.g., 1224a-1224f and/or 1226a-1226f), the computer system (e.g., 1200 and/or X700) outputs a second audio output (e.g., a second sound and/or a second set of sounds) indicative of the gaze of the user not being directed toward the first user interface element (e.g., 1222a, 1222g, and/or 1222o). Outputting audio output when the gaze of the user is directed toward the first user interface element, and outputting different audio output when the gaze of the user is not directed toward the first user interface element, encourages the user to look at the first user interface element, which enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, while displaying the plurality of user interface elements (e.g., 1224a-1224f and/or 1226a-1226f), the computer system (e.g., 1200 and/or X700) outputs background audio output (e.g., 1222a and/or 1222o) (e.g., a background sound and/or a background set of sounds). In some embodiments, the background audio output is output (e.g., concurrently) while the first audio output is output. In some embodiments, the background audio output is incorporated into the first audio output and/or is part of the first audio output. In some embodiments, in response to detecting the change in direction of the gaze of the user: in accordance with a determination that the gaze of the user is not directed toward the first user interface element, the computer system outputs the background audio output without outputting the first audio output. Outputting audio output when the gaze of the user is directed toward the first user interface element encourages the user to look at the first user interface element, which enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the plurality of user interface elements (e.g., 1224a-1224f and/or 1226a-1226f) are part of an enrollment process (e.g., a gaze enrollment process and/or an eye enrollment process). In some embodiments, the enrollment process includes: a first enrollment stage (e.g., FIGS. 12C-12P) (e.g., a first enrollment stage in which a respective set of user interface elements are displayed having a first average brightness (e.g., a first overall brightness, and/or a first overall amount of light output by the one or more display generation components) and/or a respective type of user interface element is displayed having a first average brightness (e.g., a first overall brightness, and/or a first overall amount of light output by the one or more display generation components)); and a second enrollment stage (e.g., FIGS. 12Q-12W) different from (e.g., separate from) the first enrollment stage (e.g., a second enrollment stage in which a second respective set of user interface elements are displayed having a second average brightness (e.g., a second overall brightness, and/or a second overall amount of light output by the one or more display generation components) and/or the respective type of user interface element is displayed having a second average brightness (e.g., a second overall brightness, and/or a second overall amount of light output by the one or more display generation components) different from the first average brightness) different from the first average brightness. In some embodiments, outputting the background audio output comprises: in accordance with a determination that the plurality of user interface elements is displayed during the first enrollment stage (or, in some embodiments, in accordance with a determination that the plurality of user interface elements are part of the first enrollment stage), outputting a first background audio output (e.g., 1222a); and in accordance with a determination that the plurality of user interface elements is displayed during the second enrollment stage (or, in some embodiments, in accordance with a determination that the plurality of user interface elements are part of the second enrollment stage), outputting a second background audio (e.g., 1222o) output different from the first background audio output (e.g., a first background audio output that has a different volume, a different note, a different combination of notes, a different sequence of notes, and/or a different change in notes over time from the second background audio output). In some embodiments, different background sounds are output for different stages of the enrollment process. In some embodiments, the first enrollment stage includes displaying a first plurality of user interface elements with a respective type of user interface element having a first average brightness; and the second enrollment stage includes displaying a second plurality of user interface elements with the respective type of user interface element having the second average brightness different from the first average brightness. In some embodiments, the first plurality of user interface elements corresponds to the second plurality of user interface elements. For example, in some embodiments, the first plurality of user interface elements has the same number of elements as the second plurality of user interface elements; and/or the first plurality of user interface elements are displayed at the same plurality of display locations as the second plurality of user interface elements. Outputting different background audio for the first enrollment stage and the second enrollment stage enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, in the first enrollment stage (e.g., FIGS. 12C-12P), a respective type of user interface element (e.g., 1208 and/or 1224a-1224f) is displayed having a first average brightness (e.g., a first overall brightness, and/or a first overall amount of light output by the one or more display generation components). In some embodiments, in the second enrollment stage (e.g., FIGS. 12Q-12W), the respective type of user interface element (e.g., 1208 and/or 1226a-1226f) is displayed having a second average brightness (e.g., a second overall brightness, and/or a second overall amount of light output by the one or more display generation components) different from and darker than the first average brightness. In some embodiments, the second background audio output (e.g., 1222o) has an overall lower tone than the first background audio output (e.g., 1222a) (e.g., has relatively more low frequency components and/or relatively less higher frequency components than the first audio background). Outputting different background audio based on whether the enrollment process is in the first enrollment stage or the second enrollment stage enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the first audio output includes a proximity audio component (e.g., a proximity audio component combined with one or more other audio components; and/or a plurality of components including the proximity audio component) (e.g., a proximity audio component indicative of the gaze of the user being near and/or approaching the first user interface element). In some embodiments, outputting the first audio output comprises: in accordance with a determination that the gaze of the user (e.g., 1220) is directed at a first position with respect to the first user interface element (e.g., 1224*a*) (e.g., is a first distance from the first user interface element), the first audio output is output with a first audio property (e.g., volume, pitch, and/or tone) of the proximity audio component having a first value (e.g., audio output 1222*h* in FIG. 12J) (e.g., a first volume, a first pitch, and/or a first tone); and in accordance with a determination that the gaze of the user (e.g., 1220) is directed at a second position with respect to the first user interface element (e.g., 1224*a*) (e.g., is a second distance from the first user interface element) different from the first position, the first audio output is output with the first audio property (e.g., volume, pitch, and/or tone) of the proximity audio component having a second value (e.g., a second volume, a second pitch, and/or a second tone) different from the first value (e.g., audio output 1222*i* in FIG. 12K). Outputting different audio based on the position of the gaze of the user with respect to the first user interface element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the plurality of user interface elements (e.g., 1224*a*-1224*f* and/or 1226*a*-1226*f*) are part of an enrollment process (e.g., a gaze enrollment process and/or an eye enrollment process). In some embodiments, the enrollment process includes: a first enrollment stage (e.g., FIGS. 12C-12P) (e.g., a first enrollment stage in which a respective set of user interface elements are displayed having a first average brightness (e.g., a first overall brightness, and/or a first overall amount of light output by the one or more display generation components) and/or a respective type of user interface element is displayed having a first average brightness (e.g., a first overall brightness, and/or a first overall amount of light output by the one or more display generation components)); and a second enrollment stage (e.g., FIGS. 12Q-12W) different from (e.g., separate from) the first enrollment stage (e.g., a second enrollment stage in which a second respective set of user interface elements are displayed having a second average brightness (e.g., a second overall brightness, and/or a second overall amount of light output by the one or more display generation components) and/or the respective type of user interface element is displayed having a second average brightness (e.g., a second overall brightness, and/or a second overall amount of light output by the one or more display generation components) different from the first average brightness) different from the first average brightness. In some embodiments, outputting the first audio output comprises: in accordance with a determination that the enrollment process is in the first enrollment stage (e.g., FIGS. 12C-12P) (or, in some embodiments, in accordance with a determination that the first user interface element is part of the first enrollment stage), the first audio output (e.g., audio output 1222*a*-1222*n*) is output with the proximity audio component having a first sound (e.g., a first sound; a first tone; a first collection of sounds; and/or a first collection of tones); and in accordance with a determination that the enrollment process is in the second enrollment stage (e.g., FIGS. 12Q-12W) (or, in some embodiments, in accordance with a determination that the first user interface element is part of the second enrollment stage), the first audio output is output with the proximity audio component having a second sound (e.g., a second sound; a second tone; a second collection of sounds; and/or a second collection of tones) different from the first sound (e.g., audio outputs 1222*o*-1222*u*). In some embodiments, the first enrollment stage includes displaying a first plurality of user interface elements with the respective type of user interface element having a first average brightness; and the second enrollment stage includes displaying a second plurality of user interface elements with the respective type of user interface element having the second average brightness different from the first average brightness. In some embodiments, the first plurality of user interface elements corresponds to the second plurality of user interface elements. For example, in some embodiments, the first plurality of user interface elements has the same number of objects as the second plurality of user interface elements; and/or the first plurality of user interface elements are displayed at the same plurality of display locations as the second plurality of user interface elements. Outputting different audio output for different stages of enrollment enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, outputting the first audio output comprises: in accordance with a determination that the first user interface element is displayed at a first display position, the first audio output is output with the proximity audio component having a first sound (e.g., a first sound; a first tone; a first collection of sounds; and/or a first collection of tones); and in accordance with a determination that the first user interface element is displayed at a second display position different from the first display position, the first audio output is output with the proximity audio component having a second sound (e.g., a second sound; a second tone; a second collection of sounds; and/or a second collection of tones) different from the first sound (e.g., audio output 1222*c* corresponding to gaze target 1224*a* is different from audio output 1222*h* corresponding to gaze target 1224*b*). In some embodiments, different gaze targets have different corresponding proximity audio components. Outputting different audio output for different gaze targets (e.g., gaze targets displayed at different locations) enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the proximity audio component is output (e.g., as part of the first audio output) based on a determination that the gaze of the user (e.g., 1220) is directed at a first display region, and the first display region (e.g., 1224*a*-1 and/or 1224*a*-2) corresponds to a location of the first user interface element (e.g., 1224*a*) (e.g., the first display region surrounds the first user interface element and/or includes the location of the first user interface element). Outputting a proximity audio component that is indicative of the gaze of the user being near the first user interface element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, while displaying the plurality of user interface elements (e.g., 1224a-1224f and/or 1226a-1226f), the computer system (e.g., 1200 and/or X700) outputs background audio output (e.g., 1222a) (e.g., a background sound and/or a background set of sounds), wherein the proximity audio component (e.g., 1222c) is tonally harmonious (e.g., is in the same tonal family, is not tonally dissonant with, includes the same note, includes a note in the same scale, includes a note in the same chord, includes a note that is a harmonic series with, and/or includes the same note in a different octave such as a higher or lower octave) with the background audio output. In some embodiments, one audio component being tonally harmonious with another audio component is based on one or more objective rules in a system of music theory that specifies some sets of notes are tonally harmonious with each other. In some embodiments, the background audio output is output (e.g., concurrently) while the first audio output, including the proximity audio component, is output. In some embodiments, the background audio output is incorporated into the first audio output and/or is part of the first audio output. In some embodiments, in response to detecting the change in direction of the gaze of the user: in accordance with a determination that the gaze of the user is not directed toward the first user interface element, the computer system outputs the background audio output without outputting the first audio output. Selecting audio outputs that are tonally harmonious with one another enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first audio output includes a progress audio component (e.g., a progress audio component combined with one or more other audio components; and/or a plurality of components including the progress audio component) (e.g., a progress audio component indicative of the gaze of the user being directed to the first user interface element (e.g., directed to a region corresponding to the first user interface element and/or surrounding the first user interface element); and/or indicative of the gaze of the user being continuously directed toward the first user interface element (e.g., a progress audio component that changes (e.g., in volume and/or tone) as the gaze of the user is continuously directed toward the first user interface element)). In some embodiments, outputting the first audio output comprises: in accordance with a determination that the gaze of the user (e.g., 1220) has been directed toward the first user interface element (e.g., 1224a) for a first duration of time, the first audio output is output with a first audio property (e.g., volume, pitch, and/or tone) of the progress audio component having a first value (e.g., a first volume, a first pitch, and/or a first tone); and in accordance with a determination that the gaze of the user has been directed toward the first user interface element for a second duration of time different from the first duration of time, the first audio output is output with the first audio property (e.g., volume, pitch, and/or tone) of the progress audio component having a second value (e.g., a second volume, a second pitch, and/or a second tone) different from the first value (e.g., audio output changes from FIG. 12F-FIG. 12H). In some embodiments, the first audio property of the progress audio component changes as the gaze of the user is maintained on the first user interface element. Outputting different audio based on how long the gaze of the user has been directed toward the first user interface element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the plurality of user interface elements are part of an enrollment process (e.g., a gaze enrollment process and/or an eye enrollment process). In some embodiments, the enrollment process includes: a first enrollment stage (e.g., FIGS. 12C-12P) (e.g., a first enrollment stage in which a respective set of user interface elements are displayed having a first average brightness (e.g., a first overall brightness, and/or a first overall amount of light output by the one or more display generation components) and/or a respective type of user interface element is displayed having a first average brightness (e.g., a first overall brightness, and/or a first overall amount of light output by the one or more display generation components)); and a second enrollment stage (e.g., FIGS. 12Q-12 W) different from (e.g., separate from) the first enrollment stage (e.g., a second enrollment stage in which a second respective set of user interface elements are displayed having a second average brightness (e.g., a second overall brightness, and/or a second overall amount of light output by the one or more display generation components) and/or the respective type of user interface element is displayed having a second average brightness (e.g., a second overall brightness, and/or a second overall amount of light output by the one or more display generation components) different from the first average brightness) different from the first average brightness. In some embodiments, outputting the first audio output comprises: in accordance with a determination that the enrollment process is in the first enrollment stage (or, in some embodiments, in accordance with a determination that the first user interface element is part of the first enrollment stage), the first audio output is output with the progress audio component having a first sound (e.g., a first sound; a first tone; a first collection of sounds; and/or a first collection of tones); and in accordance with a determination that the enrollment process is in the second enrollment stage (or, in some embodiments, in accordance with a determination that the first user interface element is part of the second enrollment stage), the first audio output is output with the progress audio component having a second sound (e.g., a second sound; a second tone; a second collection of sounds; and/or a second collection of tones) different from the first sound (e.g., audio outputs 1222d-1222f are different from audio outputs 1222q-1222s). In some embodiments, the first enrollment stage includes displaying a first plurality of user interface elements with the respective type of user interface element having a first average brightness; and the second enrollment stage includes displaying a second plurality of user interface elements with the respective type of user interface element having the second average brightness different from the first average brightness. In some embodiments, the first plurality of user interface elements corresponds to the second plurality of user interface elements. For example, in some embodiments, the first plurality of user interface elements has the same number of objects as the second plurality of user interface elements; and/or the first plurality of user interface elements are displayed at the same plurality of display locations as the second plurality of user interface elements. Outputting different audio output for different stages of enrollment enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, outputting the first audio output comprises: in accordance with a determination that the first user interface element is displayed at a first display position, the first audio output is output with the progress audio component having a first sound (e.g., a first sound; a first tone; a first collection of sounds; and/or a first collection of tones); and in accordance with a determination that the first user interface element is displayed at a second display position different from the first display position, the first audio output is output with the progress audio component having a second sound (e.g., a second sound; a second tone; a second collection of sounds; and/or a second collection of tones) different from the first sound (e.g., audio outputs 1222d-1222f corresponding to gaze target 1224a are different from audio outputs 1222j-1222l corresponding to gaze target 1224b). In some embodiments, different gaze targets have different corresponding progress audio components. Outputting different audio output for different gaze targets (e.g., gaze targets displayed at different locations) enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the progress audio component is output (e.g., as part of the first audio output) based on a determination that the gaze of the user (e.g., 1220) is directed at a first display region (e.g., 1224a-1), and the first display region (e.g., 1224a-1) corresponds to a location of the first user interface element (e.g., 1224a) (e.g., the first display region surrounds the first user interface element and/or includes the location of the first user interface element). In some embodiments, the computer system detects a gaze input from a user. In response to detecting the gaze input from the user: in accordance with a determination that the gaze input is directed toward a first display region (e.g., the user is looking at the first display region) and the first user interface element is located (e.g., is currently located) in the first display region, the computer system outputs the progress audio component (e.g., as part of the first audio output); and in accordance with a determination that the gaze input is directed toward the first display region and the first user interface is not located (e.g., is not currently located) in the first display region, the computer system forgoes output of the progress audio component (e.g., as part of the first audio output). In some embodiments, in response to detecting the gaze input from the user: in accordance with a determination that the gaze input is directed toward a second display region (e.g., the user is looking at the second display region) different from the first display region and the first user interface element is located (e.g., is currently located) in the second display region, the computer system outputs the progress audio component (e.g., as part of the first audio output); and in accordance with a determination that the gaze input is directed toward the second display region and the first user interface is not located (e.g., is not currently located) in the second display region, the computer system forgoes output of the progress audio component (e.g., as part of the first audio output). Outputting a progress audio component that is indicative of the gaze of the user being near the first user interface element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, while displaying the plurality of user interface elements (e.g., 1224a-1224f and/or 1226a-1226f), the computer system (e.g., 1200 and/or X700) outputs background audio output (e.g., 1222a and/or 1222o) (e.g., a background sound and/or a background set of sounds), wherein the progress audio component (e.g., 1222d-1222f) is tonally harmonious (e.g., is in the same tonal family, is not tonally dissonant with, includes the same note, includes a note in the same scale, includes a note in the same chord, includes a note that is a harmonic series with, and/or includes the same note in a different octave such as a higher octave or a lower octave) with the background audio output (e.g., 1222a). In some embodiments, the background audio output is output (e.g., concurrently) while the first audio output, including the progress audio component, is output. In some embodiments, the background audio output is incorporated into the first audio output and/or is part of the first audio output. In some embodiments, in response to detecting the change in direction of the gaze of the user: in accordance with a determination that the gaze of the user is not directed toward the first user interface element, the computer system outputs the background audio output without outputting the first audio output. Selecting audio outputs that are tonally harmonious with one another enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, while displaying the first user interface element (e.g., 1224a) and while the gaze of the user (e.g., 1220) is directed toward the first user interface element, the computer system (e.g., 1200 and/or X700) outputs the first audio output with the progress audio component having a first sound (e.g., audio output 1222d in FIG. 12F). While the gaze of the user continues to be directed toward the first user interface element (e.g., 1224a) (e.g., in accordance with a determination that the gaze of the user continues to be directed toward the first user interface element), the computer system (e.g., 1200 and/or X700) outputs the first audio output with the progress audio component having a second sound different from the first sound (e.g., audio output 1222e in FIG. 12G). While outputting the first audio output with the progress audio component having the second sound, the computer system (e.g., 1200 and/or X700) detects that the gaze of the user is no longer directed toward the first user interface element. In response to detecting that the gaze of the user is no longer directed toward the first user interface element, the computer system (e.g., 1200 and/or X700) ceases output of the first audio output. Subsequent to ceasing output of the first audio output, the computer system (e.g., 1200 and/or X700) detects that the gaze of the user is directed toward the first user interface element. In response to detecting that the gaze of the user is directed toward the first user interface element, the computer system (e.g., 1200 and/or X700) outputs the first audio output with the progress audio component having the first sound (e.g., returns to audio output 1222d in FIG. 12F) (e.g., and not the second sound). Restarting the progress audio component when the user looks away from the first user interface element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the first audio output includes a success audio component (e.g., a success audio component combined with one or more other audio components; and/or a plurality of components including the progress audio component) (e.g., a success audio component indicative of the gaze of the user being directed to the first user interface element (e.g., directed to a region corresponding to the first user interface element and/or surrounding the first user interface element); and/or indicative of the gaze of the user being continuously directed toward the first user interface element (e.g., a progress audio component that changes (e.g., in volume and/or tone) as the gaze of the user is continuously directed toward the first user interface element); and/or a success audio component indicative of successful completion of a first gaze target location). In some embodiments, outputting the first audio output comprises: in accordance with a determination that the gaze of the user (e.g., 1220) has been directed toward the first user interface element (e.g., 1224a) for a first duration of time (e.g., FIG. 12G), the first audio output is output with a first audio property (e.g., volume, pitch, and/or tone) of the success audio component having a first value (e.g., a first volume, a first pitch, and/or a first tone); and in accordance with a determination that the gaze of the user has been directed toward the first user interface element for a second duration of time different from the first duration of time (e.g., FIG. 12H), the first audio output is output with the first audio property (e.g., volume, pitch, and/or tone) of the success audio component having a second value (e.g., a second volume, a second pitch, and/or a second tone) different from the first value. In some embodiments, the first audio property of the success audio component changes as the gaze of the user is maintained on the first user interface element. Outputting different audio based on how long the gaze of the user has been directed toward the first user interface element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the plurality of user interface elements (e.g., 1224a-1224f and/or 1226a-1226f) are part of an enrollment process (e.g., a gaze enrollment process and/or an eye enrollment process). In some embodiments, the enrollment process includes: a first enrollment stage (e.g., FIGS. 12C-12P) (e.g., a first enrollment stage in which a respective set of user interface elements are displayed having a first average brightness (e.g., a first overall brightness, and/or a first overall amount of light output by the one or more display generation components) and/or a respective type of user interface element is displayed having a first average brightness (e.g., a first overall brightness, and/or a first overall amount of light output by the one or more display generation components)); and a second enrollment stage (e.g., FIGS. 12Q-12W) different from (e.g., separate from) the first enrollment stage (e.g., a second enrollment stage in which a second respective set of user interface elements are displayed having a second average brightness (e.g., a second overall brightness, and/or a second overall amount of light output by the one or more display generation components) and/or the respective type of user interface element is displayed having a second average brightness (e.g., a second overall brightness, and/or a second overall amount of light output by the one or more display generation components) different from the first average brightness. In some embodiments, outputting the first audio output comprises: in accordance with a determination that the enrollment process is in the first enrollment stage (or, in some embodiments, in accordance with a determination that the first user interface element is part of the first enrollment stage), the first audio output is output with the success audio component having a first sound (e.g., a first sound; a first tone; a first collection of sounds; and/or a first collection of tones); and in accordance with a determination that the enrollment process is in the second enrollment stage (or, in some embodiments, in accordance with a determination that the first user interface element is part of the second enrollment stage), the first audio output is output with the success audio component having a second sound (e.g., a second sound; a second tone; a second collection of sounds; and/or a second collection of tones) different from the first sound (e.g., audio output 1222f is different from audio output 1222s). In some embodiments, the first enrollment stage includes displaying a first plurality of user interface elements with the respective type of user interface element having a first average brightness; and the second enrollment stage includes displaying a second plurality of user interface elements with the respective type of user interface element having the second average brightness different from the first average brightness. In some embodiments, the first plurality of user interface elements corresponds to the second plurality of user interface elements. For example, in some embodiments, the first plurality of user interface elements has the same number of objects as the second plurality of user interface elements; and/or the first plurality of user interface elements are displayed at the same plurality of display locations as the second plurality of user interface elements. Outputting different audio output for different stages of enrollment enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, outputting the first audio output comprises: in accordance with a determination that the first user interface element is displayed at a first display position (e.g., 1224a), the first audio output is output with the success audio component having a first sound (e.g., a first sound; a first tone; a first collection of sounds; and/or a first collection of tones); and in accordance with a determination that the first user interface element is displayed at a second display position (e.g., 1224b) different from the first display position, the first audio output is output with the success audio component having a second sound (e.g., a second sound; a second tone; a second collection of sounds; and/or a second collection of tones) different from the first sound (e.g., audio output 1222f corresponding to gaze target 1224a is different from audio output 1222l corresponding to gaze target 1224b). In some embodiments, different gaze targets have different corresponding success audio components. Outputting different audio output for different gaze targets (e.g., gaze targets displayed at different locations) enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the success audio component is output (e.g., as part of the first audio output) based on a determination that the gaze of the user (e.g., 1220) is directed at a first display region (e.g., 1224a-1), and the first display region corresponds to a location of the first user interface element (e.g., 1224a) (e.g., the first display region surrounds the first user interface element and/or includes the location of the first user interface element). Outputting a success audio component that is indicative of the gaze of the user being near the first user interface element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, while displaying the plurality of user interface elements, the computer system (e.g., 1200 and/or X700) outputs background audio output (e.g., 1222a and/or 1222o) (e.g., a background sound and/or a background set of sounds), wherein the success audio component (e.g., 1222f) is tonally harmonious (e.g., is in the same tonal family, is not tonally dissonant with, includes the same note, includes a note in the same scale, includes a note in the same chord, includes a note that is in a harmonic series with, and/or includes the same note in a different octave such as a higher octave or a lower octave) with the background audio output (e.g., 1222a). In some embodiments, the success audio component is tonally harmonious with a proximity audio component of the first audio output that is indicative of the gaze of the user being directed toward the first user interface element. In some embodiments, the success audio component is tonally harmonious with a proximity audio component of the first audio output that is indicative of the gaze of the user being directed toward a display region that is proximate the first user interface element (e.g., a display region that surrounds the first user interface element). In some embodiments, the background audio output is output (e.g., concurrently) while the first audio output, including the success audio component, is output. In some embodiments, the background audio output is incorporated into the first audio output and/or is part of the first audio output. In some embodiments, in response to detecting the change in direction of the gaze of the user: in accordance with a determination that the gaze of the user is not directed toward the first user interface element, the computer system outputs the background audio output without outputting the first audio output. Selecting audio outputs that are tonally harmonious with one another enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the plurality of user interface elements (e.g., 1224a-1224f and/or 1226a-1226f) includes the first user interface element and a second user interface element different from the first user interface element (e.g., in some embodiments, the first user interface element is displayed at a first position, and the second user interface element is displayed at a second position different from the first position). In some embodiments, in response to detecting the change in direction of the gaze of the user: in accordance with a determination that the gaze of the user is directed towards the second user interface element (e.g., 1224b), the computer system (e.g., 1200 and/or X700) outputs a second audio output (e.g., a second sound and/or a second set of sounds) different from the first audio output and indicative of the gaze of the user being directed toward the second user interface element (e.g., audio output 1222d corresponding to gaze target 1224a is different from audio output 1222j corresponding to gaze target 1224b). Outputting different audio output based on whether the gaze of the user is directed toward the first user interface element or the second user interface element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, in response to detecting the change in direction of the gaze of the user (e.g., 1220): in accordance with a determination that the gaze of the user is moving towards the first user interface element (e.g., 1224a) (e.g., is moving closer to the first user interface element and/or is moving in a direction towards the first user interface element), the computer system (e.g., 1200 and/or X700) outputs a first proximity audio output (e.g., 1222b) (e.g., a first proximity audio output that starts once the gaze of the user is within a threshold distance of the first user interface element and changes in one or more characteristics (e.g., volume, pitch, and/or tone) as the gaze of the user moves closer to the first user interface element); and in accordance with a determination that the gaze of the user is moving towards the second user interface element (e.g., 1224b) (e.g., is moving closer to the second user interface element and/or is moving in a direction towards the second user interface element), the computer system (e.g., 1200 and/or X700) outputs a second proximity audio output (e.g., 1222h) (e.g., a first proximity audio output that starts once the gaze of the user is within a threshold distance of the first user interface element and changes in one or more characteristics (e.g., volume, pitch, and/or tone) as the gaze of the user moves closer to the first user interface element) different from the first proximity audio output. Outputting different audio output based on whether the gaze of the user is moving toward the first user interface element or the second user interface element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, in response to detecting the change in direction of the gaze of the user (e.g., 1220): in accordance with a determination that the gaze of the user is moving away from the first user interface element (e.g., 1224a) (e.g., is moving further from the first user interface element and/or is moving in a direction away from the first user interface element), the computer system (e.g., 1200 and/or X700) outputting a third proximity audio output (e.g., a third proximity audio output that changes in one or more characteristics (e.g., volume, pitch, and/or tone) as the gaze of the user moves further from the first user interface element and/or that ceases once the gaze of the user is outside of a threshold distance from the first user interface element); and in accordance with a determination that the gaze of the user is moving away from the second user interface element (e.g., 1224*b*) (e.g., is moving further from the second user interface element and/or is moving in a direction away from the second user interface element), the computer system (e.g., 1200 and/or X700) outputs a fourth proximity audio output (e.g., a fourth proximity audio output that changes in one or more characteristics (e.g., volume, pitch, and/or tone) as the gaze of the user moves further from the second user interface element and/or that ceases once the gaze of the user is outside of a threshold distance from the second user interface element) different from the third proximity audio output. Outputting different audio output based on whether the gaze of the user is moving away from the first user interface element or the second user interface element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, in response to detecting the change in direction of the gaze of the user (e.g., 1220): in accordance with a determination that the gaze of the user is directed toward the first user interface element (e.g., 1224*a*) (e.g., is looking at the first user interface element and/or is looking at a region that includes and/or surrounds the first user interface element), the computer system (e.g., 1200 and/or X700) outputs a first progress audio output (e.g., 1222*d*) (e.g., a first progress audio output that starts once the gaze of the user is directed toward the first user interface element and changes in one or more characteristics (e.g., volume, pitch, and/or tone) as the gaze of the user is maintained (e.g., continuously and/or substantially continuously) on the first user interface element); and in accordance with a determination that the gaze of the user is directed toward the second user interface element (e.g., 1224*b*) (e.g., is looking at the second user interface element and/or is looking at a region that includes and/or surrounds the second user interface element), the computer system (e.g., 1200 and/or X700) outputs a second progress audio output (e.g., 1222*j*) (e.g., a second progress audio output that starts once the gaze of the user is directed toward the second user interface element and changes in one or more characteristics (e.g., volume, pitch, and/or tone) as the gaze of the user is maintained (e.g., continuously and/or substantially continuously) on the second user interface element) different from the first proximity audio output. Outputting different audio output based on whether the gaze of the user is directed toward the first user interface element or the second user interface element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, in response to detecting the change in direction of the gaze of the user (e.g., 1220): in accordance with a determination that the gaze of the user is directed toward the first user interface element (e.g., 1224*a*) (e.g., is looking at the first user interface element and/or is looking at a region that includes and/or surrounds the first user interface element) and that the gaze of the user satisfies success criteria with respect to the first user interface element (e.g., the gaze of the user has been maintained on the first user interface element for a threshold duration of time (e.g., 0.5 seconds, 1 second, 1.5 seconds, or 2 seconds)) (e.g., without satisfying success criteria with respect to the second user interface element), the computer system (e.g., 1200 and/or X700) outputs a first success audio output (e.g., 1222*f*) (e.g., a first success audio output indicative of the gaze of the user satisfying the success criteria with respect to the first user interface element); and in accordance with a determination that the gaze of the user is directed toward the second user interface element (e.g., 1224*b*) (e.g., is looking at the second user interface element and/or is looking at a region that includes and/or surrounds the second user interface element) and that the gaze of the user satisfies the success criteria with respect to the second user interface element (e.g., the gaze of the user has been maintained on the second user interface element for a threshold duration of time (e.g., 0.5 seconds, 1 second, 1.5 seconds, or 2 seconds)) (e.g., without satisfying success criteria with respect to the first user interface element), the computer system (e.g., 1200 and/or X700) outputs a second success audio output (e.g., 1222l) (e.g., a second success audio output indicative of the gaze of the user satisfying the success criteria with respect to the second user interface element) different from the first success audio output. Outputting different audio output based on whether the gaze of the user is directed toward the first user interface element or the second user interface element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the first audio output (e.g., 1222*f*) is tonally harmonious (e.g., is in the same tonal family, is not tonally dissonant with, includes the same note, includes a note in the same scale, includes a note in a same chord, includes a note that is in a harmonic series with, and/or includes the same note in a different octave such as a higher octave or lower octave) with the second audio output (e.g., 1222l). Selecting audio outputs that are tonally harmonious with one another enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, subsequent to displaying the plurality of user interface elements (e.g., 1224*a*-1224*f* and/or 1226*a*-1226*f*), the computer system (e.g., 1200 and/or X700) displays, via the one or more display generation components, a second instance of the plurality of user interface elements (e.g., particles, dots, fixation points, fixation targets, gaze targets, and/or virtual objects) including the first user interface element (e.g., a second instance of FIGS. 12A-12W). While displaying the second instance of the plurality of user interface elements, the computer system (e.g., 1200 and/or X700) detects, via the one or more input devices, a second change in a direction of a gaze of the user (e.g., detecting a new direction for the gaze and/or detecting movement of the gaze). In response to detecting the second change in direction of the gaze of the user: in accordance with a determination that the gaze of the user is directed toward the first user interface element (e.g., 1224), the computer system (e.g., 1200 and/or X700) outputs a second audio output (e.g., a first sound and/or a first set of sounds) (e.g., a first audio output indicating that the user is looking at the first user interface element and/or at a first region that includes the first user interface element) different from the first audio output and indicative of the gaze of the user being directed toward the first user interface element (e.g., audio output 1222*b* varies between different gaze enrollment instances); and in accordance with a determination that the gaze of the user is not directed toward the first user interface element, the computer system (e.g., 1200 and/or X700) forgoes outputting the second audio output (e.g., a first sound and/or a first set of sounds) indicative of the gaze of the user being directed toward the first user interface element. In some embodiments, different instances of displaying the plurality of user interface elements result in different sounds (e.g., for the same actions and/or interactions). In some embodiments, different instances of user enrollment (e.g., gaze enrollment and/or eye enrollment) result in different sounds for the same actions and/or interactions. Outputting different audio outputs for different instances of displaying the plurality of user interface elements enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more varied and/or interesting user experience.

In some embodiments, the first audio output (e.g., 1222*b*) and the second audio output (e.g., 1222*a*) are randomly determined (e.g., randomly selected from a plurality of possible audio outputs). Outputting different audio outputs for different instances of displaying the plurality of user interface elements enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more varied and/or interesting user experience.

In some embodiments, the first audio output (e.g., 1222*b*) and the second audio output (e.g., 1222*a*) are selected from a predetermined set of a plurality of harmonious sounds (e.g., sounds that are in the same tonal family, are not tonally dissonant with one another, include the same note, include notes in the same scale, includes notes in the same chord, include notes that are in a harmonic series, and/or include the same notes in different octaves). Outputting different audio outputs for different instances of displaying the plurality of user interface elements enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more varied and/or interesting user experience.

In some embodiments, the first audio output (e.g., 1222*b*) includes spatialized audio corresponding to a location of the first user interface element (e.g., 1224*a*) (e.g., the first audio output emanates from and/or is played by audio output devices so as to give the impression of emanating from a location of the first user interface element). In some embodiments, spatialized audio experiences are produced by manipulating sounds in an audio output device's two audio channels (e.g., left and right) so that they resemble directional sounds arriving in the ear-canal. For example, headphones can reproduce a spatial audio signal that simulates a soundscape around the listener (also referred to as the user). An effective spatial sound reproduction can render sounds such that the listener perceives the sound as coming from a location within the soundscape external to the listener's head, just as the listener would experience the sound if encountered in the real world. In some embodiments, spatialized audio is audio that has been filtered such that a listener of the audio perceives the audio as coming from one or more directions and/or locations in a three-dimensional space (e.g., from above, below, and/or in front of the listener). An example of such a filter is a Head-Related Transfer Function (HRTF) filter. Outputting spatialized audio that corresponds to the location of the first user interface element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, in response to detecting the change in direction of the gaze of the user: in accordance with a determination that the gaze of the user has not been directed toward the first user interface element for greater than a threshold duration of time (e.g., greater than 5 seconds, 10 seconds, 15 seconds, 20 seconds, 25 seconds, 30 seconds, 45 seconds, and/or 1 minute), the computer system (e.g., 1200 and/or X700) outputs audio feedback prompting the user to look at the first user interface element (e.g., audio feedback with spoken words instructing the user to look at the first user interface element, audio feedback drawing the user's attention to the first user interface element, and/or audio feedback with spatialized audio corresponding to a location of the first user interface element) (e.g., in FIG. 12C, if the gaze of the user remains away from gaze target 1224*a* for a threshold duration of time, outputting audio feedback). Outputting audio feedback prompting the user to look at the first user interface element when the user has not looked at the first user interface element for a threshold duration of time enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the audio feedback includes spatialized audio corresponding to a location of the first user interface element (e.g., 1224*a*) (e.g., the audio feedback emanates from and/or is played by audio output devices so as to give the impression of emanating from a location of the first user interface element). In some embodiments, different user interface elements of the plurality of user interface elements (e.g., different gaze targets) cause output of audio feedback and/or audio outputs having different spatializations. For example, in some embodiments, the plurality of user interface elements includes a second user interface element displayed at a second location different from the location of the first user interface element, and audio feedback corresponding to the second user interface element (and, optionally, not corresponding to the first user interface element) includes spatialized audio corresponding to the second location (and, optionally, not corresponding to the location of the first user interface element). Outputting spatialized audio that corresponds to the location of the first user interface element when the user has not looked at the first user interface element for a threshold duration of time enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, subsequent to detecting the change in direction of the gaze of the user: in accordance with a determination that enrollment success criteria are satisfied for the user (e.g., in accordance with a determination that a sufficient quantity of biometric information has been collected from the user), the computer system (e.g., 1200 and/or X700) creates one or more device calibration profiles corresponding to the user (e.g., creating one or more device calibration profiles corresponding to one or more eyes of user, and/or creating one or more device calibration profiles to be used to receive and/or interpret gaze-based user inputs from the user) on the computer system (e.g., 1200 and/or X700) (e.g., FIG. 12X). In some embodiments, the one or more device calibration profiles corresponding to the user includes one or more offsets and/or values determined based on biometric information collected from the user during biometric enrollment of the user. In some embodiments, the one or more offsets and/or values are used to receive and/or interpret gaze-based user inputs from the user. Creating a device calibration profile for a user enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, subsequent to detecting the change in direction of the gaze of the user: in accordance with a determination that enrollment success criteria are satisfied for the user (e.g., in accordance with a determination that a sufficient quantity of biometric information has been collected from the user), the computer system (e.g., 1200 and/or X700) outputs a success audio output (e.g., 1222v) (e.g., a sound and/or a collection of sounds) indicative of successful gaze-based enrollment of the user (e.g., indicative of successful collection of biometric information corresponding to the user and/or indicative of successful creation of one or more device calibration profiles corresponding to the user). Outputting a success audio output when enrollment success criteria are satisfied enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, aspects/operations of methods 800, 900, 1000, 1100, 1300, 1400, 1600, and/or 1700 may be interchanged, substituted, and/or added between these methods. For example, the technique of method 800 can be used to initiate the techniques of methods 900, 1000, 1100, 1300, 1400, 1600, and/or 1700. For another example, the various techniques can be performed sequentially. For brevity, these details are not repeated here.

FIGS. 15A-15Y illustrate examples of gaze tracking enrollment. FIG. 16 is a flow diagram of an exemplary method 1600 for gaze tracking enrollment. FIG. 17 is a flow diagram of an exemplary method 1700 for providing feedback during gaze tracking enrollment. The user interfaces in FIGS. 15A-15Y are used to illustrate the processes described below, including the processes in FIGS. 16 and 17.

FIG. 15A depicts electronic device 1500, which is a tablet that includes touch-sensitive display 1502, one or more input sensors 1504 (e.g., one or more cameras, eye gaze trackers, hand movement trackers, and/or head movement trackers), and one or more buttons 1506a-1506c. In some embodiments described below, electronic device 1500 is a tablet. In some embodiments, electronic device 1500 is a smart phone, a wearable device, a wearable smartwatch device, a head-mounted system (e.g., a headset), or other computer system that includes and/or is in communication with one or more display devices (e.g., display screen, projection device, or the like). In some embodiments in which electronic device 1500 is a head-mounted system, electronic device 1500 optionally includes two displays (e.g., one for each eye of a user), with each display displaying respective various content, to enable a user of electronic device 1500 to perceive the various depths of the various content (e.g., physical objects and/or virtual objects) of three-dimensional environments. Electronic device 1500 is a computer system (e.g., computer system 101 in FIG. 1A).

At FIG. 15A, electronic device 1500 displays user interface 1510 overlaid on three-dimensional environment 1508. In the depicted scenario, three-dimensional environment 1508 includes objects 1508a-1508b. In some embodiments, three-dimensional environment 1508 is displayed by a display (e.g., display 1502, as depicted in FIG. 15A). In some embodiments, three-dimensional environment 1508 includes a virtual environment or an image (or video) of a physical environment captured by one or more cameras (e.g., one or more cameras that are part of input sensors 1504 and/or one or more external cameras). For example, in some embodiments, object 1508a is a virtual object that is representative of a physical object that has been captured by one or more cameras and/or detected by one or more sensors; and object 1508b is a virtual object that is representative of a second physical object that has been captured by one or more cameras and/or detected by one or more sensors, and so forth. In some embodiments, three-dimensional environment 1508 is visible to a user behind user interface 1510 but is not displayed by a display. For example, in some embodiments, three-dimensional environment 1508 is a physical environment (and, for example, objects 1508a-1508b are physical objects) that is visible to a user (e.g., through one or more transparent displays) behind user interface 1510 without being displayed by a display. In some embodiments, user interface 1510 and/or three-dimensional environment 1508 are part of an extended reality experience.

In some embodiments, user interface 1510 corresponds to input enrollment for a particular type of user input. In some embodiments, user interface 1510 corresponds to input enrollment for gaze inputs (e.g., eye-based user inputs). At FIG. 15A, electronic device 1500 detects user input 1512. In FIG. 15A, user input 1512 is a tap input on touch-sensitive display 1502. However, in some embodiments, user input 1512 is a different type of user input, such as a gesture or other action taken by a user. For example, in some embodiments, electronic device 1500 is a head-mounted system, and detecting user input 1512 includes, for example, detecting a user performing a gesture (e.g., an air gesture (e.g., an air tap gesture; and/or an air pinch gesture)) while electronic device 1500 is worn, detecting a button press while electronic device 1500 is worn, detecting rotation of a rotatable input mechanism while electronic device 1500 is worn, detecting a gaze-based gesture (e.g., detecting the user looking at an object and/or moving his or her gaze in a particular manner), and/or any combination of the foregoing (e.g., detecting a gaze at user interface 1510 in conjunction with an air pinch gesture, a hardware input such as a button press or crown rotation or a spoken input such as a verbal command).

Figure 15C:
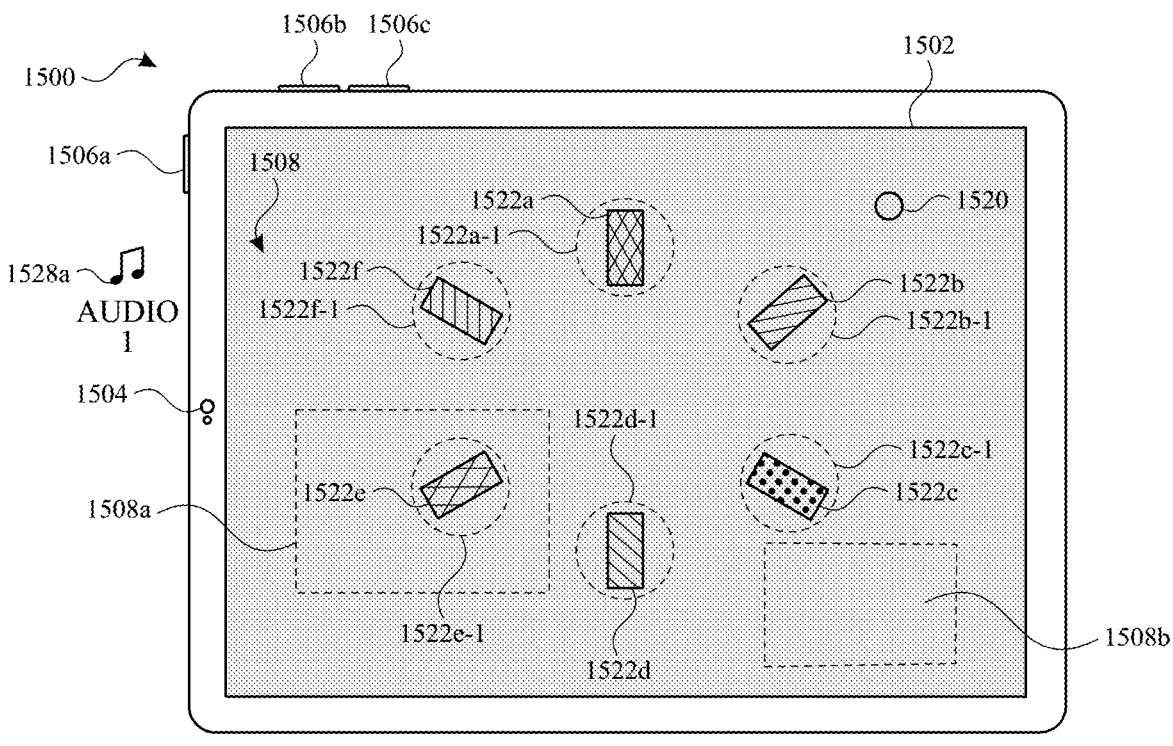
FIGS. 15A-15Y illustrate example techniques for gaze tracking enrollment in accordance with some embodiments.

At FIG. 15B1, in response to detecting user input 1512, electronic device 1500 changes a brightness of three-dimensional environment 1508, and displays user interface 1514. In some embodiments, user interface 1514 corresponds to a gaze tracking enrollment process in which a user is instructed to look at a plurality of gaze targets, and biometric information (e.g., one or more scans of the user's eyes) is collected while the user looks at and/or interacts with the gaze targets. In some embodiments, the brightness of three-dimensional environment 1508 is changed in order to cause the eyes of the user to dilate more or dilate less for the gaze tracking enrollment process. In some embodiments, the gaze tracking enrollment process comprises a plurality of different stages corresponding to a plurality of different brightness levels, such that user eye information can be collected with the eyes of the user in different states of dilation, as will be demonstrated in greater detail below. In the depicted embodiment, user interface 1514 includes introduction animation 1516a which provides a user with a preview of the gaze tracking enrollment process, as well as instructions 1516b instructing the user on how to perform gaze tracking enrollment. For example, in some embodiments, animation 1516a shows a plurality of gaze targets positioned around a representation of a user (e.g., a face), and instruction 1516b instructs the user to look at each gaze target and perform a particular type of input, such as an air gesture or other gesture. In some embodiments, the particular type of input is a pinch air gesture, a tap air gesture, and/or a swipe air gesture. User interface 1514 also includes instruction 1514c instructing the user to press a button to begin gaze tracking enrollment. In some embodiments, rather the instructing the user to provide a hardware input, electronic device 1500 displays an instruction for the user to look at a displayed object. In FIG. 15B2, electronic device 1500 displays instruction 1514c-1 instructing the user to look at gaze target 1522a in order to begin gaze tracking enrollment. At FIG. 15B1, electronic device 1500 detects a "start enrollment" user input (e.g., user input 1516, which is a press of button 1506c or an air gesture such as an air tap, air pinch gesture, air drag, or air swipe gesture or a spoken input such as a verbal request to proceed with enrollment). In some embodiments the user input includes a requirement that the gaze of the user is within a gaze target region 1522a-1 surrounding gaze target 1522a in order to progress to the next step. In some embodiments, the "start enrollment" user input that includes gaze input provides the computer system with information about the user's gaze that enables a coarse gaze enrollment that is used for some (or, optionally, all) of later gaze enrollment steps described in greater detail with reference to FIGS. 15C-15Y to determine whether the user is gazing at gaze target regions corresponding to the gaze targets. This coarse gaze enrollment helps to improve the accuracy of later gaze enrollment steps by enabling the computer system to distinguish gaze directed toward different gaze targets when multiple gaze targets are concurrently displayed as shown in FIGS. 15C-15Y. In some embodiments, in response to detecting the "start enrollment" user input directed to gaze target 1522a the device advances to the gaze enrollment user interface displayed in FIGS. 15C-15Y. In some embodiments the initial gaze target that is used for coarse gaze enrollment (e.g., gaze target 1522a) is displayed before displaying the gaze enrollment tutorial illustrated in FIGS. 15B1-15B2. In some embodiments the initial gaze target that is used for coarse gaze enrollment (e.g., gaze target 1522a) is displayed after displaying the gaze enrollment tutorial illustrated in FIGS. 15B1-15B2.

At FIG. 15C, in response to detecting user input 1516, electronic device 1500 displays a plurality of gaze targets 1522a-1522f and outputs audio output 1528a. In some embodiments, audio output 1528a is a background audio output that is output during the gaze tracking enrollment process. In the depicted embodiment, each gaze target 1522a-1522f has a corresponding region 1522a-1-1522f-1. If the user looks within a region corresponding to a particular gaze target, and performs a registration input while looking at the region (e.g., an air gesture input, a pinch air gesture, a tap air gesture, and/or a swipe air gesture), electronic device 1500 collects biometric information from the user while the user looks within the region corresponding to the gaze target. At FIG. 15C, the gaze of the user is not directed toward any of the gaze targets, as indicated by gaze indication 1520. At FIG. 15C, At FIG. 15D, the user is still not looking at any gaze targets 1522a-1522f, and a threshold duration of time has elapsed without the user looking at any gaze targets 1522a-1522f. In response to determining that the threshold duration of time has elapsed without the user looking at any gaze targets 1522a-1522f, electronic device 1500 displays indication 1524 instructing the user to look at a gaze target and perform the registration input, as the user was instructed via user interface 1514.

Figure 15D:
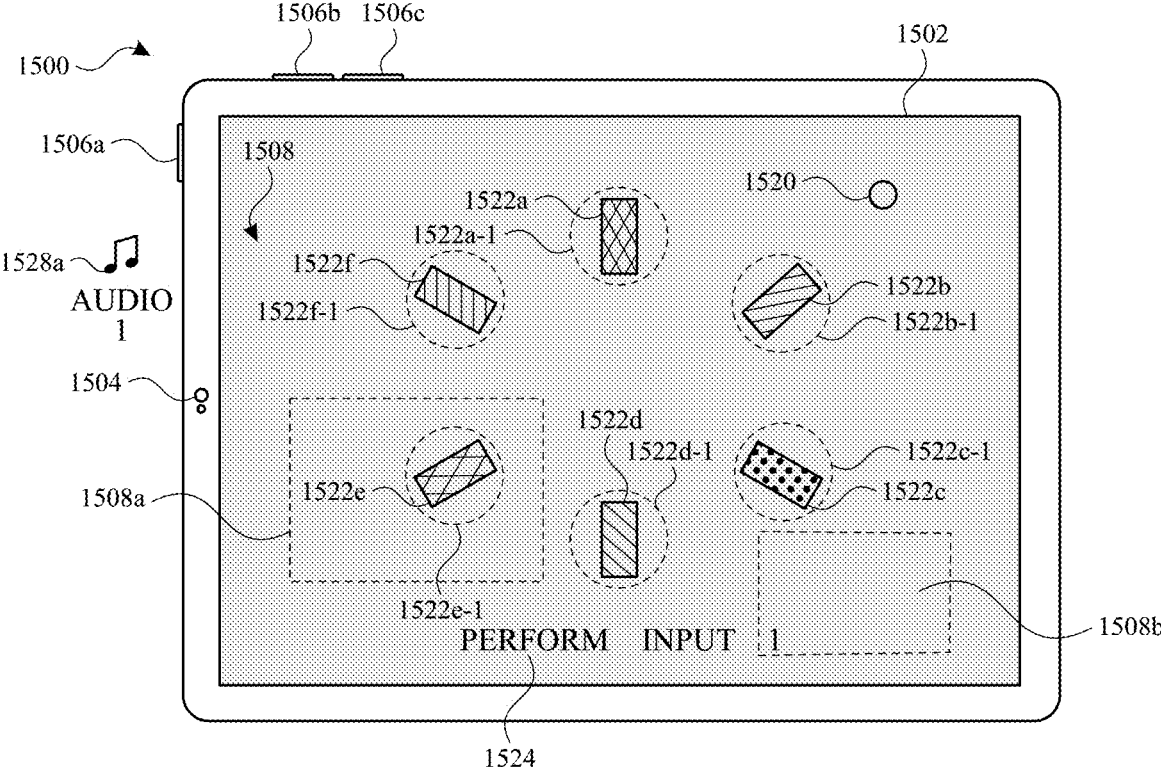
Figure 15E:
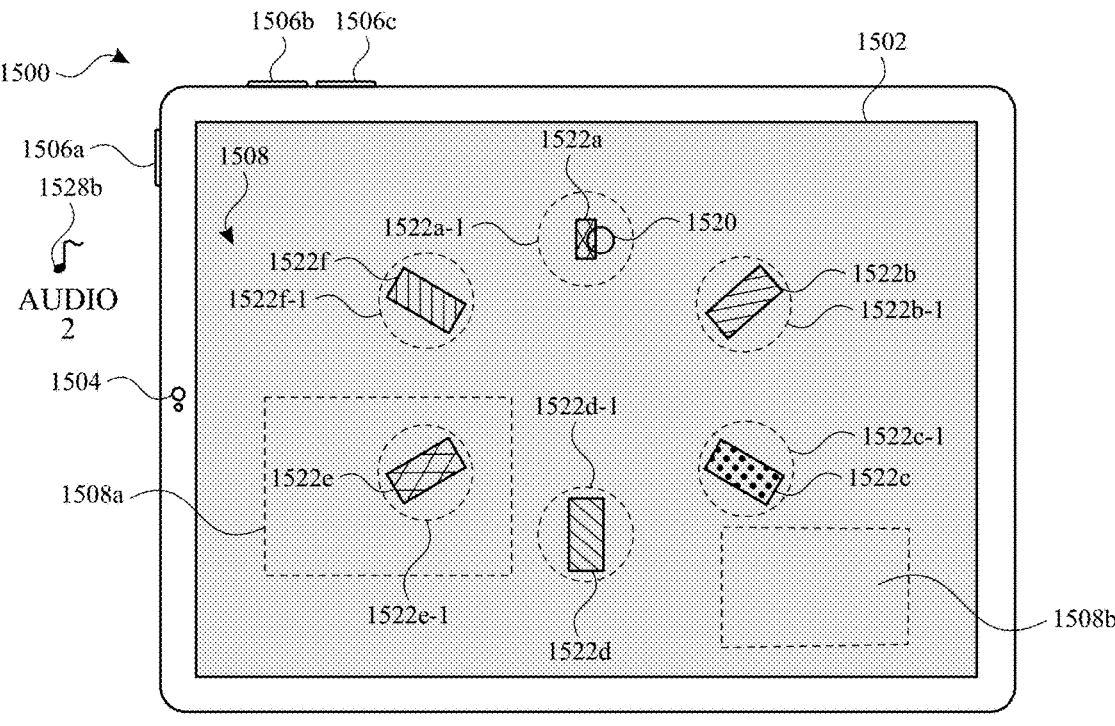

At FIG. 15E, electronic device 1500 determines that the gaze of the user has moved within region 1522a-1 corresponding to gaze target 1522a. In response to this determination, electronic device 1500 displays gaze target 1522 shrinking in size to a first shrunken size, and outputs audio output 1528b. In some embodiments, audio output 1528b corresponds to gaze target 1522a (e.g., in some embodiments, corresponds uniquely to gaze target 1522a), and is indicative of the user looking at gaze target 1522a (e.g., looking within region 1522a-1). In some embodiments, each gaze target 1522a-1522f corresponds to a unique sound (e.g., a unique musical note) that is indicative of the user looking at the gaze target. As discussed above, in order for a user to complete gaze tracking enrollment for a particular gaze target, the user must look at the gaze target and perform a respective action. However, in FIG. 15F, electronic device 1500 detects that the gaze of the user has moved to gaze target 1522b without the user having performed the respective action for gaze target 1522a.

Figure 15F:
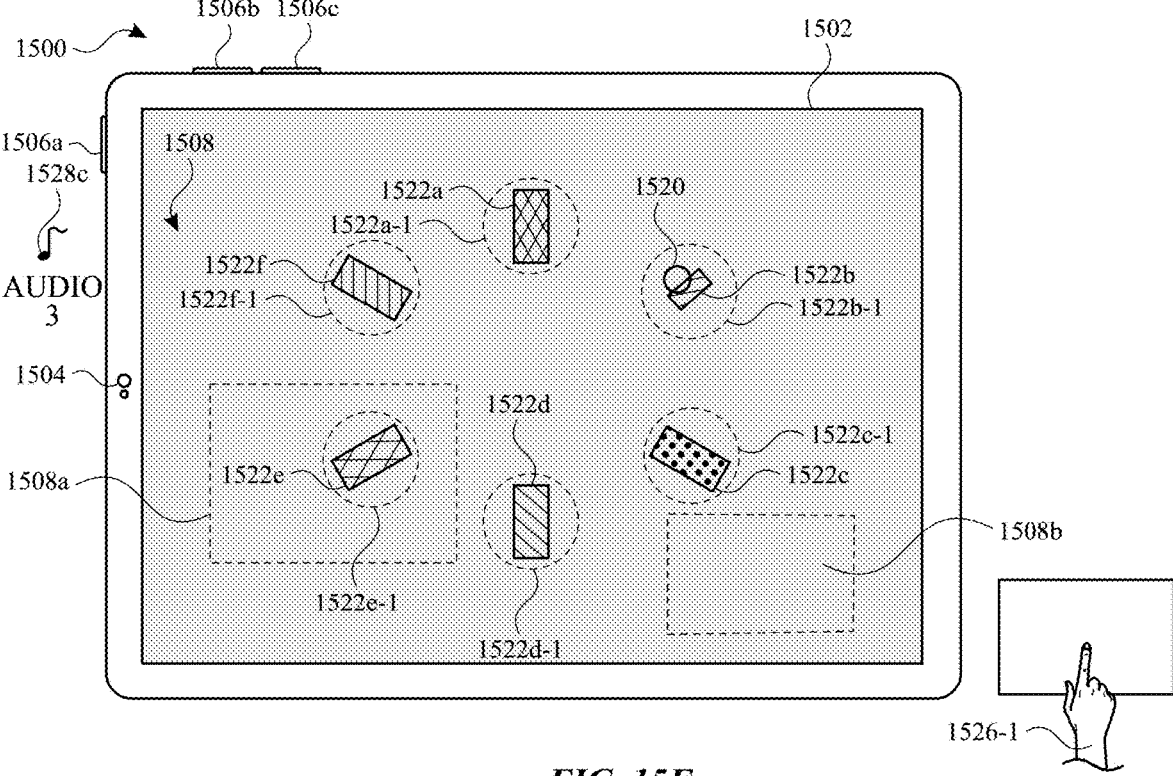

At FIG. 15F, in response to detecting that the gaze of the user is directed toward gaze target 1522b (e.g., the gaze of the user is within region 1522b-1), electronic device 1500 displays gaze target 1522b decrease in size to a first shrunken size, and outputs audio output 1528c. In some embodiments, audio output 1528c is different from audio output 1528b. As discussed above, in some embodiments, each gaze target 1522a-1522f corresponds to a unique sound (e.g., a unique musical note) that is indicative of the user looking at the gaze target. Accordingly, in some embodiments, audio output 1528c corresponds to gaze target 1522b and is indicative of the user looking at gaze target 1522b. Furthermore, in response to detecting that the gaze of the user is no longer directed toward gaze target 1522a (e.g., the gaze of the user is outside of region 1522a-1), electronic device 1500 displays gaze target 1522a expand back to its original size, and ceases output of audio output 1528b corresponding to gaze target 1522*a*. At FIG. 15F, while the gaze of the user is directed toward gaze target 1522*b*, electronic device 1500 detects user input 1526-1. In some embodiments, user input 1526-1 is a particular user input that the user is instructed to perform for gaze tracking enrollment. In some embodiments, user input 1526-1 is a air pinch gesture, an air tap gesture, and/or an air swipe gesture. In the depicted embodiments, the respective user input that is required by the gaze tracking enrollment process is a two-part input, and user input 1526-1 represents a first part of the input. For example, one example of a two-part input is an air pinch close gesture (e.g., two fingers of the user moving closer together) followed by an air pinch open gesture (e.g., two fingers of the user moving further apart). In this example, user input 1526-1 is the air pinch close gesture.

At FIG. 15G1, in response to detecting user input 1526-1 while the gaze of the user is directed toward gaze target 1522*b*, electronic device 1500 displays gaze target 1522*b* shrink to an even smaller size, and outputs audio output 1528*d*. In some embodiments, audio output 1528*d* is different from audio output 1528*c*. In some embodiments, audio output 1528*d* corresponds to gaze target 1522*b* (e.g., corresponds uniquely to gaze target 1522*b*), and is indicative of detecting the first part of the respective input for gaze tracking enrollment while the gaze of the user is directed toward gaze target 1522*b*. In some embodiments, each gaze target 1522*a*-1522*f* has a respective, different sound (e.g., a respective different musical note) that corresponds to detecting the first part of the respective input for gaze tracking enrollment while the gaze of the user is directed at that gaze target. At FIG. 15G1, electronic device 1500 detects user input 1526-2 while the gaze of the user is maintained on gaze target 1522*b* (e.g., is maintained within region 1522*b*-1). In some embodiments, user input 1526-2 is the second part of the respective input required for gaze tracking enrollment and/or is completion of the respective input.

In some embodiments, the techniques and user interface(s) described in FIGS. 15A-15Y are provided by one or more of the devices described in FIGS. 1A-1P. For example, FIG. 15G2 illustrates an embodiment in which gaze target 1522*b* (e.g., as described in FIGS. 15C-15G1) is displayed on display module X702 of head-mounted device (HMD) X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

At FIG. 15G2, in response to detecting user input 1526-1 while the gaze of the user is directed toward gaze target 1522*b*, HMD X700 displays gaze target 1522*b* shrink to an even smaller size, and outputs audio output X1528*d*. In some embodiments, audio output X1528*d* is different from audio output 1528*c*. In some embodiments, audio output X1528*d* corresponds to gaze target 1522*b* (e.g., corresponds uniquely to gaze target 1522*b*), and is indicative of detecting the first part of the respective input for gaze tracking enrollment while the gaze of the user is directed toward gaze target 1522*b*. In some embodiments, each gaze target 1522*a*-1522*f* has a respective, different sound (e.g., a respective different musical note) that corresponds to detecting the first part of the respective input for gaze tracking enrollment while the gaze of the user is directed at that gaze target. At FIG. 15G2, HMD X700 detects user input X1526-2 while the gaze of the user is maintained on gaze target 1522*b* (e.g., is maintained within region 1522*b*-1). In some embodiments, user input X1526-2 is the second part of the respective input required for gaze tracking enrollment and/or is completion of the respective input.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122*a*-*b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a*-*f*, either alone or in any combination. In some embodiments, HMD X700 includes one or more input devices, which include any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output X1528*d*), optionally generated based on detected events and/or user inputs detected by the HMD X700.

At FIG. 15H1, in response to detecting user input 1526-2 while the gaze of the user is maintained on gaze target 1522*b*, electronic device 1500 outputs audio output 1528*e* and displays gaze target 1522*b* expanding in size (e.g., back to its original size or a different size). Furthermore, gaze target 1522*b* is displayed in a different manner to indicate that gaze tracking enrollment for gaze target 1522*b* is now completed (e.g., in FIG. 15H1, gaze target 1522*b* is displayed with a bolded outline). In some embodiments, audio output 1528*e* is different from audio output 1528*d* and/or audio output X1528*d*. In some embodiments, audio output 1528*e* corresponds to gaze target 1522*b* (e.g., corresponds uniquely to gaze target 1522*b*), and is indicative of detecting the second part of the respective input for gaze tracking enrollment while the gaze of the user is directed toward gaze target 1522*b*. In some embodiments, each gaze target 1522*a*-1522*f* has a respective, different sound (e.g., a respective different musical note) that corresponds to detecting the second part of the respective input for gaze tracking enrollment while the gaze of the user is directed at that gaze target. As discussed above, in some embodiments, each gaze target has a corresponding sound (e.g., musical note) for when the gaze of the user is directed at the gaze target, when the first part of the respective input is detected while the gaze of the user is directed at the gaze target, and when the second part of the respective input is detected while the gaze of the user is directed at the gaze target. Accordingly, in some embodiments, each gaze target has a unique sequence of three sounds (e.g., a unique sequence of three notes) that is played when the user completes gaze enrollment for that particular gaze target. FIG. 15Y displays an example set of gaze targets and example corresponding sequences of musical notes for each of the gaze targets. Table 1 below displays a genericized version of the table in FIG. 15Y, with the various notes being described in reference to one another and/or with reference to a root note.

TABLE 1

| Event | On Focus | On Pinch |
|---|---|---|
| Dark - 1 | Fifth + 1 | Second + 2 |
| | | Fifth + 2 |
| Dark - 2 | Third + 1 | Seventh + 1 |
| | | Third + 2 |
| Dark - 3 | Root + 1 | Fifth + 1 |
| | | Root + 2 |
| Dark - 4 | Fifth | Fifth + 1 |
| | | Root + 2 |
| Dark - 5 | Third | Seventh |
| | | Third + 1 |
| Dark - 6 | Root | Fifth |
| | | Root + 1 |
| Dark - Final | Root + 2 | Fifth + 2 |
| | | Root + 3 |
| Light - 1 | Third + 2 | Seventh + 2 |
| | | Third + 3 |
| Light - 2 | Root + 2 | Fifth + 2 |
| | | Root + 3 |
| Light - 3 | Fifth + 1 | Second + 2 |
| | | Fifth + 2 |
| Light - 4 | Third + 1 | Seventh + 1 |
| | | Third + 2 |
| Light - 5 | Root + 1 | Fifth + 1 |
| | | Root + 2 |
| Light - 6 | Fifth | Second + 1 |
| | | Fifth + 1 |
| Light - Final | Root | Fifth |
| | | Root + 1 |

Although the depicted embodiments show embodiments in which electronic device 1500 displays separate feedback (e.g., visual and audio) for the first part of the respective input and the second part of the respective input, in some embodiments, electronic device 1500 outputs both parts of the feedback in response to detecting completion of the respective input. For example, in embodiments in which the respective input is an air pinch close gesture and an air pinch open gesture, rather than showing shrinking of the gaze target and outputting first audio in response to the air pinch close gesture and then showing expansion of the gaze target and outputting second audio in response to the air pinch open gesture (e.g., as shown in FIGS. 15G1-15H2), in some embodiments, electronic device 1500 displays shrinking and then expansion of the gaze target and outputs the first audio and then the second audio in response to detecting completion of the entire gesture (e.g., pinch close and then pinch open).

In some embodiments, the techniques and user interface(s) described in FIGS. 15A-15Y are provided by one or more of the devices described in FIGS. 1A-1P. For example, FIG. 15H2 illustrates an embodiment in which gaze target 1522*b* (e.g., as described in FIGS. 15C-15H1) is displayed on display module X702 of head-mounted device (HMD) X700. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

At FIG. 15H2, in response to detecting user input 1526-2 and/or user input X1526-2 while the gaze of the user is maintained on gaze target 1522*b*, HMD X700 outputs audio output X1528*e* and displays gaze target 1522*b* expanding in size (e.g., back to its original size or a different size). Furthermore, gaze target 1522*b* is displayed in a different manner to indicate that gaze tracking enrollment for gaze target 1522*b* is now completed (e.g., in FIG. 15H2, gaze target 1522*b* is displayed with a bolded outline). In some embodiments, audio output X1528*e* is different from audio output 1528*d* and/or X1528*d*. In some embodiments, audio output X1528*e* corresponds to gaze target 1522*b* (e.g., corresponds uniquely to gaze target 1522*b*), and is indicative of detecting the second part of the respective input for gaze tracking enrollment while the gaze of the user is directed toward gaze target 1522*b*. In some embodiments, each gaze target 1522*a*-1522*f* has a respective, different sound (e.g., a respective different musical note) that corresponds to detecting the second part of the respective input for gaze tracking enrollment while the gaze of the user is directed at that gaze target. As discussed above, in some embodiments, each gaze target has a corresponding sound (e.g., musical note) for when the gaze of the user is directed at the gaze target, when the first part of the respective input is detected while the gaze of the user is directed at the gaze target, and when the second part of the respective input is detected while the gaze of the user is directed at the gaze target. Accordingly, in some embodiments, each gaze target has a unique sequence of three sounds (e.g., a unique sequence of three notes) that is played when the user completes gaze enrollment for that particular gaze target. FIG. 15Y displays an example set of gaze targets and example corresponding sequences of musical notes for each of the gaze targets. Although the depicted embodiments show embodiments in which HMD X700 displays separate feedback (e.g., visual and audio) for the first part of the respective input and the second part of the respective input, in some embodiments, HMD X700 outputs both parts of the feedback in response to detecting completion of the respective input. For example, in embodiments in which the respective input is an air pinch close gesture and an air pinch open gesture, rather than showing shrinking of the gaze target and outputting first audio in response to the air pinch close gesture and then showing expansion of the gaze target and outputting second audio in response to the air pinch open gesture (e.g., as shown in FIGS. 15G1-15H2), in some embodiments, HMD X700 displays shrinking and then expansion of the gaze target and outputs the first audio and then the second audio in response to detecting completion of the entire gesture (e.g., pinch close and then pinch open).

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, either alone or in any combination. In some embodiments, HMD X700 includes one or more input devices, which include any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output X1528*e*), optionally generated based on detected events and/or user inputs detected by the HMD X700.

Figures 15I, 15J:
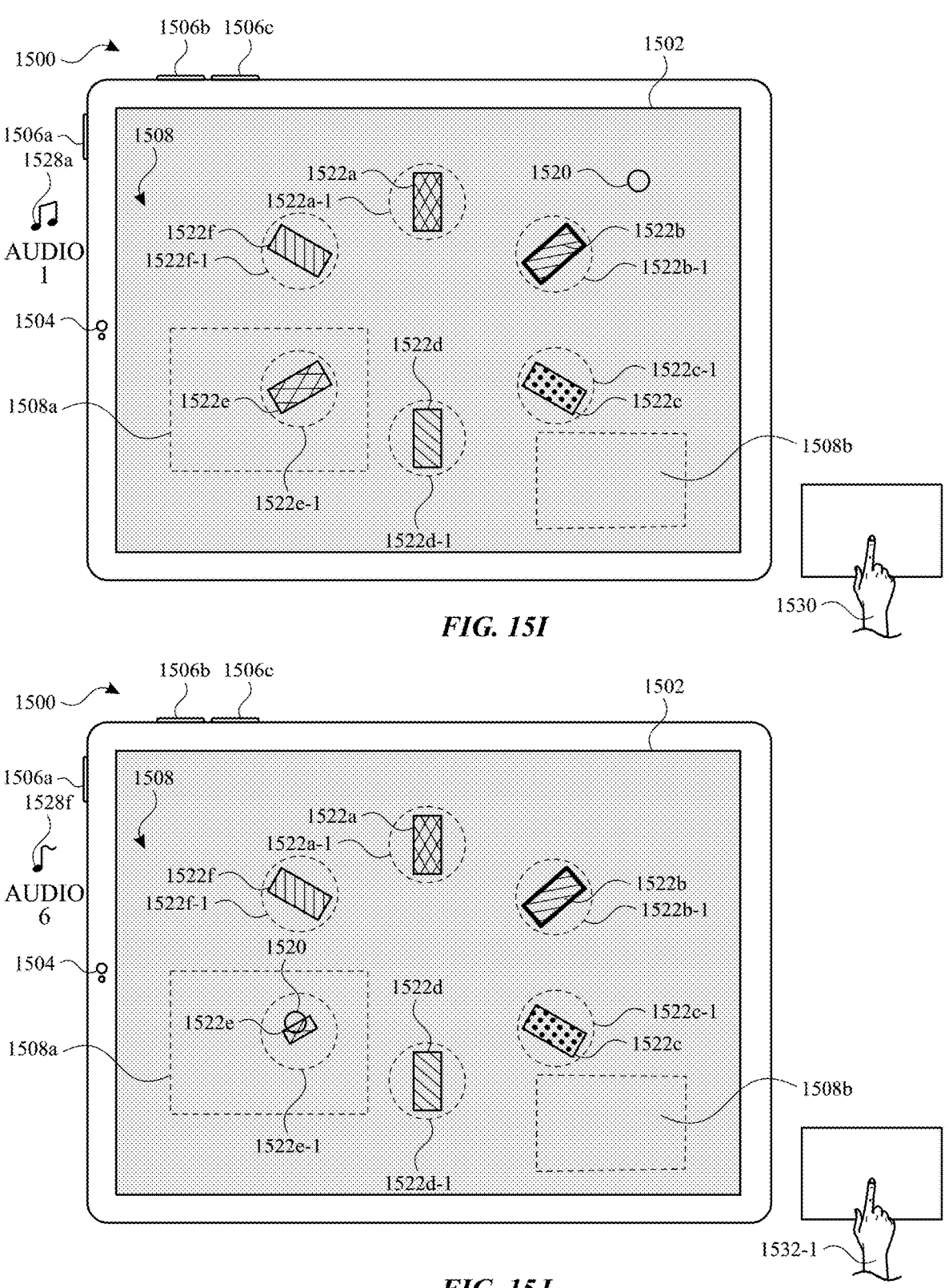

At FIG. 15I, electronic device 1500 detects that the gaze of the user is not directed toward any gaze target 1522*a*-1522*f* and, in response, outputs audio output 1528*a* (e.g., a background audio output). At FIG. 15I, electronic device 1500 detects user input 1530, which is the respective input required for gaze tracking enrollment (e.g., the first part of the respective input or the first and second parts of the respective input). However, because the gaze of the user is not directed toward any gaze target, electronic device 1500 does not respond and/or react to user input 1530.

At FIG. 15J, electronic device 1500 detects that the gaze of the user is directed toward gaze target 1522*e* (e.g., the gaze of the user is within region 1522*e*-1) and, in response displays gaze target 1522*e* shrinking in size to a first shrunken size, and outputs audio output 1528*f*. In some embodiments, audio output 1528*f* is indicative of the user looking at gaze target 1522*e*. At FIG. 15J, while the gaze of the user is directed toward gaze target 1522*e*, electronic device 1500 detects user input 1532-1, which is a first part of the respective input required for completing gaze tracking enrollment corresponding to a gaze target.

Figures 15K, 15L:
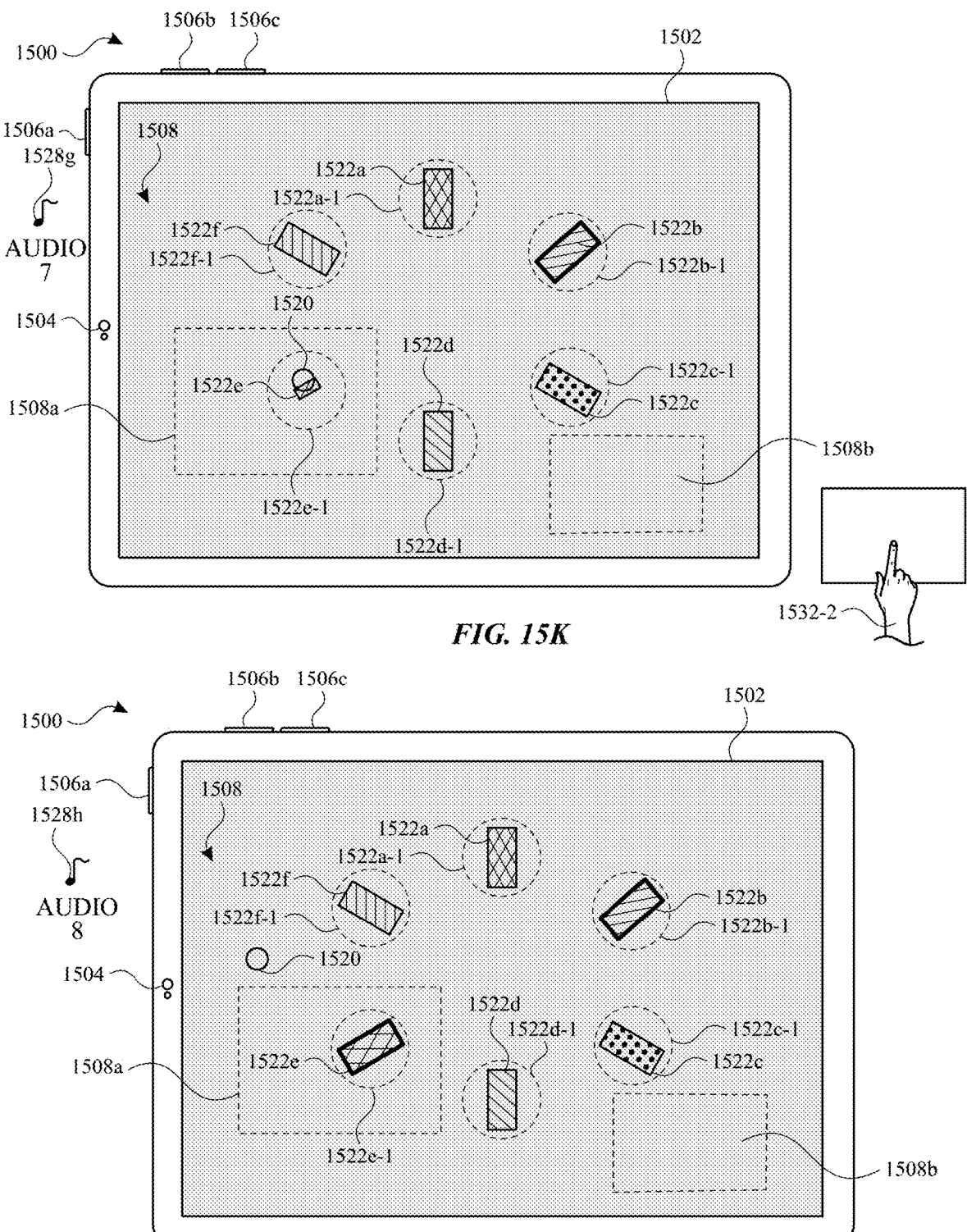

At FIG. 15K, in response to detecting user input 1532-1 while the gaze of the user is directed toward gaze target 1522*e*, electronic device 1500 outputs audio output 1528*g* and displays gaze target 1522*e* shrinking even further. In some embodiments, audio output 1528*g* is different from audio output 1528*f*, and is indicative of detecting the first part of the respective input while the gaze of the user is directed toward gaze target 1522*e*. At FIG. 15K, while the gaze of the user is directed toward gaze target 1522*e*, electronic device 1500 detects user input 1532-2, which is the second part of the respective input required for completing gaze tracking enrollment corresponding to a gaze target.

At FIG. 15L, in response to detecting user input 1532-2 while the gaze of the user is directed toward gaze target 1522*e*, electronic device 1500 outputs audio output 1528*h* and displays gaze target 1522*e* expanding in size (e.g., back to its original size or a different size). Furthermore, gaze target 1522*e* is displayed in a different manner to indicate that gaze tracking enrollment for gaze target 1522*e* is now completed (e.g., in FIG. 15L, gaze target 1522*e* is displayed with a bolded outline). In some embodiments, audio output 1528*h* is different from audio output 1528*g*, and is indicative of detecting the second part of the respective input while the gaze of the user is directed toward gaze target 1522*e*.

While some of the depicted embodiments show regions 1522*a*-1 through 1522*f*-1 remaining constant in size throughout the enrollment process, in some embodiments, regions 1522*a*-1 through 1522*f*-1 change in size over time. In some embodiments, regions 1522*a*-1 through 1522*f*-1 shrink further after each successfully completed gaze target. In this way, gaze enrollment can progress from a more coarse enrollment to a more granular and/or precise enrollment for later gaze targets (e.g., either for successive gaze targets in the same gaze enrollment stage and/or between different gaze enrollment stages). In some embodiments, gaze target regions for a plurality of gaze targets get successively smaller as additional gaze targets are enrolled through multiple iterations of enrolling gaze targets (in the same gaze enrollment stage and/or between different gaze enrollment stages). This will require increasingly precise gaze targeting by the user in order to progress through the gaze enrollment by enrolling additional gaze targets, which is enabled by increasingly accurate gaze detection by computer system based on previously enrolled gaze targets for prior portions of the gaze enrollment process. An example is shown in FIGS. 15C-15P via regions 1522*a*-2 through 1522*f*-2, which are shown progressively getting smaller as the enrollment process progresses.

In some embodiments, a user is able to interact with gaze targets 1522*a*-1522*f* and complete gaze tracking enrollment for the gaze targets 1522*a*-1522*f* in any order. At FIG. 15M, the user has completed gaze tracking enrollment for all gaze targets except for gaze target 1522*c*. As discussed above, in some embodiments, each gaze target 1522*a*-1522*f* has a unique sequence of sounds corresponding to it, and when a user looks at a respective gaze target and performs the respective input required for gaze tracking enrollment, electronic device 1500 outputs the unique sequence of sounds corresponding to the respective gaze target. However, in some embodiments, for a final gaze target of the set of gaze targets 1522*a*-1522*f* for which gaze tracking enrollment has not yet been complete, the corresponding sequence of sounds is replaced with a predetermined sequence of sounds corresponding to a final gaze target. In other words, regardless of which gaze target 1522*a*-1522*f* is the last gaze target to be completed from the set, electronic device 1500 will output a predetermined sequence of sounds when enrollment is performed for the final gaze target. For example, in FIG. 15Y, the predetermined sequence of sounds is listed in the "FINAL" row of the table. At FIG. 15M, gaze target 1522*c* is the final gaze target for which gaze tracking enrollment has not yet been completed. At FIG. 15M, electronic device 1500 detects that the gaze of the user is directed toward gaze target 1522*c* and, in response, displays gaze target 1522*c* shrinking in size and outputs audio output 1528*i*. However, rather than audio output 1528*i* being a sound that corresponds to gaze target 1522*c* (e.g., the sound that would normally be output when the user looks at gaze target 1522*c*), because gaze target 1522*c* is the final gaze target, audio output 1528*i* is indicative of the gaze of the user being directed toward a final remaining gaze target. At FIG. 15M, while the gaze of the user is directed toward gaze target 1522*c*, electronic device 1500 detects user input 1534-1, which is the first part of the respective input required for completing gaze tracking enrollment corresponding to a gaze target.

Figures 15M, 15N:
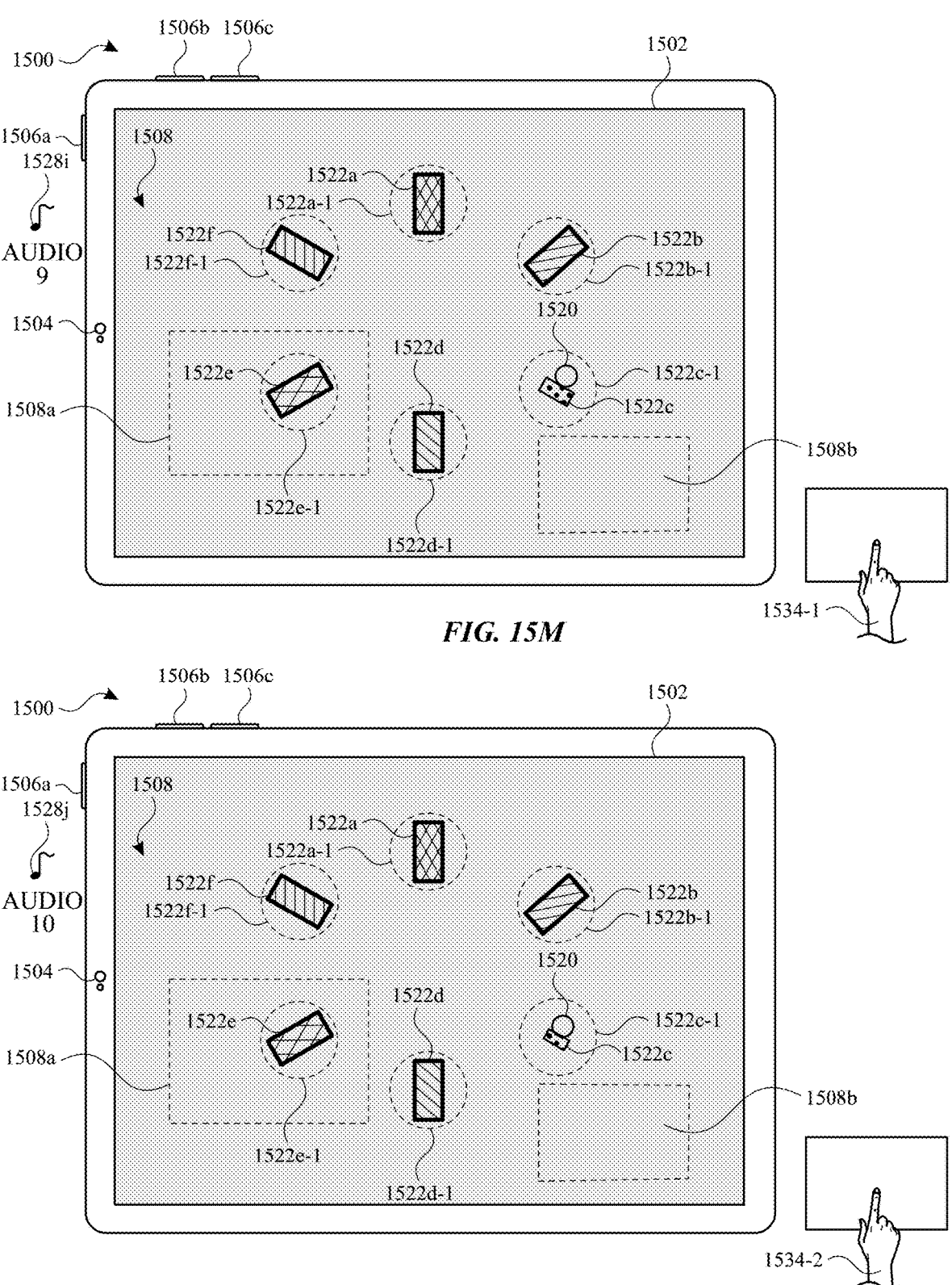

At FIG. 15N, in response to detecting user input 1534-1 while the gaze of the user is directed toward gaze target 1522*c*, electronic device 1500 displays gaze target 1522*c* shrinking further, and outputs audio output 1528*j*. However, rather than audio output 1528*j* being a sound that corresponds to gaze target 1522*c* (e.g., the sound that would normally be output when the user performs the first part of the respective input while looking at gaze target 1522*c*), because gaze target 1522*c* is the final gaze target, audio output 1528*j* is indicative of the user performing the first part of the respective input while the gaze of the user is directed toward the final remaining gaze target. At FIG. 15N, while the gaze of the user is directed toward gaze target 1522*c*, electronic device 1500 detects user input 1534-2, which is the second part of the respective input required for completing gaze tracking enrollment corresponding to a gaze target.

Figure 15O:
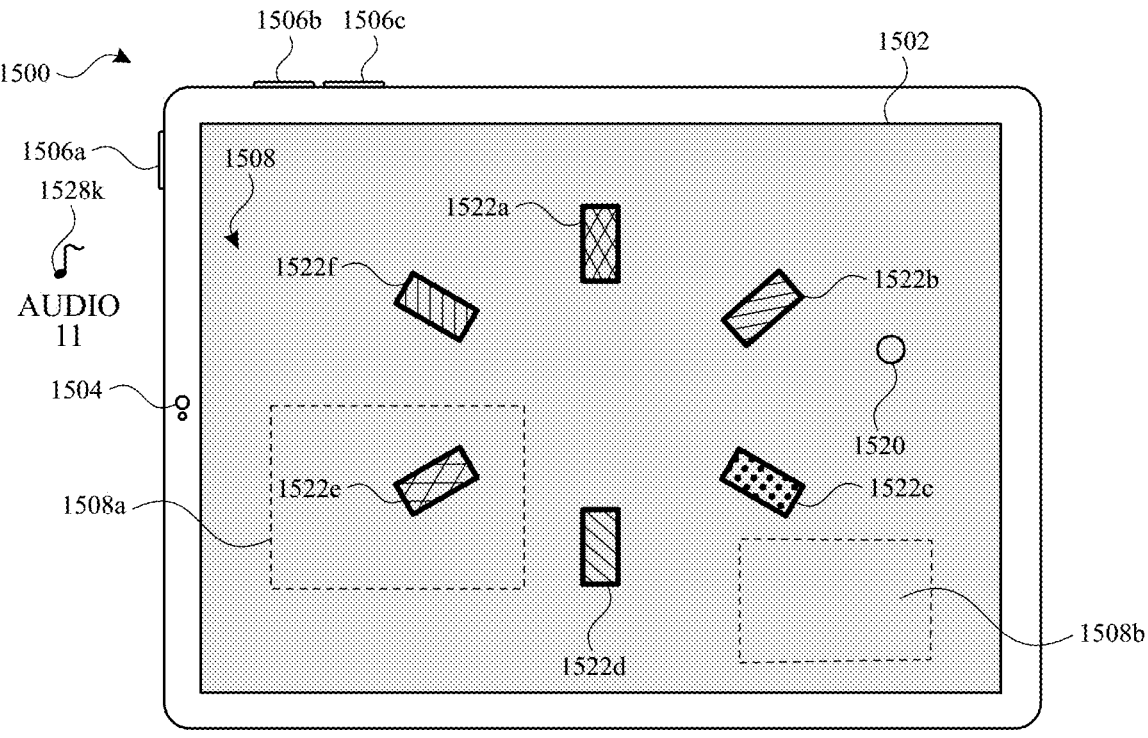
Figure 15P:
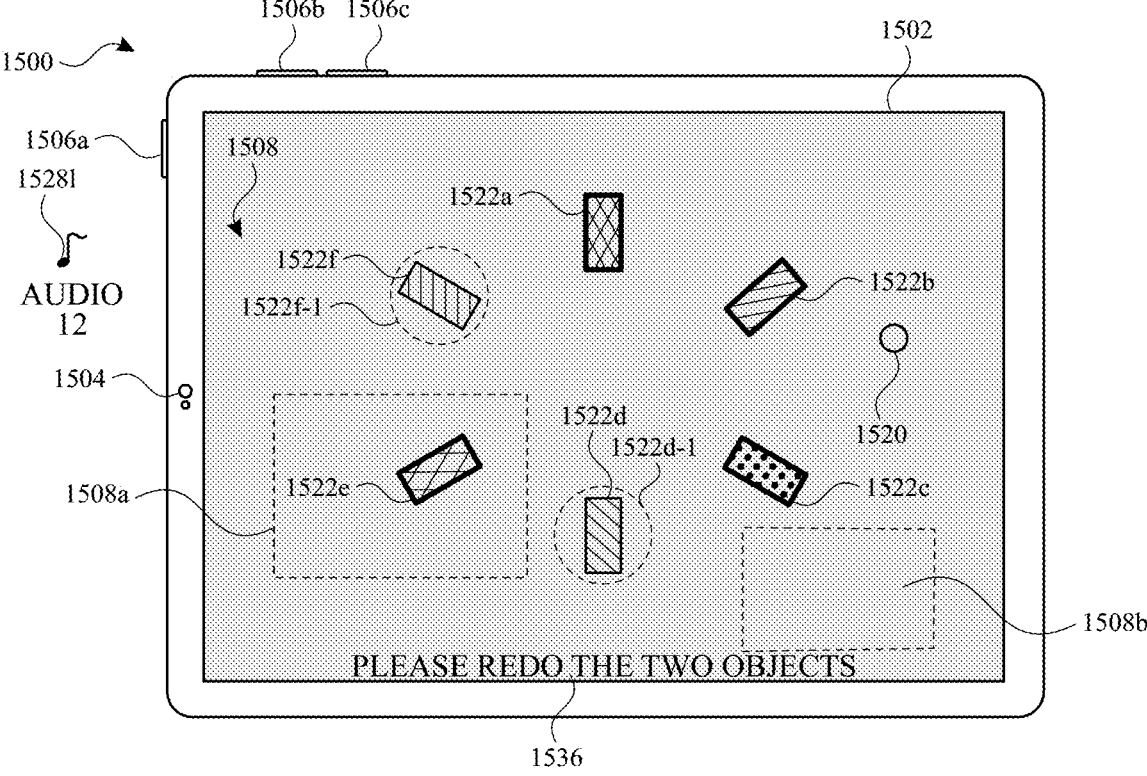

At FIG. 15O, in response to detecting user input 1534-2 while the gaze of the user is directed toward gaze target 1522*c*, electronic device 1500 displays expanding in size (e.g., back to its original size or a different size) and outputs audio output 1528*k*. However, rather than audio output 1528*k* being a sound that corresponds to gaze target 1522*c* (e.g., the sound that would normally be output when the user performs the second part of the respective input while looking at gaze target 1522*c*), because gaze target 1522*c* is the final gaze target, audio output 1528*k* is indicative of the user performing the second part of the respective input while the gaze of the user is directed toward the final remaining gaze target. At FIG. 15O, gaze target enrollment has now been performed for each of gaze targets 1522*a*-1522*f*, and all the gaze targets are shown with a bold outline.

Figure 15Q:
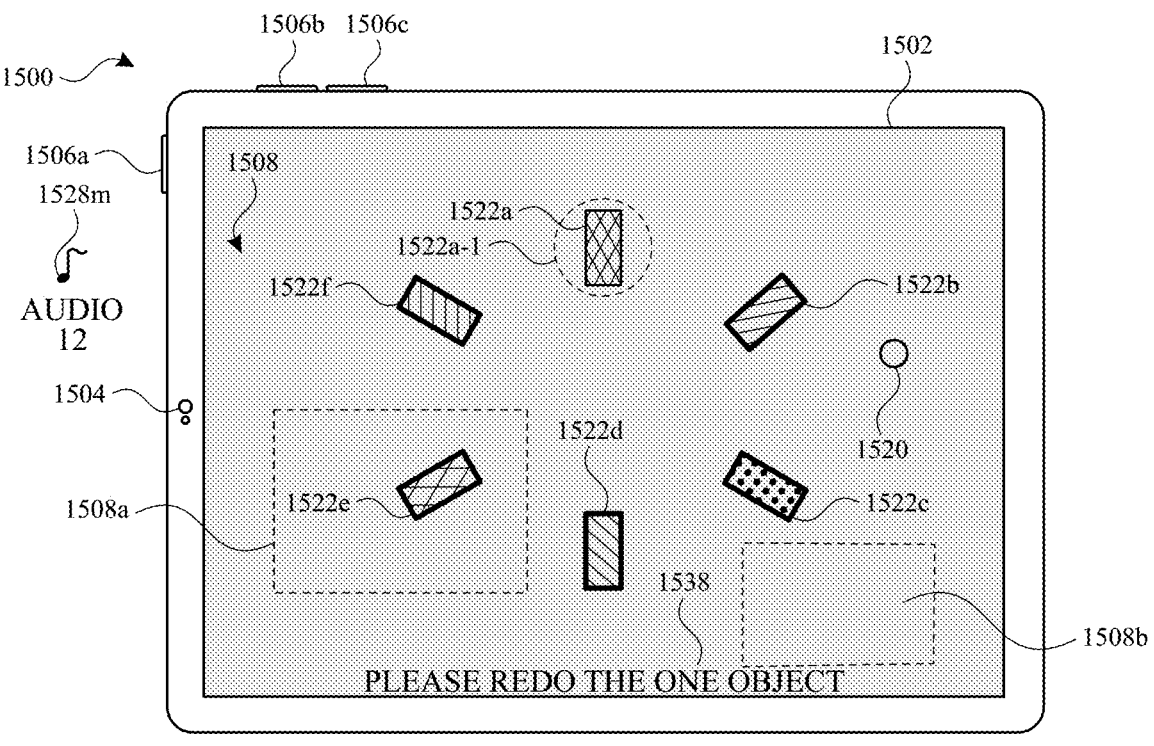

FIG. 15P and FIG. 15Q depict example scenarios in which electronic device 1500 determines that collected biometric information corresponding to one or more of gaze targets 1522*a*-1522*f* is unsatisfactory. In FIG. 15P, electronic device 1500 determines that collected biometric information corresponding to gaze target 1522*d* and gaze target 1522*f* is unsatisfactory. In response, electronic device 1500 displays gaze target 1522 and gaze target 1522*f* in a different manner (e.g., in FIG. 15P, they are unbolded), and instructs the user via instruction 1536 to reperform the respective input for these two gaze targets. In FIG. 15O, electronic device 1500 determines that collected biometric information corresponding to gaze target 1522*a* is unsatisfactory. In response, electronic device 1500 displays gaze target 1522*a* in a different manner (e.g., in FIG. 15Q, gaze target 1522*a* is unbolded), and instructs the user via instruction 1538 to reperform the respective input for this gaze target.

Figure 15R:
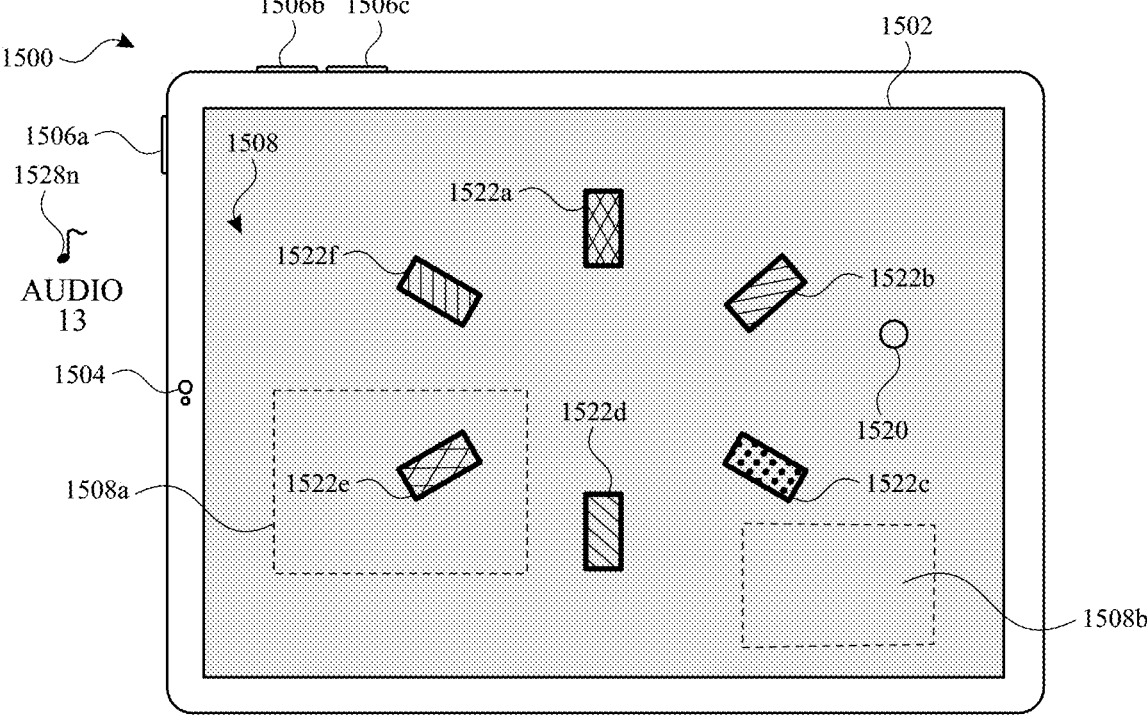

FIG. 15R depicts an example scenario in which biometric information corresponding to gaze targets 1522*a*-1522*f* is found to satisfy completion criteria (e.g., after FIG. 15O, or after the user re-performs the respective input for the gaze targets identified in FIGS. 15P and/or 15Q). At FIG. 15R, in response to determining that gaze tracking enrollment is successfully completed for all gaze targets, electronic device 1500 outputs success audio output 1528*n*.

Figure 15S:
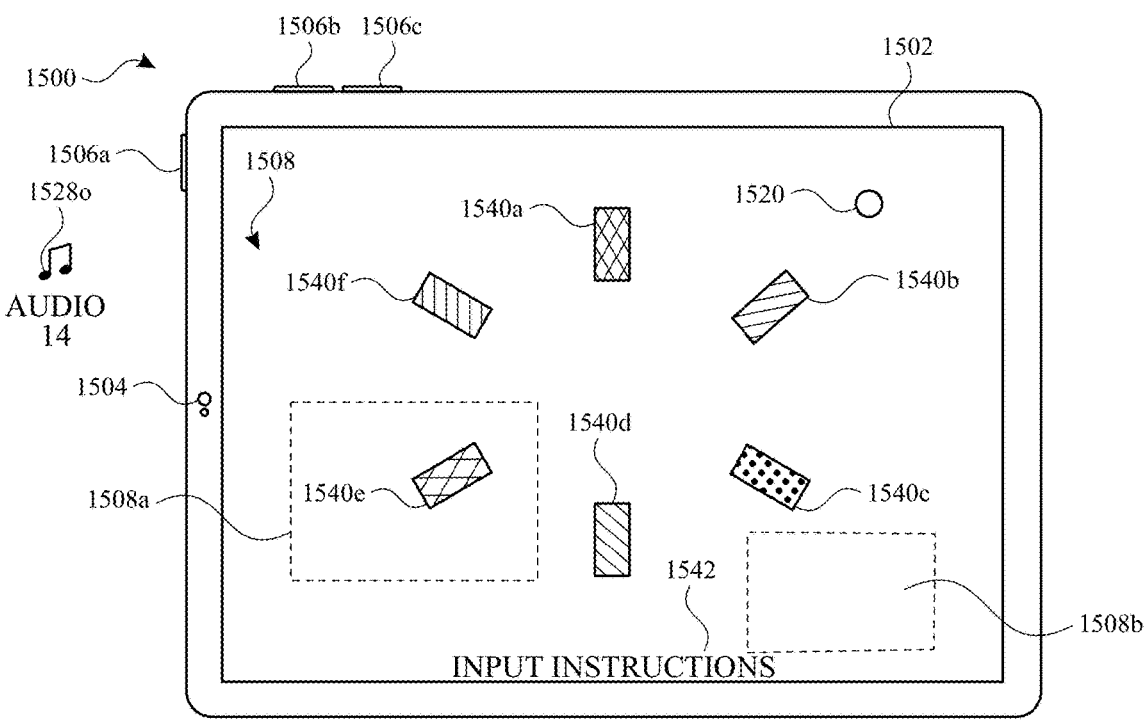

In some embodiments, the gaze tracking enrollment process includes a plurality of stages, and FIGS. 15A-15R represent a first stage in the gaze tracking enrollment process. In some embodiments, the various stages are displayed at different brightness levels in order to collect eye scans from the user while the user's pupils are in various states of dilation. At FIG. 15S, subsequent to successful completion of the first stage of gaze tracking enrollment, electronic device 1500 displays gaze targets 1540*a*-1540*f* (e.g., in some embodiments, at the same locations gaze targets 1522*a*-1522*f* were previously displayed). In FIG. 15S, three-dimensional environment 1508 is displayed at a brighter brightness than in FIGS. 15A-15R, and gaze targets 1540*a*-1540*f* are brighter than gaze targets 1522*a*-1522*f*. With the brightness of displayed components changed to a brighter brightness, electronic device 1500 repeats the gaze tracking enrollment process that was described above with reference to FIGS. 15A-15R.

Figure 15T:
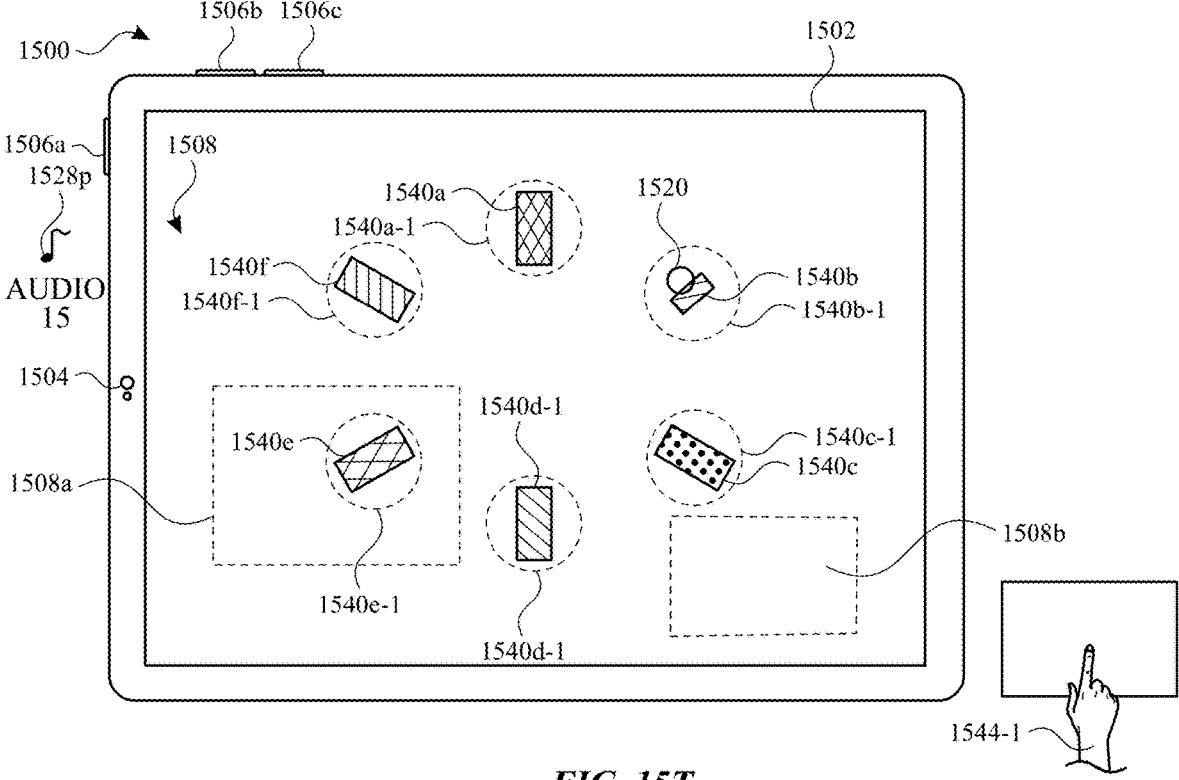

At FIG. 15S, electronic device 1500 detects that the gaze of the user is not directed toward any of gaze targets 1540*a*-1540*f*, and outputs audio output 1528*o* (e.g., a background audio output). At FIG. 15T, electronic device 1500 detects that the gaze of the user is directed toward gaze target 1540*b*. In response, electronic device 1500 displays gaze target 1540*b* shrinking in size, and outputs audio output 1528*p*. In some embodiments, audio output 1528*p* corresponds to gaze target 1540*b*, and is indicative of the gaze of the user being directed toward gaze target 1540*b*. At FIG. 15T, electronic device 1500 detects user input 1544-1 while the gaze of the user is directed toward gaze target 1540*b*. In some embodiments, user input 1544-1 is a first part of the respective input required for performing gaze tracking enrollment for a gaze target.

Figures 15U, 15V:
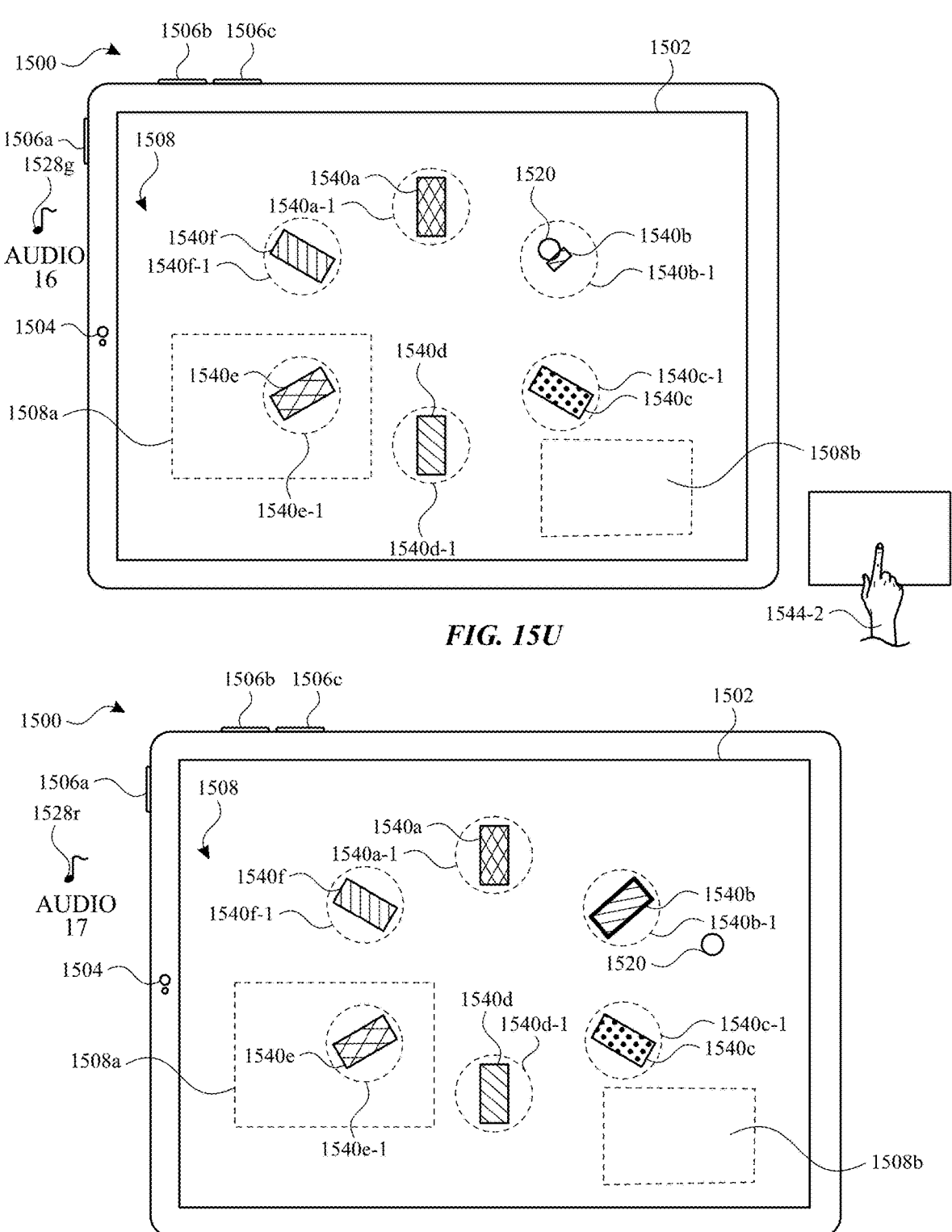

At FIG. 15U, in response to detecting user input 1544-1 while the gaze of the user is directed toward gaze target 1540*b*, electronic device 1500 displays gaze target 1540*b* shrinking further in size, and outputs audio output 1528*q*. In some embodiments, audio output 1528*q* is different from audio output 1528*p*. In some embodiments, audio output 1528*q* corresponds to gaze target 1540*b*, and is indicative of the user performing the first part of the respective input while the gaze of the user is directed toward gaze target 1540*b*. At FIG. 15U, electronic device 1500 detects user input 1544-2 while the gaze of the user is directed toward gaze target 1540*b*. In some embodiments, user input 1544-2 is a second part of the respective input required for performing gaze tracking enrollment for a gaze target.

At FIG. 15V, in response to detecting user input 1544-2 while the gaze of the user is directed toward gaze target 1540*b*, electronic device 1500 displays gaze target 1540*b* expanding in size, and outputs audio output 1528*r*. In some embodiments, audio output 1528*r* is different from audio output 1528*q*. In some embodiments, audio output 1528*r* corresponds to gaze target 1540*b*, and is indicative of the user performing the second part of the respective input while the gaze of the user is directed toward gaze target 1540*b*. In FIG. 15V, electronic device 1500 displays gaze target 1540*b* in a different manner (e.g., with a bold outline) to indicate that gaze tracking enrollment has been completed for gaze target 1540*b*.

Figure 15W:
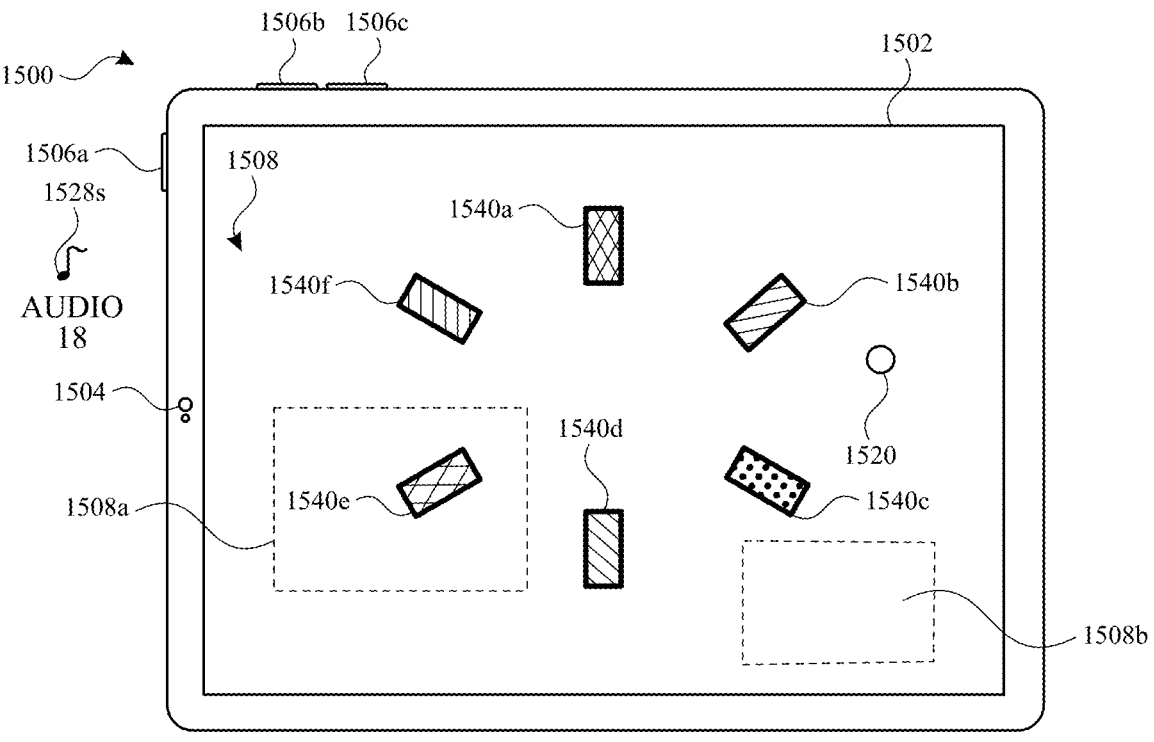
Figure 15X:
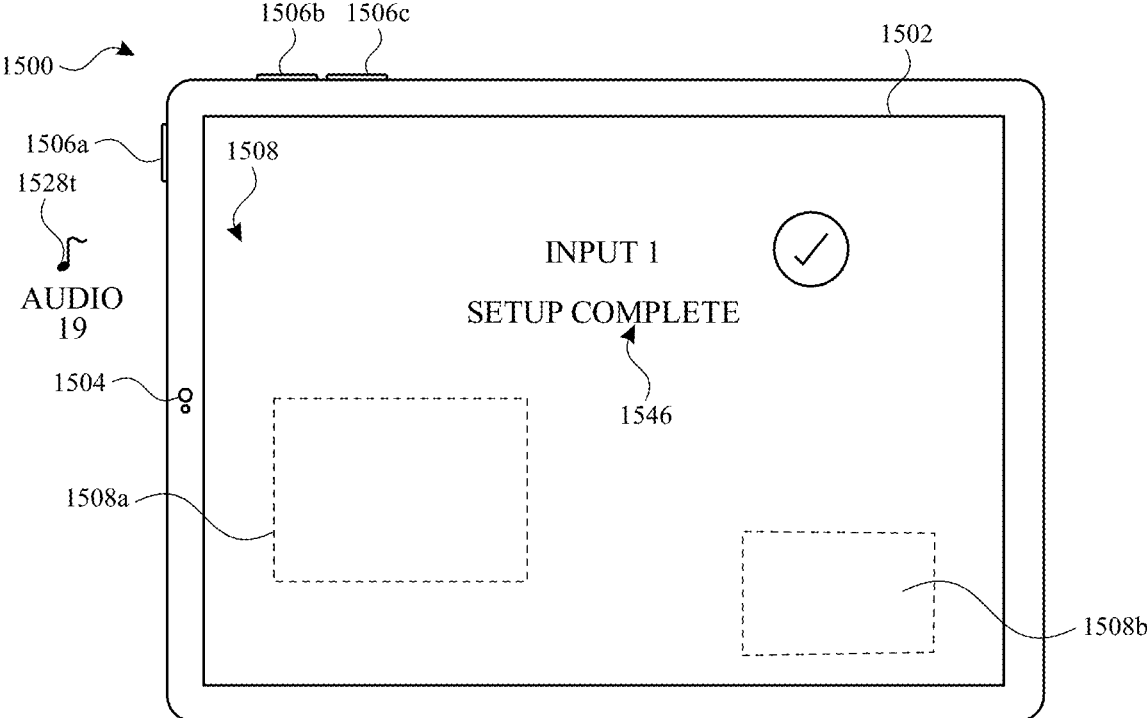

At FIG. 15W, the user has performed the respective input for all gaze targets 1540*a*-1540*f*. In some embodiments, when collected biometric information is found to be unsatisfactory for one or more of the gaze targets, electronic device 1500 instructs the user to re-perform the respective input for those gaze targets (e.g., as discussed above with reference to FIGS. 15P-15Q). In FIG. 15X, electronic device 1500 determines that collected biometric information for all gaze targets 1540*a*-1540*f* is satisfactory, and the gaze tracking enrollment process is completed. In response to this determination, electronic device 1500 outputs audio output 1528*t*, and displays user interface 1546. While the depicted embodiments, show two different stages with two different brightness levels, in some embodiments, more stages having different brightness levels are possible (e.g., 3 stages with 3 different brightness level, 4 stages with 4 different brightness levels, and so forth).

Additional descriptions regarding FIGS. 15A-15W are provided below in reference to methods 1600 and 1700 described with respect to FIGS. 15A-15W.

FIG. 16 is a flow diagram of an exemplary method 1600 for gaze tracking enrollment, in accordance with some embodiments. In some embodiments, method 1600 is performed at a computer system (e.g., 1500 and/or X700) (e.g., computer system 101 in FIG. 1A) (e.g., a smart phone, a smart watch, a tablet, a laptop, a desktop, a wearable device, and/or head-mounted device) that is in communication with one or more display generation components (e.g., a visual output device, a 3D display, a display having at least a portion that is transparent or translucent on which images can be projected (e.g., a see-through display), a projector, a heads-up display, and/or a display controller) and one or more input devices (e.g., a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an audio input device; a biometric sensor (e.g., a fingerprint sensor, a face identification sensor, a gaze tracking sensor, and/or an iris identification sensor) and/or one or more mechanical input devices (e.g., a depressible input mechanism; a button; a rotatable input mechanism; a crown; and/or a dial)). In some embodiments, the method 1600 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1600 are, optionally, combined and/or the order of some operations is, optionally, changed.

The computer system (e.g., 1500 and/or X700) displays (1602), via the one or more display generation components, a first gaze enrollment user interface (e.g., FIG. 15C), wherein the first gaze enrollment user interface includes a first plurality of gaze target elements (e.g., 1522a-1522f) (e.g., a first plurality of user interface elements that prompt the user to look at a plurality of different locations within the first gaze enrollment user interface; and/or a first plurality of user interface elements displayed at a plurality of different locations within the first gaze enrollment user interface to prompt the user to look at the plurality of different locations within the first gaze enrollment user interface), including a first gaze target element and a second gaze target element.

While displaying the first gaze enrollment user interface, the computer system (e.g., 700 and/or X700) detects (1604), via the one or more input devices, a selection input (e.g., 1526-1, 1526-2, 1532-1, 1532-2, 1534-1, and/or 1534-2) (e.g., a touchscreen input, an audio input, a gesture input, a mechanical input (e.g., pressing of a mechanical button and/or rotation of a rotatable input mechanism), a gaze input (e.g., a gaze of the user's eyes directed towards a respective location), and/or an air gesture input) In some embodiments, the selection input is an input that is separate from gaze input detected by the computer system (e.g., a touchscreen input, an audio input, a gesture input, a mechanical input (e.g., pressing of a mechanical button and/or rotation of a rotatable input mechanism), and/or an air gesture input).

In response (1606) to detecting the selection input and in accordance with a determination that a gaze of a user (e.g., 1520) (e.g., the user from which the selection input was received and/or detected; and/or the user that performed the selection input) was directed toward the first gaze target element (e.g., 1522b) when the selection input was detected (e.g., in accordance with a determination that the user is looking at the first gaze target element, looking at a region that surrounds the first gaze target element, and/or looking at a region that includes the first gaze target element) (e.g., when the selection input is detected, for the duration of the selection input, for the entirety of the selection input, for at least a threshold portion of the selection input (e.g., 50%, 60%, 70%, 80%, or 90%) when the selection input is initiated, and/or when the selection input is completed), the computer system (e.g., 1500 and/or X700) outputs (1608) first feedback (e.g., visual feedback, audio feedback, and/or haptic feedback) indicating that gaze enrollment information (e.g., biometric information, eye scan information, iris scan information, and/or pupil scan information) corresponding to the first gaze target element has been recorded (e.g., FIGS. 15E-15H1) (e.g., collected and/or saved). In some embodiments, in conjunction with outputting the first feedback indicating that gaze enrollment information corresponding to the first gaze target element has been recorded, the computer system records gaze enrollment information corresponding to the first gaze target element. In some embodiments, the first feedback indicating that gaze enrollment information corresponding to the first gaze target element has been recorded is output without outputting feedback indicating that gaze enrollment information corresponding to the second gaze target element has been recorded. In some embodiments, in response to detecting the selection input: in accordance with a determination that the gaze of the user was directed toward the second gaze target element when the selection input was detected (e.g., in accordance with a determination that the user is looking at the second gaze target element, looking at a region that surrounds the second gaze target element, and/or looking at a region that includes the second gaze target element) (e.g., when the selection input is detected, for the duration of the selection input, for the entirety of the selection input, for at least a threshold portion of the selection input (e.g., 50%, 60%, 70%, 80%, or 90%) when the selection input is initiated, and/or when the selection input is completed), the computer system outputs second feedback (e.g., visual feedback, audio feedback, and/or haptic feedback) (e.g., second feedback different from the first feedback) indicating that gaze enrollment information (e.g., biometric information, eye scan information, iris scan information, and/or pupil scan information) corresponding to the second gaze target element has been recorded (e.g., collected and/or saved). In some embodiments, in conjunction with outputting the second feedback indicating that gaze enrollment information corresponding to the second gaze target element has been recorded, the computer system records gaze enrollment information corresponding to the second gaze target element. In some embodiments, the second feedback indicating that gaze enrollment information corresponding to the second gaze target element has been recorded is output without outputting the first feedback indicating that gaze enrollment information corresponding to the first gaze target element has been recorded. In some embodiments, in response to detecting the selection input: in accordance with a determination that the gaze of the user was not directed toward the first gaze target element or the second gaze target element (e.g., was not directed to any of the first plurality of gaze target elements), the computer system forgoes outputting the first feedback or the second feedback. In some embodiments, the first gaze enrollment user interface is displayed as part of a gaze enrollment procedure in which biometric information (e.g., eye scan information and/or gaze tracking information) is collected from a user. Outputting first feedback indicating that gaze enrollment information corresponding to the first gaze target element has been recorded in response to detecting a selection input while a gaze of the user is directed toward the first gaze target element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the selection input (e.g., 1526-1, 1526-2, 1532-1, 1532-2, 1534-1, and/or 1534-2) comprises an air gesture input (e.g., an air pinch gesture, an air swipe gesture, or an air tap gesture). Allowing a user to select the first gaze target element with an air gesture input enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, outputting the first feedback indicating that gaze enrollment information corresponding to the first gaze target element has been recorded includes displaying, via the one or more display generation components, first visual feedback indicating that the gaze enrollment information corresponding to the first gaze target element has been recorded (e.g., FIGS. 15F-15H1) (e.g., displaying the first gaze target element changing in appearance (e.g., changing a color, shape, size, opacity, saturation, and/or contrast of the first gaze target element); displaying a new gaze target element that was not previously displayed prior to detecting the selection input (e.g., a new gaze target element that prompts the user to look at a particular location (e.g., a location at which the new gaze target is displayed)), and/or displaying the second gaze target element changing in appearance (e.g., changing a color, shape, size, opacity, saturation, and/or contrast of the second gaze target element)). Displaying visual feedback indicating that gaze enrollment information corresponding to the first gaze target element has been recorded in response to detecting a selection input while a gaze of the user is directed toward the first gaze target element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, displaying the first visual feedback comprises displaying the first gaze target element (e.g., 1522b) changing from having a first visual appearance to having a second visual appearance different from the first visual appearance (e.g., changing a color, shape, size, opacity, saturation, and/or contrast of the first gaze target element) (e.g., FIGS. 15F-15H1). Displaying visual feedback indicating that gaze enrollment information corresponding to the first gaze target element has been recorded in response to detecting a selection input while a gaze of the user is directed toward the first gaze target element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, subsequent to displaying the first visual feedback, the computer system (e.g., 1500 and/or X700) maintains display of the first gaze target element (e.g., 1522b) having the second visual appearance (and not having the first visual appearance) (e.g., 1522b in FIG. 15H1) (e.g., as the user continues in a gaze enrollment process and/or as the user continues to a subsequent step in the gaze enrollment process (e.g., as the user progresses to a next gaze target)). Displaying visual feedback indicating that gaze enrollment information corresponding to the first gaze target element has been recorded in response to detecting a selection input while a gaze of the user is directed toward the first gaze target element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, displaying the first visual feedback comprises displaying, via the one or more display generation components, a new gaze target element (e.g., FIGS. 12G-12I) that was not previously displayed prior to detecting the selection input (e.g., a new gaze target element that prompts the user to look at a particular location (e.g., a location at which the new gaze target is displayed)). Displaying visual feedback indicating that gaze enrollment information corresponding to the first gaze target element has been recorded in response to detecting a selection input while a gaze of the user is directed toward the first gaze target element, including displaying a new gaze target, enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, displaying the first visual feedback comprises displaying the second gaze target element changing in appearance from having a third visual appearance to having a fourth visual appearance different from the third visual appearance (e.g., changing a color, shape, size, opacity, saturation, and/or contrast of the second gaze target element) (e.g., in FIGS. 15E-15H1, instead of and/or in addition to displaying gaze target 1522b change in appearance, displaying gaze target 1522a changing in appearance). Displaying visual feedback indicating that gaze enrollment information corresponding to the first gaze target element has been recorded in response to detecting a selection input while a gaze of the user is directed toward the first gaze target element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, displaying the second gaze target element changing in appearance comprises: in accordance with a determination that gaze enrollment information corresponding to the second gaze target element has been recorded, fading out the second gaze target element (e.g., in FIG. 15L, previously enrolled gaze target 1522b fades out)

(e.g., gradually ceasing display of the second gaze target element, decreasing an opacity of the second gaze target element, increasing a transparency of the second gaze target element, decreasing a saturation of the second gaze target element, and/or decreasing a contrast of the second gaze target element). In some embodiments, in accordance with a determination that gaze enrollment information corresponding to the second gaze target element has not been recorded, the computer system forgoes fading out the second gaze target element. Displaying visual feedback indicating that gaze enrollment information corresponding to the first gaze target element has been recorded in response to detecting a selection input while a gaze of the user is directed toward the first gaze target element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, outputting the first feedback indicating that gaze enrollment information corresponding to the first gaze target element has been recorded includes outputting first audio feedback (e.g., audio output 1528*e* and/or audio output X1528*e*) (e.g., a first sound and/or a first collection of sounds) indicating that the gaze enrollment information corresponding to the first gaze target element has been recorded (e.g., outputting a first note and/or collection of notes corresponding to the first gaze target element (e.g., uniquely corresponding to the first gaze target element and/or not corresponding to any other gaze target elements)) (in some embodiments, outputting a first note and/or first collection of notes in response to a first portion of the selection input and outputting a second note and/or second collection of notes different from the first note and/or first collection of notes in response to a second portion of the selection input). Outputting audio feedback indicating that gaze enrollment information corresponding to the first gaze target element has been recorded in response to detecting a selection input while a gaze of the user is directed toward the first gaze target element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, in response (1606) to detecting the selection input (e.g., 1530) and in accordance with a determination that the gaze of the user was not directed toward the first gaze target element when the selection input was detected (e.g., in accordance with a determination that the user was not looking at the first gaze target element, was not looking at a region that surrounds the first gaze target element, and/or was not looking at a region that includes the first gaze target element) (e.g., when the selection input is detected, for the duration of the selection input, for the entirety of the selection input, for at least a threshold portion of the selection input (e.g., 50%, 60%, 70%, 80%, or 90%) when the selection input is initiated, and/or when the selection input is completed), the computer system (e.g., 1500 and/or X700) forgoes (1610) outputting the first feedback (e.g., FIG. 15I). Forgoing output of the first feedback when the gaze of the user was not directed toward the first gaze target element when the selection input was detected enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, in response to detecting the selection input (e.g., 1532-1 and/or 1532-2) and in accordance with a determination that the gaze of the user was directed toward the second gaze target element (e.g., 1522*e*) when the selection input was detected (e.g., in accordance with a determination that the user is looking at the second gaze target element, looking at a region that surrounds the second gaze target element, and/or looking at a region that includes the second gaze target element) (e.g., when the selection input is detected, for the duration of the selection input, for the entirety of the selection input, for at least a threshold portion of the selection input (e.g., 50%, 60%, 70%, 80%, or 90%) when the selection input is initiated, and/or when the selection input is completed), the computer system (e.g., 1500 and/or X700) outputs second feedback (e.g., visual feedback, audio feedback, and/or haptic feedback) (e.g., second feedback different from the first feedback) indicating that gaze enrollment information (e.g., biometric information, eye scan information, iris scan information, and/or pupil scan information) corresponding to the second gaze target element has been recorded (e.g., FIGS. 15I-15L) (e.g., collected and/or saved). In some embodiments, in conjunction with outputting the second feedback indicating that gaze enrollment information corresponding to the second gaze target element has been recorded, the computer system records gaze enrollment information corresponding to the second gaze target element. In some embodiments, the second feedback indicating that gaze enrollment information corresponding to the second gaze target element has been recorded is output without outputting the first feedback indicating that gaze enrollment information corresponding to the first gaze target element has been recorded. Outputting second feedback indicating that gaze enrollment information corresponding to the second gaze target element has been recorded in response to detecting a selection input while a gaze of the user is directed toward the second gaze target element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, in response to detecting the selection input (e.g., 1530) and in accordance with a determination that the gaze of the user was not directed toward the first gaze target element or the second gaze target element (e.g., was not directed to any of the first plurality of gaze target elements) when the selection input was detected, the computer system (e.g., 1500 and/or X700) forgoes output of the first feedback and the second feedback (e.g., FIG. 15I). In some embodiments, in response to detecting the selectin input: in accordance with a determination that the gaze of the user was not directed toward any gaze target element of the first plurality of gaze target elements when the selection input was detected, the computer system forgoes outputting any feedback indication that gaze enrollment information has been recorded. Forgoing output of the first feedback and the second feedback when the gaze of the user was not directed toward the first gaze target element or the second gaze target element when the selection input was detected enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, while displaying the first gaze enrollment user interface, the computer system (e.g., 1500 and/or X700) detects, via the one or more input devices, a gaze input from the user (e.g., 1520). In response to detecting the gaze input from the user and in accordance with a determination that the gaze input is directed toward the first gaze target element (e.g., in accordance with a determination that the user is looking at the first gaze target element and/or a region corresponding to the first gaze target element (e.g., a region that surrounds the first gaze target element)), the computer system (e.g., 1500 and/or X700) outputs first gaze feedback (e.g., visual feedback, audio feedback, and/or haptic feedback) indicating that the gaze of the user is directed toward the first gaze target element (e.g., in FIG. 15E, shrinking of gaze target 1522*a*). In some embodiments, in response to detecting the gaze input from the user, in accordance with a determination that the gaze input is not directed toward the first gaze target element (e.g., in accordance with a determination that the user is not looking at the first gaze target element and/or a region corresponding to the first gaze target element (e.g., a region that surrounds the first gaze target element)), the computer system forgoes outputting the first gaze feedback. In some embodiments, in response to detecting the gaze input from the user: in accordance with a determination that the gaze input is directed toward the second gaze target element (e.g., in accordance with a determination that the user is looking at the second gaze target element and/or a region corresponding to the second gaze target element (e.g., a region that surrounds the second gaze target element)), the computer system outputs second gaze feedback (e.g., visual feedback, audio feedback, and/or haptic feedback) (e.g., second gaze feedback different from the first gaze feedback) indicating that the gaze of the user is directed toward the second gaze target element. Outputting first gaze feedback indicating that gaze of the user is directed toward the first gaze target element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, outputting first gaze feedback indicating that the gaze of the user is directed toward the first gaze target element includes outputting audio feedback (e.g., audio output 1528*b* in FIG. 15E) indicating that the gaze of the user is directed toward the first gaze target element (e.g., outputting a first note and/or collection of notes corresponding to the first gaze target element) (e.g., in some embodiments, outputting a proximity audio feedback that changes in one or more characteristics (e.g., tone, volume, and/or pitch) as the gaze of the user moves closer to and/or further from the first gaze target element) (e.g., in some embodiments, outputting a progression audio feedback that changes in one or more characteristics (e.g., tone, volume, and/or pitch) over time as the gaze of the user is maintained on the first gaze target element). Outputting audio feedback indicating that gaze of the user is directed toward the first gaze target element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, outputting first gaze feedback indicating that the gaze of the user is directed toward the first gaze target element includes displaying, via the one or more display generation components, first gaze input visual feedback indicating that the gaze of the user is directed toward the first gaze target element (e.g., displaying the first gaze target element changing in appearance (e.g., changing a color, shape, size, opacity, saturation, and/or contrast of the first gaze target element)) (e.g., gaze target 1522*a* shrinking in size in FIG. 15E). Displaying visual feedback indicating that gaze of the user is directed toward the first gaze target element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, displaying the first gaze input visual feedback comprises displaying the first gaze target element reducing (e.g., shrinking) in size from a first size to a first reduced size that is smaller than the first size (e.g., in at least one dimension and/or in area) (e.g., FIGS. 15E-15F, gaze target 1522*b* shrinking in size). In some embodiments, while displaying the first gaze target element at the first reduced size, the computer system (e.g., 1500 and/or X700) detects, via the one or more input devices, a second selection input (e.g., 1526-1, 1526-2, and/or X1526-2) (e.g., a touch-screen input, an audio input, a gesture input, a mechanical input (e.g., pressing of a mechanical button and/or rotation of a rotatable input mechanism), a gaze input (e.g., a gaze of the user's eyes directed towards a respective location), and/or an air gesture input) while the gaze of the user is directed toward the first gaze target element, wherein the second selection input includes a first portion (e.g., 1526-1) (e.g., an air pinch gesture) and a second portion (e.g., 1526-2 and/or X1526-2) (e.g., an air depinch gesture). In some embodiments, the selection input is an input that is separate from gaze input detected by the computer system (e.g., a touchscreen input, an audio input, a gesture input, a mechanical input (e.g., pressing of a mechanical button and/or rotation of a rotatable input mechanism), and/or an air gesture input). In response to detecting the first portion (e.g., 1526-1) of the second selection input, the computer system (e.g., 1500 and/or X700) displays, via the one or more display generation components, the first gaze target element reducing (e.g., shrinking) in size from the first reduced size to a second reduced size that is smaller than the first reduced size (e.g., in at least one dimension and/or in area) (e.g., FIGS. 15F-15G2, gaze target 1522*b* shrinking further in size). In response to detecting the second portion (e.g., 1526-2 and/or X1526-2) of the second selection input, the computer system (e.g., 1500 and/or X700) displays, via the one or more display generation components, the first gaze target element growing in size from the second reduced size to a second size (e.g., a second size that is the same as or different from the first size) that is larger than the second reduced size (and, optionally, larger than the first reduced size) (e.g., in at least one dimension and/or in area) (e.g., FIG. 15G1 to FIG. 15H1, gaze target 1522*b* growing in size). Displaying visual feedback indicating that gaze of the user is directed toward the first gaze target element, and separate visual feedback in response to detecting different portions of the second selection input, enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, displaying the first gaze input visual feedback comprises displaying a first portion of the first gaze target element reducing in size while maintaining the size of a second portion of the first gaze target element (e.g., maintaining display of the second portion of the first gaze target element at its same size) (e.g., in some embodiments, the outer boundary of gaze target 1522b stays the same size while interior contents of gaze target 1522b shrink in size from FIG. 15E to FIG. 15G1). Displaying visual feedback indicating that gaze of the user is directed toward the first gaze target element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, displaying the first gaze enrollment user interface further comprises concurrently displaying the first plurality of gaze target elements (e.g., 1522a-1522f), including the first gaze target element and the second gaze target element. In some embodiments, concurrently displaying the first plurality of gaze target elements includes concurrently displaying two or more gaze target elements (e.g., two or more separate and/or discrete gaze target elements; and/or two or more separate gaze target elements displayed at different locations) (e.g., three, four, five, six, seven, eight, nine, and/or ten different gaze target elements). Concurrently displaying a plurality of gaze target elements enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first plurality of gaze target elements includes: the first gaze target element for which gaze enrollment information corresponding to the first gaze target element has not yet been recorded (e.g., at the time of displaying the first gaze enrollment user interface); and the second gaze target element for which gaze enrollment information corresponding to the second gaze target element has been recorded (e.g., at the time of displaying the first gaze enrollment user interface) (e.g., 1522a-1522f in FIG. 15L). In some embodiments, displaying the first gaze enrollment user interface includes concurrently displaying: one or more gaze target elements for which gaze enrollment information has not yet been recorded; and one or more gaze target elements for which gaze enrollment information has been recorded. Concurrently displaying a plurality of gaze target elements enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first gaze target element (e.g., 1522c in FIG. 15K) is displayed in a first manner (e.g., with a first set of visual characteristics (e.g., outlining, opacity, brightness, color, saturation, and/or size)) indicative of gaze enrollment information corresponding to the first gaze target element not yet being recorded. In some embodiments, the second gaze target element is displayed in a second manner (e.g., with a second set of visual characteristics (e.g., outlining, opacity, brightness, color, saturation, and/or size)) different from the first manner and indicative of gaze enrollment information corresponding to the second gaze target element having previously been recorded (e.g., 1522b in FIG. 15K). In some embodiments, gaze target elements for which gaze enrollment information has already been recorded and/or for which gaze enrollment has already been completed are displayed in the second manner; and gaze target elements for which gaze enrollment information has not yet been recorded and/or for which gaze enrollment has not been completed are displayed in the first manner (different from the second manner). Displaying gaze target elements differently based on whether or not gaze enrollment has been completed for those elements enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first plurality of gaze target elements (e.g., 1522a-1522f) are selectable in a plurality of different orders (e.g., using one or more gaze inputs, one or more gesture inputs, one or more air gesture inputs, one or more touch inputs, and/or one or more hardware inputs). In some embodiments, the first plurality of gaze target elements do not require a predetermined order of interaction by a user, and a user can interact with any of the plurality of gaze target elements in any order selected by the user. Allowing a user to interact with the first plurality of gaze target elements in any order enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, while displaying the first gaze enrollment user interface and in accordance with a determination that greater than a threshold duration of time (e.g., 2, 5, 10 seconds, 20 seconds, 30 seconds, 45 seconds, 1 minute, 2 minutes, 3 minutes, 4 minutes, or 5 minutes) has elapsed without receiving a selection input corresponding to a gaze target element of the first plurality of gaze target elements, the computer system (e.g., 1500 and/or X700) displays, via the one or more display generation components, a prompt instructing the user to provide a selection input corresponding to a gaze target element of the first plurality of gaze target elements (e.g., in some embodiments, in FIG. 15C or 15D, if a selection input is not detected in threshold time, the computer system displays a prompt). In some embodiments, while displaying the first gaze enrollment user interface: in accordance with a determination that less than the threshold duration of time has elapsed without detecting a user selection input, the computer system forgoes display of the prompt. Displaying a prompt prompting the user to provide a selection input when greater than a threshold duration of time has elapsed without receiving a selection input enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the prompt prompts the user to enable one or more accessibility features of the computer system (e.g., in some embodiments, in FIG. 15C or 15D, if a selection input is not detected in threshold time, the computer system displays a prompt to enable one or more accessibility features). Displaying a prompt prompting the user to provide a selection input when greater than a threshold duration of time has elapsed without receiving a selection input enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the prompt provides the user with instructions for recording gaze enrollment information for at least some of the first plurality of gaze target elements (e.g., instructions for one or more user inputs (e.g., one or more gaze inputs and/or air gesture inputs) that the user needs to provide to record gaze enrollment information) (e.g., in some embodiments, in FIG. 15C or 15D, if a selection input is not detected in threshold time, the computer system displays a prompt that instructs the user on how to provide a selection input). Displaying a prompt prompting the user to provide a selection input when greater than a threshold duration of time has elapsed without receiving a selection input enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, prior to displaying the first gaze enrollment user interface, the computer system (e.g., 1500 and/or X700) receives, via the one or more input devices, a first set of hardware inputs (e.g., 1516) (e.g., depression of a physical button and/or a physical depressible input mechanism; and/or rotation of a physically rotatable input mechanism), wherein the first gaze enrollment user interface is displayed in response to receiving the first set of hardware inputs. In some embodiments, the first gaze enrollment user interface is part of a gaze enrollment process, and the gaze enrollment process is initiated in response to receiving the first set of hardware inputs. Allowing a user to display the first gaze enrollment user interface and/or initiate a gaze enrollment process using one or more hardware inputs enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, prior to displaying the first gaze enrollment user interface, the computer system (e.g., 1500 and/or X700) displays, via the one or more display generation components, graphical instructions (e.g., 1514, 1514*a*, and/or 1514*b*) (e.g., visual instructions, text-based instructions, image-based instructions, and/or animated instructions) pertaining to a gaze enrollment process (e.g., a gaze enrollment process that includes the first gaze enrollment user interface) for recording gaze enrollment information corresponding to one or more eyes of the user (e.g., a gaze enrollment process for generating one or more device calibration profiles (e.g., one or more device calibration profiles for receiving and/or interpreting gaze-based inputs from the user)). In some embodiments, the graphical instructions provide the user with one or more instructions for how to initiate the gaze enrollment process (e.g., instructs the user to provide one or more user inputs (e.g., one or more hardware inputs) to initiate the gaze enrollment process). In some embodiments, the graphical instructions provide the user with one or more instructions for how to interact with the first plurality of gaze target elements and/or how to record gaze enrollment information (e.g., instructions that instruct the user to provide one or more user inputs to interact with the first plurality of gaze target elements (e.g., instructions instructing the user to perform an air pinch gesture while gazing at a gaze target element until each gaze target element in the first plurality of gaze target elements is completed)). Displaying graphical instructions pertaining to a gaze enrollment process enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, prior to displaying the first gaze enrollment user interface (and, in some embodiments, in response to one or more user inputs (e.g., one or more hardware inputs, one or more gaze inputs, one or more gesture inputs, one or more air gesture inputs, and/or one or more touch inputs) corresponding to a user request to display the first gaze enrollment user interface and/or a user request to initiate a gaze enrollment process), the computer system (e.g., 1500 and/or X700) displays, via the one or more display generation components, dimming of a first user interface from a first average brightness (e.g., FIGS. 15A-15B1) (e.g., a first overall brightness, and/or a first overall amount of light output by the one or more display generation components) to a second average brightness (e.g., a second overall brightness, and/or a second overall amount of light output by the one or more display generation components) that is darker than the first average brightness. In some embodiments, the first user interface is dimmed from the first average brightness to the second average brightness to cause the pupils of the user to dilate. Dimming a first user interface to, for example, cause the pupils of a user to dilate, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first user interface (e.g., 1514) includes a first animation (e.g., 1514*a*) (e.g., a welcome animation). Dimming a first user interface to, for example, cause the pupils of a user to dilate, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first user interface (e.g., 1514) includes a first video (e.g., 1514*a*) that provides the user with information pertaining to a gaze enrollment process (e.g., a gaze enrollment process that includes the first gaze enrollment user interface) for recording gaze enrollment information corresponding to one or more eyes of the user (e.g., a gaze enrollment process for generating one or more device calibration profiles (e.g., one or more device calibration profiles for receiving and/or interpreting gaze-based inputs from the user)). Dimming a first user interface to, for example, cause the pupils of a user to dilate, enhances the operability of the system and makes the user-system interface more efficient (e.g., by helping the user to provide proper inputs and reducing errors) which, additionally, reduces power usage and improves battery life of the device by enabling the user to use the system more quickly and efficiently. Displaying a first video pertaining to a gaze enrollment process enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the first gaze enrollment user interface (e.g., 1522a-1522f) is displayed with a respective type of element (e.g., 1508 and/or 1522a-1522f) having a first average brightness (e.g., a first overall brightness, and/or a first overall amount of light output by the one or more display generation components). In some embodiments, subsequent to displaying the first gaze enrollment user interface, the computer system (e.g., 1500 and/or X700) displays, via the one or more display generation components, a second gaze enrollment user interface (e.g., 1540a-1540f), wherein: the second gaze enrollment user interface includes a second plurality of gaze target elements (e.g., 1540a-1540f) (e.g., a second plurality of user interface elements that prompt the user to look at a plurality of different locations within the second gaze enrollment user interface; and/or a second plurality of user interface elements displayed at a plurality of different locations within the second gaze enrollment user interface to prompt the user to look at the plurality of different locations within the second gaze enrollment user interface); and the second gaze enrollment user interface is displayed with the respective type of element (e.g., 1508 and/or 1540a-1540f) having a second average brightness (e.g., a second overall brightness, and/or a second overall amount of light output by the one or more display generation components) different from the first average brightness. In some embodiments, the second plurality of gaze target elements are positioned at a plurality of different locations within the second gaze enrollment user interface to form a second predefined shape and/or pattern. In some embodiments, the first plurality of gaze target elements are positioned at a plurality of different locations within the first gaze enrollment user interface to form a first predefined shape and/or pattern. In some embodiments, the second predefined shape and/or pattern is the same as the first predefined shape and/or pattern. Displaying a first gaze enrollment user interface with a respective type of element having a first average brightness, and then displaying a second gaze enrollment user interface with the respective type of element having a second average brightness, allows for collection of more accurate and more useful gaze tracking information, which enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, while displaying the first gaze enrollment user interface with the respective type of element having the first average brightness (e.g., FIGS. 15C-15R), the computer system (e.g., 1500 and/or X700) receives, via the one or more input devices, a first set of user inputs (e.g., 1526-1, 1526-2, X1526-2, 1532-1, 1532-2, 1534-1, and/or 1534-2) (e.g., one or more selection inputs, one or more touch inputs, one or more gaze inputs, one or more mechanical inputs, one or more hardware inputs, one or more gesture inputs, and/or one or more air gesture inputs) corresponding to user selection of at least some of the first plurality of gaze target elements (e.g., 1522a-1522f) (in some embodiments, corresponding to user selection of each of the first plurality of gaze target elements). In response to receiving the first set of user inputs, the computer system (e.g., 1500 and/or X700) records gaze enrollment information corresponding to the at least some of the first plurality of gaze target elements. While displaying the second gaze enrollment user interface with the respective type of element having the second average brightness (e.g., FIGS. 15S-15W), the computer system (e.g., 1500 and/or X700) receives, via the one or more input devices, a second set of user inputs (e.g., 1544-1 and/or 1544-2) (e.g., one or more selection inputs, one or more touch inputs, one or more gaze inputs, one or more mechanical inputs, one or more hardware inputs, one or more gesture inputs, and/or one or more air gesture inputs) corresponding to user selection of at least some of the second plurality of gaze target elements (e.g., 1540a-1540f) (in some embodiments, corresponding to user selection of each of the second plurality of gaze target elements). In response to receiving the second set of user inputs, the computer system (e.g., 1500 and/or X700) records gaze enrollment information corresponding to the at least some of the second plurality of gaze target elements. Recording gaze enrollment information for a user based on user interaction with one or more displayed gaze target elements displayed at different brightness levels allows for collection of more accurate and more useful gaze tracking information, which enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, subsequent to detecting the selection input and in accordance with a determination that user gaze enrollment criteria are satisfied (e.g., in accordance with a determination that gaze enrollment of the user has succeeded and/or completed successfully), the computer system (e.g., 1500 and/or X700) displays an indication that gaze enrollment of the user has been successfully completed (e.g., 1546) (e.g., displaying an indication that a sufficient amount of biometric information corresponding to the user has been collected during the gaze enrollment process; and/or displaying an indication that a device calibration profile (e.g., for receiving and/or interpreting gaze inputs from the user) corresponding to the user has successfully been generated). In some embodiments, in accordance with a determination that the user gaze enrollment criteria are not satisfied, the computer system forgoes displaying the indication that gaze enrollment of the user has been successfully completed. Displaying an indication that gaze enrollment of the user has been successfully completed enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, displaying the indication that gaze enrollment of the user has been successfully completed comprises: displaying, via the one or more display generation components, the first gaze target element (e.g., 1540*a*-1540*f*) changing into the indication (e.g., 1546) that gaze enrollment of the user has been successfully completed. Displaying an indication that gaze enrollment of the user has been successfully completed enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, subsequent to detecting the selection input and in accordance with a determination that user gaze enrollment criteria are not satisfied (e.g., in accordance with a determination that gaze enrollment of the user has failed and/or has not succeeded), the computer system (e.g., 1500 and/or X700) displays, via the one or more display generation components, a first prompt prompting the user to re-attempt gaze enrollment (in some embodiments, if enrollment is unsuccessful, electronic device 1500 and/or HMD X700 prompts the user to re-attempt gaze enrollment) (e.g., prompting the user to re-attempt a gaze enrollment process that includes display of a plurality of gaze targets and receiving user inputs interacting with the plurality of gaze targets). Displaying a prompt prompting the user to re-attempt gaze enrollment when gaze enrollment fails enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, subsequent to displaying the first prompt, the computer system (e.g., 1500 and/or X700) displays, via the one or more display generation components, a first respective user interface changing from being displayed with a third average brightness (e.g., a third overall brightness, and/or a third overall amount of light output by the one or more display generation components) to being displayed with a fourth average brightness (e.g., a fourth overall brightness, and/or a fourth overall amount of light output by the one or more display generation components) different from the third average brightness (e.g., FIGS. 15A-15B1, and/or, while displaying user interface 1514, changing the brightness of user interface 1514). Displaying a prompt prompting the user to re-attempt gaze enrollment when gaze enrollment fails enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, subsequent to detecting the selection input and in accordance with a determination that user gaze enrollment criteria are not satisfied (e.g., in accordance with a determination that gaze enrollment of the user has failed and/or has not succeeded), the computer system (e.g., 1500 and/or X700) displays, via the one or more display generation components, a second respective user interface changing from being displayed with a fifth average brightness (e.g., a fifth overall brightness, and/or a fifth overall amount of light output by the one or more display generation components) to being displayed with a sixth average brightness (e.g., a sixth overall brightness, and/or a sixth overall amount of light output by the one or more display generation components) different from the sixth average brightness (e.g., at FIG. 15W, if enrollment fails, electronic device 1500 and/or HMD X700 changes the brightness of one or more elements). Displaying a prompt prompting the user to re-attempt gaze enrollment when gaze enrollment fails enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, subsequent to detecting the selection input and in accordance with a determination that user gaze enrollment criteria are not satisfied (e.g., in accordance with a determination that gaze enrollment of the user has failed and/or has not succeeded), the computer system (e.g., 1500 and/or X700) displays, via the one or more display generation components, a second prompt (e.g., 1536 and/or 1538) prompting the user to re-attempt gaze enrollment (e.g., prompting the user to re-attempt user interaction) for a first subset of the first plurality of gaze target elements (e.g., less than all of the first plurality of gaze target elements). In some embodiments, the first subset of the first plurality of gaze target elements is displayed in a first manner, and gaze target elements of the first plurality of gaze target elements that are not in the first subset are displayed in a second manner different from the first manner. Displaying a prompt prompting the user to re-attempt gaze enrollment for a first subset of gaze target elements enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, in accordance with a determination that gaze enrollment corresponding to the first gaze target element was successfully completed (e.g., the computer system successfully captured one or more scans of the user's eyes while the user gazed at and/or interacted with the first gaze target element) and gaze enrollment corresponding to the second gaze target element was not successfully completed (e.g., the computer system did not successfully capture one or more scans of the user's eyes while the user gazed at and/or interacted with the second gaze target element), the first subset of the first plurality of gaze target elements includes the second gaze target element and does not include the first gaze target element. In some embodiments, in accordance with a determination that gaze enrollment corresponding to the second gaze target element was successfully completed (e.g., the computer system successfully captured one or more scans of the user's eyes while the user gazed at and/or interacted with the second gaze target element) and gaze enrollment corresponding to the first gaze target element was not successfully completed (e.g., the computer system did not successfully capture one or more scans of the user's eyes while the user gazed at and/or interacted with the first gaze target element), the first subset of the first plurality of gaze target elements includes the first gaze target element and does not include the second gaze target element (e.g., prompt 1536 in FIG. 15P prompts re-enrollment of a different gaze target than prompt 1538 of FIG. 15Q). In some embodiments, in accordance with a determination that gaze enrollment corresponding to the first gaze target element was successfully completed (e.g., the computer system successfully captured one or more scans of the user's eyes while the user gazed at and/or interacted with the first gaze target element) and gaze enrollment corresponding to the second gaze target element was successfully completed (e.g., the computer system successfully captured one or more scans of the user's eyes while the user gazed at and/or interacted with the second gaze target element), the first subset of the first plurality of gaze target elements does not include the first gaze target element and the second gaze target element; and in accordance with a determination that gaze enrollment corresponding to the first gaze target element was not successfully completed (e.g., the computer system did not successfully capture one or more scans of the user's eyes while the user gazed at and/or interacted with the first gaze target element) and gaze enrollment corresponding to the second gaze target element was not successfully completed (e.g., the computer system did not successfully capture one or more scans of the user's eyes while the user gazed at and/or interacted with the second gaze target element), the first subset of the first plurality of gaze target elements includes the first gaze target element and the second gaze target element. Including and/or excluding gaze target elements from the first subset of gaze target elements based on whether or not gaze enrollment was successfully completed for each gaze target element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, in accordance with a determination that gaze enrollment was unsuccessful for a first number of the first plurality of gaze target elements, the first subset includes the first number of the first plurality of gaze target elements. In some embodiments, in accordance with a determination that gaze enrollment was unsuccessful for a second number of the first plurality of gaze target elements, the second number being different from the first number, the first subset includes the second number of the first plurality of gaze target elements (e.g., prompt 1536 in FIG. 15P requests reenrollment of two gaze targets, whereas prompt 1538 in FIG. 15Q prompts reenrollment of one gaze target). Displaying a prompt prompting the user to re-attempt gaze enrollment for a first subset of gaze target elements enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the first gaze enrollment user interface is part of a gaze enrollment process that includes a plurality of gaze enrollment stages, including a first gaze enrollment stage (e.g., FIGS. 15C-15R) and a second gaze enrollment stage (e.g., FIGS. 15S-15W) that occurs after the first gaze enrollment stage. In some embodiments, the first gaze enrollment user interface is part of the first gaze enrollment stage. In some embodiments, the second prompt (e.g., 1536 and/or 1538) is displayed during the first gaze enrollment stage (e.g., prior to successful completion of the first gaze enrollment stage) and prior to initiating the second gaze enrollment stage. In some embodiments, successful completion of the first gaze enrollment stage is required before advancing to the second gaze enrollment stage. In some embodiments, the first gaze enrollment stage is associated with a first average brightness level; and the second enrollment stage is associated with a second average brightness level different from the first average brightness level. Displaying a prompt prompting the user to re-attempt gaze enrollment for a first subset of gaze target elements enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the first gaze enrollment user interface is part of a gaze enrollment process that includes a plurality of gaze enrollment stages, including a first gaze enrollment stage and a second gaze enrollment stage that occurs after the first gaze enrollment stage. In some embodiments, the first gaze enrollment user interface is part of the second gaze enrollment stage. In some embodiments, the first gaze enrollment user interface is displayed after successful completion of the first gaze enrollment stage. In some embodiments, the second prompt is displayed during the second gaze enrollment stage (e.g., prompt 1536 or prompt 1538, but displayed after FIG. 15W) (e.g., subsequent to successful completion of the first gaze enrollment stage, but prior to successful completion of the second gaze enrollment stage). In some embodiments, successful completion of the first gaze enrollment stage is required before advancing to the second gaze enrollment stage. In some embodiments, the first gaze enrollment stage is associated with a first average brightness level; and the second enrollment stage is associated with a second average brightness level different from the first average brightness level. Displaying a prompt prompting the user to re-attempt gaze enrollment for a first subset of gaze target elements enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the first gaze enrollment user interface (e.g., 1522*a*-1522*f*) is displayed with a respective type of element (e.g., 1508 and/or 1522*a*-1522*f*) having a first average brightness (e.g., a first overall brightness, and/or a first overall amount of light output by the one or more display generation components). In some embodiments, subsequent to displaying the first gaze enrollment user interface, the computer system (e.g., 1500 and/or X700) displays, via the one or more display generation components, a second gaze enrollment user interface (e.g., 1540*a*-1540*f*), wherein: the second gaze enrollment user interface includes a second plurality of gaze target elements (e.g., 1540*a*-1540*f*) (e.g., a second plurality of user interface elements that prompt the user to look at a plurality of different locations within the second gaze enrollment user interface; and/or a second plurality of user interface elements displayed at a plurality of different locations within the second gaze enrollment user interface to prompt the user to look at the plurality of different locations within the second gaze enrollment user interface); and the second gaze enrollment user interface is displayed with the respective type of element (e.g., 1508 and/or 1540a-1540f) having a second average brightness (e.g., a second overall brightness, and/or a second overall amount of light output by the one or more display generation components) different from the first average brightness. In some embodiments, the second plurality of gaze target elements are positioned at a plurality of different locations within the second gaze enrollment user interface to form a second predefined shape and/or pattern. In some embodiments, the first plurality of gaze target elements are positioned at a plurality of different locations within the first gaze enrollment user interface to form a first predefined shape and/or pattern. In some embodiments, the second predefined shape and/or pattern is the same as the first predefined shape and/or pattern. In some embodiments, subsequent to displaying the second gaze enrollment user interface, the computer system (e.g., 1500 and/or X700) displays, via the one or more display generation components, a third gaze enrollment user interface (e.g., a third set of gaze targets such as 1522a-1522f or 1540a-1540f), wherein: the third gaze enrollment user interface includes a third plurality of gaze target elements (e.g., a third plurality of user interface elements that prompt the user to look at a plurality of different locations within the third gaze enrollment user interface; and/or a third plurality of user interface elements displayed at a plurality of different locations within the third gaze enrollment user interface to prompt the user to look at the plurality of different locations within the third gaze enrollment user interface); and the third gaze enrollment user interface is displayed with the respective type of element having a third average brightness (e.g., a third overall brightness, and/or a third overall amount of light output by the one or more display generation components) different from the first average brightness and the second average brightness. In some embodiments, the third plurality of gaze target elements are positioned at a plurality of different locations within the third gaze enrollment user interface to form a third predefined shape and/or pattern. In some embodiments, the first plurality of gaze target elements are positioned at a plurality of different locations within the first gaze enrollment user interface to form a first predefined shape and/or pattern. In some embodiments, the second plurality of gaze target elements are positioned at a plurality of different locations within the second gaze enrollment user interface to form a second predefined shape and/or pattern. In some embodiments, the third predefined shape and/or pattern is the same as the first predefined shape and/or pattern and/or the second predefined shape and/or pattern. Displaying multiple gaze enrollment user interfaces with different levels of brightness allows for collection of more accurate and more useful gaze tracking information, which enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the gaze enrollment user interface is part of a gaze enrollment process that requires the user to interact with at least some of the first plurality of gaze target elements, wherein: in accordance with a determination that hand inputs are available (e.g., hand input is detected, one or more hands of the user are detected, and/or the user has completed hand input enrollment and/or calibration), the gaze enrollment process requires the user to interact with at least some of the first plurality of gaze targets using gaze inputs and hand inputs (e.g., FIGS. 15A-15X) (e.g., gaze inputs and air gesture inputs (e.g., a gaze input and an air pinch gesture for each gaze target element or a threshold number of gaze target elements)); and in accordance with a determination that hand inputs are not available (e.g., hand inputs are not detected, one or more hands of the user are not detected, and/of the user has not completed hand input enrollment and/or calibration), the gaze enrollment process requires the user to interact with at least some of the first plurality of gaze targets using gaze inputs without requiring hand inputs (e.g., FIGS. 12A-12X). Modifying the requirements of the gaze enrollment process based on whether or not hand inputs are available enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, aspects/operations of methods 800, 900, 1000, 1100, 1300, 1400, 1600, and/or 1700 may be interchanged, substituted, and/or added between these methods. For example, the technique of method 800 can be used to initiate the techniques of methods 900, 1000, 1100, 1300, 1400, 1600, and/or 1700. For another example, the various techniques can be performed sequentially. For brevity, these details are not repeated here.

FIG. 17 is a flow diagram of an exemplary method 1700 for providing feedback during gaze tracking enrollment, in accordance with some embodiments. In some embodiments, method 1700 is performed at a computer system (e.g., 1500 and/or X700) (e.g., computer system 101 in FIG. 1A) (e.g., a smart phone, a smart watch, a tablet, a laptop, a desktop, a wearable device, and/or head-mounted device) that is in communication with one or more display generation components (e.g., a visual output device, a 3D display, a display having at least a portion that is transparent or translucent on which images can be projected (e.g., a see-through display), a projector, a heads-up display, and/or a display controller) and one or more input devices (e.g., a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an audio input device; a biometric sensor (e.g., a fingerprint sensor, a face identification sensor, a gaze tracking sensor, and/or an iris identification sensor) and/or one or more mechanical input devices (e.g., a depressible input mechanism; a button; a rotatable input mechanism; a crown; and/or a dial)). In some embodiments, the method 1700 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1700 are, optionally, combined and/or the order of some operations is, optionally, changed.

The computer system (e.g., 1500 and/or X700) displays (1702), via the one or more display generation components, a first gaze enrollment user interface (e.g., 1522a-1522f), wherein the first gaze enrollment user interface includes a first plurality of gaze target elements (e.g., 1522a-1522f) (e.g., a first plurality of user interface elements that prompt the user to look at a plurality of different locations within the first gaze enrollment user interface; and/or a first plurality of user interface elements displayed at a plurality of different locations within the first gaze enrollment user interface to prompt the user to look at the plurality of different locations within the first gaze enrollment user interface), including a first gaze target element and a second gaze target element.

While displaying the first gaze enrollment user interface, the computer system (e.g., 1500 and/or X700) detects (1704), via the one or more input devices, a selection input (e.g., 1526-1, 1526-2, and/or X1526-2) (e.g., a touchscreen input, an audio input, a gesture input, a mechanical input (e.g., pressing of a mechanical button and/or rotation of a rotatable input mechanism), a gaze input (e.g., a gaze of the user's eyes directed towards a respective location), and/or an air gesture input). In some embodiments, the selection input is an input that is separate from gaze input detected by the computer system (e.g., a touchscreen input, an audio input, a gesture input, a mechanical input (e.g., pressing of a mechanical button and/or rotation of a rotatable input mechanism), and/or an air gesture input).

In response (1706) to detecting the selection input and in accordance with a determination that the selection input is directed toward the first gaze target element (e.g., 1522*b*) (and, optionally, is not directed toward the second gaze target element and/or is not directed toward any other gaze target element of the first plurality of gaze target elements) (e.g., the selection input is indicative of user selection of the first gaze target element; the selection input includes a gaze input that is directed toward the first gaze target element (e.g., the user is looking at the first gaze target element and/or a region that includes the first gaze target element); and/or the selection input includes a gesture (e.g., an air gesture) that is directed toward and/or corresponds to the first gaze target element), the computer system (e.g., 1500 and/or X700) outputs (1708) first audio feedback corresponding to the first gaze target element (e.g., audio outputs 1528*d*-1528*e* and/or X1528*d*-X1528*e*) (e.g., corresponding uniquely to the first gaze target element; corresponding to the first gaze target element without corresponding to the second gaze target element; and/or corresponding to the first gaze target element without corresponding to any other gaze target element of the first plurality of gaze target elements).

In response (1706) to detecting the selection input (e.g., 1532-1 and/or 1532-2) and in accordance with a determination that the selection input is directed toward the second gaze target element (e.g., 1522*e*) (and, optionally, is not directed toward the first gaze target element and/or is not directed toward any other gaze target element of the first plurality of gaze target elements) (e.g., the selection input is indicative of user selection of the second gaze target element; the selection input includes a gaze input that is directed toward the second gaze target element (e.g., the user is looking at the second gaze target element and/or a region that includes the second gaze target element); and/or the selection input includes a gesture (e.g., an air gesture) that is directed toward and/or corresponds to the second gaze target element), the computer system (e.g., 1500 and/or X700) outputs (1710) second audio feedback corresponding to the second gaze target element and different from the first audio feedback (e.g., audio outputs 1528*g*-1528*h*) (e.g., corresponding uniquely to the second gaze target element; corresponding to the second gaze target element without corresponding to the first gaze target element; and/or corresponding to the second gaze target element without corresponding to any other gaze target element of the first plurality of gaze target elements). In some embodiments, the first gaze enrollment user interface is displayed as part of a gaze enrollment procedure in which biometric information (e.g., eye scan information and/or gaze tracking information) is collected from a user. In some embodiments, in response to detecting the selection input, while detecting the selection input, and/or while outputting the first audio feedback and/or the second audio feedback, the computer system collects biometric information (e.g., facial scan information, eye scan information, and/or hand movement information) corresponding to a user of the computer system. Outputting different audio feedback for different gaze target elements enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, interesting, and/or pleasing user experience, and provides the user with feedback about a state of the device.

In some embodiments, the first audio feedback (e.g., audio outputs 1528*d*-1528*e* and/or X1528*d*-X1528*e*) includes a first note (e.g., a first musical note). In some embodiments, the second audio feedback includes a second note (e.g., a second musical note) different from the first note. In some embodiments, the first note and the second note are part of a first major chord (e.g., are part of the same major chord and/or are part of the same major key). Outputting different audio feedback for different gaze target elements such that audio feedback for different gaze target elements are in the same major chord enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, interesting, and/or pleasing user experience, and provides the user with feedback about a state of the device.

In some embodiments, the first note is in a first octave. In some embodiments, the second note is in a second octave different from the first octave. Outputting different audio feedback for different gaze target elements such that audio feedback for different gaze target elements are in the same major chord enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, interesting, and/or pleasing user experience, and provides the user with feedback about a state of the device.

In some embodiments, the first gaze target element (e.g., 1522*b*) is displayed at a first location (e.g., a first predetermined location) in the first gaze enrollment user interface. In some embodiments, the second gaze target element (e.g., 1522*e*) is displayed at a second location (e.g., a second predetermined location) in the first gaze enrollment user interface different from the first location. In some embodiments, the first gaze target element corresponds to (e.g., is associated with and/or is assigned) a first musical note. In some embodiments, the second gaze target element corresponds to (e.g., is associated with and/or is assigned) a second musical note different from the first musical note. Outputting different audio feedback for different gaze target elements enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, interesting, and/or pleasing user experience, and provides the user with feedback about a state of the device.

In some embodiments, the first plurality of gaze target elements (e.g., 1522a-1522f) further includes a third gaze target element different from the first gaze target element and the second gaze target element. In some embodiments, the first plurality of gaze target elements are arranged in an ordered sequence, wherein: the first gaze target element (e.g., 1522b) precedes (e.g., immediately precedes) the second gaze target element (e.g., 1522e) in the ordered sequence; and the second gaze target element (e.g., 1522e) is precedes (e.g., immediately precedes) the third gaze target element (e.g., 1522f) in the ordered sequence. In some embodiments, the first plurality of gaze target elements are arranged in a geometric pattern in which gaze target elements that are adjacent to one another in the ordered sequence are displayed adjacent to one another (e.g., without any intervening gaze target elements between them) (e.g., the first gaze target element is adjacent to the second gaze target element, and the second gaze target element is adjacent to the third gaze target element). In some embodiments, the first plurality of gaze target elements correspond to a plurality of musical notes, wherein: the first gaze target element corresponds to a first musical note; the second gaze target element corresponds to a second musical note different from the first musical note. In some embodiments, the third gaze target element corresponds to a third musical note different from the first musical note and the second musical note. In some embodiments, the first musical note, the second musical note, and the third musical note monotonically ascend in the order of the ordered sequence (e.g., the second musical note is higher in pitch than the first musical note (e.g., based on the first gaze target element preceding the second gaze target element in the ordered sequence), and the third musical note is higher in pitch than the second musical note (e.g., based on the second gaze target element preceding the third gaze target element in the ordered sequence)). In some embodiments, each respective gaze target element of the first plurality of gaze target elements corresponds to (e.g., is assigned) a respective musical note. In some embodiments, the respective musical notes corresponding to the first plurality of gaze target elements monotonically ascend in the order of the ordered sequence. In some embodiments, the respective musical notes corresponding to the first plurality of gaze target elements are part of the same major chord and/or the same major key. Outputting different audio feedback for different gaze target elements, wherein the audio feedback monotonically ascends from one gaze target element to the next, enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, interesting, and/or pleasing user experience, and provides the user with feedback about a state of the device.

In some embodiments, while displaying the first gaze enrollment user interface, the computer system (e.g., 1500 and/or X700) detects, via the one or more input devices, a second selection input (e.g., a touchscreen input, an audio input, a gesture input, a mechanical input (e.g., pressing of a mechanical button and/or rotation of a rotatable input mechanism), a gaze input (e.g., a gaze of the user's eyes directed towards a respective location), and/or an air gesture input) directed toward the first gaze target element (and, optionally, is not directed toward the second gaze target element and/or is not directed toward any other gaze target element of the first plurality of gaze target elements) (e.g., the second selection input is indicative of user selection of the first gaze target element; the second selection input includes a gaze input that is directed toward the first gaze target element (e.g., the user is looking at the first gaze target element and/or a region that includes the first gaze target element); and/or the second selection input includes a gesture (e.g., an air gesture) that is directed toward and/or corresponds to the first gaze target element). In some embodiments, the second selection input is an input that is separate from gaze input detected by the computer system (e.g., a touchscreen input, an audio input, a gesture input, a mechanical input (e.g., pressing of a mechanical button and/or rotation of a rotatable input mechanism), and/or an air gesture input). In response to detecting the second selection input directed toward the first gaze target element: in accordance with a determination that there are additional gaze target elements (e.g., in addition to the first gaze target element) of the first plurality of gaze target elements that have not yet been selected by the user (e.g., with which the user has not yet interacted and/or for which the user has not yet performed a selection input), the computer system (e.g., 1500 and/or X700) outputs default audio feedback that corresponds to (e.g., that includes and/or is based on) the first musical note that corresponds to the first gaze target element (e.g., rows 1-6 and/or 7-12 in FIG. 15Y); and in accordance with a determination that there are no additional gaze target elements of the first plurality of gaze target elements that have not yet been selected (e.g., the user has previously interacted with and/or has previously performed the selection input for all gaze target elements except the first gaze target element; and/or the first gaze target element is the final gaze target element of the first plurality of gaze target elements for which the user needs to provide user input), the computer system (e.g., 1500 and/or X700) outputs last target audio feedback that is indicative of the first gaze target element being a last remaining gaze target element of the first plurality of gaze target elements and corresponds to (e.g., includes and/or is based on) a third musical note different from the first musical note and the second musical note (e.g., row "Final" in FIG. 15Y) (and, optionally, does not correspond to (e.g., does not include) the first musical note and/or the second musical note). Outputting different audio feedback when the user interacts with a final gaze target element of a set of gaze target elements enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, interesting, and/or pleasing user experience, and provides the user with feedback about a state of the device.

In some embodiments, the selection input includes a gaze input (e.g., 1520) (e.g., a gaze directed at a particular location and/or a particular displayed object) and a gesture input (e.g., 1532-1 and/or 1532-2) (e.g., an air gesture input (e.g., an air pinch gesture)). Allowing a user to select a gaze target element with a gaze input and a gesture input enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the gesture input includes a first portion (e.g., 1532-1) of the gesture input (e.g., a pinch down and/or moving of two fingers closer together) and a second portion (e.g., 1532-2) of the gesture input (e.g., a pinch up and/or moving of two fingers further apart) subsequent to the first portion. In some embodiments, outputting the first audio feedback comprises: outputting a first note (e.g., a first musical note and/or a first tone) in response to detecting the first portion of the gesture input (e.g., 1528*f* in FIG. 15J); and outputting a second note (e.g., a second musical note and/or a second tone) different from the first note in response to detecting the second portion of the gesture input (e.g., 1528*g* in FIG. 15K). In some embodiments, outputting the second audio feedback comprises: outputting a third note (e.g., a third musical note and/or a third tone) in response to detecting the first portion of the gesture input; and outputting a fourth note (e.g., a fourth musical note and/or a fourth tone) different from the third note in response to detecting the second portion of the gesture input. Outputting different musical notes at the start of a gesture input and at the end of the gesture input enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, interesting, and/or pleasing user experience, and provides the user with feedback about a state of the device.

In some embodiments, the selection includes a gaze input (e.g., 1520) that is maintained on a respective gaze target element for a threshold duration of time (e.g., continuously, without interruption, and/or without more than a threshold level of interruption (e.g., to account for saccades)) (e.g., the selection input is a gaze and dwell input). Allowing a user to select a gaze target element with a gaze input enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, while displaying the first gaze enrollment user interface, the computer system (e.g., 1500 and/or X700) detects, via the one or more input devices, a first gaze input (e.g., 1520) directed toward the first gaze target element (e.g., 1522*b*) (e.g., detecting that the user is looking at the first target element) (e.g., a gaze input without a selection input and/or a gaze input without a gesture input (e.g., without an air gesture input)). In response to detecting the first gaze input directed toward the first gaze target element, the computer system (e.g., 1500 and/or X700) outputs third audio feedback different from the first audio feedback (and, optionally, different from the second audio feedback) (e.g., audio output 1528*c* in FIG. 15F). While detecting the first gaze input directed toward the first gaze target element (and, optionally, while outputting the third audio feedback), the computer system (e.g., 1500 and/or X700) detects, via the one or more input devices, a third selection input (e.g., 1526-1) (e.g., a third selection input corresponding to the first gaze target element) (e.g., a gesture input (e.g., an air gesture input (e.g., a pinch air gesture)). In response to detecting the third selection input, the computer system (e.g., 1500 and/or X700) outputs the first audio feedback (e.g., audio output 1528*d* in FIG. 15G1 and/or audio output X1528*d* in FIG. 15G2). In some embodiments, the computer system outputs particular audio feedback when a user gazes at a gaze target element, and outputs different audio feedback when the user performs a selection input (e.g., a gesture input (e.g., an air gesture (e.g., a pinch air gesture)) selecting the gaze target element. Outputting different audio feedback when the user gazes on a gaze target element with his or her gaze and then when the user performs a gesture input with respect to the gaze target element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, interesting, and/or pleasing user experience, and provides the user with feedback about a state of the device.

In some embodiments, the first audio feedback comprises a first plurality of musical notes (e.g., FIG. 15Y, and/or audio output 1528*d* in FIG. 15G1, audio output X1528*d* in FIG. 15G2, audio output 1528*e* in FIG. 15H1, and audio output X1528*e* in FIG. 15H2). In some embodiments, the third audio feedback corresponds to and/or includes a single musical note. In some embodiments, the third audio feedback comprises a second plurality of musical notes different from the first plurality of musical notes. Outputting different audio feedback when the user gazes on a gaze target element with his or her gaze and then when the user performs a gesture input with respect to the gaze target element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, interesting, and/or pleasing user experience, and provides the user with feedback about a state of the device.

In some embodiments, the third audio feedback comprises a first respective musical note. In some embodiments, the first plurality of musical notes includes a second respective musical note that is spaced apart from the first respective musical note by one full octave (e.g., FIG. 15Y) (e.g., is one octave above or below the first respective musical note (e.g., in some embodiments, exactly one octave above or below the first respective musical note)). Outputting different audio feedback when the user gazes on a gaze target element with his or her gaze and then when the user performs a gesture input with respect to the gaze target element, wherein the different audio feedback are tonally related, enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, interesting, and/or pleasing user experience, and provides the user with feedback about a state of the device.

In some embodiments, the third audio feedback comprises a third respective musical note. In some embodiments, the first plurality of musical notes includes a fourth respective musical note that is spaced apart from the third respective musical note by a perfect fifth (e.g., a musical interval corresponding to a pair of pitches with a frequency ratio of 3:2) (e.g., FIG. 15Y). Outputting different audio feedback when the user gazes on a gaze target element with his or her gaze and then when the user performs a gesture input with respect to the gaze target element, wherein the different audio feedback are tonally related, enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, interesting, and/or pleasing user experience, and provides the user with feedback about a state of the device.

In some embodiments, the first gaze enrollment user interface is part of an enrollment process (e.g., a gaze enrollment process and/or an eye enrollment process). In some embodiments, the enrollment process includes: a first enrollment stage (e.g., FIGS. 15C-15R) (e.g., a first enrollment stage in which a respective set of user interface elements are displayed having a first average brightness (e.g., a first overall brightness, and/or a first overall amount of light output by the one or more display generation components) and/or a respective type of user interface element is displayed having a first average brightness (e.g., a first overall brightness, and/or a first overall amount of light output by the one or more display generation components)); and a second enrollment stage (e.g., FIGS. 15S-15W) different from (e.g., separate from) the first enrollment stage (e.g., a second enrollment stage in which a second respective set of user interface elements are displayed having a second average brightness (e.g., a second overall brightness, and/or a second overall amount of light output by the one or more display generation components) and/or the respective type of user interface element is displayed having a second average brightness (e.g., a second overall brightness, and/or a second overall amount of light output by the one or more display generation components) different from the first average brightness) different from the first average brightness). The first enrollment stage includes displaying the first plurality of gaze target elements (e.g., 1522*a*-1522*f*), including: displaying the first gaze target element (e.g., 1522*b*) at a first location; and displaying the second gaze target element (e.g., 1522*e*) at a second location different from the first location; the second enrollment stage includes displaying a second plurality of gaze target elements (e.g., 1540*a*-1540*f*), wherein the second plurality of gaze target elements corresponds to the first plurality of gaze target elements (e.g., includes the same number of gaze target elements; and/or includes the same number of gaze target elements arranged in the same shape and/or pattern and/or displayed at the same locations at the first plurality of gaze target elements), and displaying the second plurality of gaze target elements includes: displaying a third gaze target element (e.g., 1540*b*) (e.g., a third gaze target element different from the first gaze target element and/or the second gaze target element) at the first location; and displaying a fourth gaze target element (e.g., 1540*e*) (e.g., a fourth gaze target element different from the first gaze target element, the second gaze target element, and/or the third gaze target element) at the second location. In some embodiments, the computer system (e.g., 1500 and/or X700) detects, via the one or more input devices, a fourth selection input (e.g., a touchscreen input, an audio input, a gesture input, a mechanical input (e.g., pressing of a mechanical button and/or rotation of a rotatable input mechanism), a gaze input (e.g., a gaze of the user's eyes directed towards a respective location), and/or an air gesture input) corresponding to the first location (e.g., a selection input gesture that is performed while the gaze of the user is directed toward the first location). In some embodiments, the fourth selection input is an input that is separate from gaze input detected by the computer system (e.g., a touchscreen input, an audio input, a gesture input, a mechanical input (e.g., pressing of a mechanical button and/or rotation of a rotatable input mechanism), and/or an air gesture input). In response to detecting the fourth selection input corresponding to the first location: in accordance with a determination that the enrollment process is in the first enrollment stage when the fourth selection input is detected (and, optionally, the first gaze target element is displayed at the first location (and, optionally, the third gaze target element is not displayed at the first location)), outputting the first audio feedback; and in accordance with a determination that the enrollment process is in the second enrollment stage when the fourth selection input is detected (and, optionally, the third gaze target element is displayed at the first location (and, optionally, the first gaze target element is not displayed at the first location)), outputting fourth audio feedback different from the first audio feedback (e.g., audio feedback for 1522*b* is different than audio feedback for 1540*b*). In some embodiments, different sounds are output for similarly located gaze targets in different stages of the enrollment process. Outputting different audio for similarly located gaze target elements in different stages of the enrollment process enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the first gaze target is visually distinct (e.g., lighter and/or brighter than; and/or has a different color than) from the third gaze target (e.g., 1522*b* looks different than 1540*b*). In some embodiments, the second gaze target is visually distinct (e.g., is lighter and/or brighter than; and/or has a different color than) from the fourth gaze target (e.g., 1522*e* looks different from 1540*e*). In some embodiments, the first plurality of gaze target elements collectively have an average brightness that is brighter than or darker than the average collective brightness of the second plurality of gaze target elements. Displaying different gaze target elements in different stages of the enrollment process enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the first plurality of gaze target elements correspond to a first plurality of musical notes (e.g., in some embodiments, each gaze target element of the first plurality of gaze target elements corresponds to a respective musical note of the first plurality of musical notes; in some embodiments, each gaze target element of the first plurality of gaze target elements corresponds to a different musical note). In some embodiments, the second plurality of gaze target elements correspond to a second plurality of musical notes (e.g., a second plurality of musical notes different from the first plurality of musical notes) (e.g., in some embodiments, each gaze target element of the second plurality of gaze target elements corresponds to a respective musical note of the second plurality of musical notes; in some embodiments, each gaze target element of the second plurality of gaze target elements corresponds to a different musical note). In some embodiments, the first plurality of musical notes and the second plurality of musical notes belong to the same major chord (e.g., FIG. 15Y) (e.g., all of the notes in the first plurality of musical notes and the second plurality of musical notes belong to the same major chord). Outputting different audio for similarly located gaze target elements in different stages of the enrollment process, but keeping the audio outputs tonally related, enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with feedback about a state of the device.

In some embodiments, the first plurality of gaze target elements (e.g., 1522*a*-1522*f*) are arranged in a first ordered sequence, wherein the first gaze target element precedes (e.g., immediately precedes) the second gaze target element in the first ordered sequence (e.g., 1522*a* precedes 1522*b*, 1522*b* precedes 1522*c*, 1522*c* precedes 1522*d*, and so forth). In some embodiments, the first plurality of gaze target elements are arranged in a first geometric pattern in which gaze target elements that are adjacent to one another in the first ordered sequence are displayed adjacent to one another (e.g., without any intervening gaze target elements between them) (e.g., the first gaze target element is adjacent to the second gaze target element based on the first gaze target element immediately preceding the second gaze target element in the first ordered sequence). In some embodiments, the first plurality of gaze target elements correspond to a first plurality of musical notes, wherein: the first gaze target element corresponds to a first musical note; and the second gaze target element corresponds to a second musical note different from the first musical note. In some embodiments, the first plurality of musical notes corresponding to the first plurality of gaze target elements monotonically ascend in the order of the first ordered sequence, including the second musical note having a higher pitch than the first musical note based on the first gaze target element preceding the second gaze target element in the first ordered sequence (e.g., musical note for 1522*b* is higher in pitch than note for 1522*a*, musical note for 1522*c* is higher in pitch than the musical note for 1522*b*, and so forth). In some embodiments, the second plurality of gaze target elements (e.g., 1540*a*-1540*f*) are arranged in a second ordered sequence, wherein the third gaze target element precedes (e.g., immediately precedes) the fourth gaze target element in the second ordered sequence (e.g., 1540*a* precedes 1540*b*, 1540*b* precedes 1540*c*, 1540*c* precedes 1540*d*, and so forth). In some embodiments, the second plurality of gaze target elements are arranged in a second geometric pattern (e.g., a second geometric pattern that is the same as the first geometric pattern) in which gaze target elements that are adjacent to one another in the second ordered sequence are displayed adjacent to one another (e.g., without any intervening gaze target elements between them) (e.g., the third gaze target element is adjacent to the fourth gaze target element based on the third gaze target element immediately preceding the fourth gaze target element in the second ordered sequence). In some embodiments, the second plurality of gaze target elements correspond to a second plurality of musical notes, wherein: the third gaze target element corresponds to a third musical note; and the fourth gaze target element corresponds to a fourth musical note different from the third musical note. In some embodiments, the second plurality of musical notes corresponding to the second plurality of gaze target elements monotonically ascend in the order of the second ordered sequence, including the fourth musical note having a higher pitch than the third musical note based on the third gaze target element preceding the fourth gaze target element in the second ordered sequence. (e.g., musical note for 1540*b* is higher in pitch than the musical note for 1540*a*, the musical note for 1540*c* is higher in pitch than the musical note for 1540*b*, and so forth). In some embodiments, each respective gaze target element of the first plurality of gaze target elements corresponds to (e.g., is assigned) a respective musical note. In some embodiments, the respective musical notes corresponding to the first plurality of gaze target elements monotonically ascend in the order of the first ordered sequence. In some embodiments, each respective gaze target element of the second plurality of gaze target elements corresponds to (e.g., is assigned) a respective musical note. In some embodiments, the respective musical notes corresponding to the second plurality of gaze target elements monotonically ascend in the order of the second ordered sequence. In some embodiments, the respective musical notes corresponding to the first plurality of gaze target elements and the second plurality of gaze target elements are part of the same major chord and/or the same major key. Outputting different audio feedback for different gaze target elements, wherein the audio feedback monotonically ascends from one gaze target element to the next, enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, interesting, and/or pleasing user experience, and provides the user with feedback about a state of the device.

In some embodiments, while displaying the first gaze enrollment user interface and the enrollment process is in the first enrollment stage, the computer system (e.g., 1500 and/or X700) detects, via the one or more input devices, a fifth selection input (e.g., 1526-1, 1526-2, X1526-2, 1532-1, 1532-2, 1534-1, and/or 1534-2) (e.g., a touchscreen input, an audio input, a gesture input, a mechanical input (e.g., pressing of a mechanical button and/or rotation of a rotatable input mechanism), a gaze input (e.g., a gaze of the user's eyes directed towards a respective location), and/or an air gesture input). In some embodiments, the fifth selection input is an input that is separate from gaze input detected by the computer system (e.g., a touchscreen input, an audio input, a gesture input, a mechanical input (e.g., pressing of a mechanical button and/or rotation of a rotatable input mechanism), and/or an air gesture input)) directed toward the first gaze target element (and, optionally, is not directed toward the second gaze target element and/or is not directed toward any other gaze target element of the first plurality of gaze target elements) (e.g., the second selection input is indicative of user selection of the first gaze target element; the second selection input includes a gaze input that is directed toward the first gaze target element (e.g., the user is looking at the first gaze target element and/or a region that includes the first gaze target element); and/or the second selection input includes a gesture (e.g., an air gesture) that is directed toward and/or corresponds to the first gaze target element). In response to detecting the fifth selection input directed toward the first gaze target element: in accordance with a determination that there are additional gaze target elements (e.g., in addition to the first gaze target element) of the first plurality of gaze target elements that have not yet been selected by the user (e.g., with which the user has not yet interacted and/or for which the user has not yet performed a selection input), the computer system (e.g., 1500 and/or X700) outputs a first default musical note that corresponds to the first gaze target element (e.g., FIGS. 15C-15L) (e.g., rows 1-12 in FIG. 15Y); and in accordance with a determination that there are no additional gaze target elements of the first plurality of gaze target elements that have not yet been selected (e.g., FIGS. 15M-15N) (e.g., the user has previously interacted with and/or has previously performed the selection input for all gaze target elements in the first plurality of gaze target elements except the first gaze target element; and/or the first gaze target element is the final gaze target element of the first plurality of gaze target elements for which the user needs to provide user input), the computer system (e.g., 1500 and/or X700) outputs a first last target musical note that is different from the first default musical note and is indicative of the first gaze target element being a last remaining gaze target element of the first plurality of gaze target elements (e.g., row "FINAL" in FIG. 15Y). While displaying a second gaze enrollment user interface that includes the second plurality of gaze target elements, including the third gaze target element and the fourth gaze target element, and the enrollment process is in the second enrollment stage, the computer system (e.g., 1500 and/or X700) detects, via the one or more input devices, a sixth selection input (e.g., a touchscreen input, an audio input, a gesture input, a mechanical input (e.g., pressing of a mechanical button and/or rotation of a rotatable input mechanism), a gaze input (e.g., a gaze of the user's eyes directed towards a respective location), and/or an air gesture input) (In some embodiments, the fifth selection input is an input that is separate from gaze input detected by the computer system (e.g., a touchscreen input, an audio input, a gesture input, a mechanical input (e.g., pressing of a mechanical button and/or rotation of a rotatable input mechanism), and/or an air gesture input)) directed toward the third gaze target element (and, optionally, is not directed toward the second gaze target element and/or is not directed toward any other gaze target element of the first plurality of gaze target elements) (e.g., the second selection input is indicative of user selection of the first gaze target element; the second selection input includes a gaze input that is directed toward the first gaze target element (e.g., the user is looking at the first gaze target element and/or a region that includes the first gaze target element); and/or the second selection input includes a gesture (e.g., an air gesture) that is directed toward and/or corresponds to the first gaze target element). In response to detecting the sixth selection input directed toward the third gaze target element: in accordance with a determination that there are additional gaze target elements (e.g., in addition to the third gaze target element) of the second plurality of gaze target elements that have not yet been selected by the user (e.g., with which the user has not yet interacted and/or for which the user has not yet performed a selection input), the computer system (e.g., 1500 and/or X700) outputs a second default musical note that corresponds to the third gaze target element (e.g., rows 1-12 in FIG. 15Y); and in accordance with a determination that there are no additional gaze target elements of the second plurality of gaze target elements that have not yet been selected (e.g., the user has previously interacted with and/or has previously performed the selection input for all gaze target elements in the second plurality of gaze target elements except the third gaze target element; and/or the third gaze target element is the final gaze target element of the second plurality of gaze target elements for which the user needs to provide user input), the computer system (e.g., 1500 and/or X700) outputs a second last target musical note that is different from the second default musical note and different from the first last target musical note, and is indicative of the third gaze target element being a last remaining gaze target element of the second plurality of gaze target elements (e.g., row "FINAL" in FIG. 15Y). Outputting different audio feedback when the user interacts with a final gaze target element of a set of gaze target elements enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, interesting, and/or pleasing user experience, and provides the user with feedback about a state of the device.

In some embodiments, the first last target musical note and the second last target musical note are the same note spaced apart by one or more octaves (e.g., FINAL in FIG. 15Y) (e.g., spaced apart by two or more octaves). Outputting different audio feedback when the user interacts with a final gaze target element of a set of gaze target elements enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, interesting, and/or pleasing user experience, and provides the user with feedback about a state of the device.

In some embodiments, while displaying the first gaze enrollment user interface, the computer system (e.g., 1500 and/or X700) outputs background audio content (e.g., "AUDIO 1" in FIGS. 15C and 15I). In some embodiments, the background audio content corresponds to a first background musical note. In some embodiments, the first audio feedback corresponds to a first audio feedback note. In some embodiments, the second audio feedback corresponds to a second audio feedback note. In some embodiments, the first background musical note, the first audio feedback note, and the second audio feedback note are in the same major chord (e.g., in the same major key). Outputting audio feedback and background audio content that are tonally related enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, interesting, and/or pleasing user experience, and provides the user with feedback about a state of the device.

In some embodiments, subsequent to displaying the first gaze enrollment user interface and in accordance with a determination that enrollment success criteria are satisfied (e.g., indicative of enrollment of one or more eyes of the user and/or gaze enrollment of the user being completed successfully), the computer system (e.g., 1500 and/or X700) outputs success audio feedback (e.g., 1528*t*). In some embodiments, the success audio feedback corresponds to a first success audio note. In some embodiments, the first audio feedback corresponds to a first feedback note. In some embodiments, the second audio feedback corresponds to a second feedback note. In some embodiments, the first success audio note, the first feedback note, and the second feedback note are in the same major chord (e.g., in the same major key). Outputting gaze target interaction audio feedback and success audio feedback that are tonally related enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, interesting, and/or pleasing user experience, and provides the user with feedback about a state of the device.

In some embodiments, in response to detecting the selection input: in accordance with a determination that the selection input is directed toward the first gaze target element (and, optionally, is not directed toward the second gaze target element and/or is not directed toward any other gaze target element of the first plurality of gaze target elements) (e.g., the selection input is indicative of user selection of the first gaze target element; the selection input includes a gaze input that is directed toward the first gaze target element (e.g., the user is looking at the first gaze target element and/or a region that includes the first gaze target element); and/or the selection input includes a gesture (e.g., an air gesture) that is directed toward and/or corresponds to the first gaze target element), the computer system (e.g., 1500 and/or X700) displays, via the one or more display generation components, a first visual indication indicative of the first gaze target element being selected (e.g., 1522*b* in FIGS. 15F-15H1); and in accordance with a determination that the selection input is directed toward the second gaze target element (and, optionally, is not directed toward the first gaze target element and/or is not directed toward any other gaze target element of the first plurality of gaze target elements) (e.g., the selection input is indicative of user selection of the second gaze target element; the selection input includes a gaze input that is directed toward the second gaze target element (e.g., the user is looking at the second gaze target element and/or a region that includes the second gaze target element); and/or the selection input includes a gesture (e.g., an air gesture) that is directed toward and/or corresponds to the second gaze target element), the computer system (e.g., 1500 and/or X700) displays, via the one or more display generation components, a second visual indication (e.g., 1522*e* in FIGS. 15J-15L) different from the first visual indication and that is indicative of the second gaze target element being selected. Outputting different visual feedback for interaction with different gaze target elements enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, interesting, and/or pleasing user experience, and provides the user with feedback about a state of the device.

In some embodiments, while displaying the first gaze enrollment user interface and prior to detecting the selection input, the computer system (e.g., 1500 and/or X700) detects, via the one or more input devices, a first gaze input (e.g., 1520) (e.g., without a selection input, without a gesture input, and/or without an air gesture input). In response to detecting the first gaze input: in accordance with a determination that the gaze input is directed toward the first gaze target element (e.g., 1522*b*) (and, optionally, is not directed toward the second gaze target element and/or is not directed toward any other gaze target element of the first plurality of gaze target elements) (e.g., the user is gazing at and/or looking at the first gaze target element), the computer system (e.g., 1500 and/or X700) displays, via the one or more display generation components, a third visual indication (e.g., 1522*b* in FIGS. 15E-15F) indicative of the gaze of the user being directed toward the first gaze target element, wherein the third visual indication is different from the first visual indication (and, optionally, different from the second visual indication); and in accordance with a determination that the gaze input is directed toward the second gaze target element (and, optionally, is not directed toward the first gaze target element and/or is not directed toward any other gaze target element of the first plurality of gaze target elements) (e.g., the user is gazing at and/or looking at the second gaze target element), the computer system (e.g., 1500 and/or X700) displays, via the one or more display generation components, a fourth visual indication indicative of the gaze of the user being directed toward the second gaze target element (e.g., 1522*e* in FIGS. 15I-15J), wherein the fourth visual indication is different from the second visual indication (and, optionally, different from the first visual indication and the third visual indication). Outputting visual feedback indicative of a gaze of the user being directed toward a particular gaze target element enhances the operability of the system and makes the user-system interface more efficient (e.g., by helping the user to provide proper inputs and reducing errors) which, additionally, reduces power usage and improves battery life of the device by enabling the user to use the system more quickly and efficiently. Doing so also provides the user with a more immersive, interesting, and/or pleasing user experience, and provides the user with feedback about a state of the device.

In some embodiments, aspects/operations of methods 800, 900, 1000, 1100, 1300, 1400, 1600, and/or 1700 may be interchanged, substituted, and/or added between these methods. For example, the technique of method 800 can be used to initiate the techniques of methods 900, 1000, 1100, 1300, 1400, 1600, and/or 1700. For another example, the various techniques can be performed sequentially. For brevity, these details are not repeated here.

FIGS. 18A-18H illustrate example techniques for user enrollment, in some embodiments. FIG. 19 is a flow diagram of methods of user enrollment, in some embodiments. The user interfaces in FIGS. 18A-18H are used to illustrate the processes in FIG. 19.

Figures 18A, 18B:
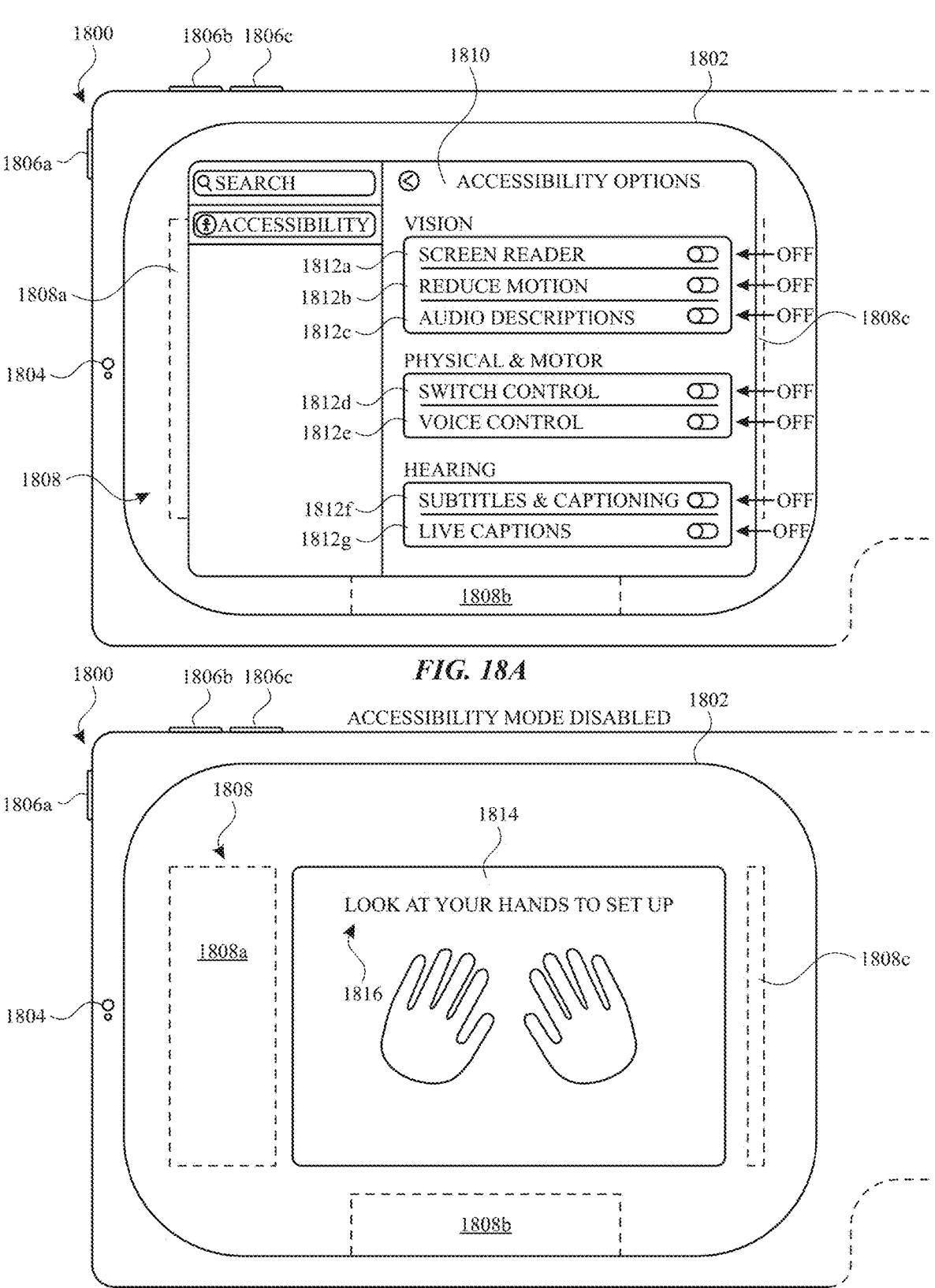
FIGS. 18A-18H illustrate example techniques for user enrollment in accordance with some embodiments.

FIG. 18A depicts electronic device 1800, which includes display 1802, one or more input sensors 1804 (e.g., one or more cameras, eye gaze trackers, hand movement trackers, and/or head movement trackers), and physical input devices 1806*a*-1806*c*. In some embodiments, electronic device 1800 is a smart phone, a tablet a wearable device, a wearable smartwatch device, a head-mounted system (e.g., a headset), or other computer system that includes and/or is in communication with one or more display devices (e.g., display screen, projection device, or the like). In some embodiments, the techniques and user interfaces described in FIGS. 18A-18H are provided by one or more of the devices described in FIGS. 1A-1P. In some embodiments, electronic device 1800 includes a pair of display modules that provide stereoscopic content to different eyes of the same user. For example, electronic device 1800 includes display module 1802 (which provides content to a left eye of the user) and a second display module (which provides content to a right eye of the user). In some embodiments, the second display module displays a slightly different image than display module 1802 to generate the illusion of stereoscopic depth.

Any of the features, components, and/or parts, including the arrangements and configurations thereof shown in FIGS.

1B-1P can be included, either alone or in any combination, in electronic device 1800. For example, in some embodiments, electronic device 1800 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display 1802 includes any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, input sensor 1804 includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, either alone or in any combination. In some embodiments, mechanical input devices 1806*a*-1806*c* include any of the features, components, and/or parts of any of first button 1-128, button 11.1.1-114, second button 1-132, and or dial or button 1-328, either alone or in any combination. In some embodiments, electronic device 1800 includes one or more audio output components (e.g., electronic component 1-112) for generating audio feedback, optionally generated based on detected events and/or user inputs detected by the electronic device 1800. Electronic device 1800 is a computer system (e.g., computer system 101 in FIG. 1A). In some embodiments, the various features described with reference to electronic device 1800 can also be applied to the features described above with reference to electronic devices 700, 1200, and/or 1500, and the various features described above with reference to electronic devices 700, 1200, and/or 1500 can also be applied to the various features described below with reference to electronic device 1800.

At FIG. 18A, electronic device 1800 displays, via display 1802, user interface 1810 overlaid on three-dimensional environment 1808. In the depicted scenario, three-dimensional environment 1808 includes objects 1808*a*-1808*d* (object 1808*d* is obscured in FIG. 18A, but is visible in FIG. 18D). In some embodiments, three-dimensional environment 1808 is displayed by a display (e.g., display 1808, as depicted in FIG. 18A). In some embodiments, three-dimensional environment 1808 includes a virtual environment or an image (or video) of a physical environment captured by one or more cameras (e.g., one or more cameras that are part of input sensors 1804 and/or one or more external cameras). For example, in some embodiments, object 1808*a* is a virtual object that is representative of a physical object that has been captured by one or more cameras and/or detected by one or more sensors, object 1808*b* is a virtual object that is representative of a second physical object that has been captured by one or more cameras and/or detected by one or more sensors, and so forth. In some embodiments, three-dimensional environment 1808 is visible to a user behind user interface 1810 but is not displayed by a display. For example, in some embodiments, three-dimensional environment 1808 is a physical environment (and, for example, objects 1808*a*-1808*d* are physical objects) that is visible to a user (e.g., through one or more transparent displays) behind user interface 1810 without being displayed by a display. In some embodiments, user interface 1810 and/or three-dimensional environment 1808 are part of an extended reality experience.

In FIG. 18A, user interface 1810 includes options 1812*a*-1812*g*. Each of options 1812*a*-1812*g* are toggleable between an enabled state and a disabled state to enable or disable a respective accessibility feature. Option 1812*a* is selectable to enable or disable a screen reader feature which, when enabled, causes visible objects and/or displayed objects to be audibly described via audio output (e.g., to assist users with impaired vision) (e.g., displayed images are described audibly via audio output, and/or displayed text is read aloud via audio output). Option 1812*b* is selectable to enable or disable a reduce motion feature that, when enabled, changes one or more animations to reduce the amount of displayed motion (e.g., for users that have a sensitivity to motion). Option 1812*c* is selectable to enable or disable an audio description feature which, when enabled, causes electronic device 1800 to output audio output describing displayed video content (e.g., for users with impaired vision). Option 1812*d* is selectable to enable or disable a switch control feature which, when enabled, allows a user to control one or more features or functions of electronic device 1800 with one or more external devices (e.g., one or more switches (e.g., one or more foot switches, one or more sip-puff switches, one or more push switches, one or more pull switches, one or more press switches, one or more blink switches, and/or one or more squeeze switches)) (e.g., for users with motor impairment and/or impaired movement). Option 1812*e* is selectable to enable or disable a voice control feature which, when enabled, allows a user to control one or more features or functions of electronic device 1800 with spoken voice commands (e.g., for users with motor impairment and/or impaired movement). Option 1812*f* is selectable to enable or disable a subtitle feature which, when enabled, displays subtitles for audio output by electronic device 1800 (e.g., for users with impaired hearing). Option 1812*g* is selectable to enable or disable a live captions feature which, when enabled, displays live captions for audio output by electronic device 1800 (e.g., for users with impaired hearing). As will be described in greater detail below, in some embodiments, when one or more of accessibility options 1812*a*-1812*g* are enabled, users are presented with different experiences, options, and/or features during biometric enrollment.

FIG. 18B depicts an example scenario in which a first set of accessibility criteria are not met. For example, in some embodiments, in FIG. 18B, none of accessibility options 1812*a*-1812*g* are enabled. However, in some embodiments, the first set of accessibility criteria are not met even when one or more of accessibility options 1812*a*-1812*g* are enabled, as will be described in greater detail below. In FIG. 18B, electronic device 1800 displays user interface 1814, which corresponds to a hand enrollment portion of a biometric enrollment process. In the depicted embodiments, during the hand enrollment portion of the biometric enrollment process, a user is instructed to perform one or more gestures with their hands in order to enroll their hands on electronic device 1800. In some embodiments, enrolling a user's hands includes generating a hand input calibration profile corresponding to the user based on detected gestures and/or detected movement by the user's hands. In some embodiments, the hand input calibration profile is used to detect and/or interpret future hand-based inputs (e.g., gesture inputs and/or air gesture inputs) by the user, and can result in more accurate and/or more precise detection of hand-based inputs by a user. In some embodiments, the biometric enrollment process results in generation of an avatar representation of the user that is generated based on biometric information collected from the user and is used to represent the user in real-time communication sessions with other users. In some embodiments, the biometric enrollment process results in generation of a biometric authentication profile corresponding to the user that is used to biometrically authenticate the user. At FIG. 18B, user interface 1814 includes instruction 1816 which instructs the user to look at their hands to begin hand enrollment.

Figures 18C, 18D:
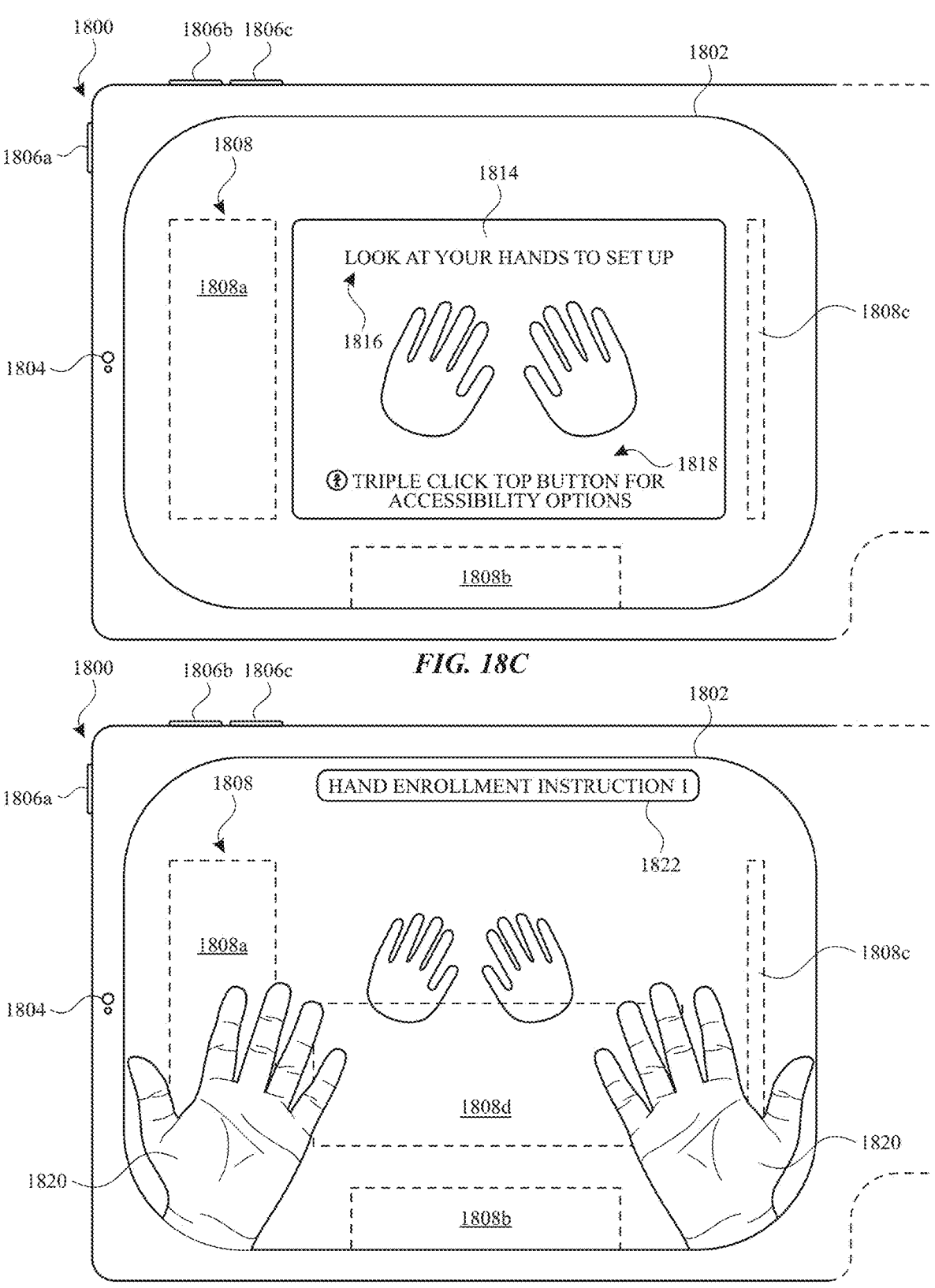

At FIG. 18C, electronic device 1800 continues to display user interface 1814, and detects that a threshold amount of time has passed since electronic device 1800 displayed user interface 1814 and the user has not looked at their hands. In response to detecting that the threshold amount of time has passed since electronic device 1800 displayed user interface 1814 and the user has not looked at their hands, electronic device 1800 updates user interface 1814 to include instruction 1818, which informs the user that the user can provide an input via button 1806b to display accessibility options user interface 1810.

At FIG. 18D, electronic device 1800 detects that the user has moved their hands 1820 in front of their field of view and, in response, ceases display of user interface 1814 and displays instruction 1822, which instructs the user to perform one or more gestures (e.g., one or more air gestures) with their hands. In some embodiments, while the user performs the one or more gestures, electronic device 1800 captures one or more scans of the user's hands in order to enroll the user's hands, generate a hand input calibration profile for the user, generate a biometric authentication profile corresponding to the user, and/or generate an avatar representation of the user based on the captured biometric information.

Figures 18E, 18F:
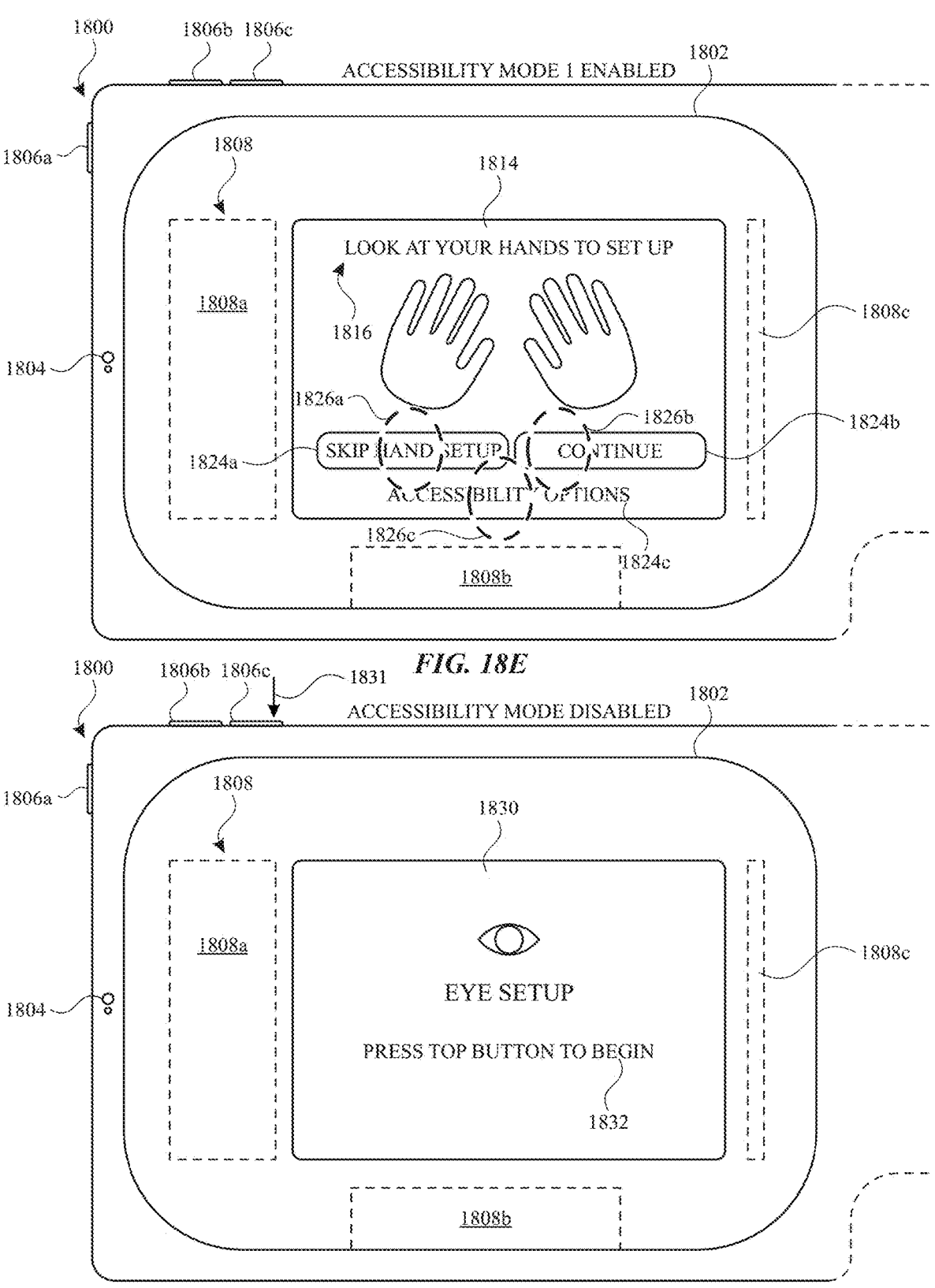

FIG. 18E depicts another example scenario in which one or more accessibility options 1812a-1812g of FIG. 18A are enabled, and the first set of accessibility criteria are met. In contrast, as discussed above, in FIG. 18B, none of accessibility options 1812a-1812g were enabled and, in FIG. 18B, the first set of accessibility criteria were not met. Based on a determination that the first set of accessibility criteria are met, user interface 1814 now includes option 1826a that is selectable to skip user hand enrollment. In FIG. 18B, based on a determination that the first set of accessibility criteria were not met, user interface 1814 did not include option 1826a. In FIG. 18E, user interface 1814 also includes option 1824b that is selectable to proceed with user hand enrollment, and option 1824c that is selectable to display accessibility options user interface 1810. In some embodiments, the first set of accessibility criteria are met when one or more of accessibility options 1812a-1812g that are indicative of impaired movement and/or impaired motor skills are enabled. For example, in some embodiments, the first set of accessibility criteria are met when option 1812d (the switch control feature) or option 1812e (the voice control feature) are enabled. In some embodiments, the first set of accessibility criteria are not met even when one or more of accessibility options 1812a-1812g are enabled if those enabled accessibility options pertain to vision impairment or hearing impairment, but not to motion and/or motor impairment. For example, in some embodiments, when options 1812a-1812c or options 1812f-1812g are enabled (e.g., options indicative of impaired vision and/or impaired hearing), but option 1812d and option 1812e are disabled (e.g., options indicative of impaired motor function and/or impaired movement), the first set of accessibility criteria are not met.

FIG. 18E depicts electronic device 1800 detecting three example user inputs 1826a-1826c.

User input 1826a corresponds to selection of option 1824a. In some embodiments, user input 1826a includes a gesture input and/or an air gesture input (e.g., a pinch air gesture and/or a tap air gesture). In some embodiments, user input 1826a includes a gaze input (e.g., a user gaze directed at option 1824a). In some embodiments, user input 1826a includes a gaze input in combination with a gesture input (e.g., an air gesture input) (e.g., a user gaze directed at option 1824a while the user performs an air pinch gesture and/or an air tap gesture). In some embodiments, user input 1826a utilizes one or more accessibility features, such as a voice control feature (e.g., a voice input directing electronic device 1800 to select option 1824a) and/or a switch control feature (e.g., an input via an external switch to select option 1824a). In some embodiments, user input 1826a utilizes one or more hardware controls (e.g., one or more depressions of a physical button and/or one or more rotations of a rotatable input mechanism), such as input devices 1806a-1806c. In response to detecting user input 1826a, electronic device 1800 skips hand enrollment of the user (e.g., forgoes display of the user interface in FIG. 18D), and proceeds to a next portion of the biometric enrollment process (e.g., FIGS. 18F-18H) and/or concludes the biometric enrollment process.

User input 1826b corresponds to selection of option 1824b. In some embodiments, user input 1826b includes a gesture input and/or an air gesture input (e.g., a pinch air gesture and/or a tap air gesture). In some embodiments, user input 1826b includes a gaze input (e.g., a user gaze directed at option 1824b). In some embodiments, user input 1826b includes a gaze input in combination with a gesture input (e.g., an air gesture input) (e.g., a user gaze directed at option 1824b while the user performs an air pinch gesture and/or an air tap gesture). In some embodiments, user input 1826b utilizes one or more accessibility features, such as a voice control feature (e.g., a voice input directing electronic device 1800 to select option 1824b) and/or a switch control feature (e.g., an input via an external switch to select option 1824b). In some embodiments, user input 1826b utilizes one or more hardware controls (e.g., one or more depressions of a physical button and/or one or more rotations of a rotatable input mechanism), such as input devices 1806a-1806c. In response to detecting user input 1826b, electronic device 1800 proceeds with user hand enrollment (e.g., FIG. 18D, and/or FIG. 18B while waiting for the user to look at their hands).

User input 1826c corresponds to selection of option 1824c. In some embodiments, user input 1826c includes a gesture input and/or an air gesture input (e.g., a pinch air gesture and/or a tap air gesture). In some embodiments, user input 1826c includes a gaze input (e.g., a user gaze directed at option 1824c). In some embodiments, user input 1826c includes a gaze input in combination with a gesture input (e.g., an air gesture input) (e.g., a user gaze directed at option 1824c while the user performs an air pinch gesture and/or an air tap gesture). In some embodiments, user input 1826c utilizes one or more accessibility features, such as a voice control feature (e.g., a voice input directing electronic device 1800 to select option 1824c) and/or a switch control feature (e.g., an input via an external switch to select option 1824c). In some embodiments, user input 1826c utilizes one or more hardware controls (e.g., one or more depressions of a physical button and/or one or more rotations of a rotatable input mechanism), such as input devices 1806*a*-1806*c* (and/or, in some embodiments, hardware controls in FIGS. 1A-1P, such as one or more buttons (e.g., first button 1-128, button 11.1.1-114, second button 1-132, and or dial or button 1-328), knobs (e.g., first button 1-128, button 11.1.1-114, and/or dial or button 1-328), and/or digital crowns (e.g., first button 1-128 which is depressible and twistable or rotatable, button 11.1.1-114, and/or dial or button 1-328)). In response to detecting user input 1826*c*, electronic device 1800 displays user interface 1810 (e.g., as shown in FIG. 18A).

FIG. 18F depicts an example scenario in which a second set of accessibility criteria are not met. For example, in some embodiments, in FIG. 18F, none of accessibility options 1812*a*-1812*g* are enabled. However, in some embodiments, the second set of accessibility criteria are not met even when one or more of accessibility options 1812*a*-1812*g* are enabled, as will be described in greater detail below. In FIG. 18F, based on a determination that the second set of accessibility criteria are not met, electronic device 1800 displays user interface 1830, which corresponds to a gaze enrollment portion (and/or an eye enrollment portion) of the biometric enrollment process. In the depicted embodiments, during the gaze enrollment portion of the biometric enrollment process, a user is instructed to look at one or more gaze targets and perform a gesture (e.g., an air gesture) while the user looks at each gaze target. An example of a gaze enrollment portion is described in greater detail above with reference to FIGS. 15A-15Y. In some embodiments, user gaze enrollment includes generating a gaze input calibration profile corresponding to the user based on one or more scans of the user's eyes as the user looks at the various gaze targets. In some embodiments, the gaze input calibration profile is used to detect and/or interpret future gaze-based inputs by the user, and can result in more accurate and/or more precise detection of gaze-based inputs by a user. In some embodiments, the biometric enrollment process results in generation of an avatar representation of the user that is generated based on biometric information collected from the user and is used to represent the user in real-time communication sessions with other users. In some embodiments, the biometric enrollment process results in generation of a biometric authentication profile corresponding to the user that is used to biometrically authenticate the user (e.g., eye-based and/or gaze-based user authentication). At FIG. 18F, user interface 1830 includes instruction 1832 which instructs the user to provide a hardware control input (e.g., via button 1806*b* and/or button 1806*c*) to begin gaze enrollment. In some embodiments, user interface 1830 is the same as user interface 1510 and/or user interface 1514, described above. At FIG. 18F, electronic device 1800 detects user input 1831, which is a hardware input via button 1806*c*.

Figures 18G, 18H:
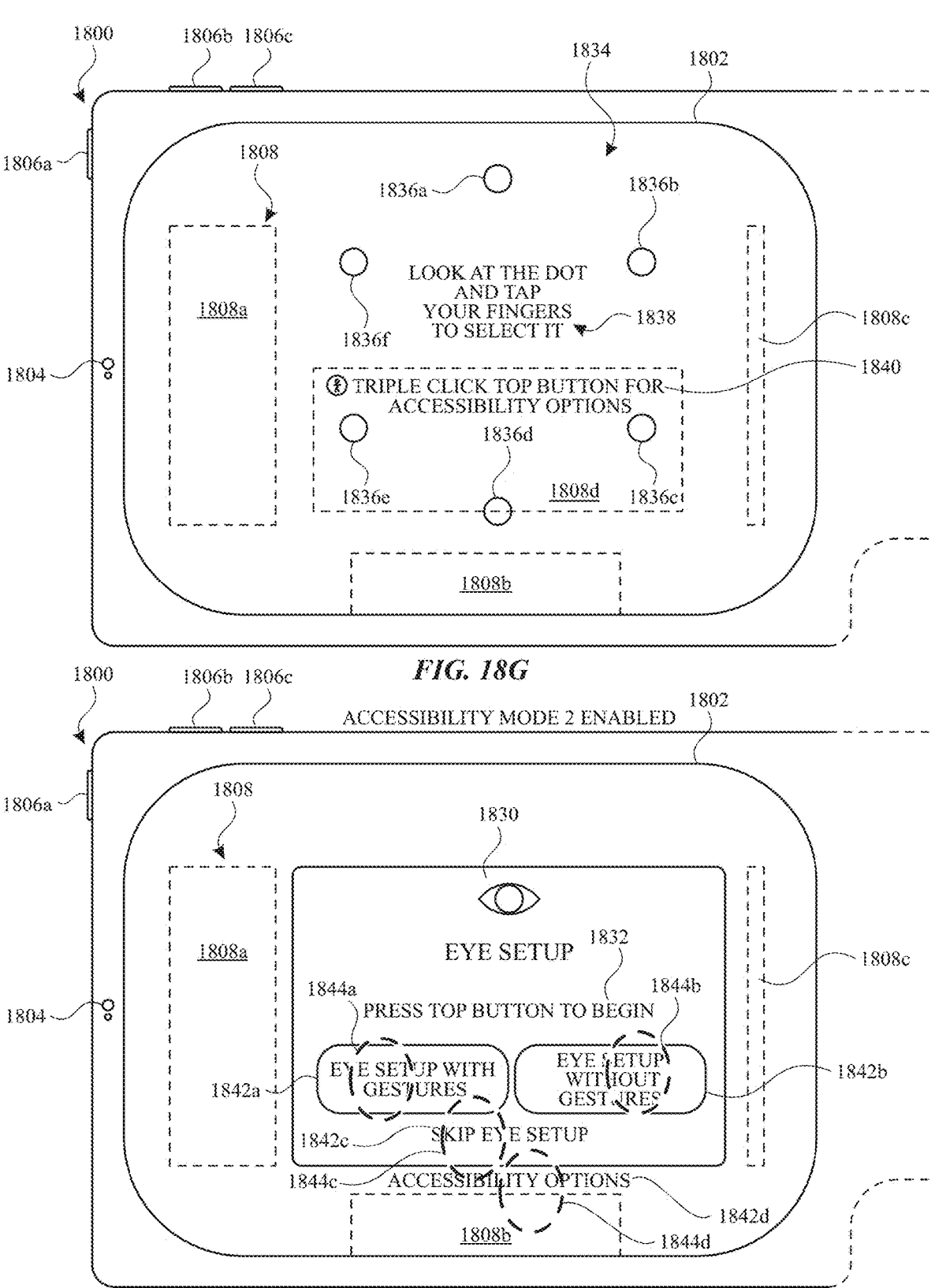

At FIG. 18G, in response to user input 1831, electronic device 1800 displays gaze enrollment user interface 1834, which includes a plurality of gaze targets 1836*a*-1836*f*, and instruction 1838, which instructs the user to look at a gaze target and perform a pinch air gesture. In some embodiments, user interface 1834 is the same as the user interface shown in FIG. 15C, and the gaze enrollment process is the same as the gaze enrollment process described above with reference to FIGS. 15A-15Y. User interface 1834 also includes instruction 1840, which informs the user that the user can access accessibility options user interface 1810 by providing a hardware control input (e.g., via buttons 1806*a*-1806*c*).

FIG. 18H depicts another example scenario in which one or more accessibility options 1812*a*-1812*g* of FIG. 18A are enabled, and the second set of accessibility criteria are met. In contrast, as discussed above, in FIG. 18F, the second set of accessibility criteria were not met. Based on a determination that the second set of accessibility criteria are met, user interface 1830 now includes option 1842*c* that is selectable to skip user gaze enrollment. In FIG. 18F, based on a determination that the second set of accessibility criteria were not met, user interface 1830 did not include option 1842*c*. In FIG. 18H, user interface 1830 also includes option 1842*a* that is selectable to proceed with a user gaze enrollment process that also includes user gesture inputs (e.g., as shown in FIG. 18G and/or FIGS. 15A-15Y). In FIG. 18H, user interface 1830 also includes option 1842*b* that is selectable to proceed with a different user gaze enrollment process that utilizes only user gaze inputs and does not utilize gesture inputs (e.g., an example of which is discussed above with reference to FIGS. 12A-12X). In some embodiments, option 1842*b* is conditionally displayed based on a determination that the first set of accessibility criteria are met (e.g., a first set of accessibility criteria that are indicative of motor impairment and/or impaired motor skills) (e.g., displayed when the first set of accessibility criteria are met and not displayed when the first set of accessibility criteria are not met). In FIG. 18H, user interface 1830 also includes option 1842*d* that is selectable to display accessibility options user interface 1810.

In some embodiments, the second set of accessibility criteria are met when one or more of accessibility options 1812*a*-1812*g* that are indicative of impaired vision are enabled. For example, in some embodiments, the second set of accessibility criteria are met when option 1812*a* (the screen reader feature), option 1812*b* (the reduced motion feature), or option 1812*c* (the audio descriptions feature) are enabled. In some embodiments, the second set of accessibility criteria are not met even when one or more of accessibility options 1812*a*-1812*g* are enabled if those enabled accessibility options pertain to motor impairment or hearing impairment, but do not pertain to vision impairment. For example, in some embodiments, when options 1812*d*-1812*g* are enabled (e.g., options indicative of impaired movement and/or impaired hearing), but options 1812*a*-1812*c* are disabled (e.g., options indicative of impaired vision), the second set of accessibility criteria are not met.

FIG. 18H depicts electronic device 1800 detecting four example user inputs 1844-1844*d*.

User input 1844*a* corresponds to selection of option 1842*a*. In some embodiments, user input 1844*a* includes a gesture input and/or an air gesture input (e.g., a pinch air gesture and/or a tap air gesture). In some embodiments, user input 1844*a* includes a gaze input (e.g., a user gaze directed at option 1842*a*). In some embodiments, user input 1844*a* includes a gaze input in combination with a gesture input (e.g., an air gesture input) (e.g., a user gaze directed at option 1842*a* while the user performs an air pinch gesture and/or an air tap gesture). In some embodiments, user input 1844*a* utilizes one or more accessibility features, such as a voice control feature (e.g., a voice input directing electronic device 1800 to select option 1842*a*) and/or a switch control feature (e.g., an input via an external switch to select option 1842*a*). In some embodiments, user input 1844*a* utilizes one or more hardware controls (e.g., one or more depressions of a physical button and/or one or more rotations of a rotatable input mechanism), such as input devices 1806*a*-1806*c*. In response to detecting user input 1844*a*, electronic device 1800 proceeds with a gaze enrollment procedure that includes gaze-based inputs and hand-based inputs (e.g., gesture inputs and/or air gesture inputs) (e.g., FIG. 18G and/or FIG. 15C).

User input 1844*b* corresponds to selection of option 1842*b*. In some embodiments, user input 1844*b* includes a gesture input and/or an air gesture input (e.g., a pinch air gesture and/or a tap air gesture). In some embodiments, user input 1844*b* includes a gaze input (e.g., a user gaze directed at option 1842*b*). In some embodiments, user input 1844*b* includes a gaze input in combination with a gesture input (e.g., an air gesture input) (e.g., a user gaze directed at option 1842*b* while the user performs an air pinch gesture and/or an air tap gesture). In some embodiments, user input 1844*b* utilizes one or more accessibility features, such as a voice control feature (e.g., a voice input directing electronic device 1800 to select option 1842*b*) and/or a switch control feature (e.g., an input via an external switch to select option 1842*b*). In some embodiments, user input 1844*b* utilizes one or more hardware controls (e.g., one or more depressions of a physical button and/or one or more rotations of a rotatable input mechanism), such as input devices 1806*a*-1806*c*. In response to detecting user input 1844*b*, electronic device 1800 proceeds with an alternative gaze enrollment procedure that includes gaze-based inputs without hand-based inputs (e.g., gesture inputs and/or air gesture inputs) (e.g., FIGS. 12A-12X).

User input 1844*c* corresponds to selection of option 1842*c*. In some embodiments, user input 1844*c* includes a gesture input and/or an air gesture input (e.g., a pinch air gesture and/or a tap air gesture). In some embodiments, user input 1844*c* includes a gaze input (e.g., a user gaze directed at option 1842*c*). In some embodiments, user input 1844*c* includes a gaze input in combination with a gesture input (e.g., an air gesture input) (e.g., a user gaze directed at option 1842*c* while the user performs an air pinch gesture and/or an air tap gesture). In some embodiments, user input 1844*c* utilizes one or more accessibility features, such as a voice control feature (e.g., a voice input directing electronic device 1800 to select option 1842*c*) and/or a switch control feature (e.g., an input via an external switch to select option 1842*c*). In some embodiments, user input 1844*c* utilizes one or more hardware controls (e.g., one or more depressions of a physical button and/or one or more rotations of a rotatable input mechanism), such as input devices 1806*a*-1806*c*. In response to detecting user input 1844*c*, electronic device 1800 skips gaze enrollment of the user (e.g., forgoes display of the user interface in FIG. 18G), and proceeds to a next portion of the biometric enrollment process (e.g., hand enrollment in FIGS. 18B-18E) and/or concludes the biometric enrollment process.

User input 1844*d* corresponds to selection of option 1842*d*. In some embodiments, user input 1844*d* includes a gesture input and/or an air gesture input (e.g., a pinch air gesture and/or a tap air gesture). In some embodiments, user input 1844*d* includes a gaze input (e.g., a user gaze directed at option 1842*d*). In some embodiments, user input 1844*d* includes a gaze input in combination with a gesture input (e.g., an air gesture input) (e.g., a user gaze directed at option 1842*d* while the user performs an air pinch gesture and/or an air tap gesture). In some embodiments, user input 1844*d* utilizes one or more accessibility features, such as a voice control feature (e.g., a voice input directing electronic device 1800 to select option 1842*d*) and/or a switch control feature (e.g., an input via an external switch to select option 1842*d*). In some embodiments, user input 1844*d* utilizes one or more hardware controls (e.g., one or more depressions of a physical button and/or one or more rotations of a rotatable input mechanism), such as input devices 1806*a*-1806*c*. In response to detecting user input 1844*d*, electronic device 1800 displays accessibility options user interface 1810 (e.g., as shown in FIG. 18A).

Additional descriptions regarding FIGS. 18A-18H are provided below with reference to method 1900.

FIG. 19 is a flow diagram of an exemplary method 1900 for user enrollment, in accordance with some embodiments. In some embodiments, method 1900 is performed at a computer system (e.g., 1800) (e.g., computer system 101 in FIG. 1A) (e.g., a smart phone, a smart watch, a tablet, a laptop, a desktop, a wearable device, and/or head-mounted device) that is in communication with one or more display generation components (e.g., a visual output device, a 3D display, a display having at least a portion that is transparent or translucent on which images can be projected (e.g., a see-through display), a projector, a heads-up display, and/or a display controller) and one or more input devices (e.g., a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an audio input device; a biometric sensor (e.g., a fingerprint sensor, a face identification sensor, a gaze tracking sensor, and/or an iris identification sensor) and/or one or more mechanical input devices (e.g., a depressible input mechanism; a button; a rotatable input mechanism; a crown; and/or a dial)). In some embodiments, the method 1900 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1900 are, optionally, combined and/or the order of some operations is, optionally, changed.

The computer system (e.g., 1800) displays (1902), via the one or more display generation components, a first biometric enrollment user interface (e.g., 1814 and/or 1830) that is part of a biometric enrollment process for enrolling one or more biometric features of a user (e.g., for enrolling one or more eyes of a user; for enrolling one or more hands of a user; for creating a gaze input calibration profile corresponding to the user (e.g., a gaze input calibration profile that includes one or more offset values and/or one or more values that are used in measuring, sensing, and/or responding to gaze inputs from the user (e.g., one or more offset values and/or other values that are determined based on scanning one or more eyes of the user while the user is instructed to look at one or more gaze targets positioned at one or more different display positions)); and/or for creating a hand input calibration profile corresponding to the user (e.g., a hand input calibration profile that includes one or more offset values and/or one or more values that are used in measuring, sensing, and/or responding to hand inputs (e.g., gesture inputs and/or air gesture inputs) from the user (e.g., one or more offset values and/or other values that are determined based on scanning one or more hands of the user while the user is instructed to perform one or more gestures and/or air gestures)), including: in accordance with a determination that a set of accessibility conditions (e.g., one or more accessibility conditions; and/or one or more conditions pertaining to one or more accessibility options, vision, vision impairment, hearing, hearing impairment, motor skills, and/or motor impairment) (e.g., in accordance with a determination that one or more enabled and/or selected accessibility options indicate user vision impairment, user hearing impairment, and/or user motor impairment) are met (1904), the computer system displays (1906) a first selectable option (e.g., 1824*a*, 1842*b*, and/or 1842*c*) (e.g., a button and/or an affordance) that is selectable to indicate a user request to skip (e.g., forgo and/or bypass) at least a portion of the biometric enrollment process (e.g., a first selectable option that is selectable to indicate a user request to skip user eye enrollment and/or user hand enrollment; a first selectable option that is selectable to skip user eye enrollment and/or user hand enrollment; and/or a first selectable option that is selectable to initiate a process for skipping user eye enrollment and/or user hand enrollment); and in accordance with a determination that the set of accessibility conditions are not met (1908) (e.g., in accordance with a determination that accessibility options do not indicate user vision impairment, user hearing impairment, and/or user motor impairment), the computer system forgoes display (1910) of the first selectable option (e.g., 1814 and/or 1830 in FIGS. 18B and/or 18F) (e.g., forgoes display of a selectable option that is selectable to skip at least a portion of the biometric enrollment process and/or a selectable option that is selectable to indicate a user request to skip at least a portion of the biometric enrollment process). In some embodiments, the first biometric enrollment user interface (e.g., 1814 and/or 1830) is displayed in response to one or more user inputs (e.g., one or more mechanical inputs (e.g., one or more button presses and/or one or more rotations of a rotatable input mechanism), one or more gesture inputs, one or more air gesture inputs, one or more gaze inputs, and/or one or more touch inputs) (e.g., one or more user inputs corresponding to a user request to initiate a biometric enrollment process; one or more user inputs corresponding to a user request to progress the biometric enrollment process; one or more user inputs corresponding to a user request to initiate a next portion of the biometric enrollment process; and/or one or more user inputs corresponding to a user request to reset and/or redo input calibration (e.g., reset and/or redo gaze input calibration and/or reset and/or redo hand input calibration)). In some embodiments, the first biometric enrollment user interface (e.g., 1814 and/or 1830) is displayed based on a determination (e.g., in response to a determination) that one or more display criteria are satisfied (e.g., based on a determination that the user has worn the computer system on his or her body (e.g., on his or her head); based on a determination that a portion of the body of the user (e.g., face, eyes, and/or nose) is detected at a predetermined position relative to a portion of the computer system (e.g., one or more eyes of the user are positioned in front of one or more display generation components of the computer system; and/or one or more facial features of the user are detected at a predetermined position relative to one or more cameras and/or sensors of the computer system); based on a determination that the user has turned on the computer system (e.g., for the first time); and/or based on a determination that based on a determination that the user has completed a portion of the biometric enrollment process). Allowing a user to skip certain portions of a biometric enrollment process when accessibility conditions are met enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first selectable option (e.g., 1824*a*) is selectable to indicate a user request to skip a hand enrollment portion of the biometric enrollment process for enrolling one or more hands of the user. In some embodiments, the first biometric enrollment user interface (e.g., 1814) corresponds to the hand enrollment portion of the biometric enrollment process. In some embodiments, the first biometric enrollment user interface includes one or more instructions (e.g., 1816) for the user to perform and/or initiate enrollment of one or more hands of the user. In some embodiments, the hand enrollment portion of the biometric enrollment process results in generation of a hand input calibration profile corresponding to the user (e.g., a hand input calibration profile that includes one or more offset values and/or one or more values that are used in measuring, sensing, and/or responding to hand inputs (e.g., gesture inputs and/or air gesture inputs) from the user (e.g., one or more offset values and/or other values that are determined based on scanning one or more hands of the user while the user is instructed to perform one or more gestures and/or air gestures)). In some embodiments, the biometric enrollment process results in generation of an avatar (e.g., an avatar-based representation, and/or a virtual representation that includes one or more portions that move based on detected movement of the user (e.g., a virtual head portion that moves based on movement of the head of the user, a virtual torso portion that moves based on movement of the torso of the user, virtual arms that move based on movement of the arms of the user, virtual hands that move based on hands of the user, and/or one or more virtual facial features (e.g., eyes, nose, and/or mouth) that move based on movement of the facial features of the user)). In some embodiments, the avatar is used to visually represent the user in a real-time communication session (e.g., to other users and/or participants in the real-time communication session). In some embodiments, while displaying the first selectable option (e.g., 1824*a*), the computer system receives a first user input. In response to receiving the first user input: in accordance with a determination that the first user input does not correspond to selection of the first selectable option (e.g., user input 1826*b*), the computer system displays a hand enrollment user interface (e.g., FIG. 18D) that corresponds to the hand enrollment portion of the biometric enrollment process (e.g., a hand enrollment user interface that includes one or more instructions for the user to enroll one or more hands of the user); and in accordance with a determination that the first user input corresponds to selection of the first selectable option (e.g., user input 1826*a*), the computer system forgoes display of the hand enrollment user interface and, in some embodiments, progresses the biometric enrollment process (e.g., advances to a next stage and/or step of the biometric enrollment process; concludes the biometric enrollment process; and/or progresses to a next step in a device setup process). In some embodiments, while displaying the first selectable option (e.g., 1824*a*), the computer system receives a first user input. In response to receiving the first user input: in accordance with a determination that the first user input does not correspond to selection of the first selectable option (e.g., user input 1826*b*), the computer system initiates a process for enrolling one or more hands of the user (e.g., initiates a process for generating a hand input calibration profile corresponding to the user) (e.g., FIG. 18D); and in accordance with a determination that the first user input corresponds to selection of the first selectable option (e.g., user input 1826*a*), the computer system forgoes enrolling one or more hands of the user (e.g., forgoes generating a hand input calibration profile corresponding to the user) and, in some embodiments, progresses the biometric enrollment process (e.g., advances to a next stage and/or step of the biometric enrollment process; concludes the biometric enrollment process; and/or progresses to a next step in a device setup process). In some embodiments, while displaying the first selectable option (e.g., 1824*a*), the computer system receives a user input (e.g., 1826*a*) corresponding to selection of the first selectable option. In response to receiving the user input corresponding to selection of the first selectable option, the computer system progresses the biometric enrollment process without enrolling the one or more hands of the user (e.g., without generating a hand input calibration profile corresponding to the user and/or without displaying one or more hand enrollment user interfaces). Allowing a user to skip a hand enrollment portion of a biometric enrollment process when accessibility conditions are met enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first selectable option (e.g., 1844*b* and/or 1842*c*) is selectable to indicate a user request to skip a gaze enrollment portion of the biometric enrollment process for enrolling one or more eyes of the user. In some embodiments, the first biometric enrollment user interface (e.g., 1830) corresponds to the gaze enrollment portion of the biometric enrollment process. In some embodiments, the first biometric enrollment user interface (e.g., 1830) includes one or more instructions (e.g., 1832) for the user to perform and/or initiate enrollment of one or more eyes of the user. In some embodiment, the gaze enrollment portion of the biometric enrollment process results in generation of a gaze input calibration profile corresponding to the user (e.g., a gaze input calibration profile that includes one or more offset values and/or one or more values that are used in measuring, sensing, and/or responding to gaze inputs from the user (e.g., one or more offset values and/or other values that are determined based on scanning one or more eyes of the user while the user is instructed to perform one or more gaze inputs (e.g., instructed to look at one or more gaze targets positioned at one or more display positions)). In some embodiments, the biometric enrollment process results in generation of an avatar (e.g., an avatar-based representation, and/or a virtual representation that includes one or more portions that move based on detected movement of the user (e.g., a virtual head portion that moves based on movement of the head of the user, a virtual torso portion that moves based on movement of the torso of the user, virtual arms that move based on movement of the arms of the user, virtual hands that move based on hands of the user, and/or one or more virtual facial features (e.g., eyes, nose, and/or mouth) that move based on movement of the facial features of the user)). In some embodiments, the avatar is used to visually represent the user in a real-time communication session (e.g., to other users and/or participants in the real-time communication session). In some embodiments, the biometric enrollment process results in generation of a biometric user authentication profile that is used to biometrically authenticate the user (e.g., face-based user authentication and/or eye-based user authentication). In some embodiments, while displaying the first selectable option (e.g., 1842*b* and/or 1842*c*), the computer system receives a first user input. In response to receiving the first user input: in accordance with a determination that the first user input does not correspond to selection of the first selectable option (e.g., user input 1844*a*), the computer system displays a gaze enrollment user interface (e.g., 1834 and/or FIG. 15C) that corresponds to the gaze enrollment portion of the biometric enrollment process (e.g., a gaze enrollment user interface that includes one or more instructions for the user to enroll one or more eyes of the user and/or enroll gaze inputs for the user); and in accordance with a determination that the first user input corresponds to selection of the first selectable option (e.g., user input 1844*c*), the computer system forgoes display of the gaze enrollment user interface and, in some embodiments, progresses the biometric enrollment process (e.g., advances to a next stage and/or step of the biometric enrollment process; concludes the biometric enrollment process; and/or progresses to a next step in a device setup process). In some embodiments, while displaying the first selectable option (e.g., 1842*b* and/or 1842*c*), the computer system receives a first user input. In response to receiving the first user input: in accordance with a determination that the first user input does not correspond to selection of the first selectable option (e.g., user input 1844*a*), the computer system initiates a process for enrolling one or more eyes of the user (e.g., initiates a process for generating a gaze input calibration profile corresponding to the user) (e.g., FIG. 18G and/or FIG. 15C); and in accordance with a determination that the first user input corresponds to selection of the first selectable option (e.g., user input 1844*c*), the computer system forgoes enrolling one or more eyes of the user (e.g., forgoes generating a gaze input calibration profile corresponding to the user) and, in some embodiments, progresses the biometric enrollment process (e.g., advances to a next stage and/or step of the biometric enrollment process; concludes the biometric enrollment process; and/or progresses to a next step in a device setup process). In some embodiments, while displaying the first selectable option (e.g., 1842*b* and/or 1842*c*), the computer system receives a user input corresponding to selection of the first selectable option (e.g., user input 1844*c*). In response to receiving the user input corresponding to selection of the first selectable option, the computer system progresses the biometric enrollment process without enrolling the one or more eyes of the user (e.g., without generating an eye input and/or gaze input calibration profile corresponding to the user and/or without displaying one or more eye enrollment and/or gaze enrollment user interfaces). Allowing a user to skip a gaze enrollment portion of a biometric enrollment process when accessibility conditions are met enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first selectable option is selectable to indicate a user request to replace the gaze enrollment portion of the biometric enrollment process with an alternative gaze enrollment portion that is different from the gaze enrollment portion (e.g., selectable option 1842*b*). In some embodiments, the gaze enrollment portion of the biometric enrollment process requires the user to perform one or more hand inputs in conjunction with one or more gaze inputs (e.g., an air gesture (e.g., a pinch air gesture and/or a tap air gesture) while the user looks at a gaze target) (e.g., FIG. 18G and/or FIGS. 15A-15Y). In some embodiments, the alternative gaze enrollment portion requires the user to perform one or more gaze inputs without requiring hand inputs (e.g., requires the user to look at a gaze target without requiring additional hand input and/or air gestures) (e.g., FIGS. 12A-12X). In some embodiments, while displaying the first selectable option (e.g., 1842*b*), the computer system (e.g., 1800) receives a first user input. In response to receiving the first user input: in accordance with a determination that the first user input does not correspond to selection of the first selectable option (e.g., user input 1844*a*), the computer system displays a first gaze enrollment user interface that corresponds to the gaze enrollment portion of the biometric enrollment process (e.g., a first gaze enrollment user interface that includes a first set of instructions for the user to enroll one or more eyes of the user and/or enroll gaze inputs for the user) (e.g., FIG. 18G and/or FIG. 15C); and in accordance with a determination that the first user input corresponds to selection of the first selectable option (e.g., user input 1844*b*), the computer system displays a second gaze enrollment user interface that corresponds to the alternative gaze enrollment portion and is different from the first gaze enrollment user interface (e.g., a second gaze enrollment user interface that includes a second set of instructions for the user to enroll one or more eyes of the user and/or enroll gaze inputs for the user and that is different from the first set of instructions) (e.g., FIG. 12B and/or 12C). Allowing a user to replace a gaze enrollment portion of a biometric enrollment process with an alternative gaze enrollment portion when accessibility conditions are met enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, subsequent to displaying the first biometric enrollment user interface (e.g., 1814 and/or 1830): in accordance with a determination that the set of accessibility conditions are not met, the computer system automatically (e.g., without further user input) progresses the biometric enrollment process to enroll one or more biometric features of the user (e.g., displays a subsequent biometric enrollment user interface; updates the first biometric display user interface; and/or displays one or more instructions for the user to enroll one or more biometric features of the user) (e.g., from FIG. 18C-18D and/or FIG. 18F-18G). Automatically progressing the biometric enrollment process when the accessibility conditions are not met enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, subsequent to displaying the first biometric enrollment user interface (e.g., 1814 and/or 1830), the computer system (e.g., 1800) displays, via the one or more display generation components (e.g., 1802), a second biometric enrollment user interface (e.g., 1814 and/or 1830) that corresponds to a second portion of the biometric enrollment process (in some embodiments, the first biometric enrollment user interface corresponds to a first portion of the biometric enrollment process different from the second portion (e.g., a hand enrollment portion and a gaze and/or eye enrollment portion)), including: in accordance with a determination that a second set of accessibility conditions (e.g., one or more accessibility conditions; and/or one or more conditions pertaining to one or more accessibility options, vision, vision impairment, hearing, hearing impairment, motor skills, and/or motor impairment) (e.g., in accordance with a determination that one or more enabled and/or selected accessibility options indicate user vision impairment, user hearing impairment, and/or user motor impairment) (e.g., a second set of accessibility conditions different from or the same as the set of accessibility conditions) are met, the computer system displays a second selectable option (e.g., 1824*a*, 1842*b*, and/or 1842*c*) (e.g., a button and/or an affordance) that is selectable to indicate a user request to skip (e.g., forgo and/or bypass) the second portion of the biometric enrollment process (e.g., a second selectable option that is selectable to indicate a user request to skip user eye enrollment and/or user hand enrollment; a second selectable option that is selectable to skip user eye enrollment and/or user hand enrollment; and/or a second selectable option that is selectable to initiate a process for skipping user eye enrollment and/or user hand enrollment); and in accordance with a determination that the second set of accessibility conditions are not met (e.g., in accordance with a determination that accessibility options do not indicate user vision impairment, user hearing impairment, and/or user motor impairment), the computer system forgoes display of the second selectable option (e.g., 1814 in FIG. 18B and/or 1830 in FIG. 18F) (e.g., forgoes display of a selectable option that is selectable to skip the second portion of the biometric enrollment process and/or a selectable option that is selectable to indicate a user request to skip the second portion of the biometric enrollment process). In some embodiments, a first set of accessibility conditions allows a user to skip hand enrollment, and a second set of accessibility conditions different from the first set of accessibility conditions allows a user to skip eye and/or gaze enrollment. For example, in some embodiments, the first set of accessibility conditions are indicative of impaired movement and/or motor impairment (e.g., when a switch control feature is enabled and/or when a voice control feature is enabled), such that it may be difficult for the user to provide hand-based gesture inputs (e.g., air gesture inputs). In some embodiments, the second set of accessibility conditions are indicative of impaired vision (e.g., when a screen reader feature is enabled), such that it may be difficult for the user to provide gaze-based inputs. In some embodiments, the second biometric enrollment user interface (e.g., 1814 and/or 1830) is displayed in response to one or more user inputs (e.g., one or more mechanical inputs (e.g., one or more button presses and/or one or more rotations of a rotatable input mechanism), one or more gesture inputs, one or more air gesture inputs, one or more gaze inputs, and/or one or more touch inputs) (e.g., one or more user inputs corresponding to a user request to initiate a biometric enrollment process; one or more user inputs corresponding to a user request to progress the biometric enrollment process; one or more user inputs corresponding to a user request to initiate a next portion of the biometric enrollment process; and/or one or more user inputs corresponding to a user request to reset and/or redo input calibration (e.g., reset and/or redo gaze input calibration and/or reset and/or redo hand input calibration)). In some embodiments, the second biometric enrollment user interface (e.g., 1814 and/or 1830) is displayed based on a determination (e.g., in response to a determination) that one or more display criteria are satisfied (e.g., based on a determination that the user has worn the computer system on his or her body (e.g., on his or her head); based on a determination that a portion of the body of the user (e.g., face, eyes, and/or nose) is detected at a predetermined position relative to a portion of the computer system (e.g., one or more eyes of the user are positioned in front of one or more display generation components of the computer system; and/or one or more facial features of the user are detected at a predetermined position relative to one or more cameras and/or sensors of the computer system); based on a determination that the user has turned on the computer system (e.g., for the first time); and/or based on a determination that based on a determination that the user has completed a portion of the biometric enrollment process).

Allowing a user to skip certain portions of a biometric enrollment process when accessibility conditions are met enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, displaying the first biometric enrollment user interface (e.g., 1814 and/or 1830) further comprises displaying a first set of instructions (e.g., 1832) instructing the user to provide user input using one or more hardware controls (e.g., one or more physical buttons, one or more physical depressible input mechanisms, and/or one or more physical rotatable input mechanisms) to progress the biometric enrollment process. In some embodiments, while displaying the first biometric enrollment user interface (e.g., 1814 and/or 1830) including the first set of instructions (e.g., 1832) instructing the user to provide user inputs using one or more hardware controls to progress the biometric enroll-ment process, the computer system receives a first set of user inputs (e.g., 1831) using the one or more hardware controls (e.g., 1806a-1806c) (e.g., one or more hardware inputs and/or mechanical inputs, one or more presses of one or more physical buttons, and/or one or more rotations of one or more rotatable input mechanisms); and in response to receiving the first set of user inputs using the one or more hardware controls, the computer system progresses the bio-metric enrollment process to a subsequent step in the bio-metric enrollment process (e.g., to a next biometric enroll-ment portion and/or concluding the biometric enrollment portion) (e.g., FIGS. 18F-18G). In some embodiments, the first set of instructions (e.g., 1832) are displayed without regard for whether the set of accessibility conditions are met. Providing the user with a first set of instructions that instruct the user to provide a user input using one or more hardware controls to progress the biometric enrollment process enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, displaying the first biometric enrollment user interface (e.g., 1814 and/or 1830) further comprises displaying a second set of instructions (e.g., 1818) instructing the user on a second set of user inputs (e.g., one or more user inputs (e.g., one or more mechanical inputs, one or more gaze inputs, one or more gesture inputs, and/or one or more air gesture inputs)) that the user can perform to cause the computer system to display an acces-sibility menu (e.g., 1810) that includes one or more acces-sibility options (e.g., 1812a-1812g) (e.g., one or more acces-sibility options that pertain to vision, vision impairment, hearing, hearing impairment, motor skills, and/or motor impairment). In some embodiments, the second set of instructions are displayed without regard for whether the set of accessibility conditions are met. In some embodiments, while displaying the first biometric enrollment user interface (e.g., 1814 and/or 1830) including the second set of instruc-tions (e.g., 1818), the computer system (e.g., 1800) receives a second set of user inputs corresponding to the second set of instructions (e.g., a second set of user inputs that performs the inputs instructed in the second set of instructions); and in response to receiving the second set of user inputs, the computer system displays the accessibility menu (e.g., 1810) that includes the one or more accessibility options (e.g.,

1812a-1812g). Providing the user with a second set of instructions that instruct the user on how to access an accessibility menu enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the determination that the set of accessibility conditions are met includes a determination that a first accessibility feature (e.g., 1812a-1812g) has been enabled (or, in some embodiments, a determination that one or more accessibility features have been enabled) (e.g., a first accessibility feature that pertains to vision, vision impairment, hearing, hearing impairment, motor skills, and/or motor impairment); and the determination that the set of accessibility conditions are not met includes a determination that the first accessibility feature is not enabled (or, in some embodiments, a determination that one or more accessibility features are not enabled). Allowing a user to skip certain portions of a biometric enrollment process when accessibil-ity features are enabled enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first accessibility feature is a screen reader feature (e.g., 1812a) (e.g., a feature in which the computer system outputs audio output (e.g., automati-cally and/or in response to user input) that describes visual content that is displayed via the one or more display gen-eration components and/or describes visual content that would be displayed via the one or more display generation components if the screen reader feature was not enabled (e.g., audio output that provides audio descriptions of images and/or audio output that reads aloud text that is displayed and/or would be displayed). In some embodi-ments, the screen reader feature indicates visual impairment of the user, and allows the user to skip gaze enrollment and/or eye enrollment. Allowing a user to skip certain portions of a biometric enrollment process when accessibil-ity features are enabled enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first accessibility feature is a switch control feature (e.g., 1812d) (e.g., a feature in which a user is able to provide user input to the computer system and/or control one or more features of the computer system using one or more external devices (e.g., one or more switches (e.g., a single switch, multiple switches, one or more foot switches, one or more sip-puff switches, one or more push switches, one or more pull switches, one or more press switches, one or more blink switches, and/or one or more squeeze switches) separate from the computer system). In some embodiments, the switch control feature indicates motor impairment of the user, and allows the user to skip hand enrollment. Allowing a user to skip certain portions of a biometric enrollment process when accessibility features are enabled enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first accessibility feature is a voice control feature (e.g., 1812*e*) (e.g., a feature in which a user is able to provide audio input (e.g., voice input) to the computer system to control one or more features of the computer system (e.g., one or more features that can be controlled via touch input, gesture input, and/or air gesture input when the voice control feature is not enabled)). In some embodiments, the voice control feature indicates motor impairment of the user, and allows the user to skip hand enrollment. Allowing a user to skip certain portions of a biometric enrollment process when accessibility features are enabled enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, while displaying the first biometric enrollment user interface (e.g., 1814 and/or 1830), including displaying the first selectable option (e.g., 1824*a*, 1842*b*, and/or 1842*c*), the computer system receives, via the one or more input devices, a navigation input (e.g., one or more inputs) (e.g., 1826*a*, 1844*b*, and/or 1844*c*) that includes one or more user inputs that utilize one or more accessibility features of the computer system (e.g., an audible and/or spoken input that utilizes a voice control feature of the computer system; and an input via an external device separate from the computer system that utilizes a switch control feature of the computer system) (e.g., one or more accessibility feature that are in an enabled state at the time of receiving the navigation input). In response to receiving the navigation input (e.g., 1826*a*, 1844*b*, and/or 1844*c*), the computer system navigates to the first selectable option (e.g., 1826*a*, 1844*b*, and/or 1844*c*) (e.g., displays an indication of navigation to the first selectable option, and/or displays an indication that the first selectable option is selected). Allowing a user to navigate to the first selectable option using one or more accessibility features of the computer system enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, while displaying the first biometric enrollment user interface (e.g., 1814 and/or 1830), including displaying the first selectable option (e.g., 1824*a*, 1842*b*, and/or 1842*c*), the computer system receives, via the one or more input devices, a navigation input (e.g., one or more inputs) (e.g., 1826*a*, 1844*b*, and/or 1844*c*) that includes one or more user inputs via one or more hardware controls (e.g., 1806*a*-1806*c*) (e.g., one or more presses of a physical button and/or depressible input mechanism; and/or one or more rotations of a physical crown and/or a rotatable input mechanism). In response to receiving the navigation input (e.g., 1826*a*, 1844*b*, and/or 1844*c*), the computer system (e.g., 1800) displays a user interface corresponding to the first selectable option (e.g., displaying an indication of navigation to the first selectable option, and/or displaying an indication that the first selectable option is selected). Allowing a user to navigate to the first selectable option using one or more hardware controls enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, aspects/operations of methods 800, 900, 1000, 1100, 1300, 1400, 1600, 1700, and/or 1900 may be interchanged, substituted, and/or added between these methods. For example, the gaze enrollment user interfaces recited in methods 1300, 1400, 1600, and/or 1700 are part of the biometric enrollment process recited in method 1900. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users, such as by performing gaze enrollment. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user and to more accurately enroll the user's gaze. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In another example, users can select not to provide data for customization of services. In yet another example, users can select to limit the length of time data is maintained or entirely prohibit the development of a customized service. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can generated by inferring preferences based on non-personal information data or a bare minimum amount of personal information, such as the content being requested by the device associated with a user, other non-personal information available to the service, or publicly available information.

What is claimed is:

1. A computer system configured to communicate with one or more display generation components and one or more input devices, comprising:
   one or more processors; and memory storing one or more programs configured to be executed by the one or more processors, the one or more programs including instructions for:
   displaying, via the one or more display generation components, a first gaze enrollment user interface, wherein:
      the first gaze enrollment user interface includes a first set of user interface elements that prompt movement of one or more eyes of a user; and
      the first gaze enrollment user interface is displayed with a respective type of element having a first average brightness;
   while displaying the first gaze enrollment user interface with the respective type of element having the first average brightness, collecting gaze information for a plurality of different user interface elements in the first set of user interface elements;
   subsequent to collecting the gaze information for the plurality of different user interface elements in the first set of user interface elements while displaying the first gaze enrollment user interface, displaying, via the one or more display generation components, a second gaze enrollment user interface, wherein:
      the second gaze enrollment user interface includes a second set of user interface elements that prompt movement of one or more eyes of a user; and
      the second gaze enrollment user interface is displayed with the respective type of element having a second average brightness different from the first average brightness; and
   while displaying the second gaze enrollment user interface with the respective type of element having the second average brightness, collecting gaze information for a plurality of different user interface elements in the second set of user interface elements.

2. The computer system of claim 1, wherein:
the respective type of element is a background element;
displaying the first gaze enrollment user interface includes displaying the first set of user interface elements overlaid on the background element; and
displaying the second gaze enrollment user interface includes displaying the second set of user interface elements overlaid on the background element.

3. The computer system of claim 2, wherein the background element is a passthrough environment.

4. The computer system of claim 2, the one or more programs further including instructions for:
subsequent to displaying the second gaze enrollment user interface, displaying, via the one or more display generation components, a respective user interface overlaid on the background element, wherein the respective user interface is different from the first gaze enrollment user interface and the second gaze enrollment user interface, and is displayed with the background element having a third average brightness different from the first average brightness and the second average brightness.

5. The computer system of claim 1, wherein the respective type of element is a gaze target.

6. The computer system of claim 1, the one or more programs further including instructions for:
prior to displaying the first gaze enrollment user interface, displaying, via the one or more display generation components, a first user interface with a first respective type of element having a fourth average brightness different from the first average brightness; and in response to one or more user inputs corresponding to a user request to progress a gaze enrollment process, changing the average brightness of the first respective type of element from the fourth average brightness to a fifth average brightness different from the fourth average brightness.

7. The computer system of claim 1, the one or more programs further including instructions for:
prior to displaying the first gaze enrollment user interface, displaying, via the one or more display generation components, a first tutorial animation that includes:
a representation of a face of user; and
representations of one or more gaze targets.

8. The computer system of claim 7, the one or more programs further including instructions for:
subsequent to displaying the first tutorial animation, receiving, via the one or more input devices, a first hardware input; and
in response to receiving the first hardware input, displaying, via the one or more display generation components, the first gaze enrollment user interface.

9. The computer system of claim 1, wherein:
the first set of user interface elements includes a first plurality of gaze targets that are arranged in a sequential order; and
displaying the first gaze enrollment user interface further comprises:
displaying, via the one or more display generation components, a first gaze target of the first plurality of gaze targets; and
subsequent to displaying the first gaze target, in accordance with a determination that gaze target criteria are met, displaying, via the one or more display generation components, a second gaze target of the first plurality of gaze targets, wherein the second gaze target is different from the first gaze target.

10. The computer system of claim 1, wherein:
displaying the first gaze enrollment user interface further comprises displaying, via the one or more display generation components, a first gaze target object; and
the one or more programs further include instructions for:
while displaying the first gaze target object, detecting, via the one or more input devices, a gaze of a user directed at the first gaze target object; and
in response to detecting the gaze of the user directed at the first gaze target object, displaying, via the one or more display generation components, a first progress indication indicating that the computer system has detected the gaze of the user directed at the first gaze target object.

11. The computer system of claim 10, wherein displaying the first progress indication includes changing a color of the first gaze target object.

12. The computer system of claim 10, wherein displaying the first progress indication includes displaying the first gaze target object shrinking in size.

13. The computer system of claim 10, wherein:
displaying the first gaze target object comprises displaying the first gaze target object a first location; and
the one or more programs further include instructions for:
subsequent to displaying the first gaze target object at the first location:
in accordance with a determination that gaze target criteria are met, displaying, via the one or more display generation components, movement of the first gaze target object from the first location to a second location different from the first location.

14. The computer system of claim 13, wherein displaying movement of the first gaze target object from the first location to the second location comprises displaying expansion of the first gaze target object as it moves from the first location to the second location.

15. The computer system of claim 13, the one or more programs further including instructions for:
while displaying movement of the first gaze target object from the first location to the second location, displaying, via the one or more display generation components, a first representation of the first gaze target object at the first location.

16. The computer system of claim 1, the one or more programs further including instructions for:
while displaying the first gaze enrollment user interface:
in accordance with a determination that a user of the computer system has not gazed at a first user interface element of the first set of user interface elements within a threshold duration of time, displaying, via the one or more display generation components, a prompt prompting the user to look at the first user interface element.

17. The computer system of claim 1, the one or more programs further including instructions for:
displaying, via the one or more display generation components, a first user interface element of the first set of user interface elements;
while displaying the first user interface element, detecting, via the one or more input devices, a gaze of a user directed at the first user interface element; and
in response to detecting the gaze of the user directed at the first user interface element, displaying, via the one or more display generation components, the first user interface element changing color from a first color to a second color different from the first color.

18. The computer system of claim 17, the one or more programs further including instructions for:
subsequent to displaying the first user interface element changing color from the first color to the second color, displaying, via the one or more display generation components, a second user interface element of the first set of user interface elements, wherein the second user interface element is different from the first user interface element;
while displaying the second user interface element, detecting, via the one or more input devices, a gaze of a user directed at the second user interface element; and
in response to detecting the gaze of the user directed at the second user interface element, displaying, via the one or more display generation components, the second user interface element changing color from a third color to a fourth color different from the third color and the second color.

19. The computer system of claim 1, the one or more programs further including instructions for:
displaying, via the one or more display generation components, a first gaze element at a first location; and
subsequent to displaying the first gaze element at the first location:
in accordance with a determination that first gaze criteria are met, displaying, via the one or more display generation components, a second gaze element at a second location different from the first location.

20. The computer system of claim 19, the one or more programs further including instructions for:

subsequent to displaying the first gaze element at the first location:

in accordance with a determination that the first gaze criteria are met, fading out the first gaze element at the first location.

21. The computer system of claim 1, wherein:

displaying the first gaze enrollment user interface further includes displaying a first element of the first set of user interface elements at a first display position; and the one or more programs further include instructions for:

while displaying the first element at the first display position, detecting a gaze of the user directed at a first display region that includes the first display position; and in response to detecting the gaze of the user directed at the first display region, outputting first audio feedback.

22. The computer system of claim 1, wherein:

the first set of user interface elements includes a first plurality of gaze targets arranged in a sequential order, including:

a first gaze target that is displayed at a first display location;

a second gaze target that is displayed after the first gaze target and that is displayed at a second display location different from the first display location; and a final gaze target that is displayed after the first gaze target and the second gaze target, and is displayed at the first display location; and displaying the first gaze enrollment user interface further comprises:

displaying, via the one or more display generation components, the first gaze target at the first display location;

subsequent to displaying the first gaze target at the first display location, displaying, via the one or more display generation components, the second gaze target at the second display location; and subsequent to displaying the second gaze target at the second display location, displaying, via the one or more display generation components, the final gaze target at the first display location.

23. The computer system of claim 1, wherein:

the first set of user interface elements includes a first plurality of gaze target elements arranged in a sequential order, including:

a first gaze target element that is displayed at a first display position; and a second gaze target element that is displayed after the first gaze target element and that is displayed at a second display position different from the first display position;

the second set of user interface elements includes a second plurality of gaze target elements arranged in a second sequential order, including:

a third gaze target element that is displayed at the first display position; and a fourth gaze target element that is displayed after the third gaze target element and that is displayed at the second display position;

displaying the first gaze enrollment user interface further comprises:

displaying, via the one or more display generation components, the first gaze target element at the first display position with the respective type of element having the first average brightness; and subsequent to displaying the first gaze target element at the first display position, displaying, via the one or more display generation components, the second gaze target element at the second display position with the respective type of element having the first average brightness; and displaying the second gaze enrollment user interface further comprises:

displaying, via the one or more display generation components, the third gaze target element at the first display position with the respective type of element having the second average brightness; and subsequent to displaying the third gaze target element at the first display position, displaying, via the one or more display generation components, the fourth gaze target element at the second display position with the respective type of element having the second average brightness.

24. The computer system of claim 23, wherein:

the first gaze target element is displayed at the first display position with a first color;

the third gaze target element is displayed at the first display position with a second color different from the first color;

the second gaze target element is displayed at the second display position with a third color; and the fourth gaze target element is displayed at the second display position with a fourth color different from the third color.

25. The computer system of claim 1, wherein:

displaying the first gaze enrollment user interface includes displaying the first gaze enrollment user interface within a first passthrough environment; and displaying the second gaze enrollment user interface includes displaying the second gaze enrollment user interface within the first passthrough environment.

26. The computer system of claim 25, wherein:

displaying the first gaze enrollment user interface includes displaying the first gaze enrollment user interface within a first passthrough environment with a first tint applied to the first passthrough environment; and displaying the second gaze enrollment user interface includes displaying the second gaze enrollment user interface within the first passthrough environment with a second tint applied to the first passthrough environment, wherein the second tint is different from the first tint.

27. The computer system of claim 1, wherein:

displaying the first gaze enrollment user interface includes displaying the first gaze enrollment user interface within a respective virtual environment; and displaying the second gaze enrollment user interface includes displaying the second gaze enrollment user interface within the respective virtual environment, wherein:

in accordance with a determination that a current time of day satisfies first criteria, the respective virtual environment is a first virtual environment; and in accordance with a determination that the current time of day satisfies second criteria different from the first criteria, the respective virtual environment is a second virtual environment different from the first virtual environment.

28. The computer system of claim 1, the one or more programs further including instructions for:

subsequent to displaying the second gaze enrollment user interface:

in accordance with a determination that gaze enrollment criteria are satisfied, displaying, via the one or more display generation components, a success indication indicating that the gaze enrollment criteria are satisfied.

29. The computer system of claim 1, the one or more programs further including instructions for:
subsequent to displaying the second gaze enrollment user interface with the respective type of element having the second average brightness, displaying a third user interface with the respective type of element having a sixth average brightness different from the second average brightness.

30. The computer system of claim 1, the one or more programs further including instructions for:
subsequent to displaying the second gaze enrollment user interface, displaying, via the one or more display generation components, a third gaze enrollment user interface, wherein:
the third gaze enrollment user interface includes a third set of user interface elements that prompt movement of one or more eyes of the user; and
the third gaze enrollment user interface is displayed with the respective type of element having a seventh average brightness different from the second average brightness.

31. A non-transitory computer-readable storage medium storing one or more programs configured to be executed by one or more processors of a computer system that is in communication with one or more display generation components and one or more input devices, the one or more programs including instructions for:
displaying, via the one or more display generation components, a first gaze enrollment user interface, wherein:
the first gaze enrollment user interface includes a first set of user interface elements that prompt movement of one or more eyes of a user; and
the first gaze enrollment user interface is displayed with a respective type of element having a first average brightness;
while displaying the first gaze enrollment user interface with the respective type of element having the first average brightness, collecting gaze information for a plurality of different user interface elements in the first set of user interface elements;
subsequent to collecting the gaze information for the plurality of different user interface elements in the first set of user interface elements while displaying the first gaze enrollment user interface, displaying, via the one or more display generation components, a second gaze enrollment user interface, wherein:
the second gaze enrollment user interface includes a second set of user interface elements that prompt movement of one or more eyes of a user; and
the second gaze enrollment user interface is displayed with the respective type of element having a second average brightness different from the first average brightness; and
while displaying the second gaze enrollment user interface with the respective type of element having the second average brightness, collecting gaze information for a plurality of different user interface elements in the second set of user interface elements.

32. The non-transitory computer-readable storage medium of claim 31, wherein:
the respective type of element is a background element;

displaying the first gaze enrollment user interface includes displaying the first set of user interface elements overlaid on the background element; and
displaying the second gaze enrollment user interface includes displaying the second set of user interface elements overlaid on the background element.

33. The non-transitory computer-readable storage medium of claim 31, wherein the respective type of element is a gaze target.

34. The non-transitory computer-readable storage medium of claim 31, the one or more programs further including instructions for:
prior to displaying the first gaze enrollment user interface, displaying, via the one or more display generation components, a first user interface with a first respective type of element having a fourth average brightness different from the first average brightness; and
in response to one or more user inputs corresponding to a user request to progress a gaze enrollment process, changing the average brightness of the first respective type of element from the fourth average brightness to a fifth average brightness different from the fourth average brightness.

35. The non-transitory computer-readable storage medium of claim 31, the one or more programs further including instructions for:
prior to displaying the first gaze enrollment user interface, displaying, via the one or more display generation components, a first tutorial animation that includes:
a representation of a face of user; and
representations of one or more gaze targets.

36. The non-transitory computer-readable storage medium of claim 31, wherein:
the first set of user interface elements includes a first plurality of gaze targets that are arranged in a sequential order; and
displaying the first gaze enrollment user interface further comprises:
displaying, via the one or more display generation components, a first gaze target of the first plurality of gaze targets; and
subsequent to displaying the first gaze target, in accordance with a determination that gaze target criteria are met, displaying, via the one or more display generation components, a second gaze target of the first plurality of gaze targets, wherein the second gaze target is different from the first gaze target.

37. The non-transitory computer-readable storage medium of claim 31, wherein:
displaying the first gaze enrollment user interface further comprises displaying, via the one or more display generation components, a first gaze target object; and
the one or more programs further include instructions for:
while displaying the first gaze target object, detecting, via the one or more input devices, a gaze of a user directed at the first gaze target object; and
in response to detecting the gaze of the user directed at the first gaze target object, displaying, via the one or more display generation components, a first progress indication indicating that the computer system has detected the gaze of the user directed at the first gaze target object.

38. The non-transitory computer-readable storage medium of claim 31, the one or more programs further including instructions for:
while displaying the first gaze enrollment user interface:

in accordance with a determination that a user of the computer system has not gazed at a first user interface element of the first set of user interface elements within a threshold duration of time, displaying, via the one or more display generation components, a prompt prompting the user to look at the first user interface element.

39. The non-transitory computer-readable storage medium of claim 31, the one or more programs further including instructions for:

displaying, via the one or more display generation components, a first user interface element of the first set of user interface elements;

while displaying the first user interface element, detecting, via the one or more input devices, a gaze of a user directed at the first user interface element; and in response to detecting the gaze of the user directed at the first user interface element, displaying, via the one or more display generation components, the first user interface element changing color from a first color to a second color different from the first color.

40. The non-transitory computer-readable storage medium of claim 31, the one or more programs further including instructions for:

displaying, via the one or more display generation components, a first gaze element at a first location; and subsequent to displaying the first gaze element at the first location:

in accordance with a determination that first gaze criteria are met, displaying, via the one or more display generation components, a second gaze element at a second location different from the first location.

41. The non-transitory computer-readable storage medium of claim 31, wherein:

displaying the first gaze enrollment user interface further includes displaying a first element of the first set of user interface elements at a first display position; and the one or more programs further include instructions for:

while displaying the first element at the first display position, detecting a gaze of the user directed at a first display region that includes the first display position; and in response to detecting the gaze of the user directed at the first display region, outputting first audio feedback.

42. The non-transitory computer-readable storage medium of claim 31, wherein:

the first set of user interface elements includes a first plurality of gaze targets arranged in a sequential order, including:

a first gaze target that is displayed at a first display location;

a second gaze target that is displayed after the first gaze target and that is displayed at a second display location different from the first display location; and a final gaze target that is displayed after the first gaze target and the second gaze target, and is displayed at the first display location; and displaying the first gaze enrollment user interface further comprises:

displaying, via the one or more display generation components, the first gaze target at the first display location;

subsequent to displaying the first gaze target at the first display location, displaying, via the one or more display generation components, the second gaze target at the second display location; and subsequent to displaying the second gaze target at the second display location, displaying, via the one or more display generation components, the final gaze target at the first display location.

43. The non-transitory computer-readable storage medium of claim 31, wherein:

the first set of user interface elements includes a first plurality of gaze target elements arranged in a sequential order, including:

a first gaze target element that is displayed at a first display position; and a second gaze target element that is displayed after the first gaze target element and that is displayed at a second display position different from the first display position;

the second set of user interface elements includes a second plurality of gaze target elements arranged in a second sequential order, including:

a third gaze target element that is displayed at the first display position; and a fourth gaze target element that is displayed after the third gaze target element and that is displayed at the second display position;

displaying the first gaze enrollment user interface further comprises:

displaying, via the one or more display generation components, the first gaze target element at the first display position with the respective type of element having the first average brightness; and subsequent to displaying the first gaze target element at the first display position, displaying, via the one or more display generation components, the second gaze target element at the second display position with the respective type of element having the first average brightness; and displaying the second gaze enrollment user interface further comprises:

displaying, via the one or more display generation components, the third gaze target element at the first display position with the respective type of element having the second average brightness; and subsequent to displaying the third gaze target element at the first display position, displaying, via the one or more display generation components, the fourth gaze target element at the second display position with the respective type of element having the second average brightness.

44. The non-transitory computer-readable storage medium of claim 31, wherein:

displaying the first gaze enrollment user interface includes displaying the first gaze enrollment user interface within a first passthrough environment; and displaying the second gaze enrollment user interface includes displaying the second gaze enrollment user interface within the first passthrough environment.

45. The non-transitory computer-readable storage medium of claim 31, wherein:

displaying the first gaze enrollment user interface includes displaying the first gaze enrollment user interface within a respective virtual environment; and displaying the second gaze enrollment user interface includes displaying the second gaze enrollment user interface within the respective virtual environment, wherein:

in accordance with a determination that a current time of day satisfies first criteria, the respective virtual environment is a first virtual environment; and in accordance with a determination that the current time of day satisfies second criteria different from the first criteria, the respective virtual environment is a second virtual environment different from the first virtual environment.

46. The non-transitory computer-readable storage medium of claim 31, the one or more programs further including instructions for:

subsequent to displaying the second gaze enrollment user interface:

in accordance with a determination that gaze enrollment criteria are satisfied, displaying, via the one or more display generation components, a success indication indicating that the gaze enrollment criteria are satisfied.

47. The non-transitory computer-readable storage medium of claim 31, the one or more programs further including instructions for:

subsequent to displaying the second gaze enrollment user interface with the respective type of element having the second average brightness, displaying a third user interface with the respective type of element having a sixth average brightness different from the second average brightness.

48. The non-transitory computer-readable storage medium of claim 31, the one or more programs further including instructions for:

subsequent to displaying the second gaze enrollment user interface, displaying, via the one or more display generation components, a third gaze enrollment user interface, wherein:

the third gaze enrollment user interface includes a third set of user interface elements that prompt movement of one or more eyes of the user; and the third gaze enrollment user interface is displayed with the respective type of element having a seventh average brightness different from the second average brightness.

49. A method, comprising:

at a computer system that is in communication with one or more display generation components and one or more input devices:

displaying, via the one or more display generation components, a first gaze enrollment user interface, wherein:

the first gaze enrollment user interface includes a first set of user interface elements that prompt movement of one or more eyes of a user; and the first gaze enrollment user interface is displayed with a respective type of element having a first average brightness;

while displaying the first gaze enrollment user interface with the respective type of element having the first average brightness, collecting gaze information for a plurality of different user interface elements in the first set of user interface elements;

subsequent to collecting the gaze information for the plurality of different user interface elements in the first set of user interface elements while displaying the first gaze enrollment user interface, displaying, via the one or more display generation components, a second gaze enrollment user interface, wherein:

the second gaze enrollment user interface includes a second set of user interface elements that prompt movement of one or more eyes of a user; and the second gaze enrollment user interface is displayed with the respective type of element having a second average brightness different from the first average brightness; and while displaying the second gaze enrollment user interface with the respective type of element having the second average brightness, collecting gaze information for a plurality of different user interface elements in the second set of user interface elements.

50. The method of claim 49, wherein:

the respective type of element is a background element;

displaying the first gaze enrollment user interface includes displaying the first set of user interface elements overlaid on the background element; and displaying the second gaze enrollment user interface includes displaying the second set of user interface elements overlaid on the background element.

51. The method of claim 49, wherein the respective type of element is a gaze target.

52. The method of claim 49, further comprising:

prior to displaying the first gaze enrollment user interface, displaying, via the one or more display generation components, a first user interface with a first respective type of element having a fourth average brightness different from the first average brightness; and in response to one or more user inputs corresponding to a user request to progress a gaze enrollment process, changing the average brightness of the first respective type of element from the fourth average brightness to a fifth average brightness different from the fourth average brightness.

53. The method of claim 49, further comprising:

prior to displaying the first gaze enrollment user interface, displaying, via the one or more display generation components, a first tutorial animation that includes:

a representation of a face of user; and representations of one or more gaze targets.

54. The method of claim 49, wherein:

the first set of user interface elements includes a first plurality of gaze targets that are arranged in a sequential order; and displaying the first gaze enrollment user interface further comprises:

displaying, via the one or more display generation components, a first gaze target of the first plurality of gaze targets; and subsequent to displaying the first gaze target, in accordance with a determination that gaze target criteria are met, displaying, via the one or more display generation components, a second gaze target of the first plurality of gaze targets, wherein the second gaze target is different from the first gaze target.

55. The method of claim 49, wherein:

displaying the first gaze enrollment user interface further comprises displaying, via the one or more display generation components, a first gaze target object; and the method further comprises:

while displaying the first gaze target object, detecting, via the one or more input devices, a gaze of a user directed at the first gaze target object; and in response to detecting the gaze of the user directed at the first gaze target object, displaying, via the one or more display generation components, a first progress indication indicating that the computer system has detected the gaze of the user directed at the first gaze target object.

56. The method of claim 49, further comprising:

while displaying the first gaze enrollment user interface:

in accordance with a determination that a user of the computer system has not gazed at a first user interface element of the first set of user interface elements within a threshold duration of time, displaying, via the one or more display generation components, a prompt prompting the user to look at the first user interface element.

57. The method of claim 49, further comprising:

displaying, via the one or more display generation components, a first user interface element of the first set of user interface elements;

while displaying the first user interface element, detecting, via the one or more input devices, a gaze of a user directed at the first user interface element; and in response to detecting the gaze of the user directed at the first user interface element, displaying, via the one or more display generation components, the first user interface element changing color from a first color to a second color different from the first color.

58. The method of claim 49, further comprising:

displaying, via the one or more display generation components, a first gaze element at a first location; and subsequent to displaying the first gaze element at the first location:

in accordance with a determination that first gaze criteria are met, displaying, via the one or more display generation components, a second gaze element at a second location different from the first location.

59. The method of claim 49, wherein:

displaying the first gaze enrollment user interface further includes displaying a first element of the first set of user interface elements at a first display position; and the method further comprising:

while displaying the first element at the first display position, detecting a gaze of the user directed at a first display region that includes the first display position; and in response to detecting the gaze of the user directed at the first display region, outputting first audio feedback.

60. The method of claim 49, wherein:

the first set of user interface elements includes a first plurality of gaze targets arranged in a sequential order, including:

a first gaze target that is displayed at a first display location;

a second gaze target that is displayed after the first gaze target and that is displayed at a second display location different from the first display location; and a final gaze target that is displayed after the first gaze target and the second gaze target, and is displayed at the first display location; and displaying the first gaze enrollment user interface further comprises:

displaying, via the one or more display generation components, the first gaze target at the first display location;

subsequent to displaying the first gaze target at the first display location, displaying, via the one or more display generation components, the second gaze target at the second display location; and subsequent to displaying the second gaze target at the second display location, displaying, via the one or more display generation components, the final gaze target at the first display location.

61. The method of claim 49, wherein:

the first set of user interface elements includes a first plurality of gaze target elements arranged in a sequential order, including:

a first gaze target element that is displayed at a first display position; and a second gaze target element that is displayed after the first gaze target element and that is displayed at a second display position different from the first display position;

the second set of user interface elements includes a second plurality of gaze target elements arranged in a second sequential order, including:

a third gaze target element that is displayed at the first display position; and a fourth gaze target element that is displayed after the third gaze target element and that is displayed at the second display position;

displaying the first gaze enrollment user interface further comprises:

displaying, via the one or more display generation components, the first gaze target element at the first display position with the respective type of element having the first average brightness; and subsequent to displaying the first gaze target element at the first display position, displaying, via the one or more display generation components, the second gaze target element at the second display position with the respective type of element having the first average brightness; and displaying the second gaze enrollment user interface further comprises:

displaying, via the one or more display generation components, the third gaze target element at the first display position with the respective type of element having the second average brightness; and subsequent to displaying the third gaze target element at the first display position, displaying, via the one or more display generation components, the fourth gaze target element at the second display position with the respective type of element having the second average brightness.

62. The method of claim 49, wherein:

displaying the first gaze enrollment user interface includes displaying the first gaze enrollment user interface within a first passthrough environment; and displaying the second gaze enrollment user interface includes displaying the second gaze enrollment user interface within the first passthrough environment.

63. The method of claim 49, wherein:

displaying the first gaze enrollment user interface includes displaying the first gaze enrollment user interface within a respective virtual environment; and displaying the second gaze enrollment user interface includes displaying the second gaze enrollment user interface within the respective virtual environment, wherein:

in accordance with a determination that a current time of day satisfies first criteria, the respective virtual environment is a first virtual environment; and in accordance with a determination that the current time of day satisfies second criteria different from the first criteria, the respective virtual environment is a second virtual environment different from the first virtual environment.

64. The method of claim 49, further comprising:

subsequent to displaying the second gaze enrollment user interface:

in accordance with a determination that gaze enrollment criteria are satisfied, displaying, via the one or more display generation components, a success indication indicating that the gaze enrollment criteria are satisfied.

65. The method of claim 49, further comprising:

subsequent to displaying the second gaze enrollment user interface with the respective type of element having the second average brightness, displaying a third user interface with the respective type of element having a sixth average brightness different from the second average brightness.

66. The method of claim 49, further comprising:

subsequent to displaying the second gaze enrollment user interface, displaying, via the one or more display generation components, a third gaze enrollment user interface, wherein:

the third gaze enrollment user interface includes a third set of user interface elements that prompt movement of one or more eyes of the user; and the third gaze enrollment user interface is displayed with the respective type of element having a seventh average brightness different from the second average brightness.

\* \* \* \* \*